US011419437B2

(12) United States Patent
Kressin et al.

(10) Patent No.: US 11,419,437 B2
(45) Date of Patent: Aug. 23, 2022

(54) HANGING APPARATUS

(71) Applicant: MCS Industries, Inc., Easton, PA (US)

(72) Inventors: Matthew Scott Kressin, Allentown, PA (US); Ariane Ebba Boli, Delaware Water Gap, PA (US)

(73) Assignee: MCS INDUSTRIES, INC.

( * ) Notice: Subject to any disclaimer, the term of this patent is extended or adjusted under 35 U.S.C. 154(b) by 148 days.

(21) Appl. No.: 15/931,951

(22) Filed: May 14, 2020

(65) Prior Publication Data
US 2020/0268181 A1 Aug. 27, 2020

Related U.S. Application Data

(63) Continuation-in-part of application No. 16/192,218, filed on Nov. 15, 2018, now Pat. No. 11,033,125.
(Continued)

(51) Int. Cl.
| *A47G 1/16* | (2006.01) |
| *A47G 1/02* | (2006.01) |
| *A45D 42/00* | (2006.01) |
| *F16B 45/00* | (2006.01) |
| *F16B 5/07* | (2006.01) |
| *F16B 5/06* | (2006.01) |

(52) U.S. Cl.
CPC .......... *A47G 1/1653* (2013.01); *A45D 42/00* (2013.01); *A47G 1/02* (2013.01); *F16B 45/00* (2013.01); *F16B 5/065* (2013.01); *F16B 5/07* (2013.01)

(58) Field of Classification Search
CPC ......... A47G 1/1653; A47G 1/02; F16B 5/065; F16B 45/00; F16B 5/07; A45D 42/00

USPC .............................. 248/475.1, 466, 489, 490
See application file for complete search history.

(56) References Cited

U.S. PATENT DOCUMENTS

| 2,204,862 A | 12/1937 | Lehman |
| 2,270,796 A | 1/1942 | Hauser |

(Continued)

FOREIGN PATENT DOCUMENTS

| WO | WO2012141780 A2 | 10/2012 |
| WO | WO2012141782 A2 | 10/2012 |

OTHER PUBLICATIONS

Columbia Frame, Instructions to hang mirrow over the door, Columbia Frame Inc., 6251, rue Notre-Dame, Montreal, Quebec H1N 2E9, Nov. 23, 2005.

(Continued)

*Primary Examiner* — Todd M Epps
(74) *Attorney, Agent, or Firm* — Belles Katz LLC

(57) ABSTRACT

An apparatus for hanging an article from a door. In one aspect, the apparatus may be an over-the-door hanging apparatus that includes a support structure, a bracket assembly detachably coupled to the support structure, and at least one accessory unit detachably coupled to the support structure. The bracket assembly includes at least one mounting element for coupling the bracket assembly to the support structure and, at least one bracket configured to engage a top edge of a door for hanging the support structure from the door. The accessory unit may include a mesh portion and a plurality of hooks, with the mesh portion being positioned adjacent to one of the lateral edges of the support structure.

20 Claims, 85 Drawing Sheets

Related U.S. Application Data which is a continuation-in-part of application No. 15/726,865, filed on Oct. 6, 2017, now Pat. No. 10,238,221, which is a continuation-in-part of application No. 15/652,586, filed on Jul. 18, 2017, now Pat. No. 9,801,478, which is a continuation of application No. 15/475,963, filed on Mar. 31, 2017, now Pat. No. 10,080,448, which is a continuation-in-part of application No. 15/297,291, filed on Oct. 19, 2016, now Pat. No. 9,622,600, which is a continuation of application No. 15/084,102, filed on Mar. 29, 2016, now Pat. No. 9,480,350, which is a continuation-in-part of application No. 14/747,656, filed on Jun. 23, 2015, now Pat. No. 9,386,867, which is a continuation-in-part of application No. 14/300,834, filed on Jun. 10, 2014, now Pat. No. 9,060,627, which is a continuation of application No. 14/028,839, filed on Sep. 17, 2013, now Pat. No. 8,746,644, which is a continuation of application No. 12/915,747, filed on Oct. 29, 2010, now Pat. No. 8,534,627.

(60) Provisional application No. 62/848,834, filed on May 16, 2019, provisional application No. 62/586,263, filed on Nov. 15, 2017, provisional application No. 62/405,325, filed on Oct. 7, 2016, provisional application No. 62/216,703, filed on Sep. 10, 2015, provisional application No. 61/334,914, filed on May 14, 2010.

(56) References Cited

U.S. PATENT DOCUMENTS

| | | | |
|---|---|---|---|
| 2,639,109 A | 3/1949 | Hoag | |
| 3,224,715 A | 12/1965 | Maggiore | |
| 3,384,987 A | 5/1968 | Prechtl | |
| 4,216,597 A | 8/1980 | Kocina et al. | |
| 4,466,591 A | 8/1984 | Alonzo | |
| 4,496,128 A | 1/1985 | Larsen | |
| 4,531,315 A | 7/1985 | Sobel | |
| 4,557,457 A | 12/1985 | Cockfield | |
| 4,611,780 A | 9/1986 | Robertson | |
| 4,979,323 A | 12/1990 | Wenkman et al. | |
| 5,413,297 A | 5/1995 | Adams | |
| 5,454,542 A | 10/1995 | Hart | |
| 5,485,932 A | 1/1996 | Romm et al. | |
| 5,645,178 A | 7/1997 | Conley | |
| 5,695,073 A | 12/1997 | Klein et al. | |
| 5,810,304 A | 9/1998 | Lehrman | |
| 5,855,279 A | 1/1999 | Klein et al. | |
| 5,950,337 A | 9/1999 | Lehrman | |
| 6,138,841 A | 10/2000 | Klein | |
| 6,223,914 B1 | 5/2001 | Snell | |
| 6,299,118 B1 | 10/2001 | Farrell | |
| 6,311,851 B1 | 11/2001 | Knudsen, Sr. et al. | |
| 6,575,416 B1 | 6/2003 | Avinger | |
| 6,854,610 B2 | 2/2005 | Adams | |
| 6,857,528 B2 | 2/2005 | Klein et al. | |
| 6,857,608 B2 | 2/2005 | Avinger | |
| 7,097,048 B2 | 8/2006 | Rimback et al. | |
| 7,185,864 B2 | 3/2007 | Adams | |
| 7,188,741 B1 | 3/2007 | Abdi et al. | |
| 7,207,088 B2 | 4/2007 | Adams et al. | |
| RE39,638 E | 5/2007 | Klein et al. | |
| 7,234,671 B2 | 6/2007 | Avinger | |
| 7,309,053 B2 | 12/2007 | Lin | |
| D568,725 S | 5/2008 | Snider | |
| 7,654,500 B1 | 2/2010 | Jump | |
| 7,828,144 B2 | 11/2010 | Bentley et al. | |
| 7,891,124 B1 | 2/2011 | Willis | |
| 7,992,833 B1 | 8/2011 | Goodman et al. | |
| 8,353,490 B2 | 1/2013 | Spinelli | |
| 8,387,838 B2 | 3/2013 | Adams et al. | |
| 8,534,627 B2 | 9/2013 | Kressin | |
| 9,060,627 B2 | 6/2015 | Kressin | |
| 9,279,538 B1 | 3/2016 | Wening | |
| 9,380,891 B2 | 7/2016 | Wittenberg et al. | |
| 9,392,889 B2 | 7/2016 | Trainor-Smith et al. | |
| 9,480,350 B2 | 11/2016 | Kressin et al. | |
| 9,622,600 B2 | 4/2017 | Kressin et al. | |
| D791,578 S | 7/2017 | Royak | |
| 9,801,478 B1 * | 10/2017 | Kressin | A45D 42/00 |
| 10,039,394 B2 | 8/2018 | Pyle | |
| 10,080,448 B2 * | 9/2018 | Kressin | A45D 42/00 |
| 10,238,221 B2 * | 3/2019 | Kressin | F16M 11/046 |
| 10,681,995 B2 | 6/2020 | Pyle et al. | |
| 10,835,061 B2 * | 11/2020 | Kressin | F16M 13/022 |
| 10,959,546 B2 * | 3/2021 | Kressin | A47G 25/10 |
| 11,033,125 B2 * | 6/2021 | Kressin | F16M 13/022 |
| 2003/0201291 A1 | 10/2003 | Kestler | |
| 2004/0173550 A1 | 9/2004 | Adams | |
| 2005/0189458 A1 | 9/2005 | Avinger | |
| 2007/0001088 A1 | 1/2007 | Bowman | |
| 2008/0098664 A1 | 5/2008 | McGregor | |
| 2008/0110777 A1 | 5/2008 | Bentley et al. | |
| 2008/0185299 A1 | 8/2008 | Thorman | |
| 2008/0185353 A1 | 8/2008 | Immerman et al. | |
| 2008/0245751 A1 | 10/2008 | Moran | |
| 2009/0165319 A1 | 7/2009 | Gallien | |
| 2009/0199783 A1 | 8/2009 | Wilmore | |
| 2010/0308193 A1 | 12/2010 | Bonshor | |
| 2011/0168858 A1 | 7/2011 | Mears | |
| 2011/0253755 A1 | 10/2011 | Adams et al. | |
| 2011/0284707 A1 | 11/2011 | Adams et al. | |
| 2012/0251988 A1 | 10/2012 | Moffatt | |
| 2014/0034801 A1 | 2/2014 | Kim | |
| 2017/0035223 A1 | 2/2017 | Kressin et al. | |
| 2017/0055728 A1 | 3/2017 | Krake et al. | |
| 2017/0055729 A1 | 3/2017 | Krake et al. | |
| 2017/0055730 A1 | 3/2017 | Krake et al. | |
| 2017/0055732 A1 | 3/2017 | Krake et al. | |
| 2017/0202374 A1 | 7/2017 | Kressin et al. | |
| 2017/0367506 A1 | 12/2017 | Pyle et al. | |
| 2019/0082863 A1 * | 3/2019 | Kressin | F16M 11/046 |

OTHER PUBLICATIONS

Alibaba Group, Cute Stainless Steel Over the Door Dual Hanger Hook Hat Coat Holder Worldwide Store, website www/aliexpress.com, printed Oct. 4, 2016. US.

Aliexpress, Fashion Brand Wall Hanger Hooks Rose Leaves Metal Over Door Kitchen Bathroom for Coat Hat Towel Holder, website www.aliexpress.com, printed Oct. 4, 2016. US.

Aliexpress, Over Door Bathroom Hanger Coat Clothes Hat Bag Towel Hanging Rack Holder—7 Hooks, website www.aliexpress.com, printed Oct. 4, 2016. US.

Iron Accents, Discover decorating with wrought iron flair!; Wire Mesh Wall Mirror Center, website: https://www.ironaccents.com/19-cq7241.html, Printed Nov. 15, 2018 US.

Vintage. Brass Wire Mesh Mirror, 1950s, Website: https://www.vntg.com/70801/brass-wire-mesh-mirror-1950s. Printed Nov. 15, 2018 Germany.

West Elm, Entryway Mirror and Hooks, Website: https://www.westelm.com/products/entryway-mirror-hooks-d3047/, Printed Nov. 15, 2018 US.

Target, Rectangle Entryway Decorative Wall Mirror with Hooks—Threshold. Website: https://www.target.com/p/rectangle-entryway-decorative-wall-mirror-with-hooks-threshold-153/-/A-50362224. Printed Nov. 15, 2018 US.

West Elm, Entryway Mirror and Hooks—Large. Website: https://www.westelm.com/products/entryway-mirror-hooks-large-d3050/. Printed Nov. 15, 2018 US.

Gallery Perfect, Photo Frame Wall Gallery Kit, https://www.amazon.com/GALLERY-PERFECT-Piece-Gallery-13FW2901/dp/B00MFL5TOY, Website, Amazon.com. US.

At Home Frame Images Aug. 15, 2017, pp. 1-9.

\* cited by examiner

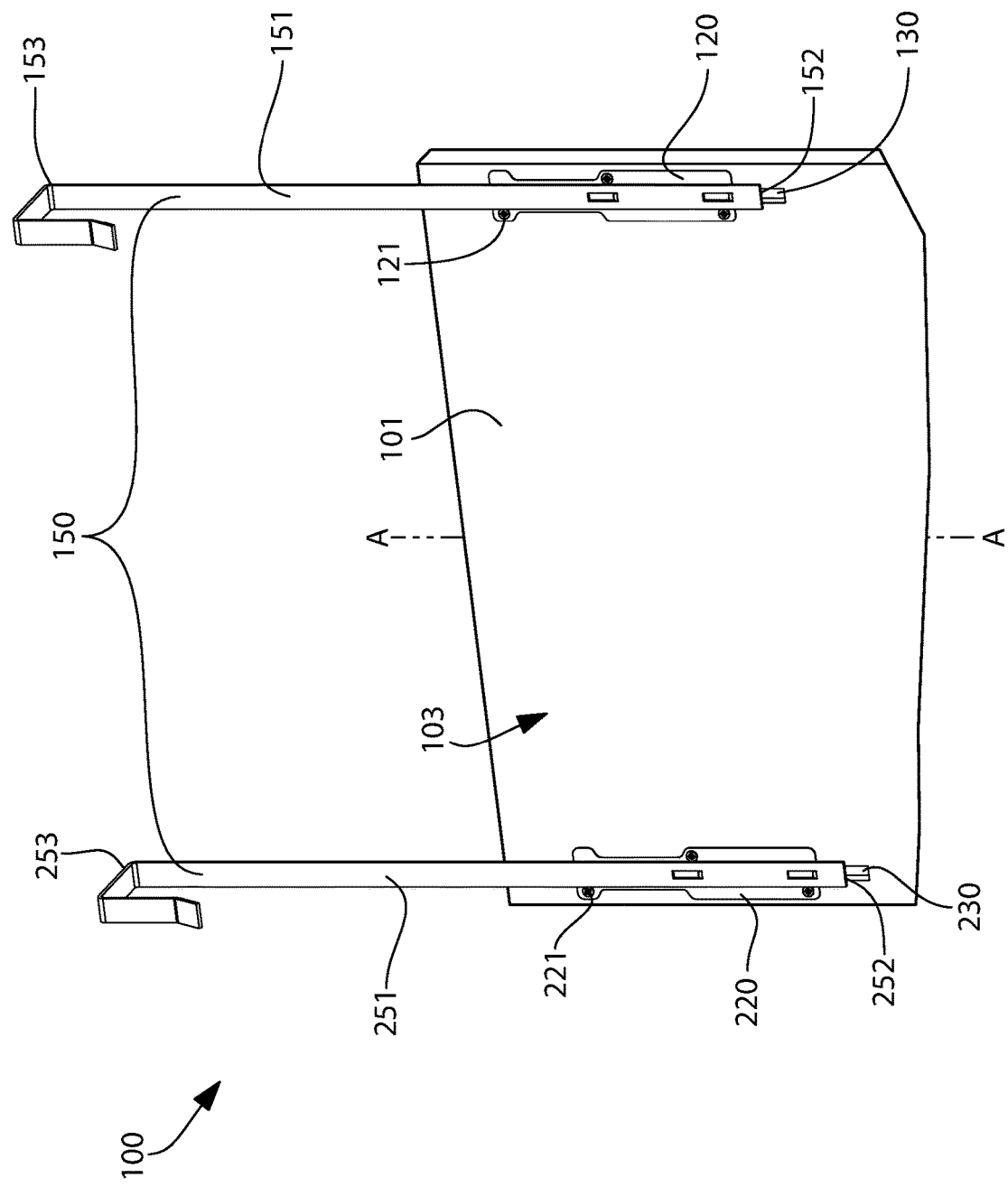

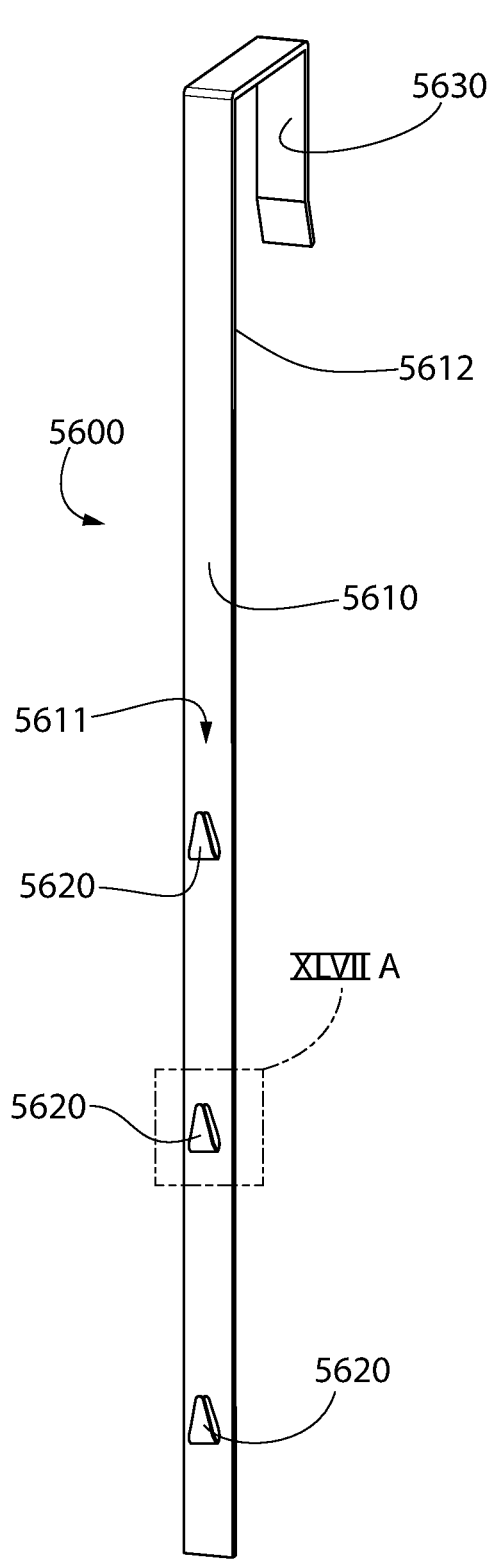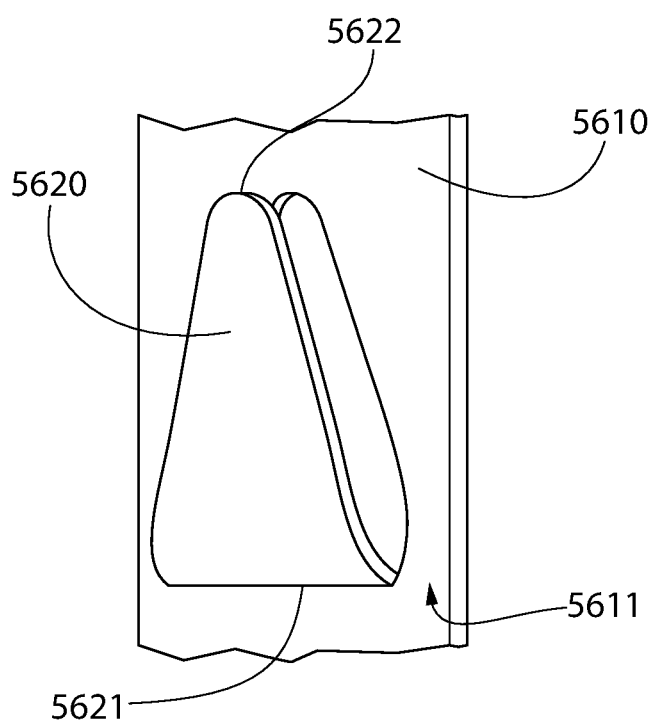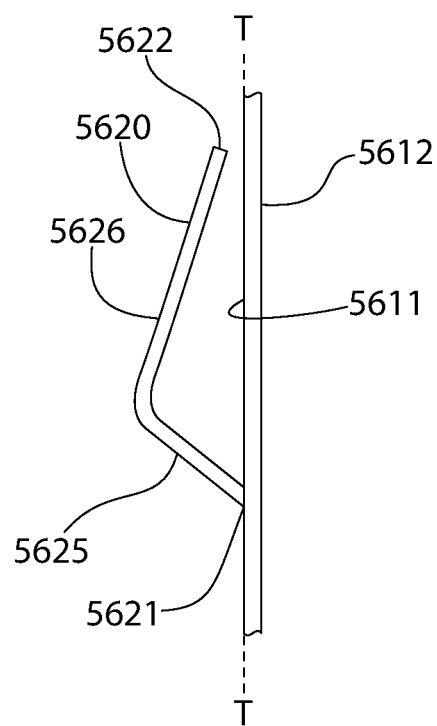
FIG. 47
FIG. 47A
FIG. 47B

HANGING APPARATUS

CROSS-REFERENCE TO RELATED PATENT APPLICATIONS

The present application claims the benefit of U.S. Provisional Patent Application Ser. No. 62/848,834, filed May 16, 2019. The present application is also a continuation-in-part of U.S. patent application Ser. No. 16/192,218, filed Nov. 15, 2018.

U.S. patent application Ser. No. 16/192,218 claims the benefit of U.S. Provisional Patent Application Ser. No. 62/586,263, filed Nov. 15, 2017. U.S. patent application Ser. No. 16/192,218 is also a continuation-in-part of U.S. patent application Ser. No. 15/726,865, filed Oct. 6, 2017, which: (1) claims the benefit of U.S. Provisional Patent Application Ser. No. 62/405,325, filed Oct. 7, 2016; and (2) is a continuation-in-part of U.S. patent application Ser. No. 15/652,586, filed Jul. 18, 2017, now U.S. Pat. No. 9,801,478, which is a continuation of U.S. patent application Ser. No. 15/475,963, filed Mar. 31, 2017, now U.S. Pat. No. 10,080,448, which in turn: (1) is a continuation-in-part of U.S. patent application Ser. No. 15/297,291, filed Oct. 19, 2016, now U.S. Pat. No. 9,622,600; and (2) claims the benefit of U.S. Provisional Patent Application Ser. No. 62/405,325, filed Oct. 7, 2016.

U.S. patent application Ser. No. 15/297,291, filed Oct. 19, 2016, is a continuation of U.S. patent application Ser. No. 15/084,102, filed Mar. 29, 2016, now U.S. Pat. No. 9,480,350, which in turn: (1) claims the benefit of U.S. Provisional Patent Application Ser. No. 62/216,703, filed Sep. 10, 2015; and (2) is a continuation-in-part of U.S. patent application Ser. No. 14/747,656, filed Jun. 23, 2015, now U.S. Pat. No. 9,386,867.

U.S. patent application Ser. No. 14/747,656, filed Jun. 23, 2015, is a continuation-in-part of U.S. patent application Ser. No. 14/300,834, filed Jun. 10, 2014, now U.S. Pat. No. 9,060,627, which in turn is a continuation of U.S. patent application Ser. No. 14/028,839, filed Sep. 17, 2013, now U.S. Pat. No. 8,746,644, which in turn is a continuation of U.S. patent application Ser. No. 12/915,747, filed Oct. 29, 2010, now U.S. Pat. No. 8,534,627, which in turn claims the benefit of U.S. Provisional Patent Application Ser. No. 61/334,914, filed May 14, 2010.

The entirety of each of the above-referenced applications is incorporated herein by reference.

BACKGROUND OF THE INVENTION

Mirrors are used often in everyday life. For example, the first thing that a person does after waking up is go to the bathroom and look at him or herself in the mirror. Furthermore, people also typically look at themselves in the mirror prior to leaving the house to make sure that they are pleased with their appearance. A very common room in the home for a person to desire to have a mirror is in the bedroom or the bathroom. However, there is not always a good place to put a mirror in those rooms. Therefore, it has been known to hang a mirror on a wall or from a door by using adhesives, screws, nails or hangers. Doors have been widely used to support mirrors because they provide convenient available space, because they may be removed to facilitate mounting of the mirror, and because they avoid the necessity of placing wall anchors in plaster or drywall.

In addition to mirrors, people often desire to hang other articles or objects from a door in order to conserve space while still enjoying the benefits of the article. For example, people may desire to hang a painting, picture or some other framed article from a door. Depending on the person's needs and the space that the person has available, a person may desire to hang an object that may otherwise be hung or attached to a wall from a door instead.

Typical hangers that enable a user to hang a mirror or other article from a door require a user to assemble the hanger onto the rear of the mirror or other article by screwing, gluing or otherwise attaching the hanger directly onto the rear of the mirror or other article. This type of an installation requires a screw driver or glue, which a user or consumer does not always have available. Furthermore, in the case of a screw-type assembly, even if the user has a screwdriver, the user may find it difficult to force the screw into the rear of the mirror or other article because the mirror or other article typically does not have pilot or pre-drilled holes.

Thus, a need exists for an apparatus and/or system that can be used to hang a mirror or other item from a door without the need for a screw driver or any other tools. A need also exists for an apparatus and/or system that provides added functionality to a mirror or other item that is hanging from a door or other surface.

SUMMARY OF THE INVENTION

The present invention may be directed to an apparatus that can be hung from a wall or a door, and more particularly an apparatus that is intended to be hung from the top edge of a door, also referred to as an over-the-door hanging apparatus. That apparatus may include a support member, a bracket assembly detachably coupled to the support member for hanging the support member from the desired surface, and an accessory unit detachably coupled to the support member. The accessory unit may include a mesh portion for the storage of jewelry or the like and/or hooks for holding desired articles such as hats, coats, backpacks, umbrellas, or the like. The apparatus may be assembled in a "tools-free" manner.

In one aspect, the invention may be a hanging apparatus comprising: a support structure comprising a front surface, a rear surface, and a perimetric edge extending between the front and rear surfaces; a bracket assembly coupled to the support structure and configured to hang the support structure from a top edge of a door; and at least one accessory unit detachably coupled to the support structure, the at least one accessory unit comprising a mesh portion positioned adjacent to at least a portion of the perimetric edge of the support structure.

In another aspect, the invention may be a hanging apparatus comprising: a support structure comprising a front surface, a rear surface, and a perimetric edge extending between the front and rear surfaces; a bracket assembly coupled to the support structure and configured to hang the support structure from a surface; and a first accessory unit detachably coupled to the support structure, the first accessory unit comprising a plurality of hooks arranged in a spaced apart manner adjacent to at least a portion of the perimetric edge of the support structure.

In yet another aspect, the invention may be an apparatus comprising: a support structure; a mirror coupled to the support structure and exposed at a front surface of the support structure; a first accessory unit detachably coupled to the support structure and being positioned adjacent to a lateral edge of the support structure; a second accessory unit detachably coupled to the support structure and being positioned adjacent to a bottom edge of the support structure;

and wherein each of the first and second accessory units comprises a plurality of hooks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a close-up view of a top portion of the over-the-door hanging apparatus of FIG. 1.

FIG. 47 is a perspective view of a portion of a bracket assembly in accordance with an embodiment of the present invention.

FIG. 47A is a close-up view of area XLVIIA of FIG. 47.

FIG. 47B is a side view of the close-up shown in FIG. 47A.

DETAILED DESCRIPTION OF THE INVENTION

Figure 1:
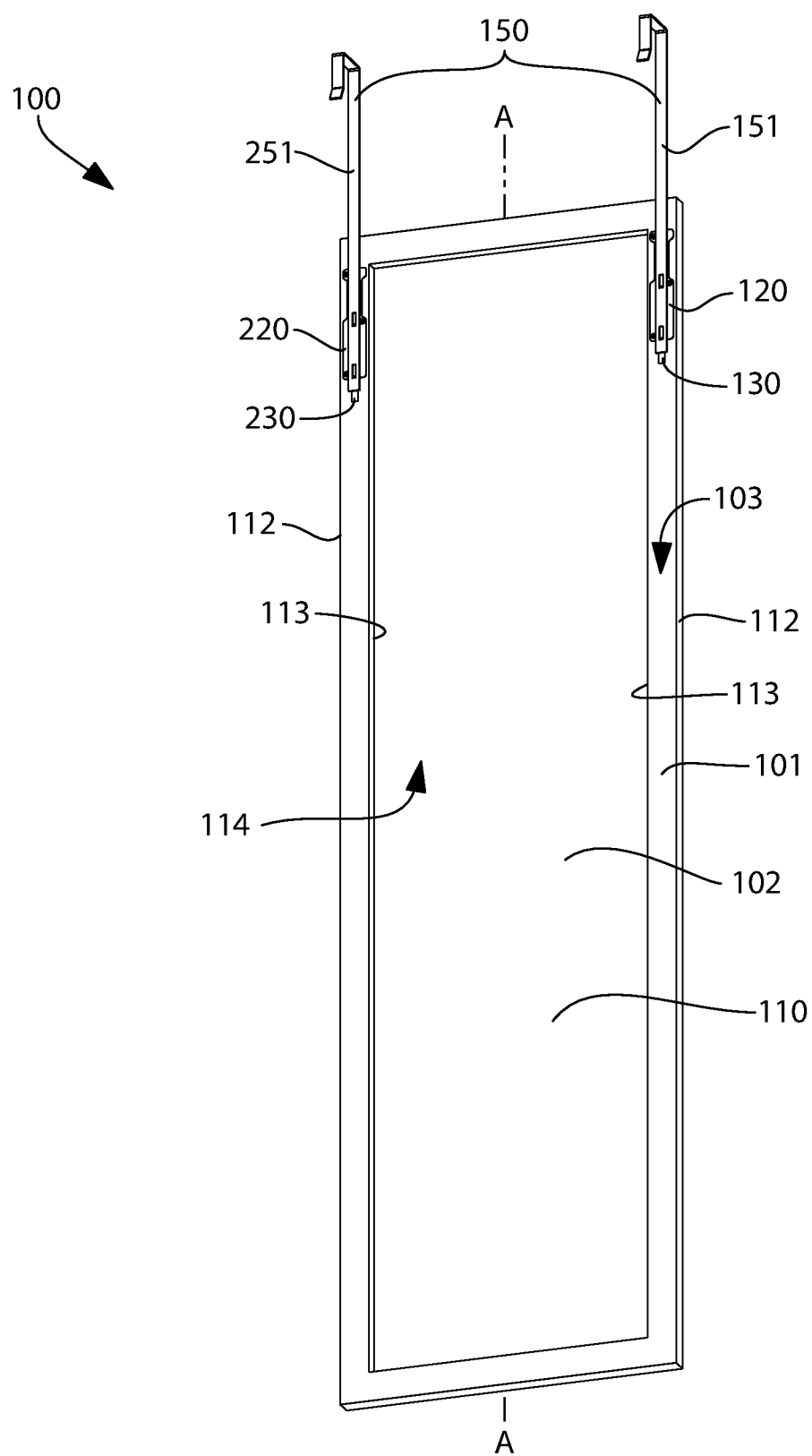
FIG. 1 is a perspective rear view of an over-the-door hanging apparatus in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto. Where there is a conflict in the language used throughout the specification, the definition and use of the terminology in the section of the specification describing embodiments that are relevant to the particular claims at issue controls.

Referring to FIGS. 1-2 concurrently, a first embodiment of an over-the-door hanging apparatus 100 is illustrated. The over-the-door hanging apparatus 100 generally comprises a frame 101, a flat article 110 supported within the frame 100, first and second mounting plates 120, 220 secured to a rear surface 103 of the frame 101, and a bracket assembly 150 to which the frame 101 is slidably mounted (as discussed in greater detail below).

In the exemplified embodiment of FIGS. 1 and 2, the frame 101 is a perimeter-type frame comprising an outer edge 112 and an inner edge 113. The inner edge 113 forms a closed-geometry thereby defining a central opening 114. A flat article 110, such as a mirror, is positioned and supported within the central opening 114 according to known mounting techniques. Although the invention will be described with reference to the flat article 110 being a mirror, any other substantially flat article (or article with a substantially flat rear surface) can be used in conjunction with the present invention, including artwork, diplomas, or the like. Furthermore, as used herein, the term "frame" is not limited to a traditional perimeter-type frame having a central opening, but includes frames resembling a simple backer-board or plate that takes up the entire (or a portion of) rear surface area of the article to be mounted thereon. Preferably, however, the desired flat article is displayed by frame 101 so as to be visible to a user when the over-the-door hanging apparatus 100 is hung from a door as described below.

The over-the-door hanging apparatus 100 comprises a first mounting plate 120 and a second mounting plate 220 that are secured to the rear surface 103 of the frame 101 on opposite lateral sides of a vertical centerline A-A. The first and second mounting plates 120, 220 are secured to the frame 101 via screws 121, 221, respectively. Of course, other fasteners and fastening techniques can be used to secure the first and second mounting plates 120, 220 to the frame, including without limitation bolts, nails, rivets, clamps, ties, slot-and-groove mating connections, snap-fit connections, and/or combinations thereof.

The over-the-door hanging apparatus 100 also comprises a bracket assembly 150 to which the frame 101 is detachably mounted. More specifically, the frame 101 is detachably mounted to the bracket assembly through a slidable mating between the first and second mounting plates 120, 220 and the hooks of the bracket assembly 150, which will be described in great detail below. The frame 101 comprises a first channel 130 and a second channel 230 (fully visible in FIG. 5). Only a bottom portion of the first and second channels 130, 230 is visible in FIGS. 1 and 2.

In the exemplified embodiment, the over-the-door hanging apparatus 100 comprises a perimeter-style frame 101, two mounting plates 120, 220 and a bracket assembly 150 that includes a first elongate bracket member 151 and a second elongate bracket member 251. In this embodiment, the two mounting plates 120, 220 are attached to the frame 101 on opposite sides of the vertical centerline A-A of the frame 101 while the first elongate member 151 is slidably attached to the first mounting plate 120 and the second elongate member 251 is slidably attached to the second mounting plate 220. Of course, the invention is not so limited and the over-the-door hanging apparatus 100 may comprise only one mounting plate and one elongate bracket member connected to a central region of the frame 101. Alternatively, the over-the-door hanging apparatus 100 may comprise greater than two mounting plates and a corresponding number of elongate members of the bracket assembly to provide for a more secure connection between the bracket assembly 150 and the frame 101. Moreover, while the first and second elongate bracket members 151, 251 are exemplified as separate structures, it is possible for theses members 151, 251 to be formed as a single construct.

For purposes of referencing direction and orientation of the various components of the over-the-door hanging apparatus 100, it should be noted that relative terms such as top, bottom, left, right, lateral, proximal, distal, upward, outward, inward, vertical, horizontal, and the like are used to delineate relative positions of the components of the inventive over-the-door hanging apparatus 100 with respect to one another and with respect to the vertical centerline A-A and are not intended to be in any further way limiting of the present invention.

Figure 3A:
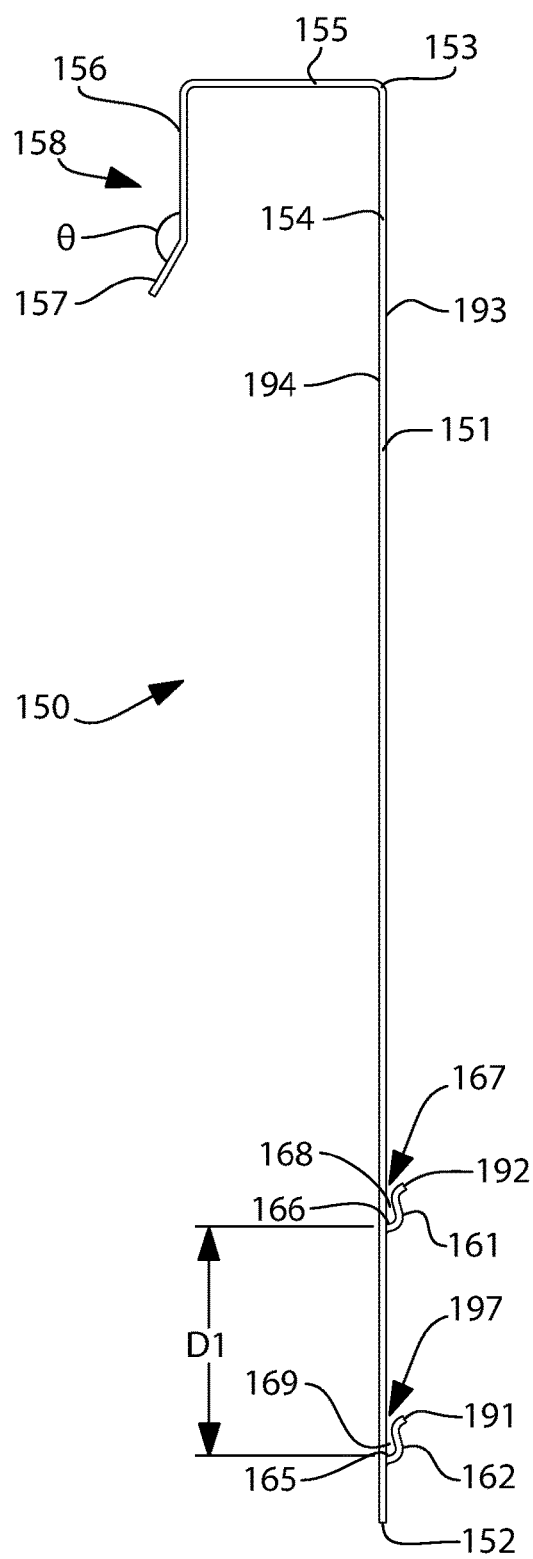
FIG. 3A is a side view of an elongate member of the over-the-door hanging apparatus of FIG. 1.
Figure 3B:
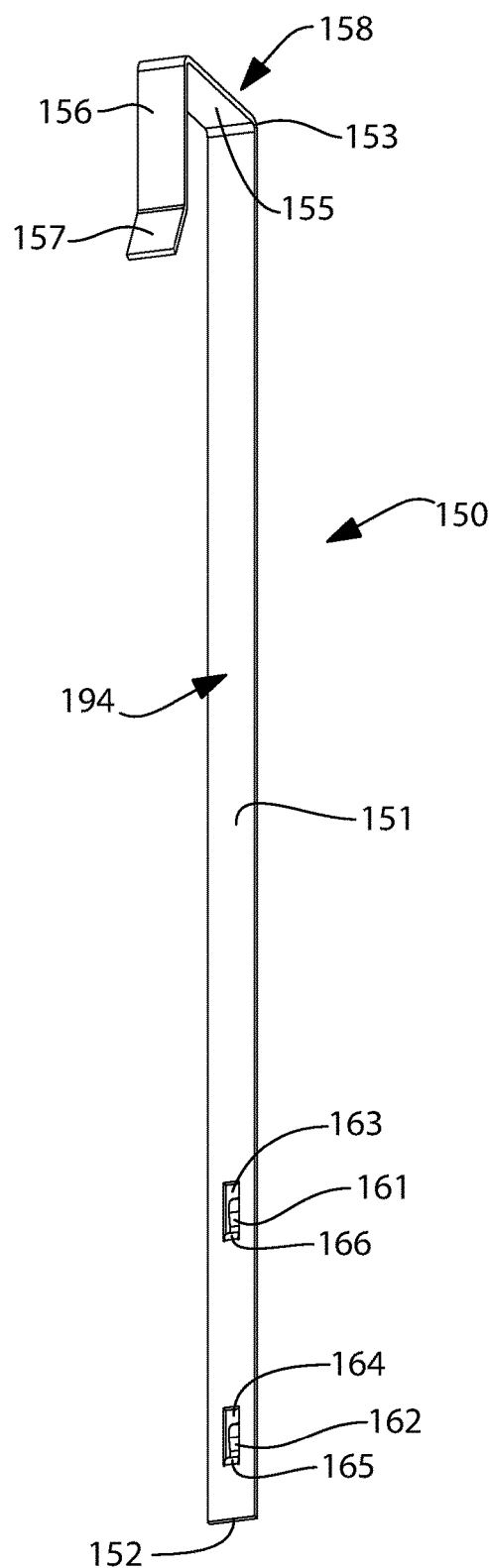
FIG. 3B is a perspective view of the elongate member of FIG. 3A.

Referring now to FIGS. 2, 3a and 3b concurrently, a detailed description of the bracket assembly 150 will be set forth. The structural details of the elongate bracket members 151, 252 will be discussed herein with respect to the first elongate member 151 with the understanding that the same is applicable to the second elongate member 251 in all respects.

The first elongate member 151 extends from a distal end 152 to a proximal end 153 and comprises a front surface 193 and an opposite rear surface 194. The first elongate member 151 is preferably an integrally formed structure formed by appropriately bending a flat strip of flexible metal (sheet metal) which may be formed from steel or the like. Of course, other materials and formation techniques can be used, including the molding, milling and/or lathing of plastics, matrix materials, or any other material capable of withstanding the required load-bearing requirements. Moreover, while the first elongate member 151 of the bracket assembly 150 is preferably flexible in nature, it may be constructed so as to be substantially rigid if desired.

A generally U-shaped bracket 158 is provided at a proximal end 153 of the first elongate member 151 and extends from the rear surface 194 thereof for sliding over and engaging a top edge of a door. The U-shaped bracket 158 comprises a front portion 154, a top portion 155 and a back portion 156 that terminates with an angled flange 157. The front portion 154 corresponds to a top portion of the elongate member 151 and it encompasses the proximal end 153 of the elongate member 151. The top portion 155 extends outward from the rear surface 194 of the elongate member 151 at the proximal end 153 so as to form an approximately 90 degree angle with the front portion 154 of the U-shaped bracket 158. Although the top portion 155 is described as extending at an approximately 90 degree angle from the front portion 154 of the U-shaped bracket 158, it may extend at other angles if desired. The back portion 156 of the U-shaped bracket 158 extends downwardly from the top portion 155 at an approximately 90 degree angle with the top portion 155, thereby forming the U-shaped bracket 158 of the first elongate member 151 of the bracket assembly 150. The angled flange 157 diverges slightly outward from the back portion 156 at an obtuse angle Θ in order to facilitate placement of the U-shaped bracket 158 over a top edge of a door as will be described below with reference to FIG. 8.

The U-shaped bracket 158 is preferably made of a flexible material so that it can bend and more easily fit over doors with varying widths. In other words, it is preferable that a user is able to extend the distance between the back portion 156 and the front portion 154 of the U-shaped bracket 158 by applying an outward force on the flange 157. The top portion 155 of the U-shaped bracket 158 is made wide enough to accommodate a conventional door width which the inventive bracket assembly 150 is to be used. The thickness of the material, and hence its flexibility, must be chosen so that the U-shaped bracket 158 is sufficiently rigid to avoid deformation under the load of the flat article 110 and yet is thin enough to fit over the top of the door without creating clearance problems with respect to the cap of the door frame. In use, a user may grip and pull on the flange portion 157 of the U-shaped bracket 158 of the bracket assembly 150 in order to assist with the attachment of the bracket assembly 150 to the top edge of a door as will be described in detail below with reference to FIG. 11.

The first elongate member 151 further comprises a top hook 161 and a bottom hook 162 near the distal end 152 of the elongate member 151. The top hook 161 and the bottom hook 162 collectively form a pair of hooks and are often referred to as such throughout this application. In the exemplified embodiment, the top and bottom hooks 161, 162 are integrally formed with the first member 151. More specifically, the top and bottom hooks 161, 162 are preferably formed by punching an appropriate pattern in the first elongate member 151 and subsequently bending the in-plane tab out of plane and into the desired shape. As a result, apertures 163, 164 (i.e. holes) are formed in the elongate member 151 behind the hooks 161, 162. The apertures 163, 164 enable the elongate member 151 to be manufactured with less material and also prevent the elongate member 151 from prematurely deteriorating due to the friction of the mounting plates 120, 220 against the hooks 161, 162. Of course, the apertures 163, 164 need not be included as a part of the elongate member 151 and the hooks 161, 162 can be separate structures that are subsequently welded, fastened, clamped or otherwise connected to the first elongate member 151.

The top and bottom hooks 161, 162 each extend outwardly from the front surface 193 of the elongate member 151 and upwardly toward the proximal end 153. The top hook 161 extends from a base 166 at which it connects to the elongate member 151 to a distal end 192 at which it terminates. Similarly, the bottom hook 162 extends from a base 165 at which it connects to the elongate member 151 to a distal end 191 at which it terminates. The top and bottom hooks 161, 162 are preferably in a linear vertical alignment with one another on the front surface 193 of the elongate member 151. The hooks 161, 162 each have a length which is equal to the distance from the bases 165, 166 to the distal ends 191, 192 of the hooks 161, 162, respectively. The base 166 of the top hook 161 is spaced a distance D1 from the base 165 of the bottom hook 162, the importance of which will become apparent from the description below with reference to FIGS. 4a and 4b.

The top and bottom hooks 161, 162 are preferably S-shaped tabs. The S-shape of the top and bottom hooks 161, 162 are preferred in order to accomplish an efficient attachment between the bracket assembly 150 and the mounting plates 120, 220 as will be described below. The invention, of course, is not limited by the shape of the hooks and other shapes may be used as would be known to persons skilled in the art. For example, the top and bottom hooks 161, 162 could simply be straight tabs extending outwardly in an angled fashion from the bracket assembly 150 for slidable mating with the edges of the mounting plates as described below. Furthermore, it should be understood that the term hooks is intended to include any tab-type structure that may extend outwardly from the bracket assembly 150 in a manner that affords slidable mating with the edges of the mounting plates 120, 220 and is not intended to be in any other way limiting of the present invention.

Both of the top and bottom hooks 161, 162 extend outwardly and upwardly from the front surface 193 of the elongate member 151 in a spaced part manner so that slots 168, 169 are formed between the hooks 161, 162 and the front surface 193 of the elongate member 151. Both of the slots 168, 169 have an open top end 167, 197 that provides access into the slots 168, 169 so that the edges of the mounting plates can be lowered into the slots 168, 169 during mounting of the frame 101 to the bracket assembly 150, which will be described in greater below with reference to FIG. 6.

Figure 4A:
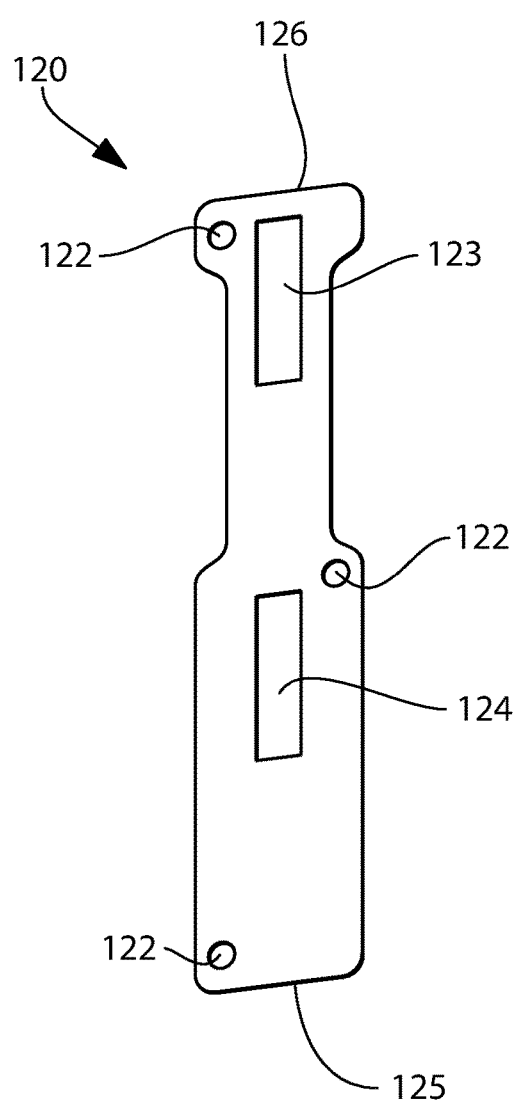
FIG. 4A is a perspective view of a mounting plate of the over-the-door hanging apparatus of FIG. 1.
Figure 4B:
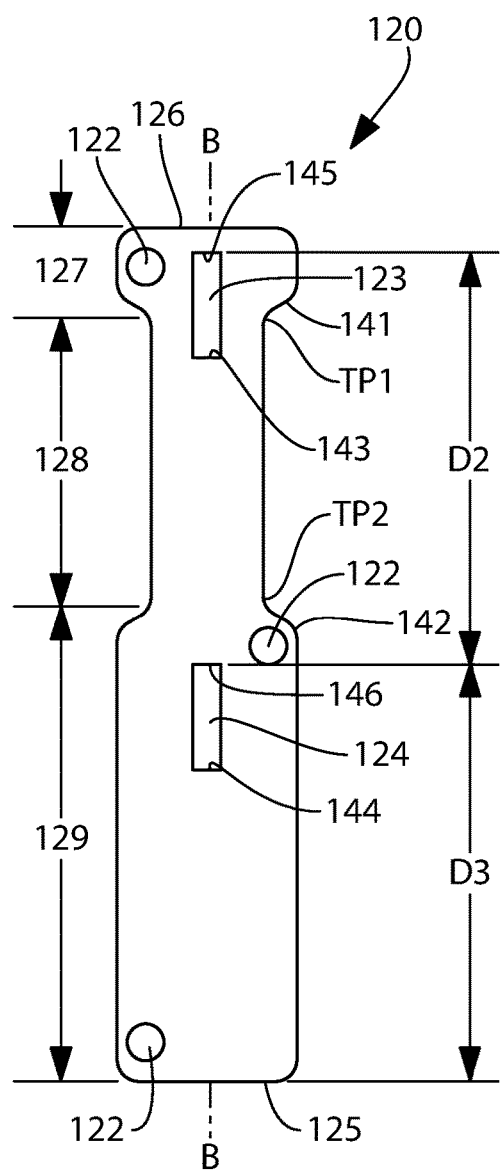
FIG. 4B is a front view of the mounting plate of FIG. 4A.

Referring now to FIGS. 4a and 4b, the details of the mounting plates 120, 220 of the present invention will be described. Similar to the description of the elongate members 151, 251 above, only the first mounting plate 120 will be described in detail with the understanding that the discussion is applicable to the second mounting plate 220.

The first mounting plate 120 is preferably a flat plate that can be secured to the frame 101 by any of the techniques described above. The first mounting plate 120 comprises a plurality of screw holes 122 that are sized and configured to receive a screw to facilitate the attachment of the first mounting plate 120 to the frame 101. Although the first mounting plate 120 is illustrated having three screw holes 122, the invention is not so limited and the first mounting plate 120 may have more or less than three screw holes 122 as desired. When attached to the frame 101, a rear surface (not shown) of the first mounting plate 120 is in surface contact with the rear surface 103 of the frame 101 by nature of their opposing flat surfaces.

The first mounting plate 120 is preferably a flat plate that is substantially free of contour for the entirety of its major planar surfaces. The first mounting plate 120 has an overall perimeter shape such that its cross-sectional area changes throughout its length. The first mounting plate 120 has a bottom edge 125, a top edge 126 and two vertical sides that collectively form the perimeter of the first mounting plate 120. The first mounting plate 120 also comprises a vertical axis B-B that is substantially transverse to and intersects the bottom and top edges 125, 126 of the first mounting plate 120. A top section 127 of the first mounting plate 120 extends from the top edge 126 of the first mounting plate 120 to a transition point TP1. A middle section 128 of the first mounting plate 120 extends from the transition point TP1 to a transition point TP2. A bottom section 129 of the first mounting plate 120 extends from the transition point TP2 to the bottom end 125 of the first mounting plate 120. The cross-sectional area of the top section 127 of the first mounting plate 120 gradually decreases from a point 141 in the top section 127 to the transition point TP1. The middle section 128 of the first mounting plate 120, which extends from the transition point TP1 to the transition point TP2, has a constant cross-sectional area throughout its length. The cross-sectional area of the bottom section 129 of the first mounting plate 120 gradually increases from the transition point TP2 to a point 142. The cross-sectional area of the first mounting plate 120 is again constant from the point 142 of the bottom section 129 of the first mounting plate 120 to the bottom edge 125 of the first mounting plate 120. The shape of the first mounting plate 120 provides the first mounting plate 120 with a structural rigidity while using a minimized amount of materials in order to reduce the costs in manufacturing.

In the illustrated embodiment, the first mounting plate 120 comprises a top aperture 123 and a bottom aperture 124. The top aperture 123 is positioned partially within both of the top and middle sections 127, 128 while the bottom aperture 124 is positioned within the bottom section 129 only. Although the invention is described with a plate having two apertures, the first mounting plate 120 may have only one aperture or more than two apertures as would be understood by a person skilled in the art. Furthermore, the apertures 123, 124 may be positioned on other locations on the first mounting plate 120 as desired. Using more apertures will enable additional adjustability to the hanging height of the article as will be described below. The apertures 123, 124 in the first mounting plate 120 are preferably rectangular in shape, but may take on any other shape as desired.

The top aperture 123 is defined by a closed-geometry edge that includes a top edge 145 and a bottom edge 143. Similarly, the bottom aperture 124 is defined by a closed-geometry edge that includes a top edge 146 and a bottom edge 144. The top edge 145 of the top aperture 123 is spaced a distance D2 from the top edge 146 of the bottom aperture 124, measured along the linear axis B-B. Similarly, the top edge 146 of the bottom aperture 124 is spaced a distance D3 from the bottom edge 125, measured along the axis B-B. The first mounting plate 120 is designed so that the distance D2 is substantially equal to the distance D3. Furthermore, both of these distances D2, D3 are also substantially equal to the distance D1 between the hooks 161, 162 (discussed above with respect to FIGS. 3a, 3b). The importance of the edges 145, 146, 125, and the distances D1, D2, D3 will become apparent from the description below with reference to FIG. 5.

Figure 5:
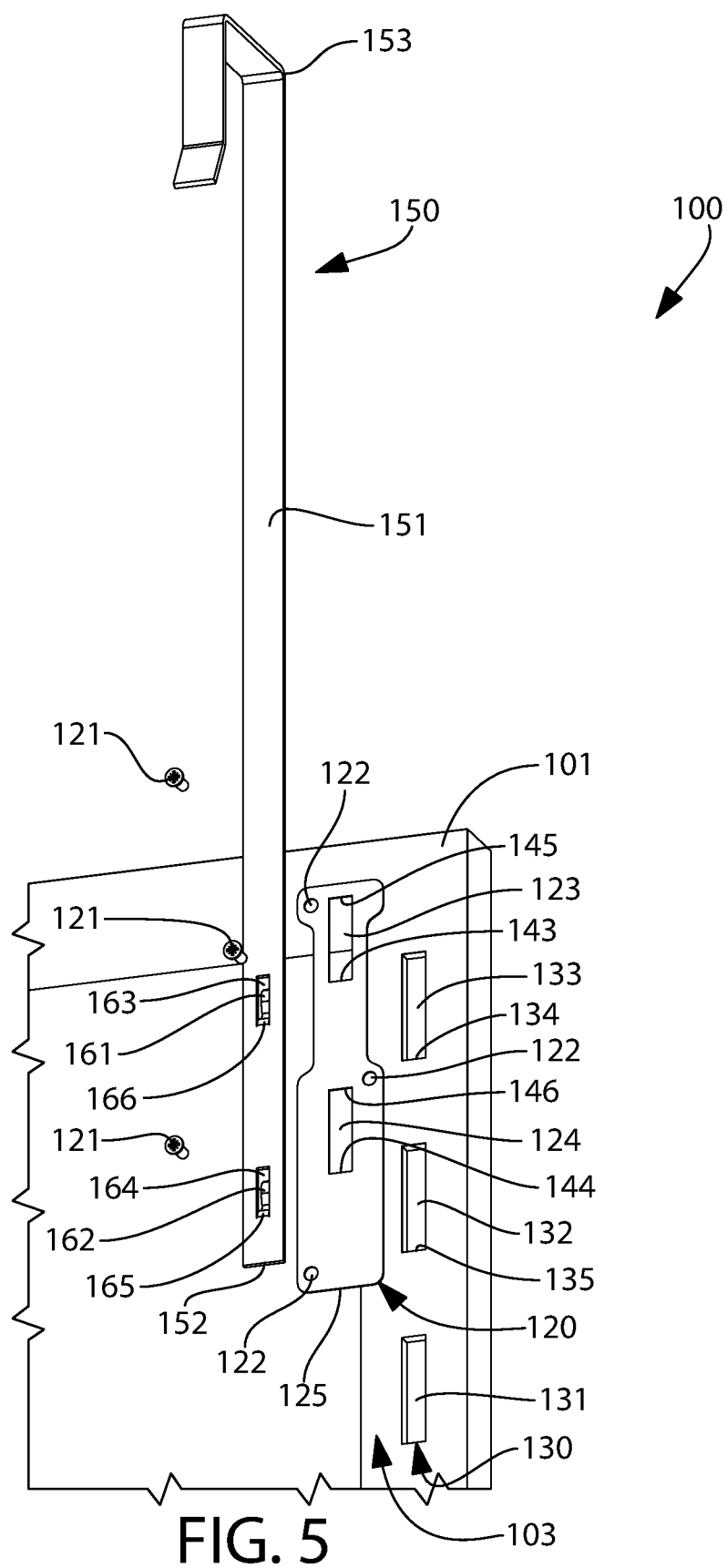
FIG. 5 is an exploded perspective view of a portion of the over-the-door hanging apparatus of FIG. 1.

Referring now to FIG. 5, a portion of the over-the-door hanging apparatus 100 is illustrated in an exploded state. As can be seen, the frame 101 comprises has a first channel 130 formed into the rear surface 103 on one side of the vertical centerline A-A of the frame 101 along the right lateral (another one of the channels is provided on the opposite side of the vertical centerline A-A). In the exemplified embodiment of FIG. 5, the channel 130 is illustrated as a segmented channel 130 comprising a first channel segment 131, a second channel segment 132 and a third channel segment 133.

As noted above, FIG. 5 illustrates the channel 130 as comprising a first channel segment 131, a second channel segment 132 and a third channel segment 133. However, more than three channel segments may be used as desired for further adjustability in the hanging height of the over-the-door hanging apparatus 100 as will be described below. Furthermore, the frame 101 may be configured with less than three channel segments and still be used as described below as would be understood by a person skilled in the art.

Each of the channel segments 131-133 of the channel 130 is a rectangular shaped depression formed into the frame 101. The channel segments 131-133 of the channel 130 each form a groove or trough within the rear surface 103 of the frame 101 that comprises a floor and, thus, do not extend through the entire thickness of the frame 101. However, in alternative embodiments, one or more of the channel segments 131-133 of the channel 130 may be through-holes in the sense that they could extend all the way through the thickness of the frame 101. Of course, the channel segments 131-133 are contemplated as taking on any other shapes, including without limitation circles, triangles, trapezoids or the like.

Figure 7:
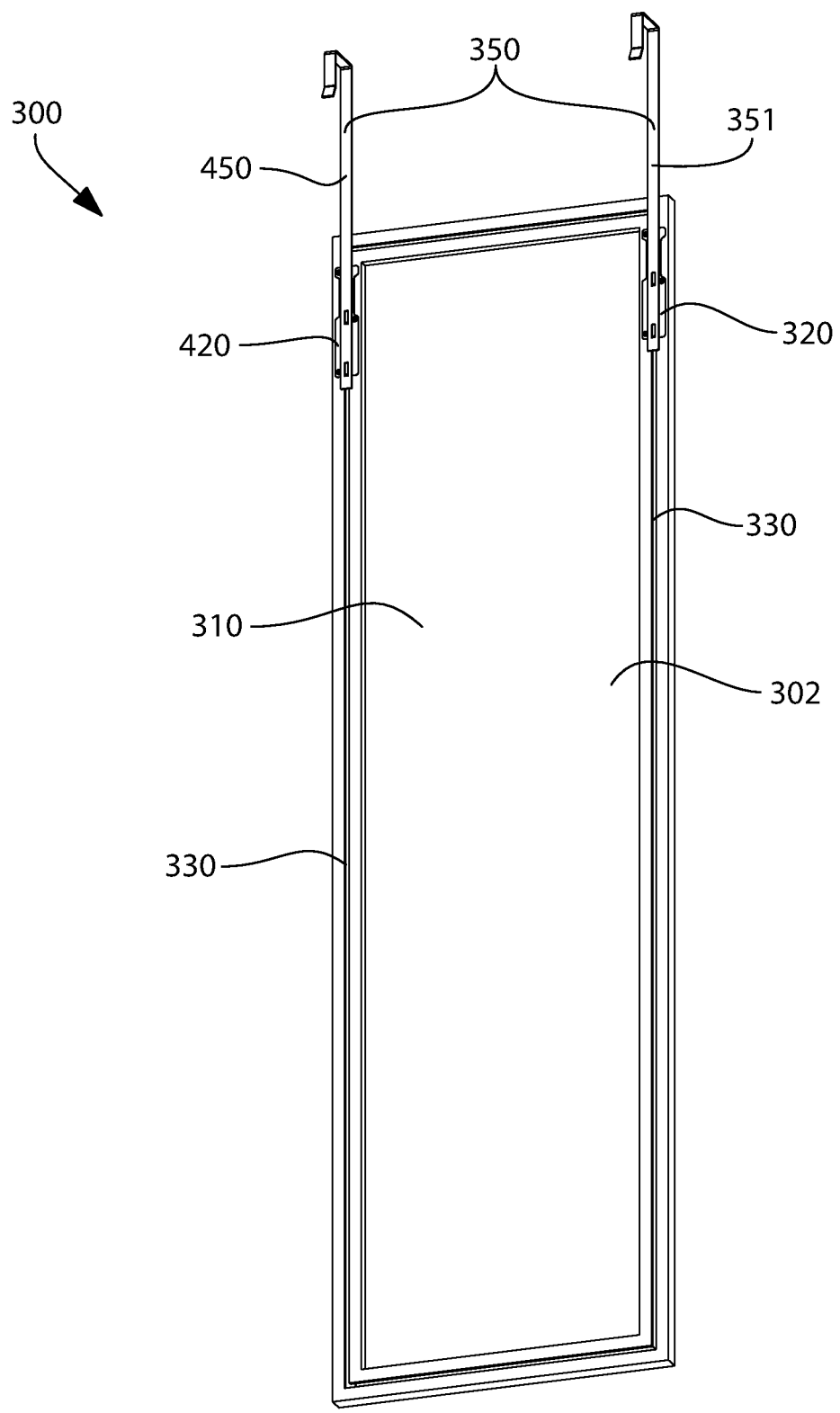
FIG. 7 is a perspective rear view of an over-the-door hanging apparatus in accordance with a second embodiment of the present invention.
Figure 8:
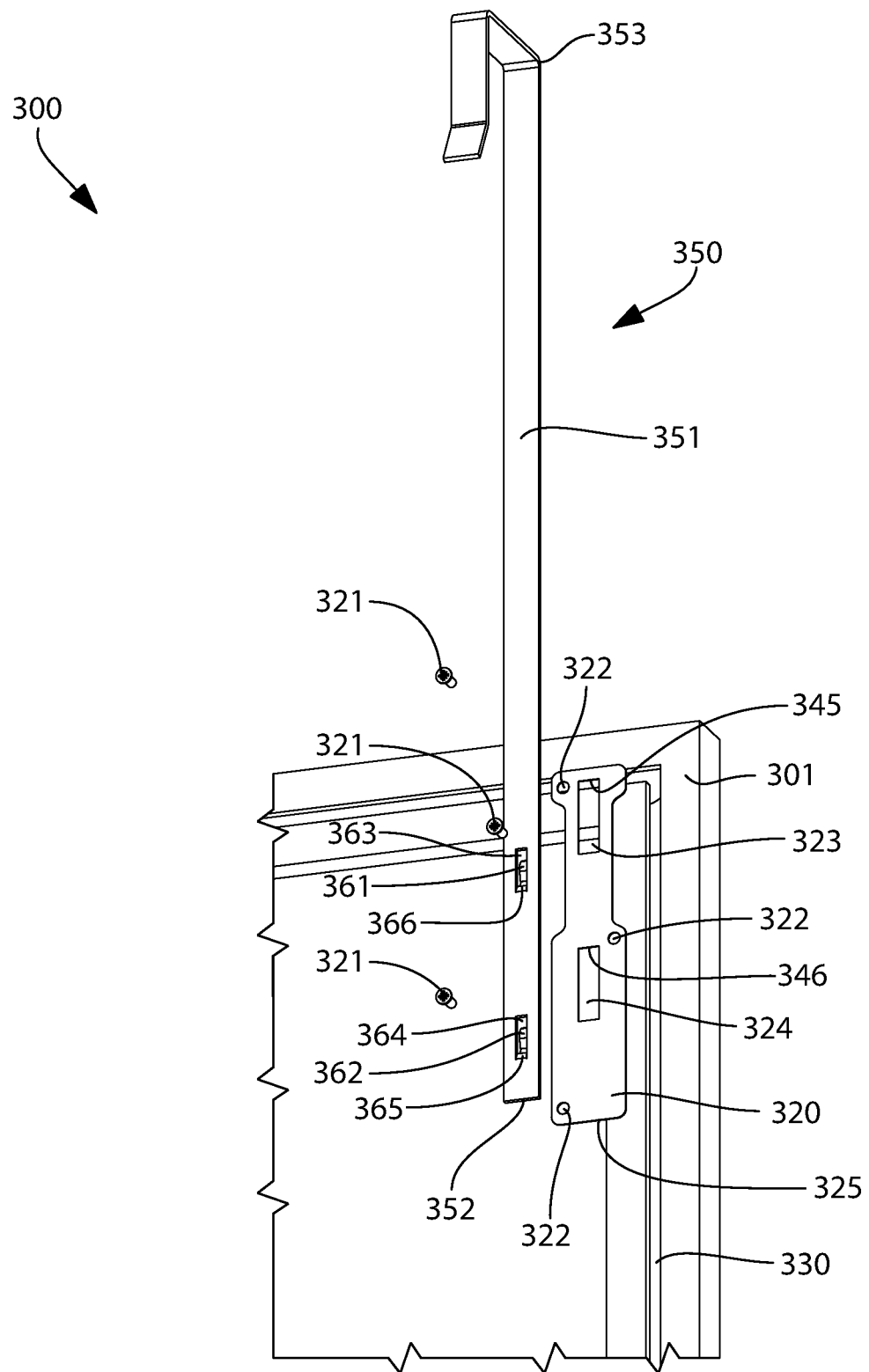
FIG. 8 is an exploded perspective view of a portion of the over-the-door hanging apparatus of FIG. 7.
Figure 9:
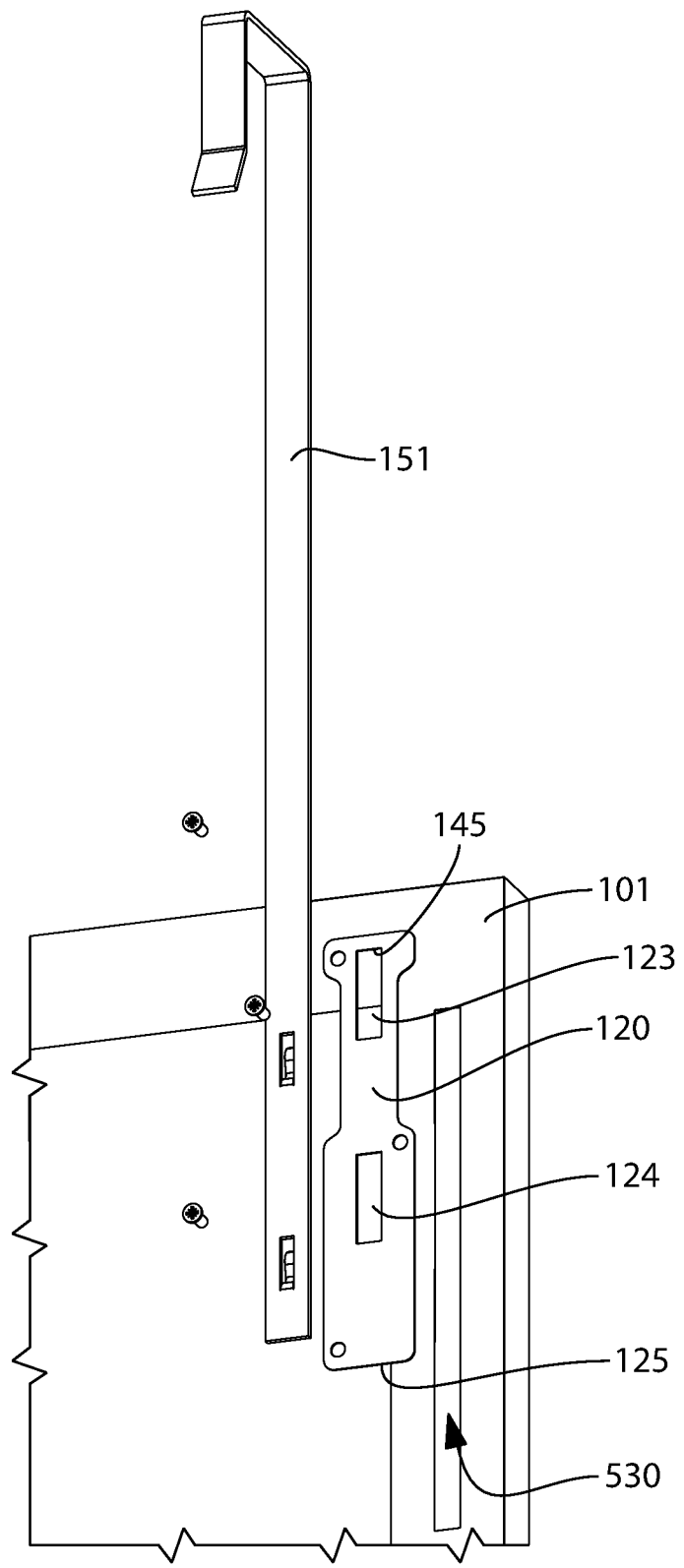
FIG. 9 is an exploded view of the portion of the over-the-door hanging apparatus of FIG. 7 in accordance with an alternative embodiment.

Furthermore, while the channel 130 is exemplified as a segmented channel, the invention is not so limited and the channel 130 may be a singular continuous annular channel that extends around the entire perimeter of the rear surface 103 of the frame 101 or can be a continuous channel that extends from below the bottom edge 125 of the first mounting plate 120 to above the top edge 145 of the top aperture 123 of the first mounting plate 120. These alternative embodiments are shown in FIGS. 7-9 and will be described in greater detail below.

Figure 6:
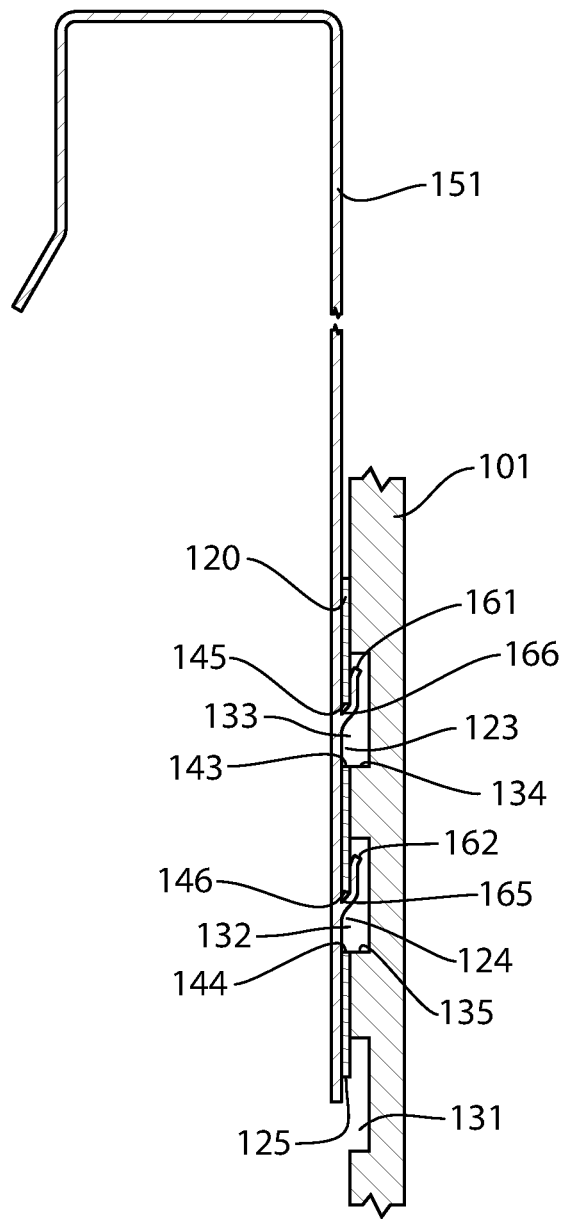
FIG. 6 is a cross-sectional schematic of the over-the-door hanging apparatus of FIG. 1 illustrating the connection between the elongate member and the mounting plate.

Referring to FIGS. 5 and 6 concurrently, the placement and attachment of the first mounting plate 120 to the rear surface 103 of the frame 101 will be described. In FIGS. 5 and 6, only the first mounting plate 120 is shown for clarity and ease of understanding. However, it is to be understood that the second mounting plate 220 is attached to the rear surface 103 of the frame 101 in the same manner as the first mounting plate 120, except that the second mounting plate 220 is attached to the opposite side of the vertical centerline A-A of the frame 101 (FIG. 2) in cooperation with a second channel.

The first mounting plate 120 is secured to the rear surface 103 of the frame 101 so that the vertical axis B-B of the first mounting plate 120 is coextensive with the elongated channel 130, which in the exemplified embodiment is substantially parallel with the vertical centerline A-A. The second mounting plate 220 is secured to the rear surface 103 of the frame 101 on the opposite side of a vertical centerline A-A of the frame 101 in an identical orientation with respect to the second channel 230.

More specifically, the first mounting plate 120 is secured to the frame 101 so that: (1) the first channel segment 131 extends from a position below the bottom edge 125 of the first mounting plate 120 to a position above the bottom edge 125 of the first mounting plate 120; (2) the second channel segment 132 extends from a position below the top edge 146 of the bottom aperture 124 of the first mounting plate 120 to a position above the top edge 146 of the bottom aperture 124 of the first mounting plate 120; and (3) the third channel segment 133 extends from a position below the top edge 145 of the top aperture 123 of the first mounting plate 120 to a position above the top edge 145 of the top aperture 124 of the first mounting plate 120. While not required, it may be preferred that the first mounting plate 120 be secured to the frame 101 so that further: (1) the bottom edge 144 of the bottom aperture 124 is aligned with the top edge 146 of the bottom aperture 124 of the first mounting plate 120; and (2) the bottom edge 143 of the top aperture 123 of the first mounting plate 120 is aligned with the top edge 145 of the top aperture 123 of the first mounting plate 120.

When the first mounting plate 120 is secured to the frame 101 in the manner described above, the top aperture 123 is aligned with the first channel segment 133 and forms a passageway through the first mounting plate 120 into the third channel segment 133. Similarly, the bottom aperture 124 is aligned with the second channel segment 132 and forms a passageway through the first mounting plate 120 into the second channel segment 132. Moreover, the top edge 145 of the top aperture 123 extends transversely across the third channel segment 133. The top edge 146 of the bottom aperture 124 extends transversely across the second channel segment 132. The bottom edge 125 of the first mounting plate 120 extends transversely across the first channel segment 131.

Referring solely now to FIG. 6, the first, second and third channel segments 131-133 preferably extend above the bottom edge 125 of the first mounting plate 120, the top edge 146 of the bottom aperture 124, and the top edge 145 of the top aperture 123, respectively, by a distance that is at least equal to the length of the hooks 161, 162. This configuration provides sufficient space for the hooks 161, 162 to fit within the selected channel segments 131-133 when the frame 101 is slidably mounted to the bracket assembly 150 as will be discussed below.

Referring to FIGS. 2, 5 and 6 concurrently, the attachment of the bracket assembly 150 to the first and second mounting plates 120, 220 will be described. The description will be provided with specific reference to the mating between the first mounting plate 120 and the first elongate member 151 of the bracket assembly 150. However, it should be understood that the description is equally applicable to the mating of the second mounting plate 220 with the second elongate member 251.

After properly aligning the first mounting plate 120 as described above, the first mounting plate 120 is secured to the rear surface 103 of the frame 101 by extending the screws 121 through the screw holes 122 and threadily engaging the frame. It is preferred that the first and second mounting plates 120, 220 be preassembled (i.e., secured) to the frame 101 during manufacturing. Thus, the user will be able to hang the apparatus 100 to a door without the need for any tools or excessive physical strength. In other words, the user will purchase the product fully assembled with the exception that the bracket assembly 150 will be separate from the first and second mounting plates 120, 220 and frame 101. As such, the user will only need to slide the U-Shaped brackets of the bracket assembly 150 over the top edge of the door and then slide the hooks 161, 162 of the bracket assembly into mating cooperation with either: (1) the top edges 145, 146 of the apertures 123, 124; or (2) the top edge 146 and the bottom edge 125.

By nature of having an option between sliding the hooks 161, 162 of the bracket assembly into mating cooperation with either: (1) the top edges 145, 146 of the apertures 123, 124; or (2) the top edge 146 and the bottom edge 125, the inventive over-the-door hanging apparatus 100 has an advantageous built-in hanging height adjustability. In other words, depending upon which of the channel segments 131-133 of the frame 101 the top and bottom hooks 161, 162 are attached to, the hanging height may be altered. A more detailed description of how the inventive over-the-door hanging apparatus 100 may be hung at a lower and/or a higher position will be set forth below. It should be understood, however, that while the description will be set forth below in relation to the first elongate member 151 mating with the first mounting plate 120 and the first channel 130, the same principles apply to the mating between the second elongate member 151, the second mounting plate 220, and the second channel 230.

When a lower hanging position is desired, such as is shown in FIG. 6, the first elongate member 151 of the bracket assembly 150 will be attached to the frame 101 by inserting the bottom hook 162 through the bottom aperture 124 in the first mounting plate 120 and the top hook 161 through the top aperture 123 in the first mounting plate 120. Because the first mounting plate 120 is attached to the frame 101 so that the bottom aperture 124 is aligned with the second channel segment 132 and the top aperture 123 is aligned with the third channel segment 133, the bottom hook 162 will be inserted into the second channel segment 132 of the frame 101 while the top hook 161 will be inserted into the third channel segment 133 of the frame 101. Once sufficiently inserted through the apertures 123, 124 and into the second and third channel segments 132, 133 of the frame 101, the frame 101 will be lowered (or the elongate member 151 will be raised) until the top edge 145 of the top aperture 123 of the first mounting plate 120 slides into the slot 168 of the top hook 161 and the top edge 146 of the bottom aperture 124 of the first mounting plate 120 slides into the slot 169 of the bottom hook 162. When fully slid into the slots 168, 169, the base 165 of the bottom hook 162 will contact the top edge 146 of the bottom aperture 124 of the first mounting plate 120 and the base 166 of the top hook 161 will contact the top edge 145 of the top aperture 123 of the first mounting plate 120.

As noted above, the second and third channel segments 132, 133 extend upwardly beyond the edges 145, 146 (in the direction of the vertical axis A-A) and beneath the first mounting plate 120. This configuration enables the hooks 161, 162 of the bracket assembly 150 to extend into the frame 101 so that a portion of the first mounting plate 120 is snugly disposed within each of the slots 168, 169.

Through this slidable mating, the hooks 161, 162 frictionally engage the portions of the first mounting plate 120 positioned within the slots 168, 169 to prevent the frame 101 from becoming accidentally dislodged from the bracket assembly 150. The frictional engagement is further facilitated by the S-shape and resilient nature of the hooks 161, 162. Although the attachment is described as being a friction fit, the invention is not so limited and the attachment may be described as a press fit, an interference fit or any other fit as would be known to persons skilled in the art. The attachment between the bracket assembly 150 and the frame 101 will be enhanced when the U-shaped bracket 158 of the bracket assembly 150 is attached to a top edge of a door because the weight of the flat article 110 being hung will increase the tight nature of the fit between the hooks 161, 162 and the combined plate/frame 120/101 apparatus.

The invention has been described with the bracket assembly 150 attached to the second and third channel segments 133, 132 in the frame 101. Such an attachment is used when the hanging height of the mirror or article is desired to be a lower hanging height. As noted above, the hanging height of the over-the-door hanging apparatus 100 is adjustable. Therefore, the mirror or other flat article 110 may be hung at a higher hanging height in the manner described below and as shown in FIG. 2.

When the first mounting plate 120 is secured to the frame 101, the first channel segment 131 in the frame 101 extends beyond the bottom edge 125 of the first mounting plate 120 as illustrated in FIG. 2. Therefore, rather than attaching the bracket assembly 150 through the second and third channel segments 133, 132 of the frame 101, the hooks 161, 162 of the bracket assembly 150 are attached to the second and first channel segments 132, 131 of the frame 101, respectively. Specifically, the bottom hook 162 will be inserted into the first channel segment 131 below the bottom edge 125 of the first mounting plate 120 while the top hook 161 will be inserted into the second channel segment 132 via the bottom aperture 124 of the first mounting.

Once sufficiently inserted into the first and second channel segments 131, 132 of the frame 101, the frame 101 will be lowered (or the elongate member 151 will be raised) until the top edge 146 of the bottom aperture 124 of the first mounting plate 120 slides into the slot 168 of the top hook 161 and the bottom edge 146 of the first mounting plate 120 slides into the slot 169 of the bottom hook 162. When fully slid into the slots 168, 169, the base 165 of the bottom hook 162 will contact the top edge 146 of the bottom aperture 124 of the first mounting plate 120 and the base 166 of the top hook 161 will contact the bottom edge 125 of the first mounting plate 120.

As noted above, the first and second channel segments 131, 132 extend upwardly beyond the edges 146, 125 (in the direction of the vertical axis A-A) and beneath the first mounting plate 120. This configuration enables the hooks 161, 162 of the bracket assembly 150 to extend into the frame 101 so that a portion of the first mounting plate 120 is snugly disposed within each of the slots 168, 169. Thus, the same frictional/interference fit is formed. With such an attachment, the apparatus 100 may be hung at a higher level on a door than previously described manner. Thus, the present invention provides an easy and efficient way for a user to adjust the hanging height of a mirror or other object without the need for tools or an excessive amount of physical force. The adjustable height mounting is achieved by designing the distances D1, D2, D3 to be substantially equal.

Of course, the second elongate member 251 may be attached in the same manner as described above except that the second elongate member 251 is attached to the second mounting plate 220 which is secured onto the frame 101 on the opposite side of the vertical centerline A-A. By using the first and second elongate members 151, 251, the flat article 110 will be more securely hung from the top of the door.

Referring to FIGS. 7 and 8 concurrently, an alternative embodiment of a frame 301 to be used with an over-the-door hanging apparatus 300 will be described. The components of the over-the-door hanging apparatus 300 that are the same as the components described above with reference to the over-the-door hanging apparatus 100 will be delineated by the same reference numerals except that the over-the-door hanging apparatus 300 will use the 300- and 400-series of numbers rather than the 100- and 200-series of numbers. Furthermore, only those aspects of the over-the-door hanging apparatus 300 that are different from the over-the-door hanging apparatus 100 described above will be described below in detail. Therefore, all features of the over-the-door hanging apparatus 300 that are not described below should be interpreted as being identical to the corresponding component from the over-the-door hanging apparatus 100 described above.

Specifically, rather than having a channel 130 comprising three distinct channel segments 131-133 in the frame 101 that require time and effort in order to properly align the first and second mounting plates 120, 220 as described above, the frame 301 may have a continuous channel 330 along all four sides of the frame 301 so as to form an annular channel about the perimeter of the frame 301. This embodiment is advantageous in that it reduces the costs in manufacturing by reducing the amount of material needed to create the frame 301 and by reducing the time required to attach the first and second mounting plates 320, 420 to the frame 301.

In use, the first mounting plate 320 is aligned with the channel 330 so that the channel 330 can be seen through the apertures 323, 324 in the first mounting plate 320. This embodiment nullifies the need to align the apertures 323, 324 of the first mounting plate 320 with the channel 330 in a vertical direction and instead enables the first mounting plate 320 to be attached to the frame 301 in a myriad of positions so long as the channel 330 is visible and accessible through the apertures 323, 324. Such an embodiment provides a significantly greater amount of flexibility to the hanging height of the flat article.

After the first mounting plate 320 (and preferably also the second mounting plate 420) is secured to the frame, the hooks 361, 362 of the bracket assembly 350 are inserted through the apertures 323, 324 of the first mounting plate 320 in the same manner as described above. The entire attachment procedure between the bracket assembly 350 and the frame 301 is identical to the attachment procedure described above with reference to the bracket assembly 150 and the frame 101. Essentially, the over-the-door hanging apparatus 300 is identical to the over-the-door hanging apparatus 100 except that instead of having a segmented channel 130 in the frame 101, there is one continuous channel 330 in the frame 301 that forms a rectangular border around the entirety of the frame 301. As can be seen the channel 330 still extends from a position below to a position above each of the edges 345, 346, 325.

Referring to FIG. 9, another alternative embodiment of the channel in the frame will be described. This embodiment comprises a continuous channel 530 that is not segmented and that does not form a border around the frame 101. Rather, the channel 530 only extends from a position below the bottom edge 147 of the first mounting plate 120 to a position above the top edge 145 of the top aperture 123 of the first mounting plate 120. In such an embodiment, a second channel (not shown) which is identical to the channel 530 will be located on the opposite lateral side of the frame 101, thereby forming a mirror image.

Figure 10:
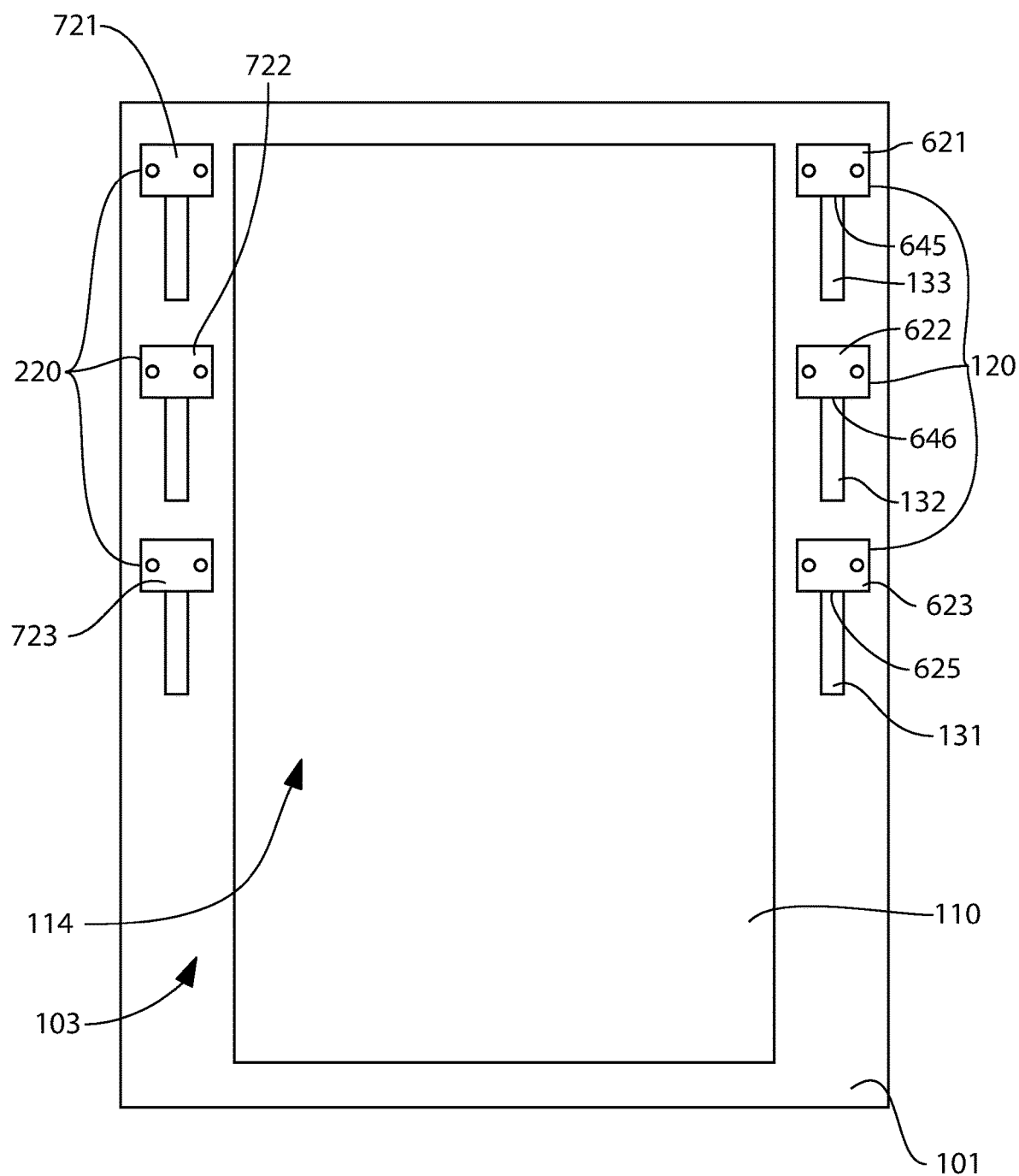
FIG. 10 is a rear view of an over-the-door hanging apparatus in accordance with a third embodiment of the present invention.

Referring to FIG. 10, an alternative embodiment for a mounting plate will be described. The first and second mounting plates 120, 220 may each comprise a first plate segment 621, 721, a second plate segment 622, 722 and a third plate segment 623, 723. This embodiment will be further described only with reference to the first mounting plate 120. It should be understood that the second mounting plate 220 will have features and components that are identical to the first mounting plate 120.

In the embodiment illustrated in FIG. 10, a bottom edge 625 of the third plate segment 623 serves an identical purpose to the bottom edge 125 of the first mounting plate 120 described above. Furthermore, a bottom edge 646 of the second plate segment 622 serves an identical purpose to the top edge 146 of the bottom aperture 124 of the first mounting plate 120. Further still, a bottom edge 645 of the first plate segment 621 serves an identical purpose to the top edge 145 of the top aperture 123 of the first mounting plate 120. It should be understood to a person skilled in the art that the inventive over-the-door hanging apparatus 100 would operate in the same exact manner with the three plate segment 621, 622, 623 embodiment as it would with the mounting plate 120 as described above. In other words, the bracket assembly 150 will be attached to the embodiment illustrated in FIG. 10 in the same manner as was described above.

Figure 11:
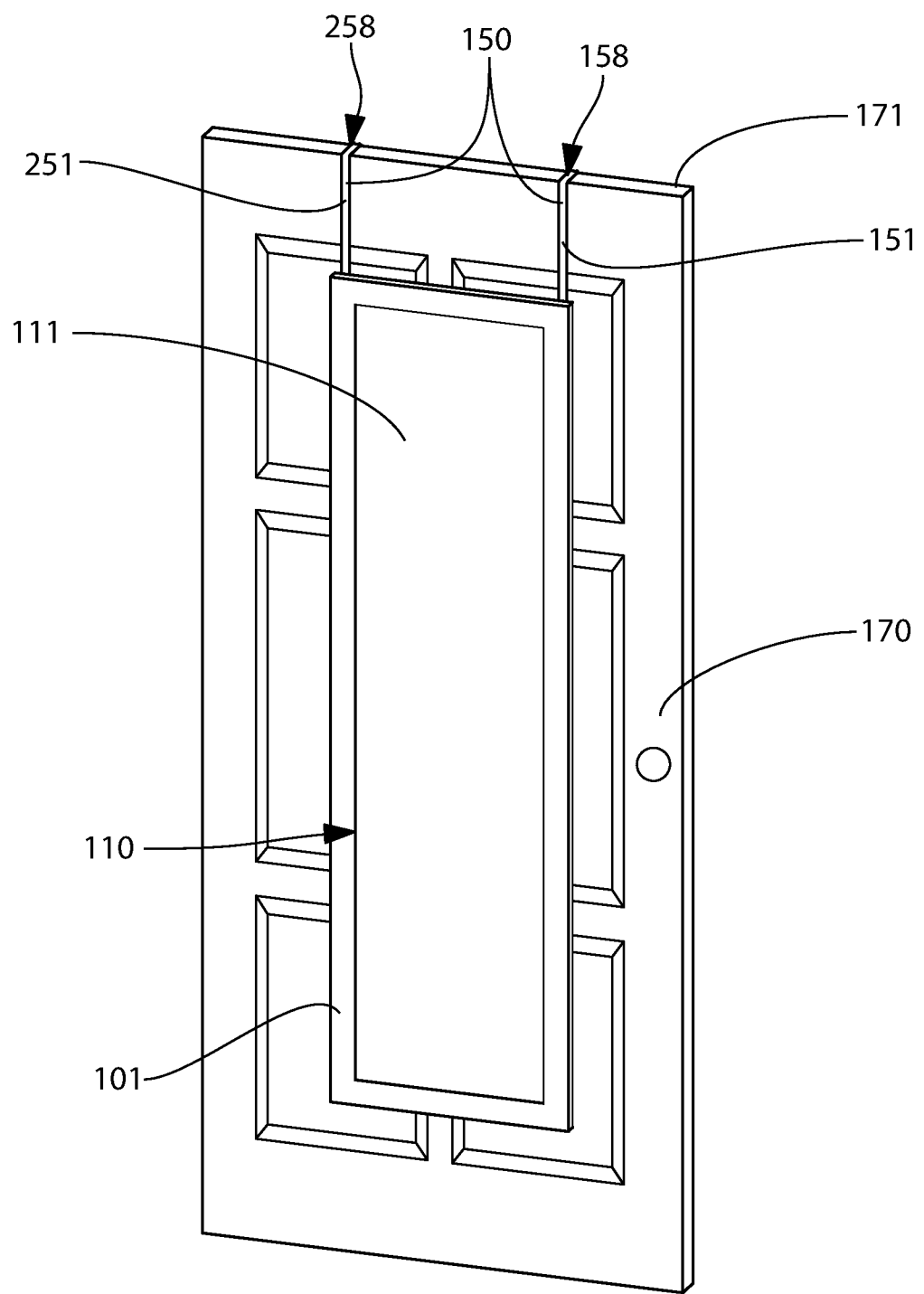
FIG. 11 is a perspective view of the over-the-door hanging apparatus of FIG. 1 hanging from a top edge of a door.

Referring to FIG. 11, the mirror 110 or other article is illustrated hanging from a top edge 171 of a door 170. In the illustrated embodiment, the mirror or other flat article 110 is attached to the bracket assembly 150 which comprises the first elongate member 151 and the second elongate member 251 on opposite lateral sides of the rear surface (not shown) of the flat article 110. The U-shaped brackets 158, 258 of the elongate members 151, 251 of the bracket assembly 150 are attached to the top edge 171 of the door 170 so that the flat article 110 is hung therefrom. When the flat article 110 is a mirror, it is hung so that the reflective front surface 111 is visible and the rear surface (not shown) is in surface contact with the door 170. It should be understood that any of the various types of channels and mounting plates may be used with the inventive over-the-door hanging apparatus in many different combinations. For example, the three plate segment 621, 622, 623 mounting plate may be used with the segmented channels 131, 132, 133 or with the elongated channel 530 or with the border/annular channel 330. Similarly, the first and second mounting plates 120, 220 may also be used with any of the above mentioned channel configurations.

In alternative embodiments of the invention, which are not illustrated, the frame 100 may not include channels 130, 230 in its rear surface 101. In such embodiments, the first and second mounting plates 120, 220 (or the segments thereof) would be placed over planar sections of the rear surface 101 of the frame 100 and be designed so that the hooks 161-162, 191-292 could be slid/inserted between a raised portion of the mounting plates 120, 220 and the planar sections of the rear surface 101. This could be accomplished by forming the first, second and/or third edges 125, 145, 146 to include a raised portion that protrudes from the rear surface 101 of the frame 100, thereby forming a nesting space/gap between the rear surface 101 of the frame 100 and the rear surfaces of the mounting plates 120, 220 (or the segments thereof). For example, the mounting plates 120, 220 (or the segments thereof) could be formed in to resemble one half of a C-clamp and/or a V-clamp. In another example, a small section of the first, second and/or third edges 125, 145, 146 could be bent out of plane with the remaining sections of the mounting plates 120, 220 (or the segments thereof) that are coupled to the frame 100. Finally, any of the foregoing details described above with respect to FIGS. 1-11 could be utilized with such an alternative embodiment.

In a still further embodiment of the invention, shown in FIGS. 12-17B, the frame 801 may be designed so that the channels 130, 230 are omitted. In such an embodiment, the bracket assembly 850 comprises a first elongate member 851 and a second elongate member 951 that are slidably attached to mounting plates 820, 920 respectively. In this embodiment, the first and second mounting plates 820, 920 are placed over planar sections of the rear surface 803 of the frame 801. To avoid redundancy, only the first mounting plate 820, along with its cooperation with the first elongate member 851, is described in detail herein with the understanding that the second mounting plate 920, and its coupling to the second elongate member 951, is identical.

Figure 15A:
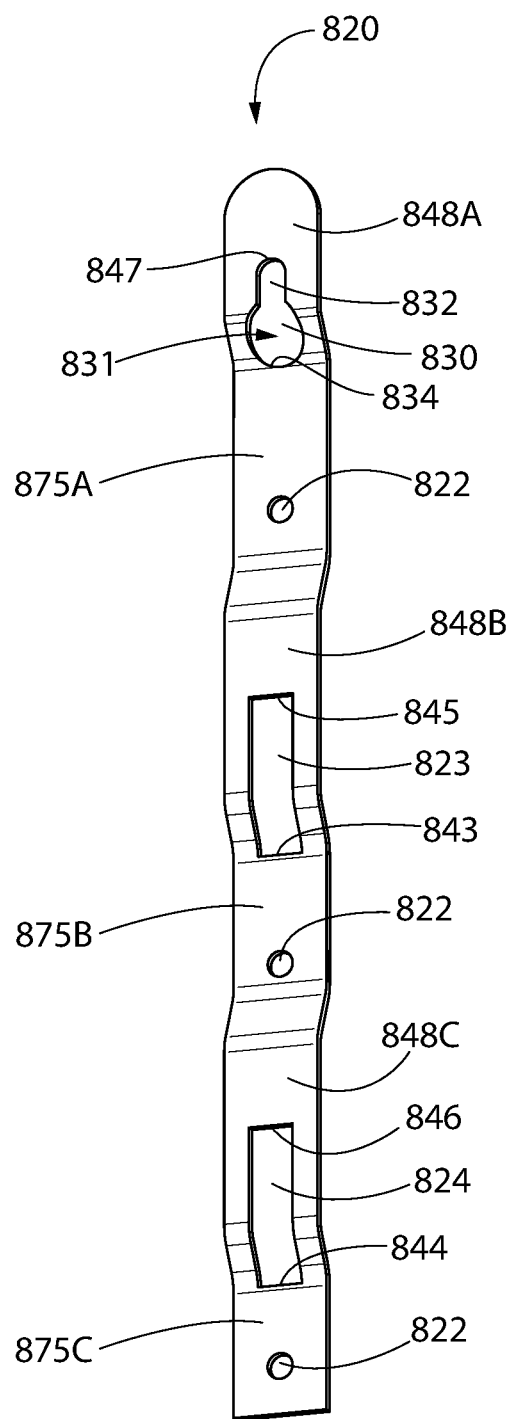
FIG. 15A is a perspective view of a mounting plate of the over-the-door hanging apparatus of FIG. 12.
Figure 15B:
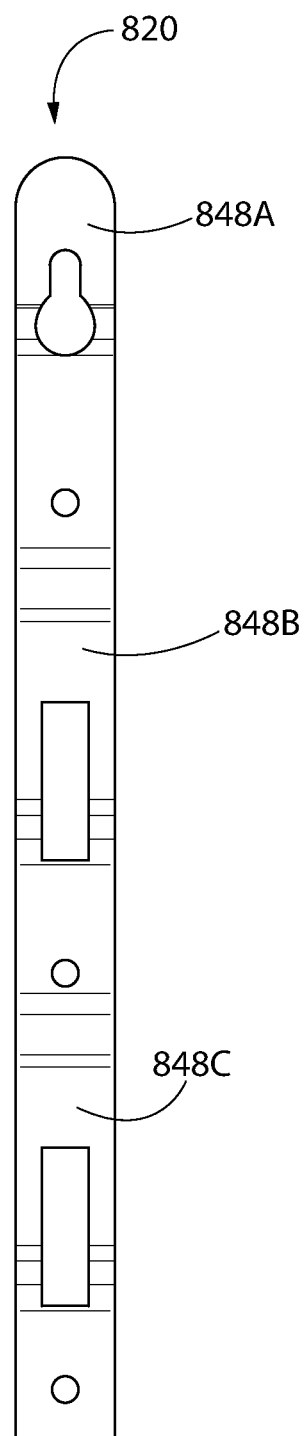
FIG. 15B is a front view of the mounting plate of FIG. 15A.
Figure 16:
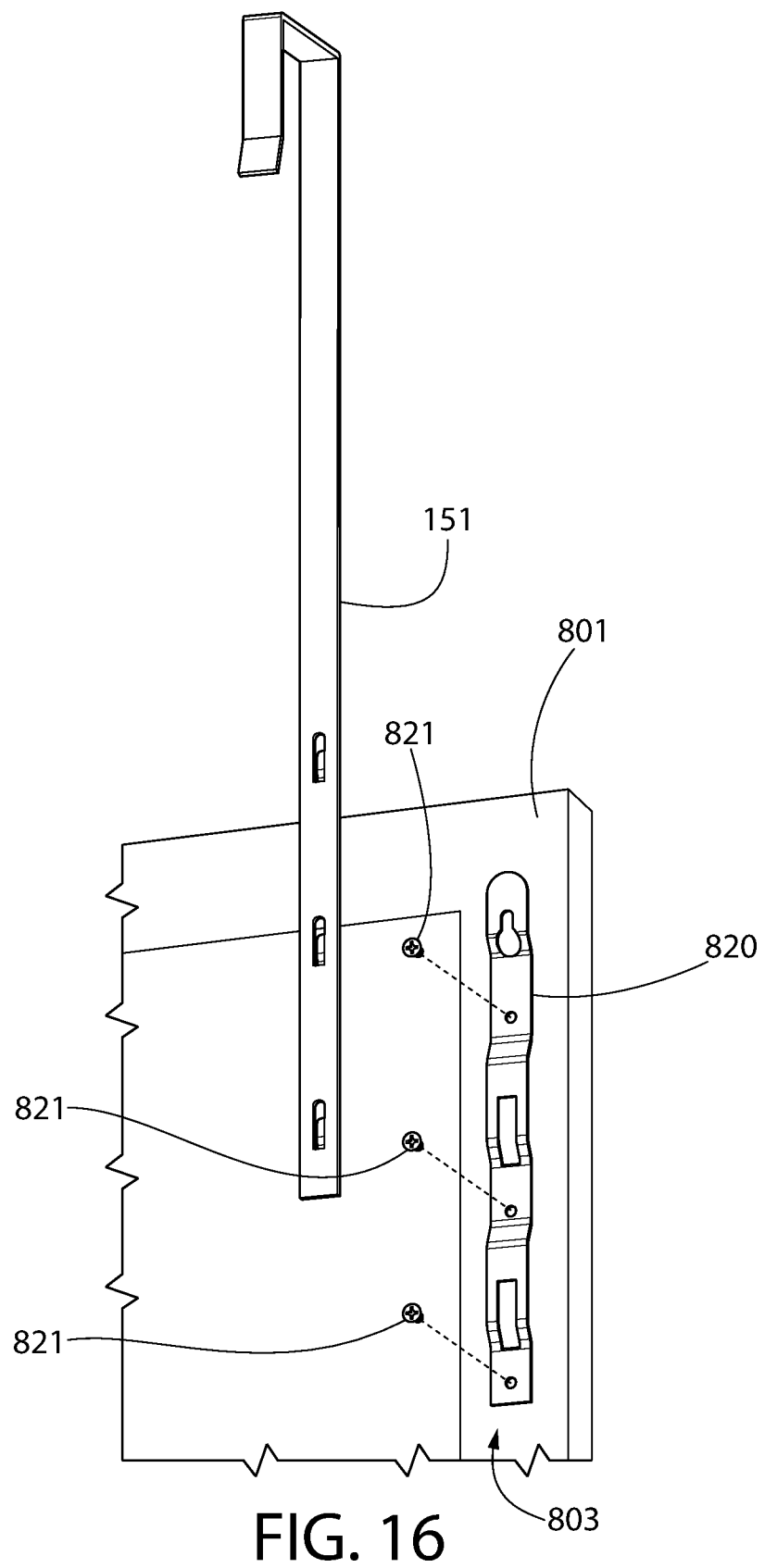
FIG. 16 is an exploded view of a portion of the over-the-door hanging apparatus of FIG. 12.

As best shown in FIGS. 15A and 15B, the first mounting plate 820 generally comprises a plurality of planar portions 875A-C and a plurality of raised portions 848A-C. The plurality of planar portions 875A-C are substantially coplanar with one another. Similarly, the plurality of raised portions 848A-C are substantially coplanar with one another. The plurality of raised portions 848A-C are offset from and not coplanar with the plurality of planar portions 875A-C. The plurality of raised portions 848A-C and the plurality of planar portions 875A-C are arranged in an alternating manner and are interconnect to one another.

The first mounting plate 820 is designed so that the hooks 861-863 (or flanged bosses, rivets, screws or bolts in other embodiments) of the first elongate member 851 may be slidably inserted between the raised portions 848A-C of the first mounting plate 820 and the planar sections of the rear surface 801 of the frame 801, respectively.

The first mounting plate 820 further comprises a first aperture 823, a second aperture 824, and a multi-width aperture 830 that are formed in the raised portions 848A-C of the first mounting plate 820 respectively. The multi-width aperture 830 is divided into a nesting section 832 and a receiving section 831. The nesting section 832 extends vertically from the receiving section 831 and is narrowed relative to the receiving section 831. Stated simply, the nesting section 832 has a width that is less than the width of the receiving section 831. While the multi-width aperture is exemplified as having stepped width, in other embodiments the width may simply taper such that the multi-width slot resembles a V-shape.

The multi-width aperture 830 terminates in a top edge 847. As exemplified, the top edge 847 is curved to accommodate the shaft of a screw but can be linear in other embodiments. The receiving section 831 is sized such that it will permit the head of a screw, flanged fastener, bolt, or rivet to pass therethrough. The receiving section 831 of the multi-width aperture 830 may have a semi-circular shape or may be constructed in any shape that permits the passage of a flanged portion of fastener (such as the head of a screw or the head of a flanged fastener).

The multi-width aperture 830 has a bottom edge 834 that is located on or near the planar portion 875A of the first mounting plate 820 to facilitate insertion of the screw head into the screw aperture 830. The nesting section 832 is sized such that the head of the screw may not pass through the slot section 832. This allows the multi-width aperture 830 of the first mounting plate 820 to be aligned with a protruding screw such that the screw head can be slid into the receiving section 831. Then, upon the first mounting plate 820 being slid downward, the screw body passes into the nesting section 832 and the screw head is trapped between the raised portion 848A of the first mounting plate 820 and the rear surface of the frame 801, thereby facilitating mounting to a door or other vertical surface.

Each of the first aperture and second aperture 823, 824 have a top edge 845, 846 respectively. The top edge 845 of the first aperture 823 is located on the raised portion 848B while the top edge 846 of the second aperture 824 is located on the raised portion 848C. The first and second apertures 823, 824 also have bottom edges 843, 844, respectively. The bottom edge 843 of the first aperture 823 is located on the planar portion 875B while the bottom edge 844 of the second aperture 824 is located on the planar portion 875C. As will be discussed below with respect to FIG. 17A, the hooks 861-863 are slidably inserted into the apertures 823, 824, 830 and engage the top edges 845-847 of the first mounting plate 820.

The first mounting plate 820 further includes a plurality of fastener holes 822 which are sized and configured to receive a screw (or other fastener) to facilitate fixed attachment of the first mounting plate 820 to the rear surface 803 of the frame 801. Although the first mounting plate 820 is illustrated as having three fastener holes 822, the invention is not so limited and the first mounting plate 820 may have more or less than three fastener holes 822 as desired. When attached to the frame 801, the planar portions 875A-C are in surface contact with the rear surface 803 of the frame 801.

Figure 12:
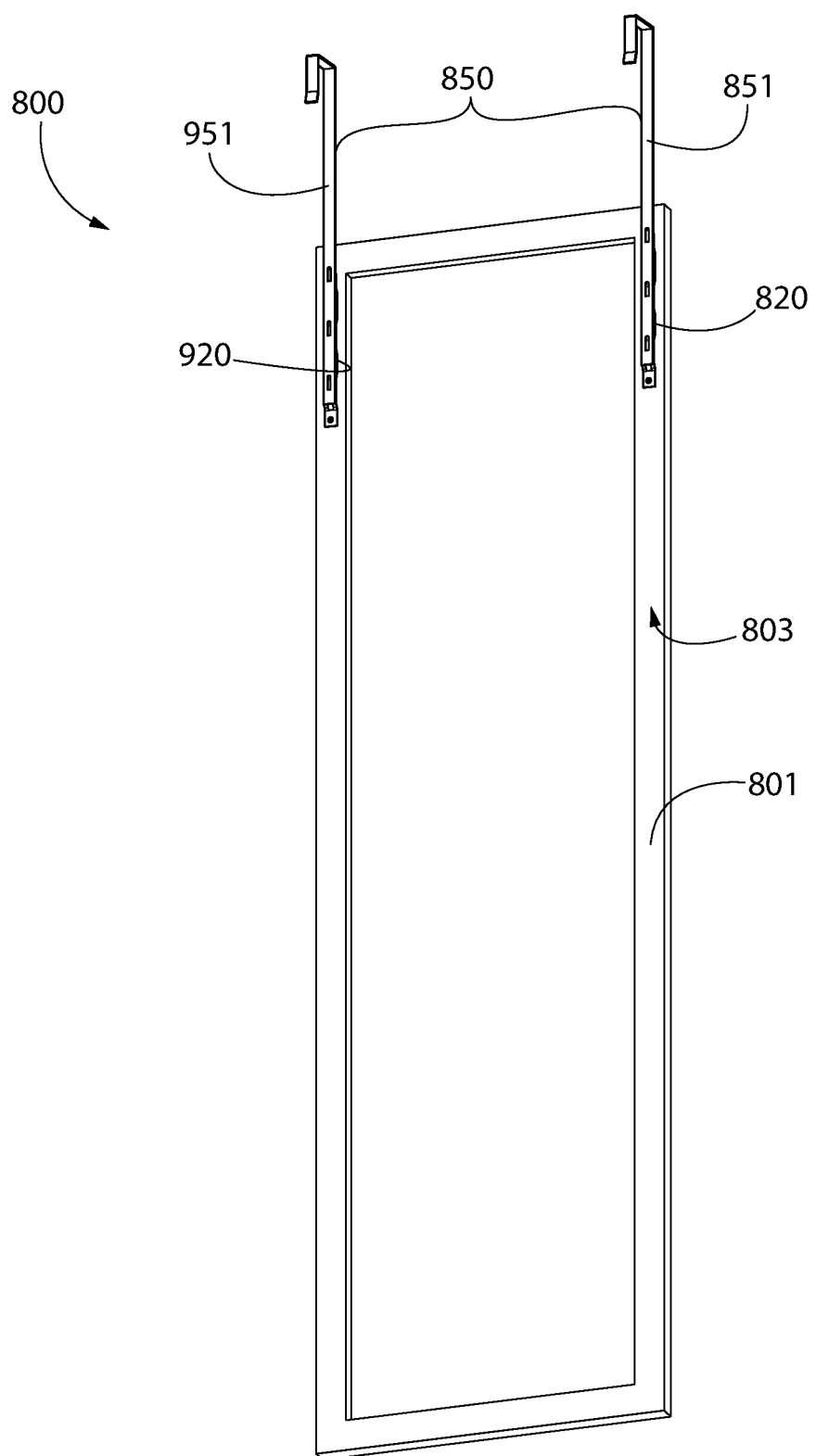
FIG. 12 is a perspective rear view of an over-the-door hanging apparatus in accordance with a fourth embodiment of the present invention.
Figure 13:
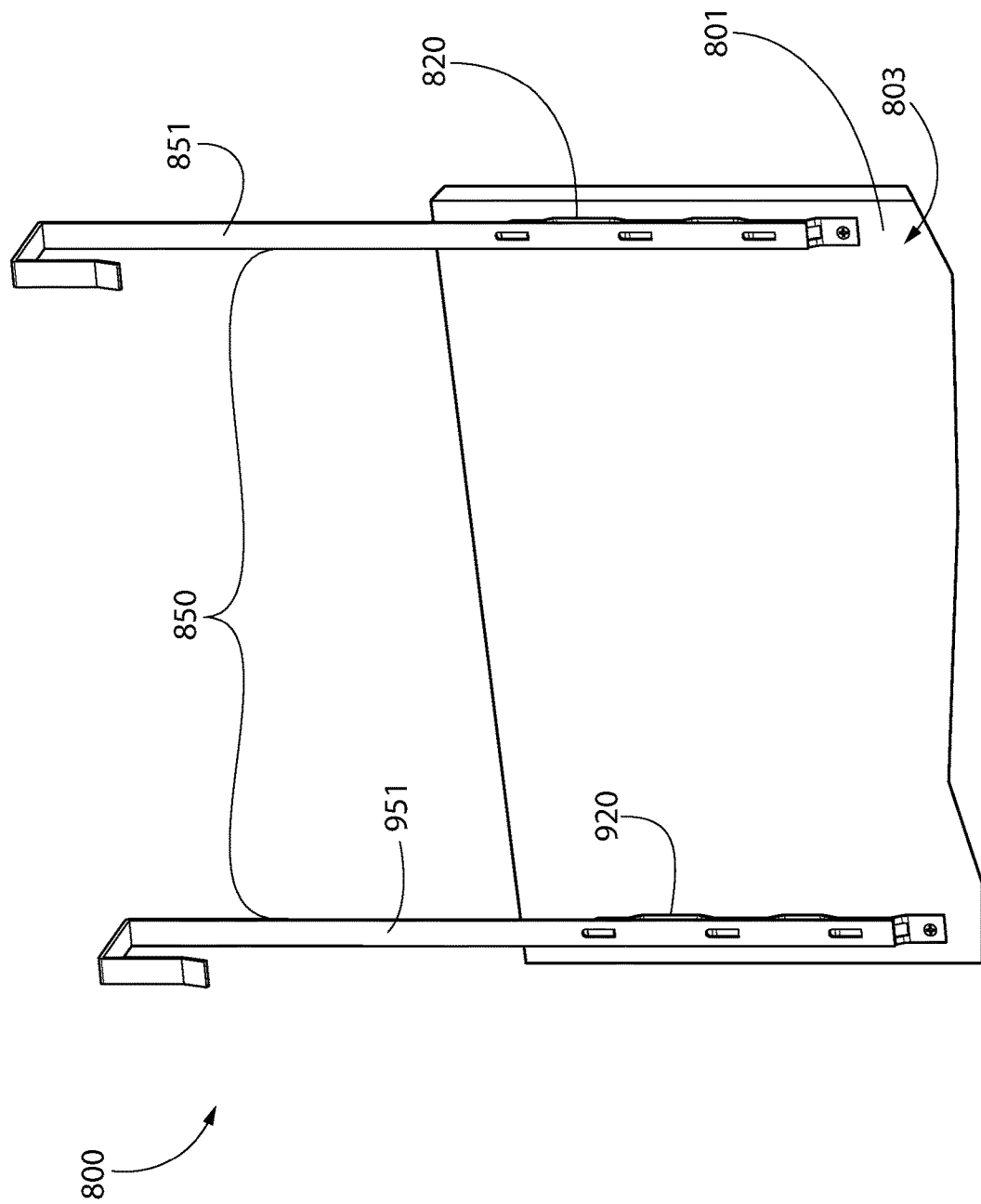
FIG. 13 is a close-up view of a top portion of the over-the-door hanging apparatus of FIG. 12.
Figure 14A:
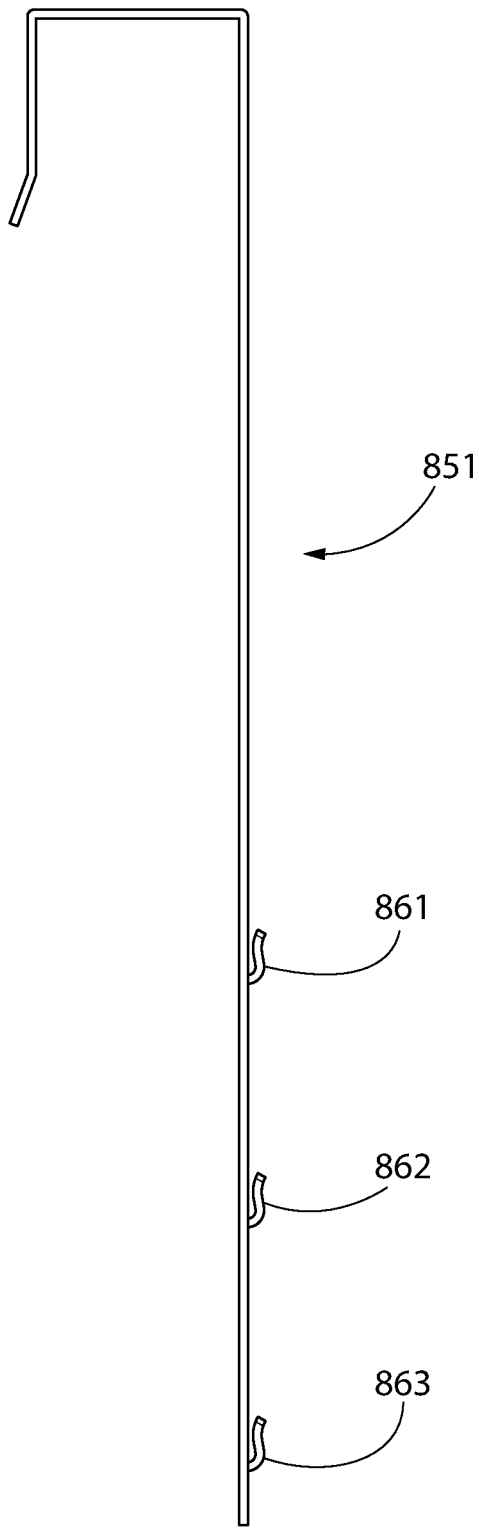
FIG. 14A is a side view of an elongate member of the over-the-door hanging apparatus of FIG. 12.
Figure 14B:
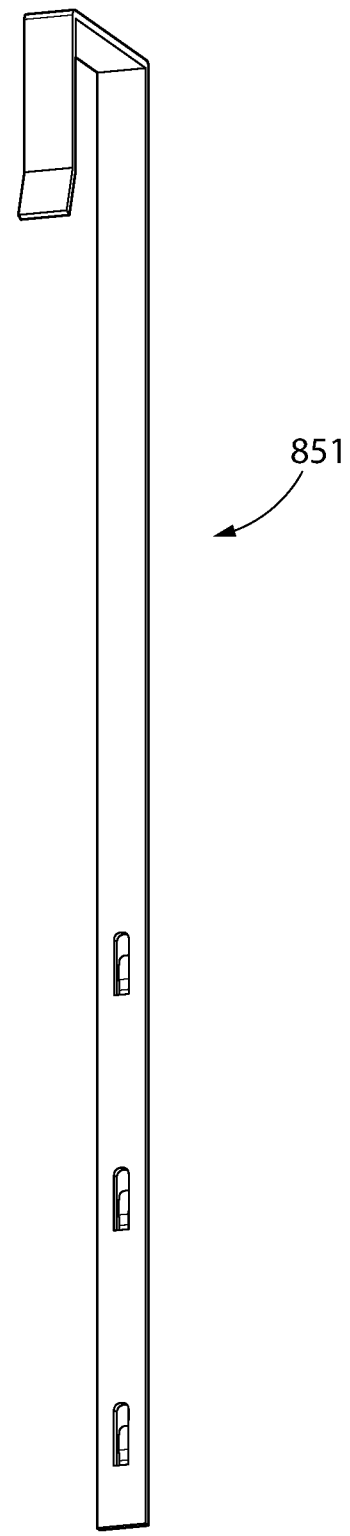
FIG. 14B is a perspective view of the elongate member of FIG. 14A.
Figure 17A:
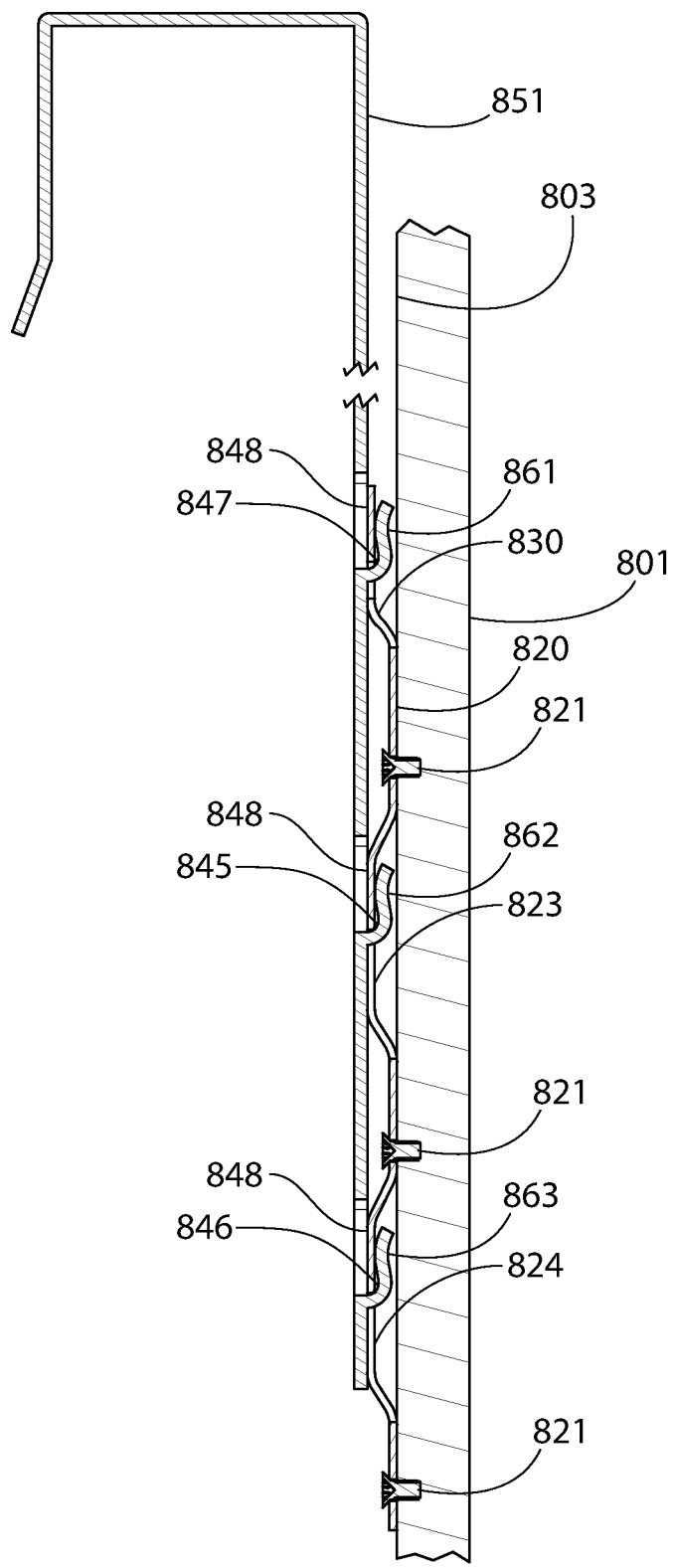
FIG. 17A is a cross-sectional schematic of the over-the-door hanging apparatus of FIG. 12 showing the connection between the elongate member and the mounting plate.

As can be best seen in FIGS. 12 and 17A, the over-the-door apparatus 800 may be hung from a door by using the first and second elongate members 851, 951. The first and second elongate members 851, 951 are slid over the top edge of the door as described above for the embodiments of FIGS. 1-10. The first and second mounting plates 820, 920, which are coupled to the frame 801, are then slidably mounted to the first and second elongate members 851, 951, respectively, as discussed in greater detail below.

To avoid redundancy, only the mounting of the first elongate member 851 to the first mounting plate 820 is described in detail herein with the understanding that the second elongate member 951 and the second mounting plate 920 are identical. In order to slidably mount the first elongate member 851 to the first mounting plate 820, the hooks 861-863 are inserted through the multi-width aperture 830, the first aperture 823, and the second aperture 824. The hook 861 is inserted through the multi-width aperture 830, the hook 862 is inserted through the first aperture 823, and the hook 863 is inserted through the second aperture 824. The elongate member 851 is then slid upward until the hooks 861-863 fully engage the top edges 847, 845, 846 respectively.

Instead of inserting hooks 861-863 through apertures 830, 823, and 824, the hook 861 may be inserted through the first aperture 823 and the hook 862 may be inserted through the second aperture 824. Alternately, hook 862 may be inserted through the multi-width aperture 830 and hook 863 may be inserted through the first aperture 823. In yet other mounting combinations, the hook 861 may be inserted through the second aperture 824. Further, the hook 863 may be inserted through the multi-width aperture 830. By inserting different hooks 861-863 through different apertures 830, 823, 824, adjustments in height may be obtained. In alternate embodiments, there may be more than three hooks 861-863 or apertures 830, 823, 824 or there may be fewer than three hooks 861-863 or apertures 830, 823, 824. The number of hooks 861-863 and the number of apertures 830, 823, 824 need not be equal. In yet other embodiments, the first and second apertures 823, 824 may have the same shape as the multi-width aperture 830.

Figure 17B:
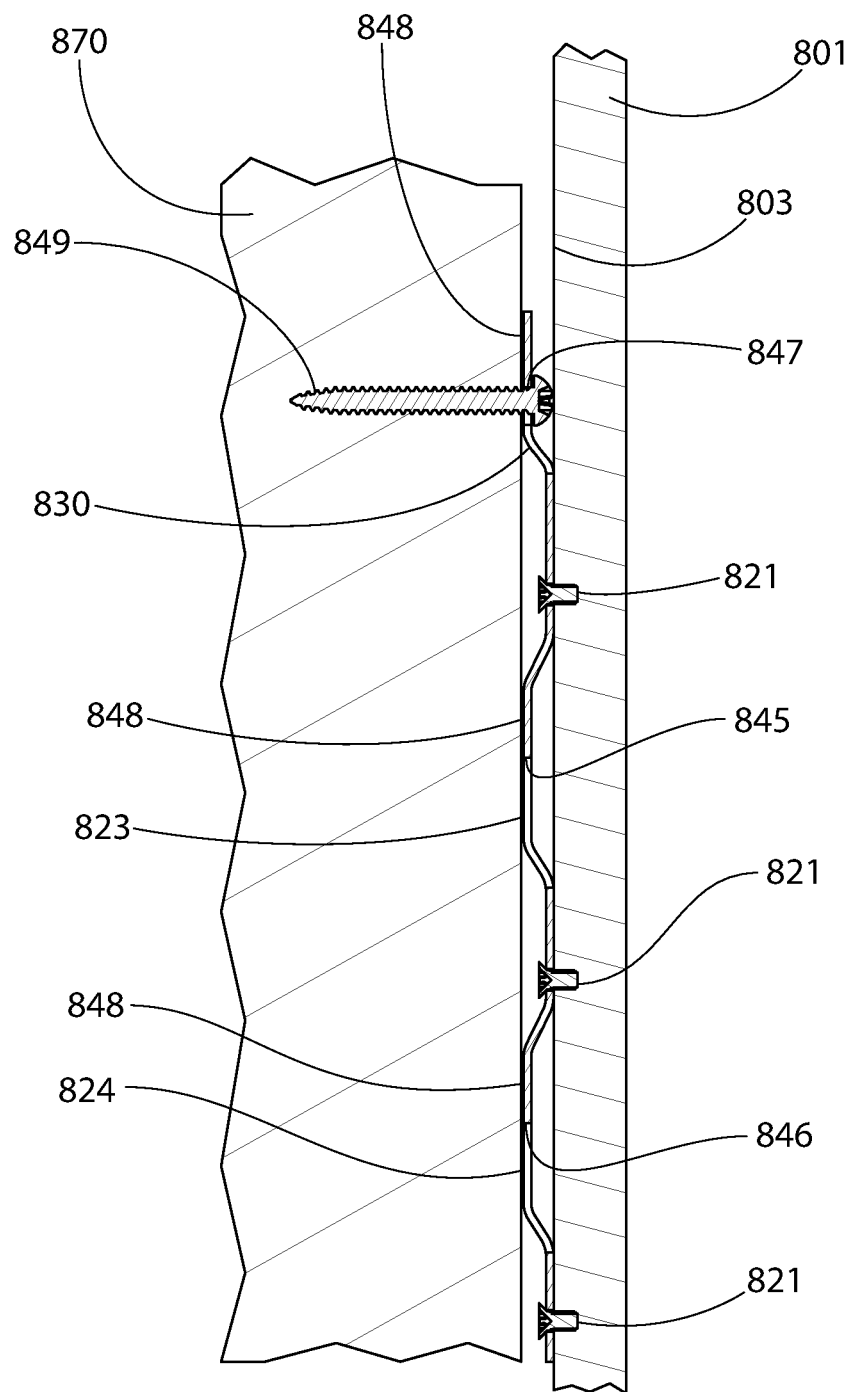
FIG. 17B is a cross-sectional schematic of the over-the-door hanging apparatus of FIG. 12 showing the connection between the mounting plate and a door with the elongate member omitted in accordance with an alternative embodiment.

In an alternate mounting best shown in FIG. 17B, the frame 801 is hung by installing a screw 849 into a door 870. To avoid redundancy, only the first mounting plate 820 is disclosed, with the second mounting plate 920 being identical. Instead of a door 870, the first mounting plate 820 may be mounted to any other vertical surface, such as a wall. As with other embodiments, the first mounting plate 820 is installed to the frame 801 via screws 821, and then the head of the screw 849 is inserted into the multi-width aperture 830 and slid upward until the shaft of the screw 849 contacts the top edge 847 of the multi-width aperture 830. This permits flexible mounting of the frame 801 without requiring the use of the first and second elongate members 851, 951. Multiple screws 849 may be used, and the first mounting plate 820 may be designed to accommodate multiple screw apertures 830 as desired.

Figure 18A:
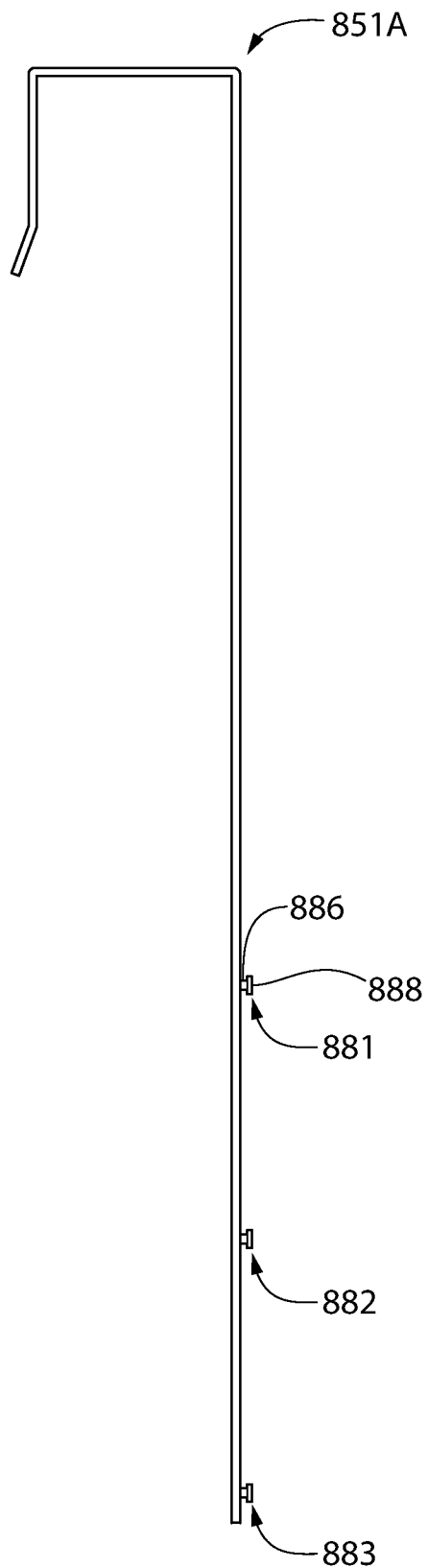
FIG. 18A is a side view of an elongate member of the over-the-door hanging apparatus of FIG. 12 in accordance with an alternative embodiment.
Figure 18B:
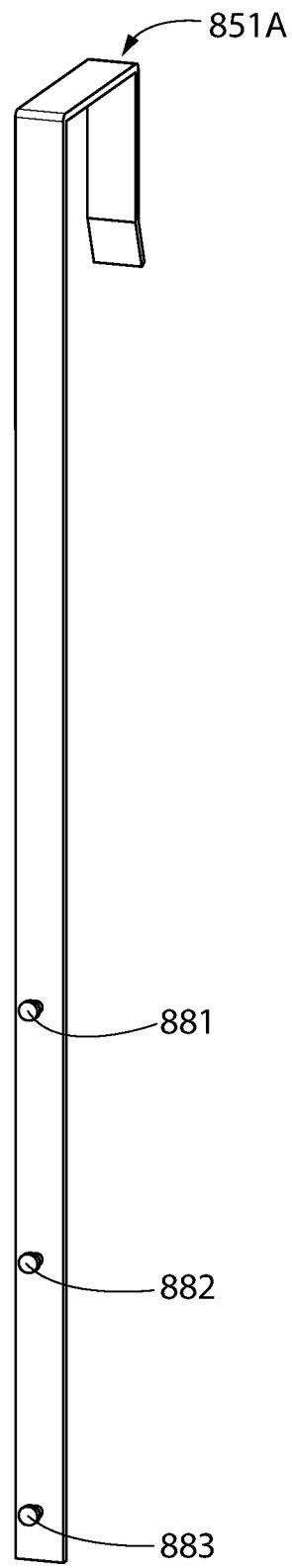
FIG. 18B is a rear perspective view of the elongate member of FIG. 18A.

FIGS. 18A and 18B disclose an alternate embodiment of the first elongate member 851A, with three flanged fasteners 881-883 in place of hooks 861-863. The elongate member 851A is identical to the embodiments disclosed in FIGS. 12-17B excepting those features explicitly described. The second elongate member is also identical to the first elongate member 851A disclosed in this embodiment. The flanged fasteners 881-883 each have a post portion 886 and a flange portion 888. The flanged fasteners engage multi-width apertures 891-893 as will be discussed in further detail below.

Figure 19A:
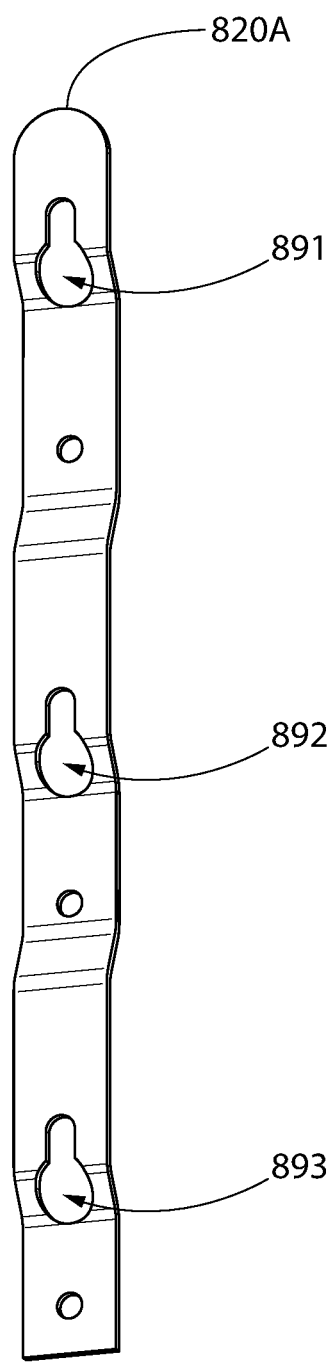
FIG. 19A is a perspective view of a mounting plate of the over-the-door hanging apparatus of FIG. 12 in accordance with an alternative embodiment.
Figure 19B:
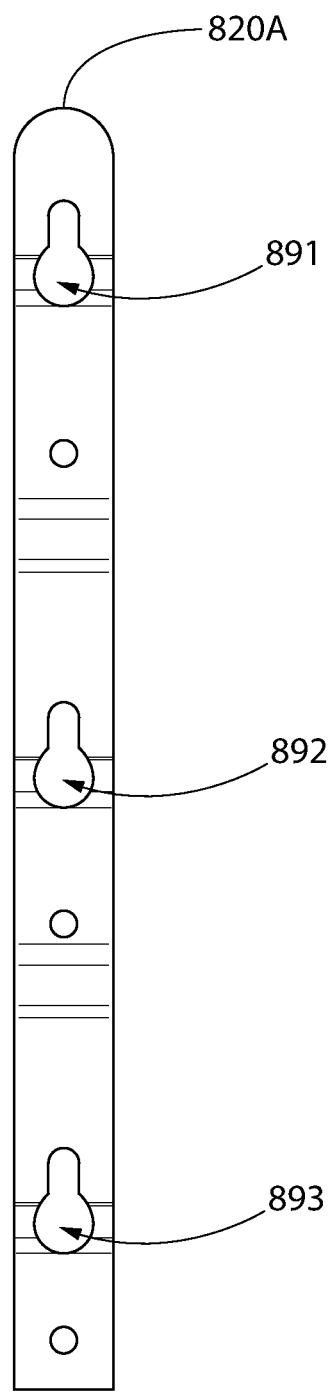
FIG. 19B is a front view of the mounting plate of FIG. 19A.

FIGS. 19A and 19B disclose an alternate embodiment of the first mounting plate 820A. The first mounting plate 820A has three multi-width apertures 891-893. The first mounting plate 820A is identical to the embodiment disclosed in FIGS. 12-17B excepting those features explicitly described. The second mounting plate is also identical to the first mounting plate 820A disclosed in this embodiment.

Figure 20:
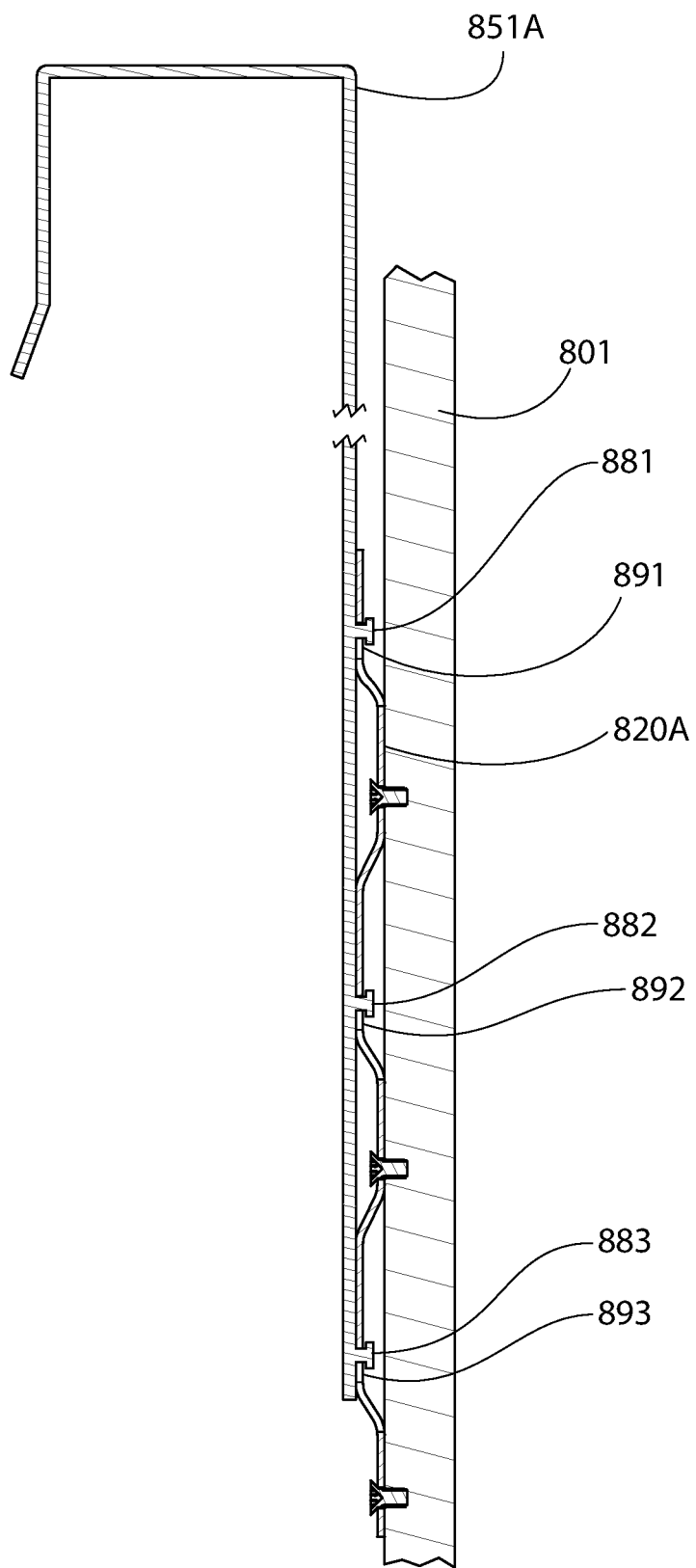
FIG. 20 is a cross-sectional schematic of the over-the-door hanging apparatus of FIG. 12 showing the connection between the elongate member of FIG. 18A and the mounting plate of FIG. 19A.

Turning to FIG. 20, the flanged fasteners 881-883 are shown engaged with the multi-width apertures 891-893. The flanged fasteners 881-883 are inserted into the multi-width apertures 891-893 and slidably engaged such that the post portion 886 of the flanged fasteners 881-883 mates with the nesting section of the corresponding multi-width apertures 891-893. The flange portion 888 of the flanged fasteners 881-883 prevents the flanged fasteners 881-883 from withdrawing from the multi-width apertures 891-893 unless the first mounting plate 820A is slid upward with respect to the first elongate member 851A to release the flanged fasteners 881-883. Alternate embodiments of the flanged fasteners 881-883 may be bolts, rivets, screws, or other fasteners having a flange and post portion which permit engagement with the nesting portion of the multi-width apertures 891-893.

In yet other embodiments, the hooks, flanged fasteners, bolts, rivets, or screws of the first and second elongate members as shown and described in the preceding embodiments may be substituted for the apertures of the first and second mounting plates of the preceding embodiments. Likewise, the apertures of the first and second mounting plates may be substituted for the hooks, flanged fasteners, etc. of the first and second elongate members. Thus, the mounting features may be reversed to permit the mounting plates to have hooks or flanged fasteners which engage apertures of the elongate members.

Figure 21A:
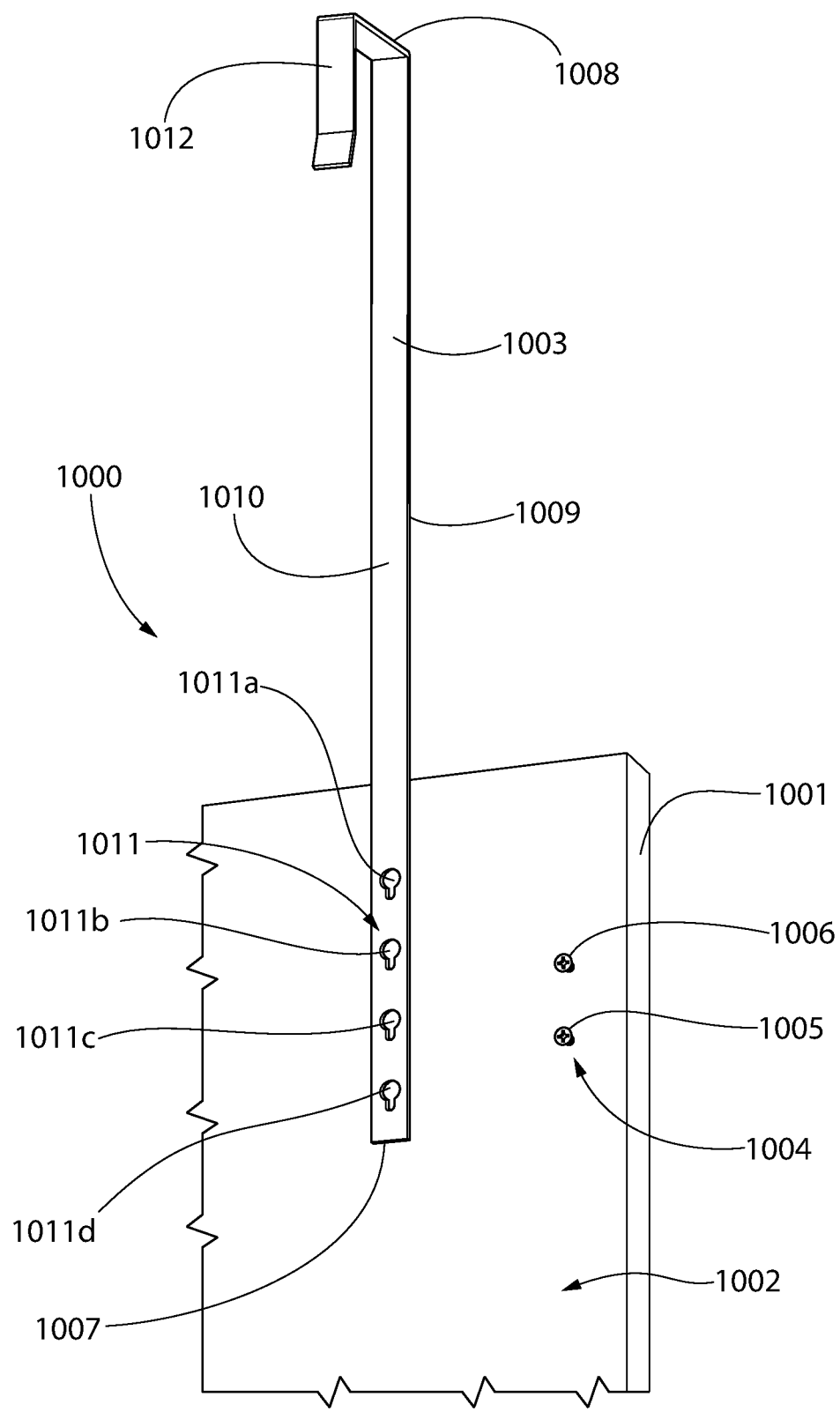
FIG. 21A is a perspective view of a portion of an over-the-door hanging apparatus in accordance with a fifth embodiment of the present invention with an elongate member and a mounting element in a detached state.
Figure 21B:
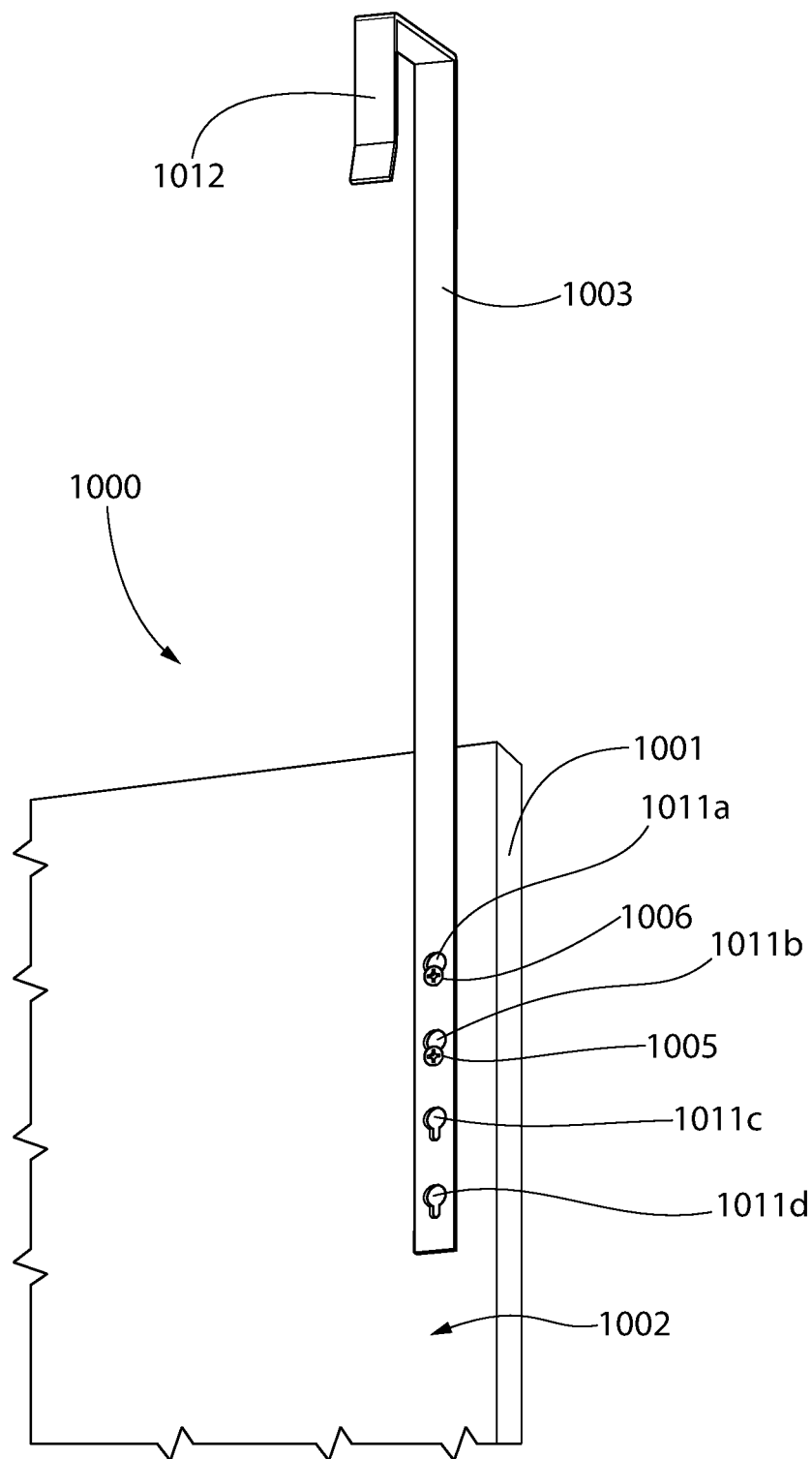
FIG. 21B is a perspective view of the portion of the over-the-door hanging apparatus of FIG. 21A with the elongate member and the mounting element in an attached state.

Referring now to FIGS. 21A and 21B, an over-the-door hanging apparatus 1000 will be described in accordance with yet another embodiment of the present invention. FIGS. 21A and 21B only illustrate a portion of the over-the-door hanging apparatus 1000 showing the coupling components on one side thereof, it being understood that the opposite side thereof may have identical components and an identical structure. Thus, the configuration shown, for example, in FIGS. 1 and 2 is applicable to this embodiment except that the structure of the mounting components is different in this embodiment as will be described herein below.

The over-the-door hanging apparatus 1000 comprises a support structure 1001 having a rear surface 1002. In certain embodiments a mirror is coupled to the support structure 1001. However, the invention is not to be limited to a mirror being coupled to the support structure 1001 in all embodiments and other articles may be coupled to the support structure 1001 in other embodiments as described herein above. The mirror (or other article) is not illustrated in FIGS. 21A and 21B, but the description above regarding the coupling of the mirror may be applicable. In certain embodiments, the support structure 1001 may have the rear surface 1002 and an opposite front surface, and the mirror may be coupled to the front surface. The mirror may be directly or indirectly coupled to the front surface. For example, in some embodiments the mirror may be coupled to a door that is hingedly coupled to the front surface of the support structure 1001 similar to conventional cabinets such as medicine cabinets or other storage cabinets with a mirrored door.

The over-the-door hanging apparatus 1000 also comprises a first elongate member 1003 and a second elongate member (not illustrated) and a first pair of mounting elements 1004 and a second pair of mounting elements (not illustrated). Specifically, the first pair of mounting elements 1004 is secured to the rear surface 1002 of the support structure 1001 on a first side of a vertical centerline of the support structure 1000 and the second pair of mounting elements (not illustrated) is secured to the rear surface 1002 of the support structure 1001 on a second side of the vertical centerline of the support structure 100 that is opposite the first side. Because only one side of the over-the-door hanging apparatus 1000 is illustrated, only one of the elongate members and one of the pairs of mounting elements is illustrated. However, it should be appreciated that a second elongate member that is identical in structure to the first elongate member 1003 and a second pair of mounting elements that is identical in structure to the first pair of mounting elements 1004 are also included as a part of the over-the-door hanging apparatus 1000 similar to that which has been described in the previous embodiments.

The first pair of mounting elements 1004 (and also the second pair of mounting elements) is secured to the rear surface 1002 of the support structure 1001. The details of the first pair of mounting elements 1004 described below are applicable to the second pair of mounting elements that are not illustrated in the exemplified embodiment. In the exemplified embodiment, the first pair of mounting elements 1004 comprises a first mounting element 1005 and a second mounting element 1006. More specifically, in this embodiment the first mounting element 1005 is a first set screw that is screwed into the rear surface 1002 of the support structure 1001 and the second mounting element 1006 is a second set screw that is screwed into the rear surface 1002 of the support structure 1001. Of course, the first and second mounting elements 1005, 1006 may be other types of fasteners, including nails, rivets, bolts, pins, barbs, or the like (see, for example, FIG. 26 and the related description below). The first and second mounting elements 1005, 1006 may be secured to the rear surface 1002 of the support structure 1001 and then the first elongate member 1003 secured to the first and second mounting elements 1005, 1006 or the first elongate member 1003 may be placed adjacent/into contact with the rear surface 1002 of the support structure 1001 and then the first and second mounting elements 1005, 1006 used to couple the first elongate member 1003 to the support structure 1001. Thus, the first and second pairs of mounting elements 1004 may be secured to the rear surface 1002 of the support structure 1001 by the factory during manufacturing or by the user during assembly after purchase.

The first elongate member 1003 will be described below, it being understood that the same description is applicable to the second elongate member although it is not specifically illustrated in the figures for this particular embodiment. The first elongate member 1003 extends from a distal end 1007 to a proximal end 1008 and comprises a first surface 1009 and an opposite second surface 1010. The first elongate member 1003 comprises a plurality of mounting elements 1011 for mounting the first elongate member 1003 to the support structure 1001, and more specifically to the first pair of mounting elements 1004. The first elongate member 1003 also comprises a first bracket 1012 for engaging a top edge of a door as has been described above.

In the exemplified embodiment, the plurality of mounting elements 1011 comprises four separate multi-width apertures 1011a-d formed into the first elongate member 1003 in a vertically spaced apart manner. The multi-width apertures 1011a-d comprise a larger width portion that permits the head/flange of the first and second mounting elements 1005, 1006 of the first pair of mounting elements 1004 to pass therethrough and a smaller width portion that prevents the head of the first and second mounting elements 1005, 1006 of the first pair of mounting elements 1004 from passing therethrough. The smaller width portions of the multi-width apertures 1011a-d permit the stem portions of the first and second mounting elements 1005, 1006 of the first pair of mounting elements 1004 to pass therethrough.

Thus, referring collectively to FIGS. 21A and 21B, the first elongate member 1003 can be coupled to the first pair of mounting elements 1004 by inserting the heads of the first and second mounting elements 1005, 1006 of the first pair of mounting elements 1004 (which may be set screws or other fasteners as described above) through the larger width portion of two of the multi-width apertures 1011a, 1011b and then sliding the first elongate member 1003 relative to the support structure 1001 so that the stem portions of the first and second mounting elements 1005, 1006 of the first pair of mounting elements 1004 (which may be set screws or other fasteners as described above) enter into the smaller width portion of the multi-width apertures 1011a, 1011b. This prevents the first elongate member 1003 from being separated from the first pair of mounting elements 1004 unless the installation process including the sliding movement noted above is reversed.

Thus, the first and second elongate members 1003 are separate components from the support structure 1001. The first and second pairs of mounting elements 1004 are coupled to the rear surface 1002 of the support structure 1001 before the first and second elongate members 1003 are mounted to the support structure 1001. Specifically, the first and second elongate members 1003 are configured to be mounted to the support structure 1001 via engagement between the mounting elements 1011 of the first and second elongate members 1003 and the first and second pairs of mounting elements 1004.

Figures 22A, 22B:
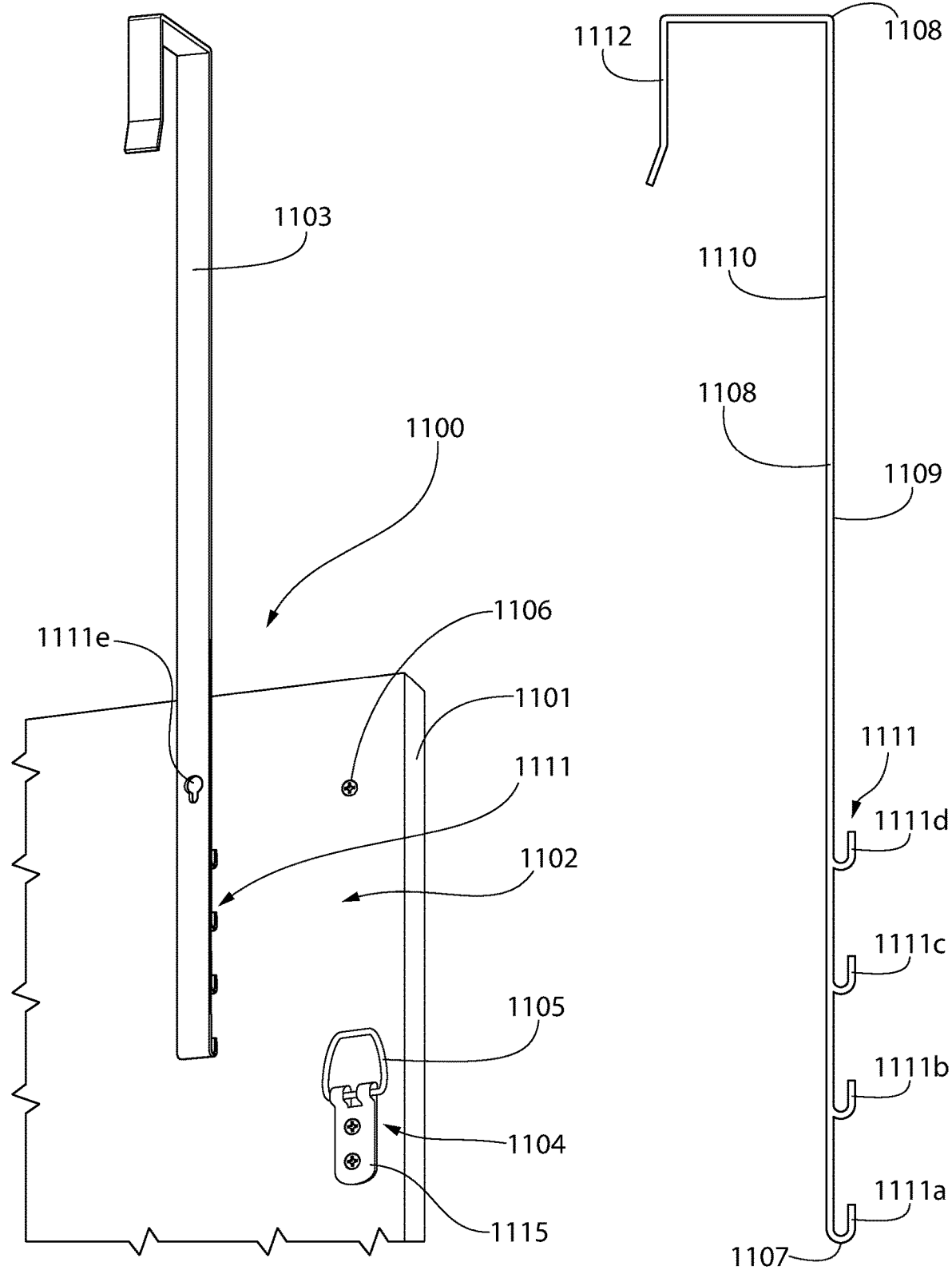
FIG. 22A is a perspective view of a portion of an over-the-door hanging apparatus in accordance with a sixth embodiment of the present invention with an elongate member and a mounting element in a detached state.
FIG. 22B is a side view of the elongate member of FIG. 22A.
Figure 22C:
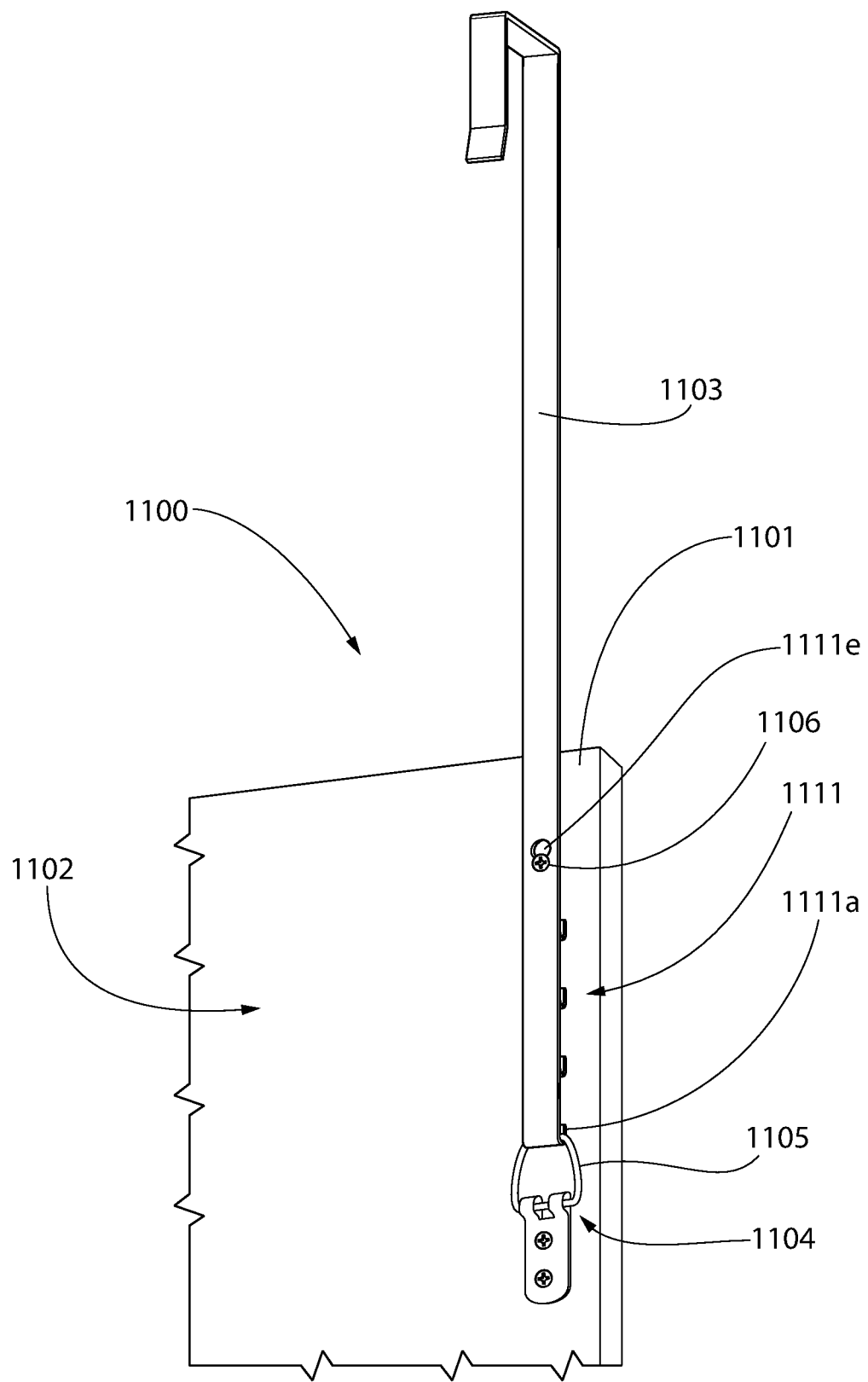
FIG. 22C is a perspective view of the portion of the over-the-door hanging apparatus of FIG. 22A with the elongate member and the mounting element in an attached state.

Referring now to FIGS. 22A-22C, another embodiment of an over-the-door hanging apparatus 1100 will be described. The over-the-door hanging apparatus 1100 generally comprises a support structure 1101 having a rear surface 1102, first and second elongate members 1103 (only the first elongate member is illustrated), and first and second pairs of mounting elements 1104 (only the first pair of mounting elements is illustrated). Similar to the embodiments described above, a mirror or other flat article may be coupled to the support structure 1101. As with the previously described embodiment of FIGS. 21A-21B, in this embodiment only one side of the apparatus 1100 and thus only one of the elongate members 1103 and one of the pairs of mounting elements 1104 is illustrated. However, it should be appreciated that a second elongate member and a second pair of mounting elements that are identical to the first elongate member 1103 and the first pair of mounting elements 1104 is provided on the opposite side of the over-the-door hanging apparatus 1100. In certain embodiments, the first pair of mounting elements 1104 and the second pair of mounting elements are located on opposite sides of a vertical centerline of the support structure 1101 as described above.

The first pair of mounting elements 1104 (and also the second pair of mounting elements) is secured to the rear surface 1102 of the support structure 1101. The details of the first pair of mounting elements 1104 described below are applicable to the second pair of mounting elements. In the exemplified embodiment, the first pair of mounting elements 1104 comprises a first mounting element 1105 and a second mounting element 1106. The first and second mounting elements 1105, 1106 of the first pair of mounting elements 1104 are vertically aligned and spaced apart from one another. In the exemplified embodiment, the first mounting element 1105 is a D-ring located on the rear surface 1102 of the support structure 1101 and the second mounting element 1106 is a set screw that is screwed into the rear surface 1102 of the support structure 1101. The D-ring may be coupled to the rear surface 1102 of the support structure 1101 via a bracket or plate member 1115. The set screw may be replaced with other fasteners such as those described above with reference to FIGS. 21A and 21B. In certain embodiments, the apparatus 1100 may only include the first mounting element 1105 and not also the second mounting element 1106, and thus the second mounting element 1106 (i.e., the set screw or equivalent) may be omitted in some embodiments. Although the second pair of mounting elements is not illustrated in the drawings, in some embodiments the first mounting element 1105 of the first pair of mounting elements 1104 is horizontally aligned with the first mounting element of the second pair of mounting elements and the second mounting element 1106 of the first pair of mounting elements 1104 is horizontally aligned with the second mounting element of the second pair of mounting elements.

The first elongate member 1103 extends from a proximal end 1107 to a distal end 1108 and comprises a first surface 1109 and an opposite second surface 1110. The first elongate member 1103 comprises a plurality of mounting elements 1111 for mounting to the support structure 1101 (and more specifically for mounting to the first pair of mounting elements 1104) and a first bracket 1112 for engaging a top edge of a door. The first bracket 1112 is located at the distal end 1108 of the first elongate member 1103. In the exemplified embodiment, the plurality of mounting elements 1111 extend from the first surface 1109 of the first elongate member 1103 and the first bracket 1112 extends from the second surface 1110 of the first elongate member 1103.

In the exemplified embodiment, the plurality of mounting elements 1111 comprises a first mounting element 1111a, a second mounting element 1111b, a third mounting element 1111c, a fourth mounting element 1111d, and a fifth mounting element 1111e. However, the number of the mounting elements 1111 is not to be limiting of the present invention in all embodiments and there may be more or less than that which is shown in the appended drawings. In the exemplified embodiment, each of the first through fourth mounting elements 1111a-d is a protrusion or hook that extends from the first surface 1109 of the first elongate member 1103 and the fifth mounting element 1111e is an aperture, and more specifically a multi-width aperture, that is formed through the first elongate member 1103.

In the exemplified embodiment, the fifth mounting element 1111e is formed into the main portion of the first elongate member 1103. However, in other embodiments the fifth mounting element 1111e may be an aperture that is formed into one of the first through fourth mounting elements 1111a-d. For example, the first elongate member 1103 may comprise the first mounting element 1111a, but it may be elongated relative to that which is illustrated so that it extends further vertically along the first elongate member 1103. In some embodiments, the aperture of the fifth mounting element 1111e may be formed into the first mounting element 1111a.

In the exemplified embodiment, the first mounting element 1111a is located at the proximal end 1107 of the first elongate member 1103. Furthermore, in the exemplified embodiment the fifth mounting element 1111e is located between the first mounting element 1111a and the proximal end 1108 of the first elongate member 1103. In some embodiments, the plurality of mounting elements 1111 may comprise only the first mounting element 1111a and the fifth mounting element 1111e. It should be appreciated that the use of the terms "first," "second," "third," and so on is merely intended to distinguish between the different mounting elements and is not otherwise intended to limit the scope of the application or claims. Thus, the phrase "first mounting element," "second mounting element," etc. in the claims may refer to any of the mounting elements 1111a-e described herein.

Referring to FIGS. 22A and 22C, the coupling of the first elongate member 1103 to the support structure 1101 via the first pair of mounting elements 1104 will be described, it being understood that this same description is applicable to the coupling of the second elongate member to the support structure 1101 via the second pair of mounting elements. The first elongate member 1103 is positioned adjacent the rear surface 1102 of the support structure 1101 so that the first mounting element 1111a of the first elongate member 1103 is aligned with the first mounting element 1105 of the first pair of mounting elements 1104 and the fifth mounting element 1111e of the first elongate member 1103 is aligned with the second mounting element 1106 of the first pair of mounting elements 1104. Of course, any one of the first through fourth mounting elements 1111a-d of the first elongate member 1103 may be aligned with the first mounting element 1105 depending on the desired hanging height of the over-the-door hanging apparatus 1100. The positioning/location of the second mounting element 1106 of the first pair of mounting elements 1104 may simply need to be changed to ensure that it is aligned with the fifth mounting element 1111e of the first elongate member 1103 depending on which of the first through fourth mounting elements 1111a-d of the first elongate member 1103 is to be coupled to the first mounting element 1105 of the first pair of mounting elements 1104. In some embodiments the second through fourth mounting elements 1111b-d may be omitted so that there is only the first mounting element 1111a and the fifth mounting element 1111e and no adjustability in the hanging height of the over-the-door hanging apparatus 1100.

Once aligned as described herein, the first mounting element 1111a of the first elongate member 1103 is engaged with the first mounting element 1105 such that the D-ring becomes positioned within a space between the first mounting element 1111a and the first surface 1109 of the first elongate member 1103. Simultaneously, the second mounting element 1106 enters into the larger width portion of the second mounting element 1106 of the first elongate member 1103. Next, the first elongate member 1103 is slid upwardly/vertically so that the second mounting element 1106 enters into the smaller width portion of the second mounting element 1106 and the D-ring becomes hooked onto/engaged with the first mounting element 1111a. This dual mount system prevents substantial movement of the first elongate member 1103 relative to the support structure 1101.

Referring to FIGS. 23A-23D, another embodiment of an over-the-door hanging apparatus 1200 will be described. The over-the-door hanging apparatus 1200 generally comprises a support structure 1201 having a rear surface 1202, first and second elongate members 1203 (only the first elongate member is illustrated, it being understood that the second elongate member is identical thereto), and first and second pairs of mounting elements 1204 (only the first pair of mounting elements is illustrated, it being understood that the second pair of mounting elements is identical but positioned on the opposite side of the support structure 1201 as has been discussed in the previous embodiments). As with the embodiments above with regard to FIGS. 21A-21B and 22A-22C, FIGS. 23A-23D only illustrate a portion of the over-the-door hanging apparatus 1200 sufficient to show the mount system for mounting the first and second elongate members 1203 to the support structure 1201 via the first and second pairs of mounting elements 1204.

As with the previously described embodiments, the first pair of mounting elements 1204 is coupled or secured to the rear surface 1202 of the support structure 1201. In this embodiment, the first pair of mounting elements 1204 comprises a first mounting element 1205 and a second mounting element 1206. In the exemplified embodiment, the first and second mounting elements 1205, 1206 are illustrated as separate and distinct elements. However, the invention is not to be so limited and the first and second mounting elements 1205, 1206 may be formed into a single mounting plate that is coupled to the rear surface 1202 of the support structure 1201. Each of the first and second mounting elements 1205, 1206 comprises a curved channel 1215.

The first elongate member 1203 extends from a distal end 1207 to a proximal end 1208 and comprises a first surface 1209 and an opposite second surface 1210. The first elongate member 1204 comprises first and second mounting elements 1211a, 1211b extending from the first surface 1209 and a first bracket 1212 extending from the second surface 1210. The first and second mounting elements 1211a, 1211b are hooks that are configured to cooperate with the first and second mounting elements 1205, 1206 of the first pair of mounting elements 1204 to mount the first elongate member 1203 to the support structure 1201. In the exemplified embodiment, the first mounting element 1211a is a hook that extends outwardly and downwardly towards the distal end 1207 of the first elongate member 1203 and the second mounting element 1206 is a hook that extends outwardly and upwardly towards the proximal end 1208 of the first elongate member 1203. However, the invention is not to be so limited in all embodiments and both of the first and second mounting elements 1211a, 1211b of the first elongate member 1203 may extend outwardly and upwardly towards the proximal end 1208 in other embodiments. The first bracket 1212 is configured to engage a top edge of a door to support the over-the-door hanging apparatus 1200 from the door.

Figures 23A, 23B:
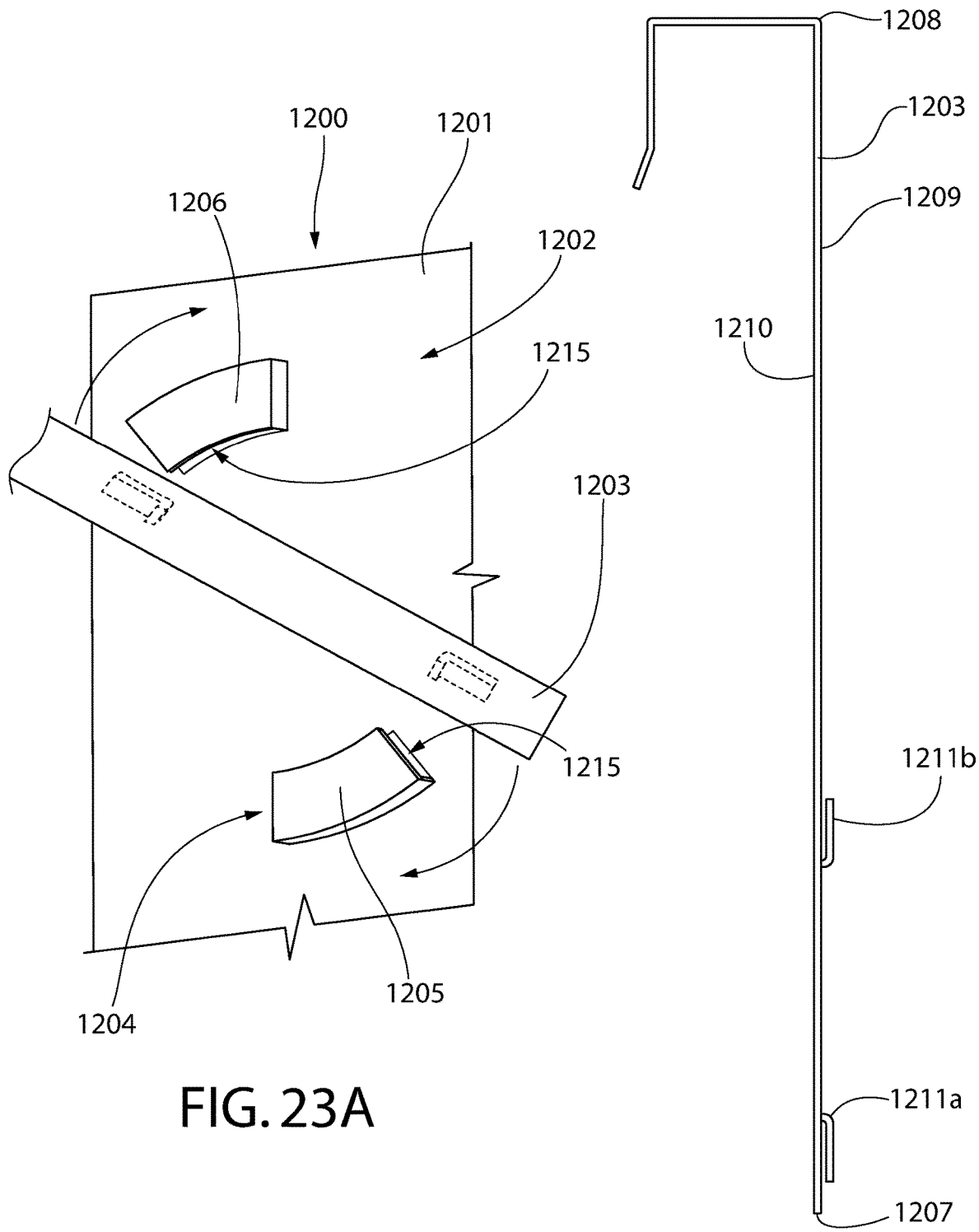
FIG. 23A is a plan view of a portion of an over-the-door hanging apparatus in accordance with a seventh embodiment of the present invention with an elongate member and a mounting element in a detached state.
FIG. 23B is a side view of the elongate member of FIG. 23A.
Figure 23D:
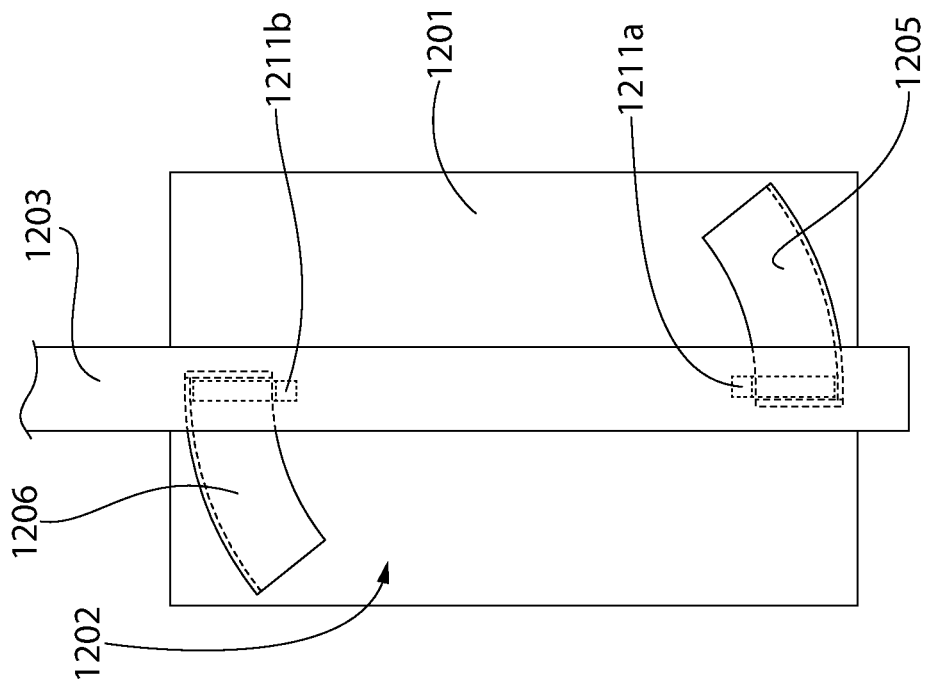
FIGS. 23C and 23D are plan views of the portion of the over-the-door hanging apparatus of FIG. 22A illustrating the manner of coupling the elongate member to the mounting element.
Figure 23C:
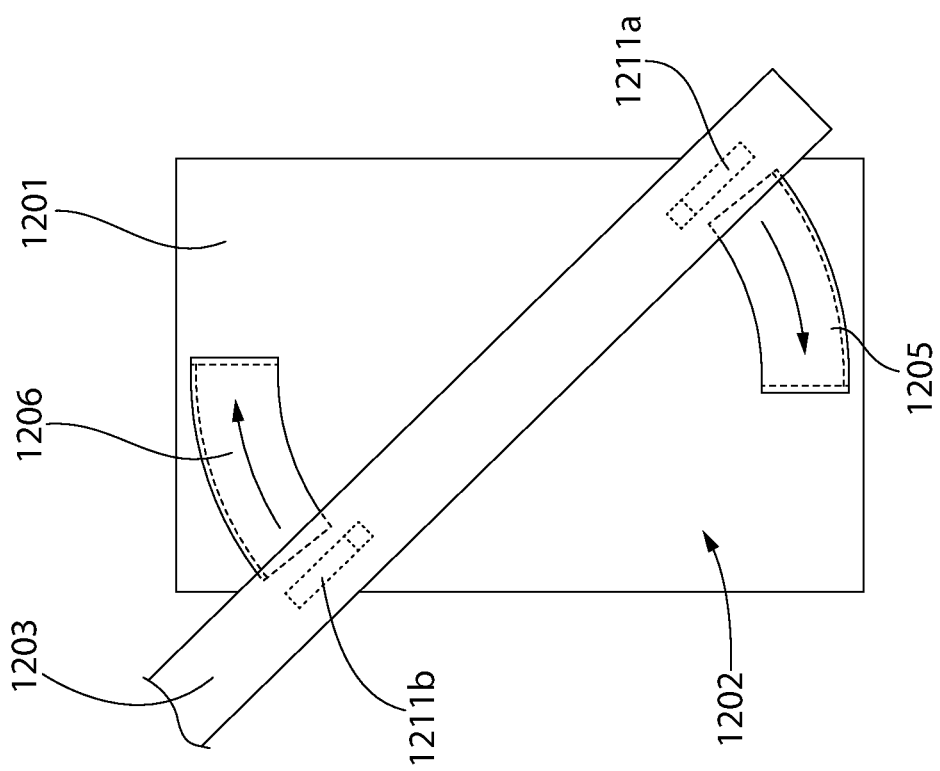

FIGS. 23C and 23D illustrate the manner of mounting the first elongate member 1203 to the support structure 1201 via the first and second mounting elements 1205, 1206 of the first pair of mounting elements 1204. The first elongate member 1203 is positioned adjacent to the first and second mounting elements 1205, 1206 of the first pair of mounting elements 1204 so that the first and second mounting elements 1211a, 1211b of the first elongate member 1203 are aligned with openings into the channels 1215 of the first and second mounting elements 1205, 1206 of the first pair of mounting elements 1204. Next, the first elongate member 1203 is rotated about an axis that is perpendicular to the first and second surfaces 1209, 1210 of the first elongate member 1203 so that the first mounting element 1211a of the first elongate member 1203 enters into the channel 1215 of the first mounting element 1205 and the second mounting element 1211b of the first elongate member 1203 enters into the channel 1215 of the second mounting element 1206. Thus, the main difference between this embodiment and those that were previously described is that the coupling is achieved via a rotational movement of the first elongate member 1203 relative to the support structure 1201. The same rotational technique is used for mounting the second elongate member to the second pair of mounting elements.

Figure 24A:
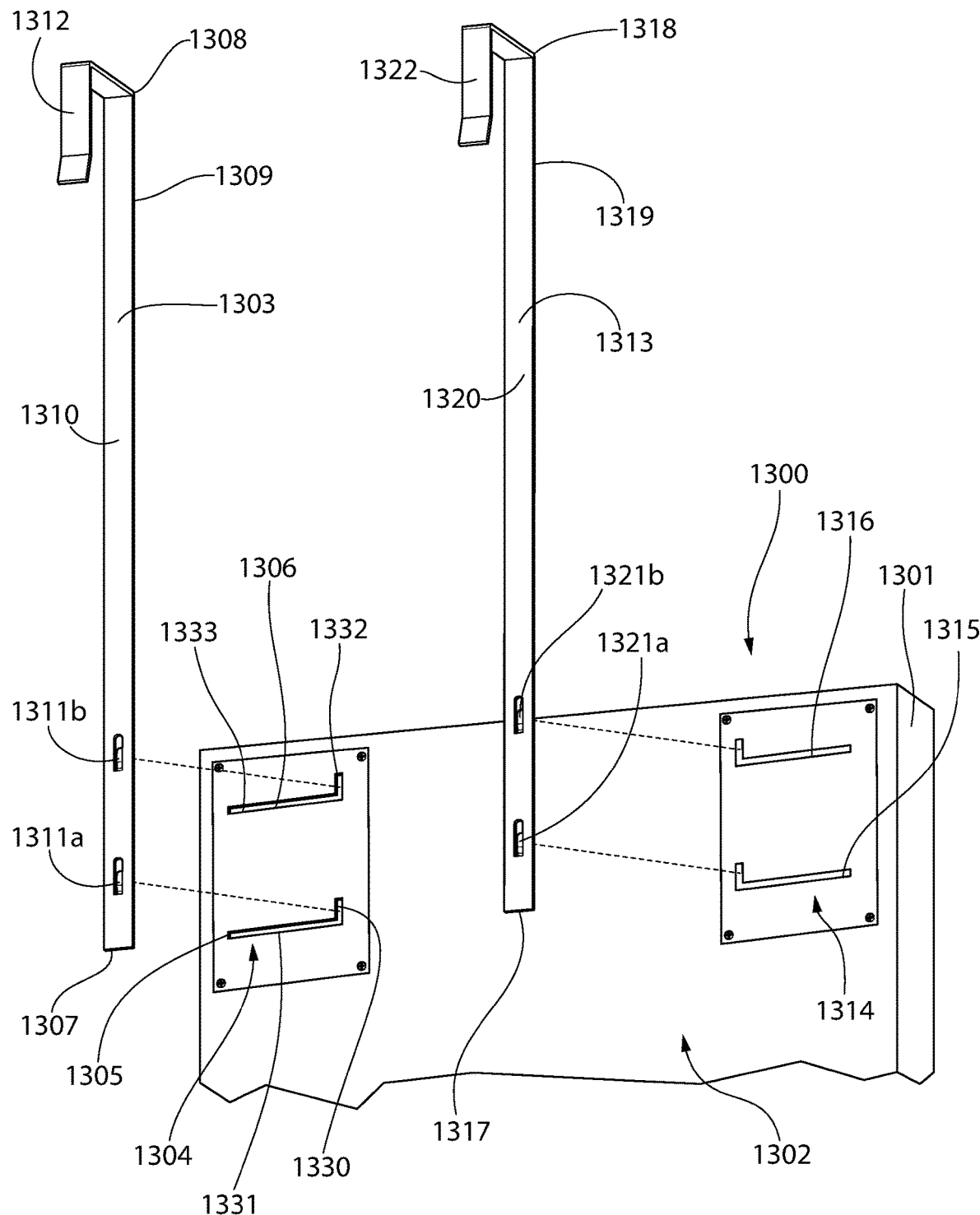
FIG. 24A is a plan view of a portion of an over-the-door hanging apparatus in accordance with an eighth embodiment of the present invention with an elongate member and a mounting element in a detached state.
Figure 24B:
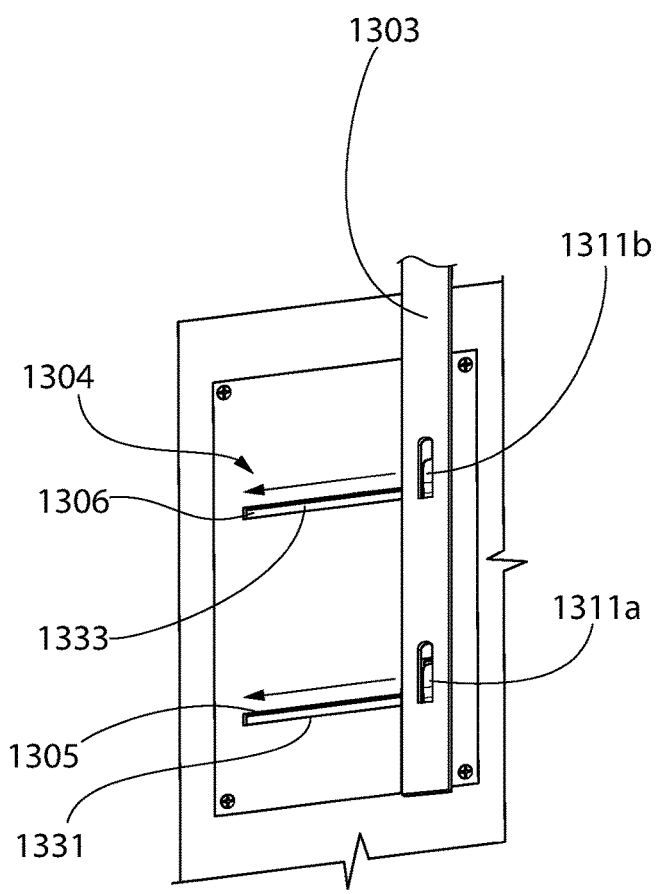
FIGS. 24B and 24C are plan views of the portion of the over-the-door hanging apparatus of FIG. 24A illustrating the manner of coupling the elongate member to the mounting element.
Figure 24C:
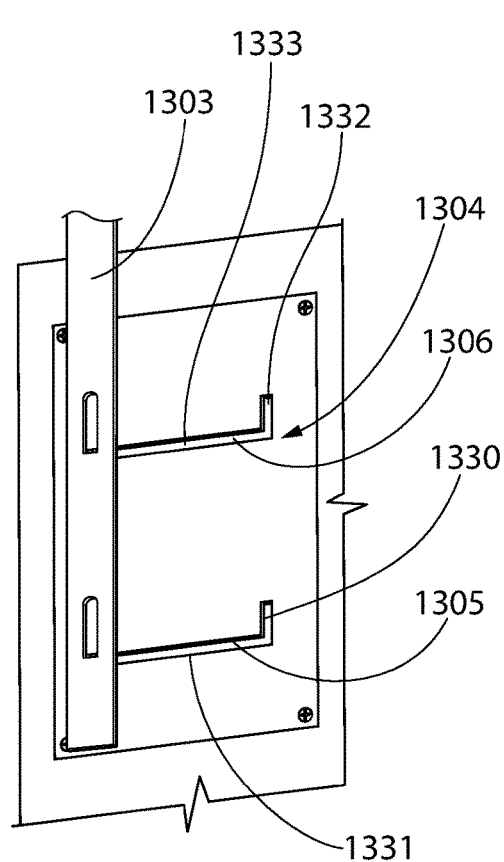

Referring to FIGS. 24A-24C concurrently, another embodiment of an over-the-door hanging apparatus 1300 will be described. The over-the-door hanging apparatus 1300 generally comprises a support structure 1301 having a rear surface 1302, first and second elongate members 1303, 1313, and first and second pairs of mounting elements 1304, 1314. As with the embodiments above with regard to FIGS. 21A-21B, 22A-22C, and 23A-23D, FIGS. 24A-24C only illustrate a portion of the over-the-door hanging apparatus 1300 sufficient to show the mount system for mounting the first and second elongate members 1303, 1313 to the support structure 1301 via the first and second pairs of mounting elements 1304, 1314.

As with the previously described embodiments, the first and second pairs of mounting elements 1304, 1314 are coupled or secured to the rear surface 1302 of the support structure 1301 on opposite sides of a vertical centerline of the support structure 1301. In this embodiment, the first pair of mounting elements 1304 comprises a first mounting element 1305 and a second mounting element 1306 and the second pair of mounting elements 1314 comprises a first mounting element 1315 and a second mounting element 1316. In the exemplified embodiment, the first and second mounting elements 1305, 1306 of the first pair of mounting elements 1304 are positioned on a single plate and the first and second mounting elements 1315, 1316 of the first pair of mounting elements 1314 are positioned on a single plate. However, the invention is not to be limited in this regard in all embodiments.

The first elongate member 1303 extends from a distal end 1307 to a proximal end 1308 and comprises a first surface 1309 and an opposite second surface 1310. The first elongate member 1304 comprises first and second mounting elements 1311a, 1311b extending from the first surface 1309 and a first bracket 1312 extending from the second surface 1310. Of course, more than two mounting elements may extend from the first surface 1309 of the first elongate member 1304 in other embodiments. In the exemplified embodiment, the first and second mounting elements 1311a, 1311b are hooks that are configured to cooperate with the first and second mounting elements 1305, 1306 of the first pair of mounting elements 1304 to mount the first elongate member 1303 to the support structure 1301. In the exemplified embodiment, each of the first and second mounting elements 1311a, 1311b extends outwardly and upwardly towards the proximal end 1308 of the first elongate member 1303. The second elongate member 1313 extends from a distal end 1317 to a proximal end 1318 and comprises a first surface 1319 and an opposite second surface 1320. The second elongate member 1314 comprises first and second mounting elements 1321a, 1321b extending from the first surface 1319 and a second bracket 1322 extending from the second surface 1320. The first and second mounting elements 1321a, 1321b are hooks that are configured to cooperate with the first and second mounting elements 1315, 1316 of the second pair of mounting elements 1314 to mount the second elongate member 1313 to the support structure 1301. In the exemplified embodiment, each of the first and second mounting elements 1321a, 1321b extends outwardly and upwardly towards the proximal end 1308 of the first elongate member 1303. The first and second brackets 1312, 1322 are configured to engage a top edge of a door to support the over-the-door hanging apparatus 1300 from the door.

The first pair of mounting elements 1304, and specifically the first and second mounting elements 1305, 1306 of the first pair of mounting elements 1304, will now be described, it being understood that the same description applies to the second pair of mounting elements 1314. In the exemplified embodiment, the first pair of mounting elements 1304 is formed into a plate that is coupled to the rear surface 1302 of the support member 1301. However, the invention is not to be so limited in all embodiments and the first pair of mounting elements 1304 may be formed directly into the rear surface 1302 of the support member 1301 or each mounting element 1305, 1306 of the first pair of mounting elements 1304 may be formed into separate plates that are coupled to the rear surface 1302 of the support member 1301.

The first mounting element 1305 of the first pair of mounting elements 1304 comprises an entry region 1330 and a nesting region 1331. Similarly, the second mounting element 1306 of the first pair of mounting elements 1304 comprises an entry region 1332 and a nesting region 1333. The entry regions 1330, 1332 are vertically oriented channels that permit the first and second mounting elements 1311a, 1311b of the first elongate member 1303 to pass therethrough. The nesting regions 1331, 1333 are horizontally oriented channels.

Thus, as best illustrated in FIGS. 24B and 24C, the first elongate member 1303 is coupled to the support member 1301 (and more specifically to the first pair of mounting elements 1304) via a horizontal sliding motion. Specifically, first the first and second mounting elements 1311a, 1311b are aligned with and inserted into the entry regions 1330, 1332 of the first and second mounting elements 1305, 1306 of the first pair of mounting elements 1304. Next, the first elongate arm 1303 is slid horizontally relative to the support structure 1301 so that the first and second mounting elements 1311a, 1311b slide horizontally along/within the nesting regions 1331, 1333 of the first and second mounting elements 1305, 1306 of the first pair of mounting elements 1304. There is either a cutout formed into the rear surface 1302 of the support structure 1301 or the plate that contains the first pair of mounting elements 1304 is raised to provide a pocket or open space within which the first and second mounting elements 1311a, 1311b can nest. Thus, this embodiment utilizes a horizontal sliding motion between the first elongate arm 1303 and the support structure 1301 to mount the first elongate arm 1303 to the support structure 1301 via the first pair of mounting elements 1304.

Figure 25A:
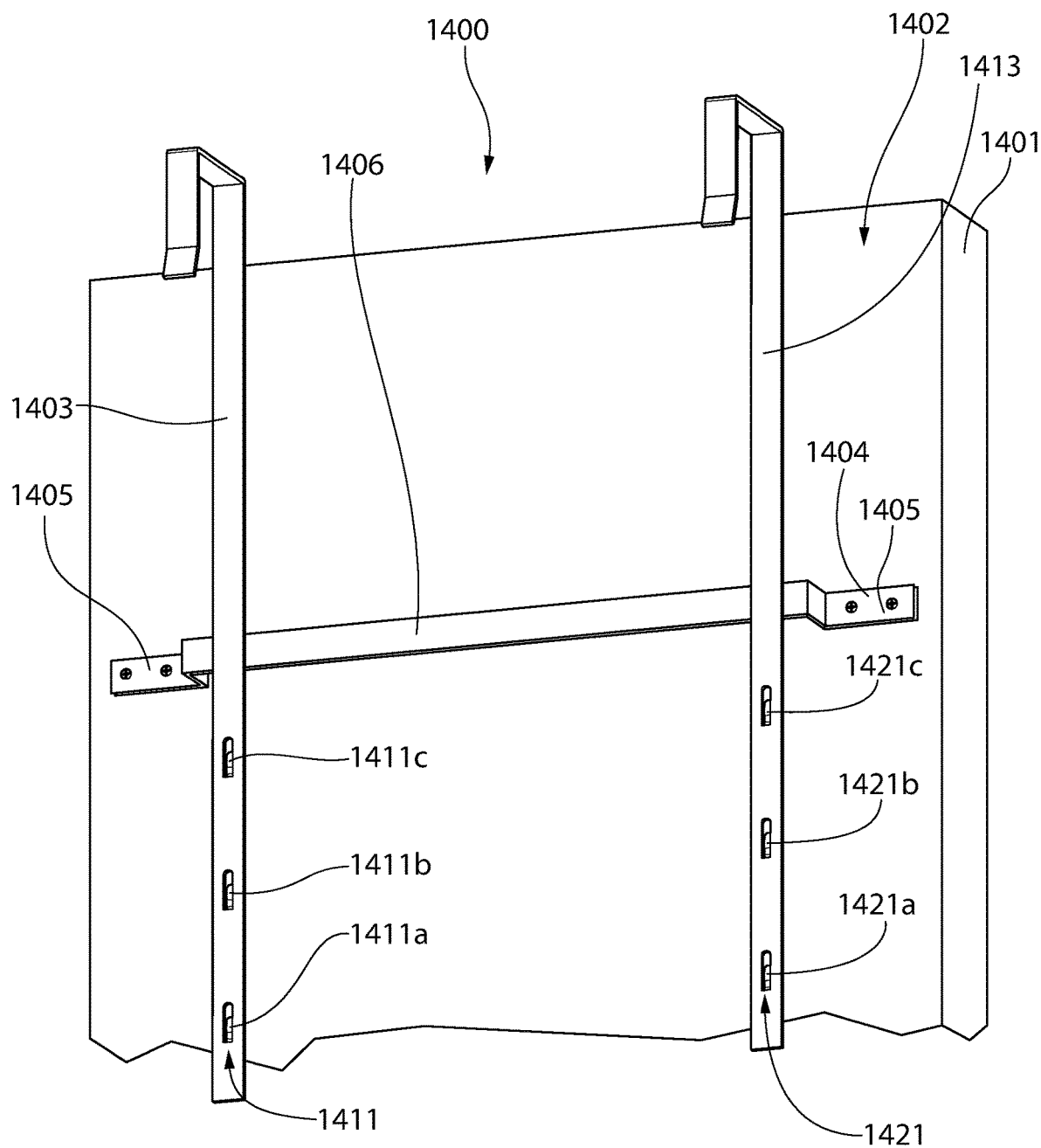
FIG. 25A is a perspective view of a portion of an over-the-door hanging apparatus in accordance with a ninth embodiment of the present invention with an elongate member and a mounting element in a detached state.
Figure 25B:
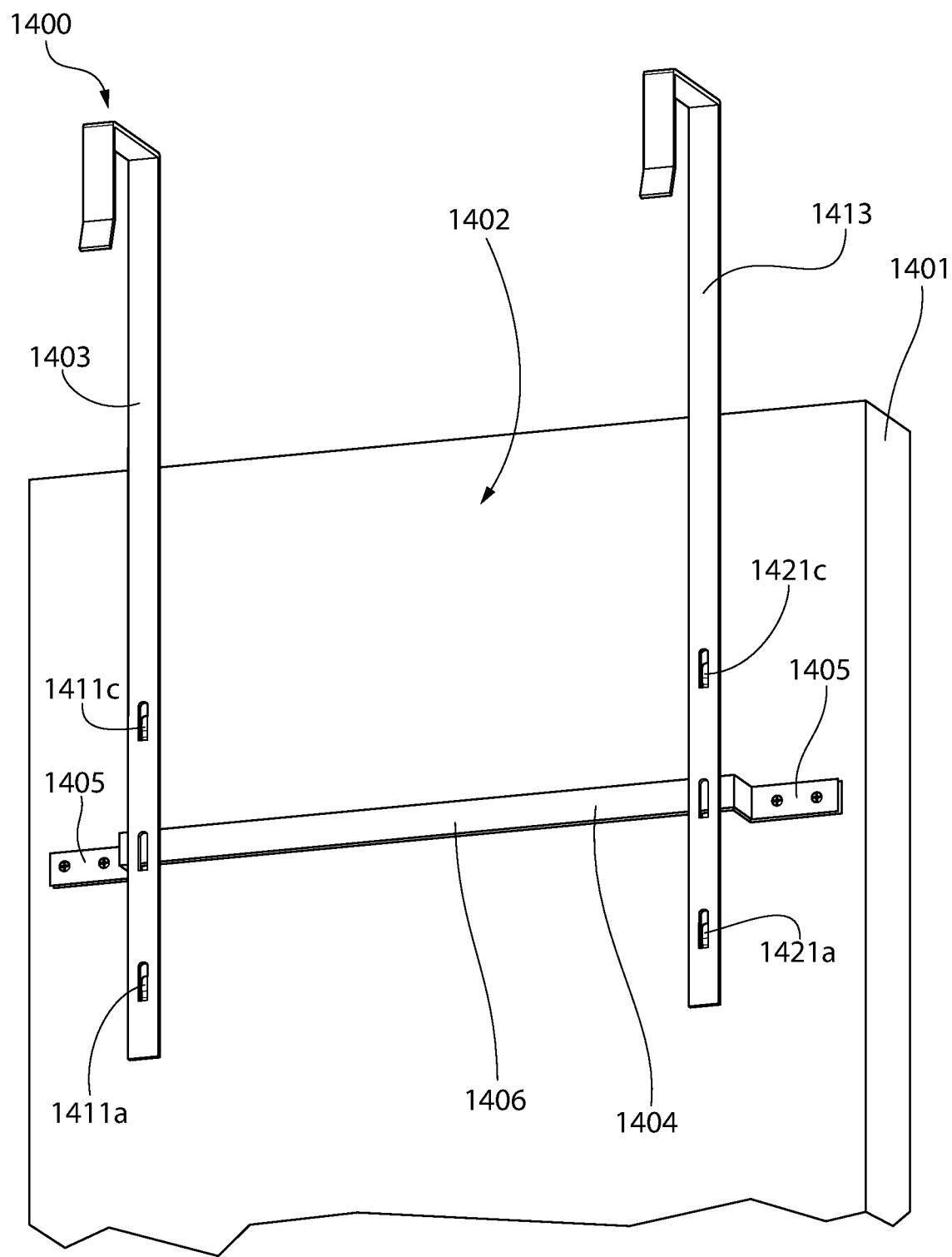
FIG. 25B is a perspective view of the portion of the over-the-door hanging apparatus of FIG. 25A with the elongate member and the mounting element in the attached state.

Referring to FIGS. 25A and 25B, another embodiment of an over-the-door hanging apparatus 1400 is illustrated and will be described. The over-the-door hanging apparatus 1400 generally comprises a support structure 1401 having a rear surface 1402 and a mirror or other flat article coupled to the support structure 1401, first and second elongate members 1403, 1413, and a mounting bracket 1404 secured or coupled to the rear surface 1402 of the support structure 1401. The first and second elongate members 1403, 1413 are similar in structure to the previously described first and second elongate members. Specifically, the first elongate member 1403 comprises a plurality of mounting elements 1411 (a first mounting element 1411a, a second mounting element 1411b, and a third mounting element 1411c) and a first bracket 1412. The second elongate member 1413 comprises a plurality of mounting elements 1421 (a first mounting element 1421a, a second mounting element 1421b, and a third mounting element 1421c) and a second bracket 1422.

The main difference in this embodiment relative to those previously described is that rather than having a mounting plate or pairs of mounting elements on the rear surface 1402 of the support structure 1401, there is a single mounting bracket 1404. The mounting bracket 1404 comprises first portions 1405 that are secured directly to the rear surface 1402 of the support structure 1401 and second portions 1406 that are raised relative to the rear surface 1402 of the support structure 1401. Thus, the first portions 1405 of the mounting bracket 1404 are in direct surface contact with the rear surface 1402 of the support structure 1401 to couple the mounting bracket 1404 to the support structure 1401 and the second portions 1406 of the mounting bracket 1404 are spaced apart from the rear surface 1402 of the support structure 1401. The mounting bracket 1404 extends horizontally along the rear surface 1402 of the support structure 1401 transverse to a vertical centerline of the support structure 1401. The first portions 1405 of the mounting bracket 1404 are on opposing ends of the mounting bracket 1404 and the second portion 1406 of the mounting bracket 1404 extends between the first portions 1405 of the mounting bracket.

FIG. 25A illustrates the first and second elongate members 1403, 1413 detached from the mounting bracket 1404 and FIG. 25B illustrates the first and second elongate members 1403, 1413 attached or mounted to the mounting bracket 1404. To mount the first elongate arm 1403 to the mounting bracket 1404, one of the first, second, and third mounting elements 1411a-c of the first elongate arm 1403 (which may be hooks as described herein above) is aligned with a bottom edge of the raised portion 1406 of the mounting bracket 1404. The first elongate member 1403 is then slid vertically to trap the raised portion 1406 of the mounting bracket 1404 within the slot or space formed by the mounting element 1411a-c being used. Any of the first, second, and third mounting elements 1411a-c may be used depending on the desired hanging height of the support structure 1401. Specifically, if the first mounting element 1411a is used, the support structure 1401 will hang lower and if the third mounting element 1411c is used the support structure will hang higher. The same technique is used for mounting the second elongate member 1413 to the mounting bracket 1404. In FIG. 25B, the second mounting elements 1411b, 1421b of the first and second elongate members 1403, 1413 are used in the mounting.

Although only a single mounting bracket 1404 is used in the exemplified embodiment, in alternative embodiments a second mounting bracket may also be coupled to the rear surface 1402 of the support structure 1401 at a vertical position above or below the mounting bracket 1404. When two mounting brackets are used, two of the mounting elements 1411a-c, 1421a-c of the first and second elongate embers 1403, 1413 will engage with mounting brackets simultaneously, resulting in a more secure attachment between the first and second elongate members 1403, 1413 and the support structure 1401, allowing less potential movement of the support structure 1401 when it is hanging from a door as described herein above.

Figure 25C:
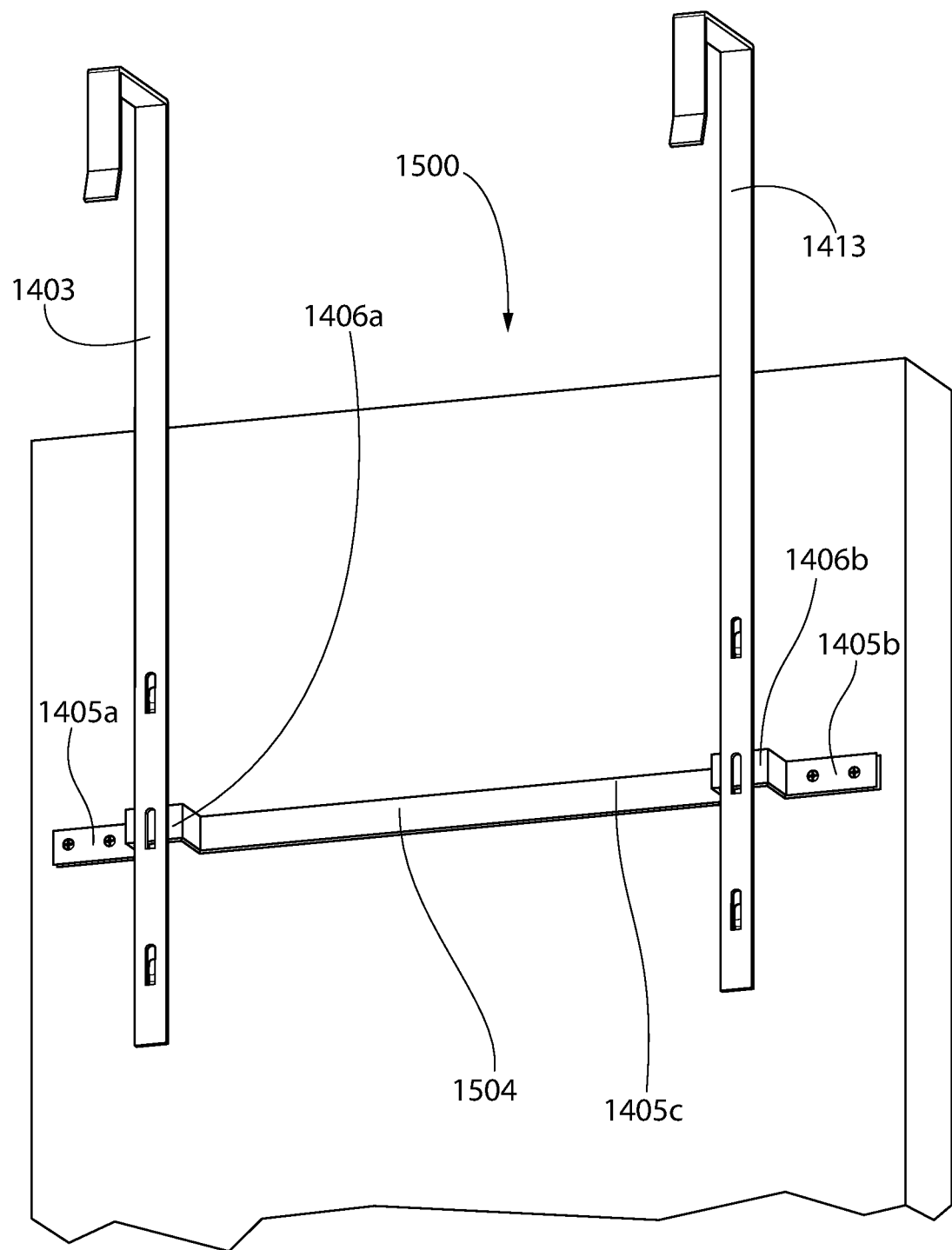
FIG. 25C is a perspective view of the portion of the over-the-door hanging apparatus of FIG. 25B illustrating an alternative embodiment of the mounting element.

FIG. 25C illustrates an embodiment of an over-the-door hanging apparatus 1500 that is similar to the over-the-door hanging apparatus 1400 of FIGS. 25A and 25B except as described herein below. Thus, the description above with regard to the over-the-door hanging apparatus 1400 is applicable to this embodiment except for the differences specifically described below. In this embodiment, the mounting bracket 1504 has two raised portions 1406a, 1406b and three non-raised portions 1405a-c. The non-raised portion 1405c is positioned and extends in between the two raised portions 1406a, 1406b. Thus, in this embodiment the raised portions 1406a, 1406b are reduced in length relative to the raised portion 1406 of the over-the-door hanging apparatus 1400. This will reduce horizontal sliding of the first and second elongate members 1403, 1413 when the first and second elongate members 1403, 1413 are mounted to the mounting bracket 1504.

Figure 25D:
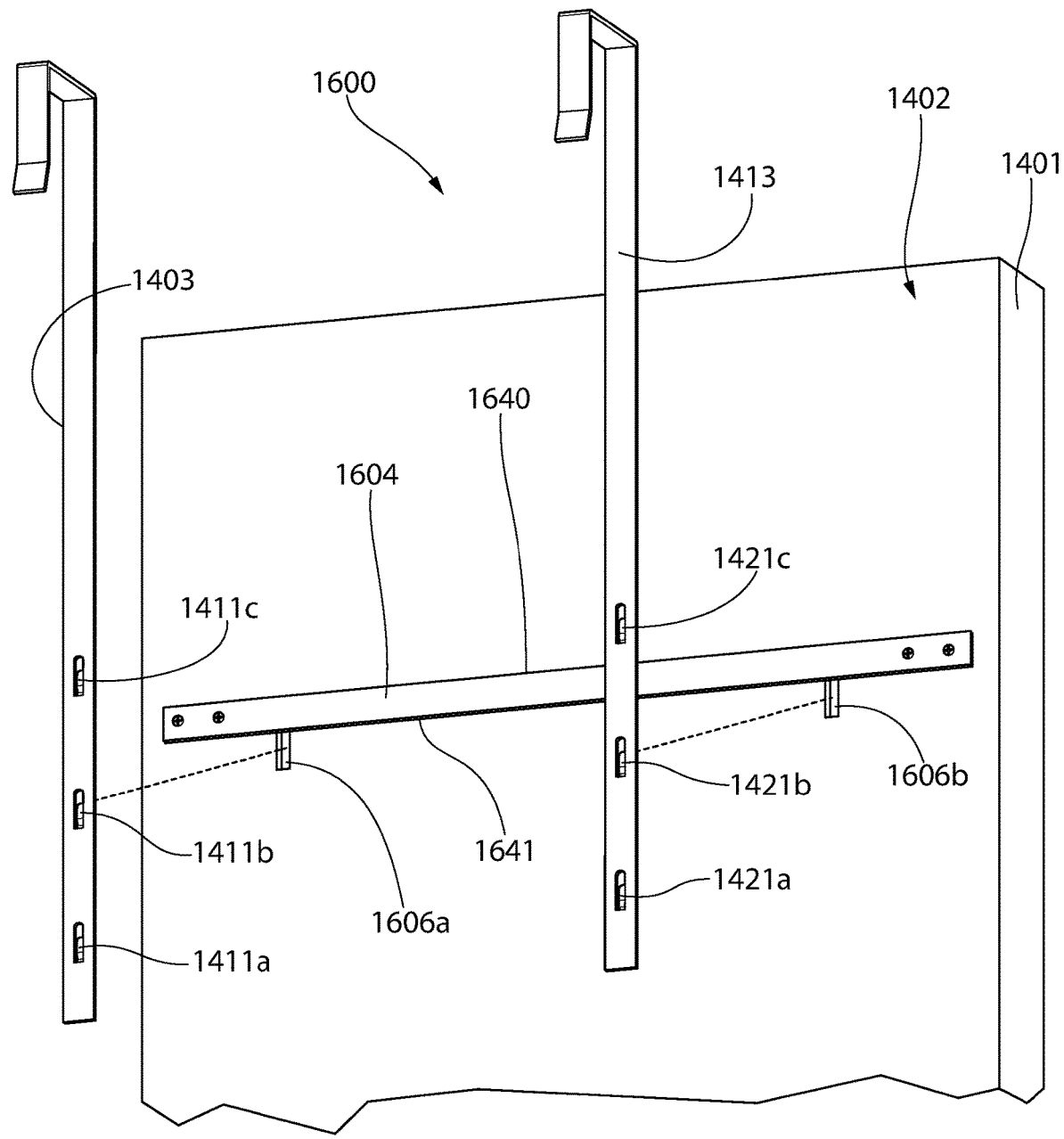
FIG. 25D is a perspective view of the portion of the over-the-door hanging apparatus of FIG. 25A illustrating still another alternative embodiment of the mounting element with the elongate member and the mounting element in a detached state.
Figure 25E:
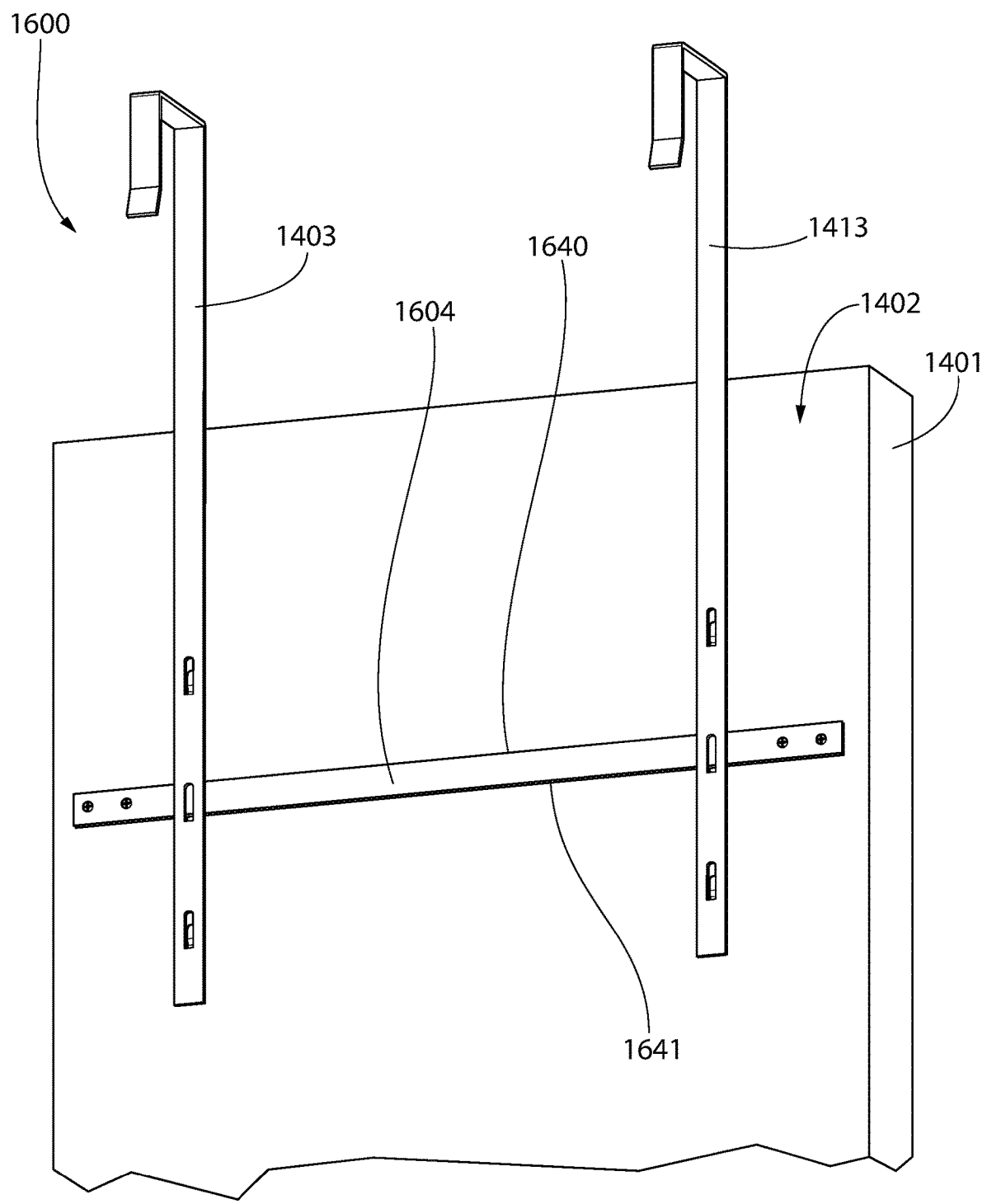
FIG. 25E is a perspective view of the over-the-door hanging apparatus of FIG. 25D with the mounting element and the elongate member in an attached state.

FIGS. 25D and 25E illustrate still another embodiment of an over-the-door hanging apparatus 1600 that is similar to the over-the-door hanging apparatus 1400 of FIGS. 25A and 25B except as described herein below. Thus, the description above with regard to the over-the-door hanging apparatus 1400 is applicable to this embodiment except for the differences specifically described below. In this embodiment, the mounting bracket 1604 is a generally flat, planar structure extending across the width of the support structure 1401. However, in this embodiment there are two cutouts 1606a, 1606b formed into the rear surface 1402 of the support structure 1401 from a location adjacent a top edge 1640 of the mounting bracket 1604 vertically downwardly beyond a bottom edge 1641 of the mounting bracket 1604.

To mount the first elongated member 1403 to the mounting bracket 1604, one of the mounting elements 1411a-c of the first elongated member 1403 is inserted into the cutout 1606a, and then the first elongated member 1403 is slid upwardly. Similarly, to mount the second elongated member 1413 to the mounting bracket 1604, one of the mounting elements 1421a-c of the second elongated member 1413 is inserted into the cutout 1606b, and then the second elongated member 1413 is slid upwardly.

Figure 26:
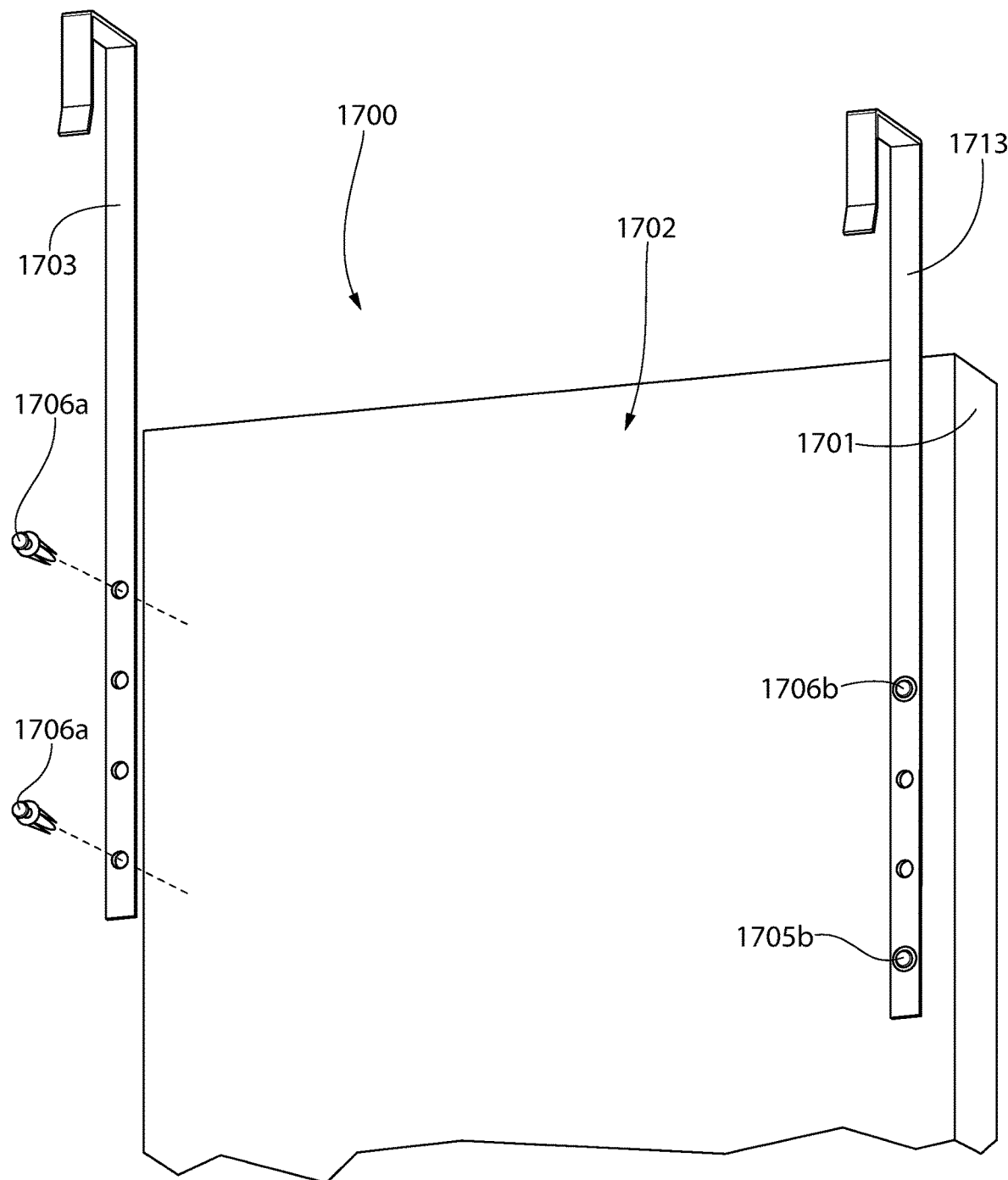
FIG. 26 is a perspective view of an over-the-door hanging apparatus in accordance with a tenth embodiment of the present invention with one elongate member in an attached state and another elongate member in a detached state.

Referring to FIG. 26, another embodiment of an over-the-door hanging apparatus 1700 is illustrated. The over-the-door hanging apparatus 1700 is similar to the over-the-door hanging apparatus 1000 of FIGS. 21A and 21B except that instead of using set screws as the mounting elements that are secured to the rear surface 1702 of the support structure 1701 and to which the first and second elongated members 1703, 1713 are mounted to the support structure 1701, barbs 1705a, 1705b, 1706a, 1706b are used. Thus, the first and second elongated members 1703, 1713 may be aligned with the rear surface 1702 of the support structure 1701 as desired, and then the barbs may be inserted into through-holes (i.e., mounting elements) formed into the first and second elongated members 1703, 1713. The material and construction of the barbs 1705a, 1705b, 1706a, 1706b and the material of the support structure 1701 may be such that the barbs 1705a, 1705b, 1706a, 1706b are able to be press fit into the support structure 1701 with the force of a user's hand or thumb/fingers. Alternatively, the rear surface 1702 of the support structure 1701 may include pre-drilled holes into which the barbs 1705a, 1705b, 1706a, 1706b may be press-fit to secure the first and second elongate members 1703, 1713 to the support structure 1701. This embodiment may be used in combination with a plate (not shown) that is affixed to the rear surface 1702 of the support structure 1701 or without such a plate as shown in the exemplified embodiment.

Rather than barbs 1705a, 1705b, 1706a, 1706b, any type of fastener (bolts, rivets, screws, eye lags, etc.) may be used. Alternatively, the elongated members 1703, 1713 may be secured to the rear surface 1702 of the support structure 1701 using adhesive, hook-and-loop fasteners, or the like.

Figure 27:
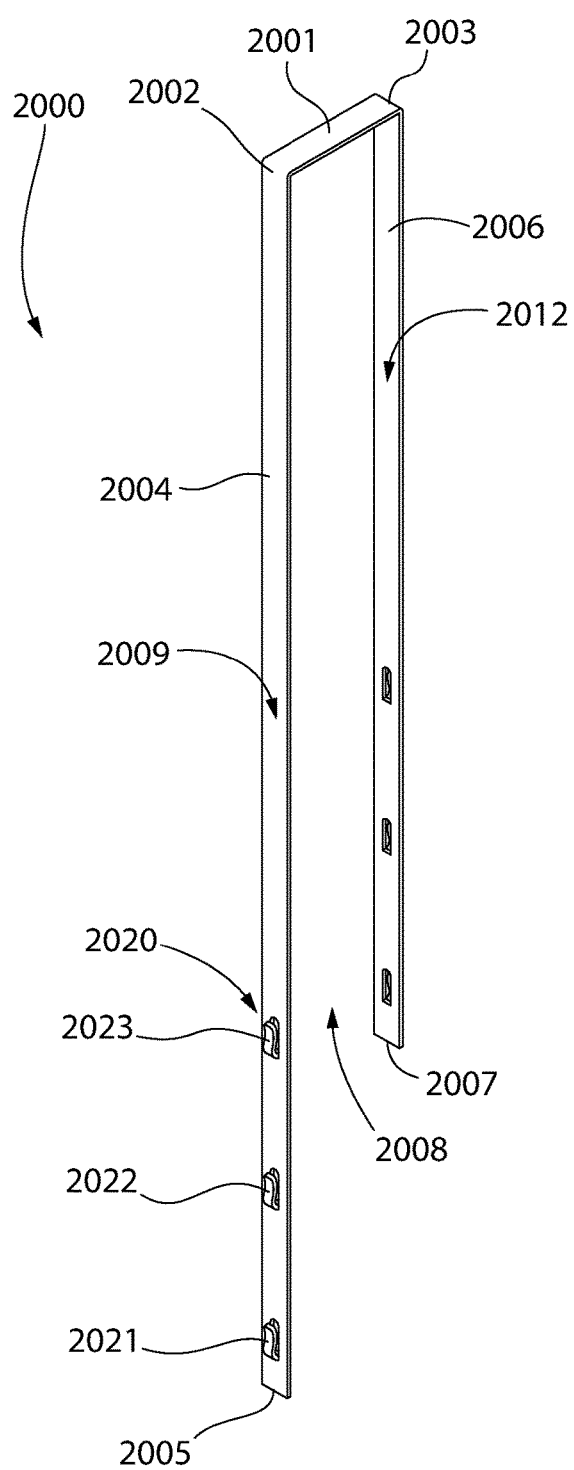
FIG. 27 is a front perspective view of a bracket member in accordance with an embodiment of the present invention.
Figure 28:
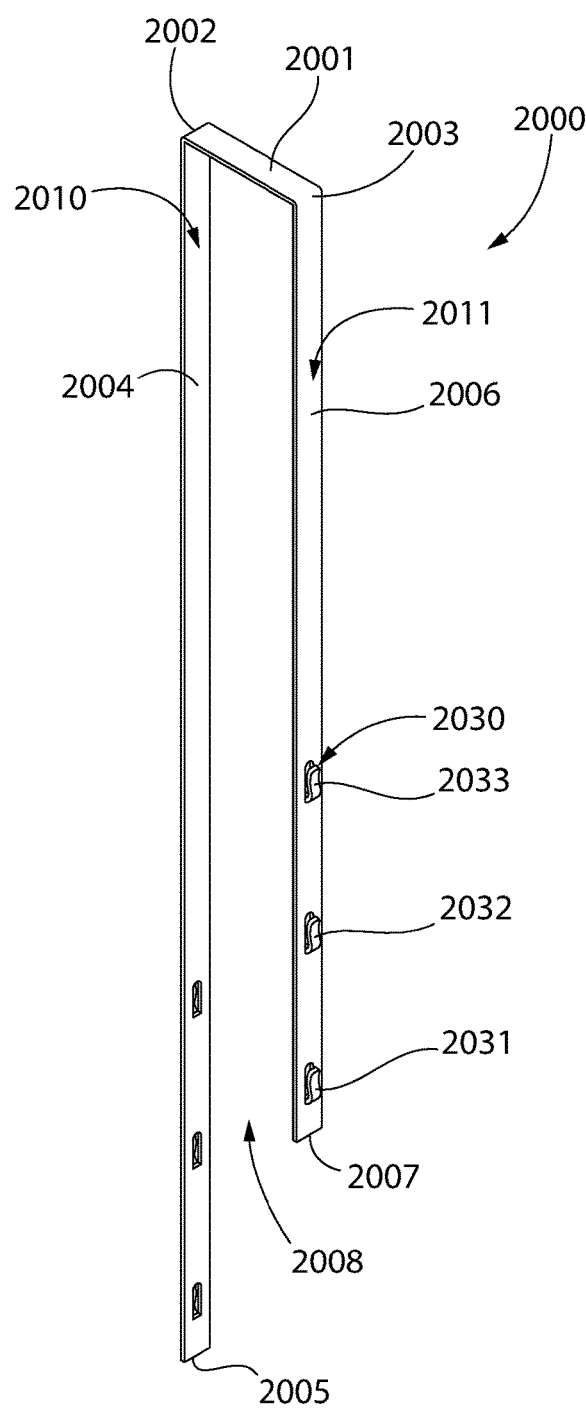
FIG. 28 is a rear perspective view of the bracket member of FIG. 27.
Figure 29:
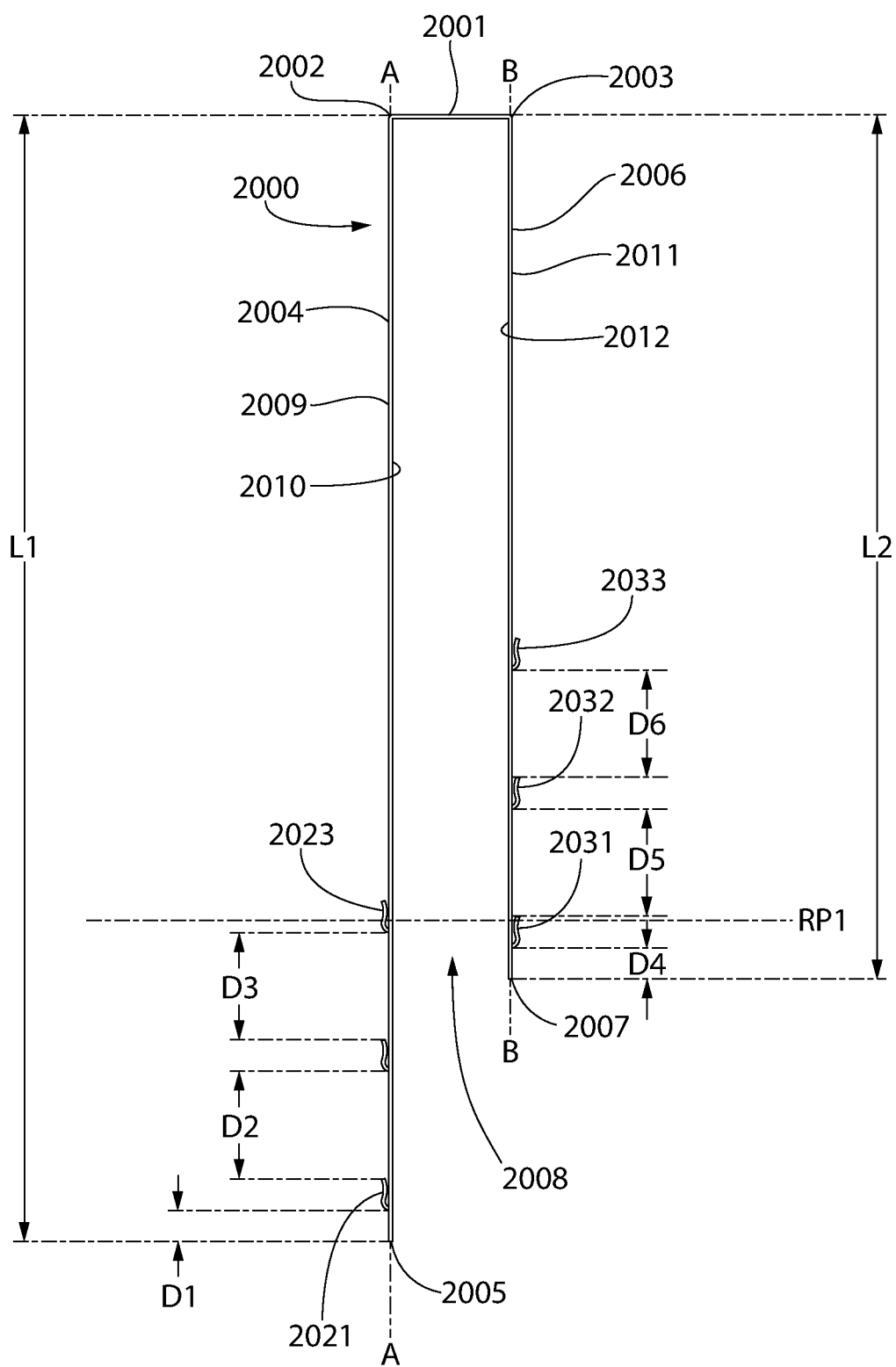
FIG. 29 is a side view of the bracket member of FIG. 27.

Referring to FIGS. 27-29 concurrently, a bracket member 2000 will be described in accordance with another embodiment of the present invention. FIGS. 27-35D all relate to the bracket member 2000 and its use. Specifically, FIGS. 27-29 illustrate the bracket member 2000 by itself, FIGS. 30-32D illustrate the bracket member supporting two distinct products, and FIGS. 33-35D illustrate the bracket member supporting two distinct products whereby at least one of the products in FIGS. 33-35D is different than one of the products in FIGS. 30-32D. This section of the application will begin with a description of the bracket member 2000 and will follow with a description of how various products or support structures are mounted to the bracket member 2000 and how the bracket member 2000 is mounted to a door.

The bracket member 2000 is configured to engage a top edge of a door to mount the bracket member 2000 to the door in a similar manner to that which has been described above. Specifically, the bracket member 2000 comprises a top portion 2001 extending from a first end 2002 to a second end 2003, a first portion 2004 extending along a first axis A-A from the first end 2002 of the top portion 2001 to a distal edge 2005, and a second portion 2006 extending along a second axis B-B from the second edge 2003 of the top portion 2001 to a distal edge 2007. In the exemplified embodiment, each of the first and second portions 2004, 2006 extend perpendicularly from the top portion 2001, although the invention is not to be so limited in all embodiments. Thus, in the exemplified embodiment the bracket member 2000 is in the shape of a "U" although one of the legs of the "U" is longer than the other as discussed below.

The first portion 2004 has a first length L1 measured from the top portion 2001 to the distal edge 2005 and the second portion 2006 has a second length L2 measured from the top portion 2001 to the distal edge 2007. In the exemplified embodiment, the first length L1 is greater than the second length L2. In some embodiments, the first length L1 may be between 450 mm and 470 mm and the second length may be between 340 mm and 360 mm. Of course, lengths outside of these ranges are possible in other embodiments as would be understood by persons skilled in the art. In some embodiments the first length L1 may be approximately 100 mm-120 mm greater than the second length L2. In some embodiments a ratio of L1:L2 is between 1.2:1 and 1.4:1, and more specifically approximately 1.3:1.

The top portion 2001 of the bracket member 2000 extends along an axis that is generally perpendicular to the first and second axes A-A, B-B. Furthermore, the first and second axes A-A, B-B, and hence also the first and second portions 2004, 2006 of the bracket member 2000, are generally parallel to one another. The first and second portions 2004, 2006 are spaced apart from one another along their length thereby forming a gap 2008 that is configured to receive a portion of a door when the bracket member 2000 is mounted to the door. Specifically, the bracket member 2000 is mounted to a door by positioning the top portion 2001 of the bracket member 2000 adjacent a top edge of the door so that the first and second portions 2004, 2006 extend along the front and rear surfaces of the door, respectively. The bracket member 2000 can slide side-to-side along the door but cannot be removed from the door without lifting the bracket member 2000 until the first and second portions 2004, 2006 are above the top edge of the door or sliding the bracket member 2000 until it slides off the free edge of the door (opposite the hinges).

In the exemplified embodiment, the gap 2008 between the first and second portions 2004, 2006 of the bracket member 2000 has a constant width measured between the first and second portions 2004, 2006 of the bracket member 2000 (which is generally dictated by the length of the top portion 2001 of the bracket member 2000 measured between the first and second ends 2002, 2003). The exact width of the gap 2008 is not limiting of the present invention but may be selected depending on the thickness of the door to which the bracket member 2000 is to be mounted (approximately 35-55 mm in some embodiments). Furthermore, it is possible that the bracket member 2000 may be formed of a material that permits the first and second portions 2004, 2006 to each be pivoted/rotated relative to the top portion 2001, which would enable the gap 2008 to increase or decrease in width. This may be possible due to the thickness of the material or the particular material chosen regardless of thickness. However, when in a biased un-pivoted position, the width of the gap 2008 is constant along the entirety of the lengths of the first and second portions 2004, 2006 of the bracket member 2000. Thus, the bracket member 2000 is a generally U-shaped member such that when it is mounted to the top edge of a door, the top portion 2001 is adjacent to and in contact with the top edge of the door, the first portion 2004 is adjacent to and possibly in contact with one of the major surfaces (front or rear) of the door, and the second portion 2006 is adjacent to and possibly in contact with the other of the major surfaces (front or rear) of the door.

The first portion 2004 of the bracket member 2000 comprises a front surface 2009 and an opposite rear surface 2010. Similarly, the second portion 2006 of the bracket member 2000 comprise a front surface 2011 and an opposite rear surface 2012. The rear surface 2010 of the first portion 2004 of the bracket member 2000 faces the rear surface 2012 of the second portion 2006 of the bracket member 2000, although the rear surfaces 2010, 2012 are separated by the gap 2008 as described herein. When mounted to a door, the rear surfaces 2010, 2012 of the first and second portions 2004, 2006 of the bracket member 2000 face and/or are in contact with the door while the front surfaces 2009, 2011 of the first and second portions 2004, 2006 of the bracket member 2000 face away from the door.

A first plurality of hooks 2020 extend from the front surface 2009 of the first portion 2004. The first plurality of hooks 2020 are arranged in a spaced apart manner along the first axis A-A. The first plurality of hooks 2020 comprises a first hook 2021 adjacent to but spaced apart from the distal end 2005 of the first portion 2004 of the bracket member 2000 by a first distance D1, a second hook 2022 adjacent to but spaced apart from the first hook 2021 by a second distance D2, and a third hook 2023 adjacent to but spaced apart from the second hook 2022 by a third distance D3. Thus, none of the hooks 2021, 2022, 2023 of the first plurality of hooks 2020 is located at the distal end 2005 of the first portion 2004, but rather all are spaced some distance along the first axis A-A from the distal end 2004. As shown in FIG. 29, in the exemplified embodiment the second and third distances D2, D3 are the same and are greater than the first distance D1. However, the invention is not to be so limited in all embodiments and the spacing between the hooks 2021, 2022, 2023 may be different in other embodiments. Furthermore, although the exemplified embodiment includes three hooks 2021, 2022, 2023 in the first plurality of hooks 2020, the invention is not to be so limited and the first plurality of hooks 2020 may include two hooks or more than three hooks in various alternative embodiments. Furthermore, rather than a plurality of hooks, in some embodiments just one hook may extend from the front surface 2009 of the first portion 2004.

The second portion 2006 of the bracket member 2000 comprises a second plurality of hooks 2030 extending from the front surface 2011 of the second portion 2006. The second plurality of hooks 2030 are arranged in a spaced apart manner along the second axis B-B. The second plurality of hooks 2030 comprises a fourth hook 2031 adjacent to but spaced apart from the distal end 2007 of the second portion 2006 of the bracket member 2000 by a fourth distance D4, a fifth hook 2032 adjacent to but spaced apart from the fourth hook 2031 by a fifth distance D5, and a sixth hook 2033 adjacent to but spaced apart from the fifth hook 2032 by a sixth distance D6. Thus, none of the hooks 2031, 2032, 2033 of the second plurality of hooks 2030 is located at the distal end 2007 of the second portion 2006, but rather all are spaced some distance along the second axis B-B from the distal end 2007. The second plurality of hooks 2030 may include two hooks or more than three hooks, and in some embodiments there may simply be a single hook rather than a plurality of hooks extending from the second portion 2006.

As shown in FIG. 29, in the exemplified embodiment the fifth and sixth distances D5, D6 are the same and are greater than the fourth distance D4. Furthermore, in the exemplified embodiment the first and fourth distances D1, D4 are the same and the second, third, fifth, and sixth distances D2, D3, D5, D6 are the same. In some embodiments, the first and fourth distances D1, D4 are in a range of approximately 12 mm-15 mm whereas the second, third, fifth, and sixth distances D2, D3, D5, D6 are in a range of 40 mm-50 mm. Furthermore, in the exemplified embodiment the length of the hooks (measured from a bottom-most edge of the hook to a top-most edge of the hook in the direction of the axes A-A, B-B) is between 10-15 mm. However, these ranges are provided with reference to one possible embodiment and distances/spacing between the hooks outside of these noted ranges are possible in other embodiments. Furthermore, it should be appreciated that the invention is not to be limited in all embodiments by the specific spacing illustrated in the drawings and described herein and thus the spacing between the hooks 2031, 2032, 2033 may be different in other embodiments. Furthermore, although the exemplified embodiment includes three hooks 2031, 2032, 2033 in the second plurality of hooks 2030, the invention is not to be so limited and the second plurality of hooks 2030 may include two hooks or more than three hooks in various alternative embodiments (or a single hooks).

Each of the hooks 2021, 2022, 2023, 2031, 2032, 2033 has a width measured along a width of the first or second portion 2004, 2006 of the bracket member 2000 from which it extends that is less than the width of the first or second portion 2004, 2006. Thus, the hooks 2021, 2022, 2023, 2031, 2032, 2033 do not span the entire width of the bracket member 2000, but rather are centrally located (in the width direction) within the first or second portion 2004, 2006 from which it extends. This is because in the exemplified embodiment the hooks 2021, 2022, 2023, 2031, 2032, 2033 are formed by punching out a portion of the first and/or second portions 2004, 2006 of the bracket member 2000 and subsequent bending as described above. Thus, the width of the hooks 2021, 2022, 2023, 2031, 2032, 2033 must be less than the width of the first and second portions 2004, 2006 of the bracket member 2000.

In the exemplified embodiment, each of the hooks 2021, 2022, 2023, 2031, 2032, 2033 is similar in shape and function to the hooks 161, 162 described above with reference to FIGS. 3A and 3B. Thus, the details of the hooks 2021, 2022, 2023, 2031, 2032, 2033 will not be further described herein, it being understood that the description already made previously herein is applicable. Specifically, despite the description of the hooks 161, 162 being made with regard to a different embodiment, the details remain the same and thus are equally applicable to this embodiment.

Due to the first length L1 of the first portion 2004 of the bracket member 2000 being greater than the second length L2 of the second portion 2006 of the bracket member 2000, the hooks of the first and second pluralities of hooks 2020, 2030 are generally not aligned with one another. In fact, although there is some slight overlap between one of the hooks of the first plurality of hooks 2020 and one of the hooks of the second plurality of hooks 2030 as discussed below, none of the hooks of the first plurality of hooks 2020 is perfectly aligned with any of the hooks of the second plurality of hooks 2030. Of course, in other embodiments alignment of the hooks of the first and second pluralities of hooks 2020, 2030 may occur.

In the exemplified embodiment, each of the first and second hooks 2021, 2022 of the first plurality of hooks 2020 is spaced a greater distance from the top portion 2001 of the bracket member 2000 than each of the second plurality of hooks 2030. In fact, in the exemplified embodiment there exists no plane transverse (perpendicular) to the first and second axes A-A, B-B that intersects one of the first and second hooks 2021, 2022 of the first plurality of hooks 2020 and any portion of the second portion 2030 of the bracket member 2000. This is because the first and second hooks 2021, 2022 of the first plurality of hooks 2020 are located at a position on the first portion 2004 of the bracket member 2000 that extends beyond the distal end 2007 of the second portion 2006 of the bracket member 2000 in a direction of the first and second axes A-A, B-B.

Furthermore, in the exemplified embodiment the third hook 2023 of the first plurality of hooks 2020 is transversely aligned with the second portion 2006 of the bracket member 2000. Specifically, the third hook 2023 of the first plurality of hooks 2020 is spaced a greater distance from the top portion 2001 than each of the fifth and sixth hooks 2032, 2033 of the second plurality of hooks 2030 and a lesser distance from the top portion 2001 than the fourth hook 2031 of the second plurality of hooks 2030. Thus, the fourth hook 2031 is located further from the top portion 2001 of the bracket member 2000 than the third hook 2023. As can be seen, a plane RP1 that is orthogonal to the first and second axes A-A, B-B exists that intersects the third hook 2023 of the first plurality of hooks 2020 and the fourth hook 2031 of the second plurality of hooks 2030. The third hook 2023 of the first plurality of hooks 2020 and the fourth hook 2031 of the second plurality of hooks 2030 are not in perfect transverse alignment, but they have some overlap which results in their both being intersected by the plane RP1. In the exemplified embodiment, the third hook 2023 of the first plurality of hooks 2020 is closer to the top portion 2001 than the fourth hook 2031 of the second plurality of hooks 2030.

Figure 30A:
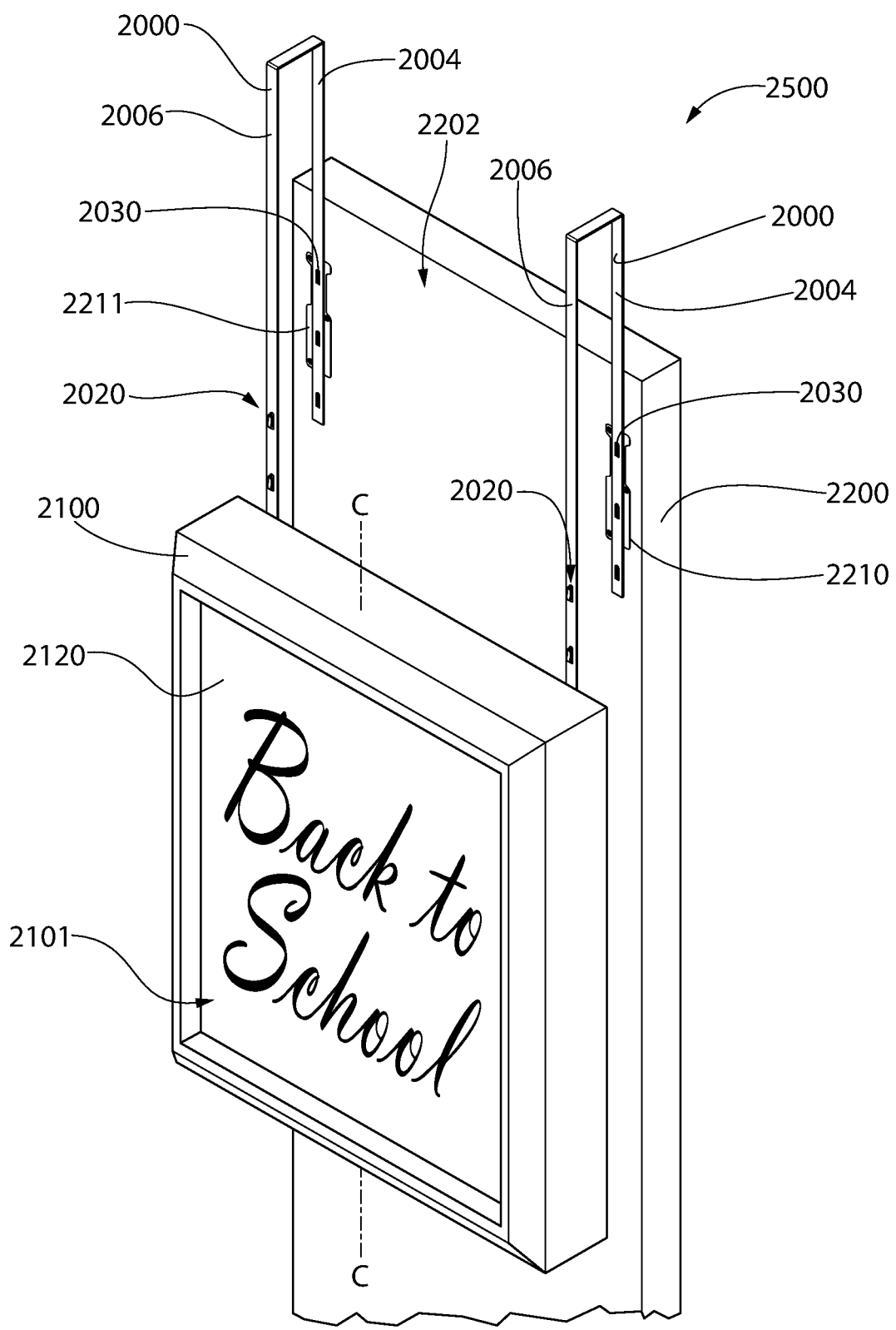
FIG. 30A is a front perspective view of the bracket member of FIG. 27 supporting first and second support structures.
Figure 30B:
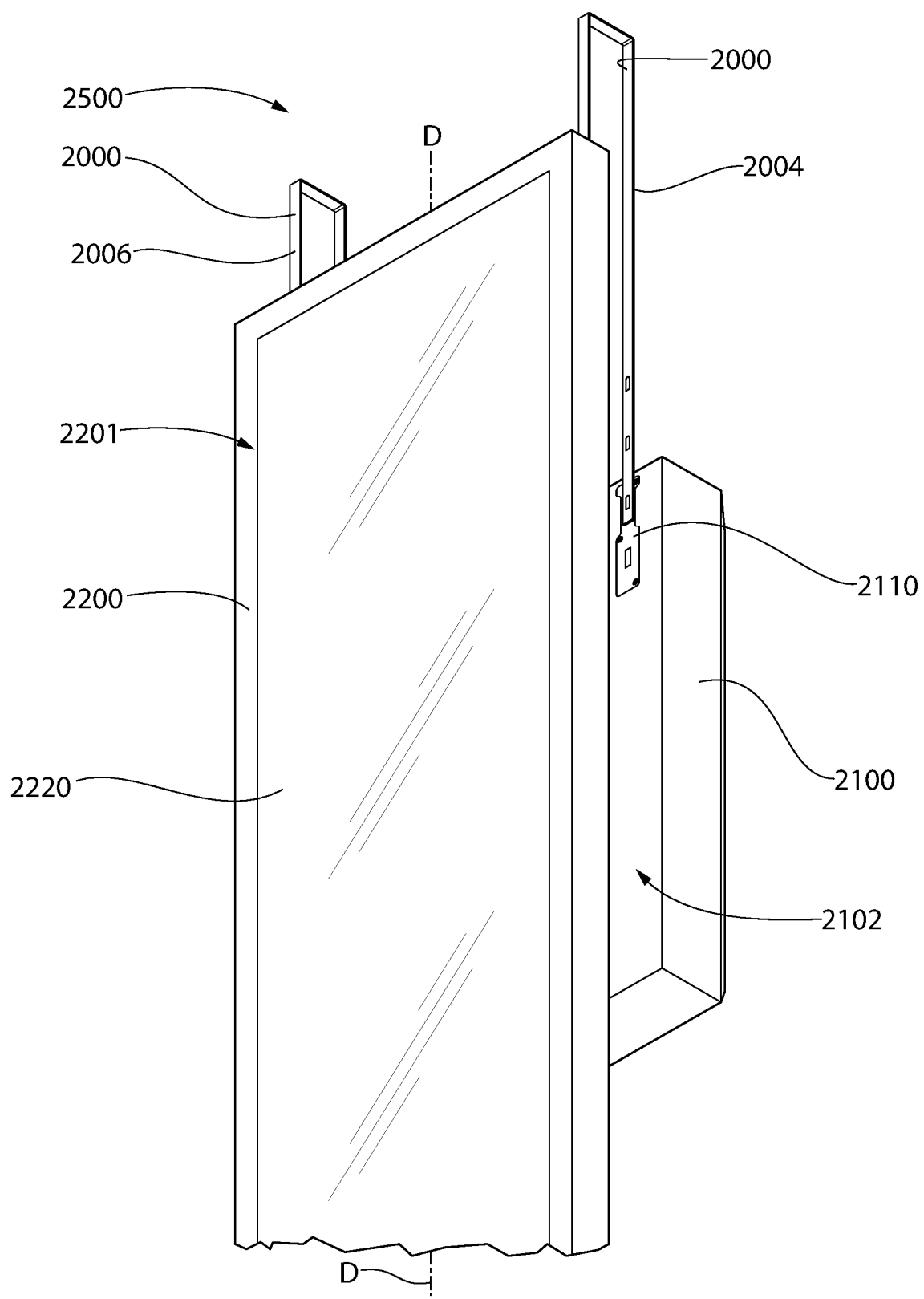
FIG. 30B is a rear perspective view of the bracket member of FIG. 27 supporting the first and second support structures.
Figure 31:
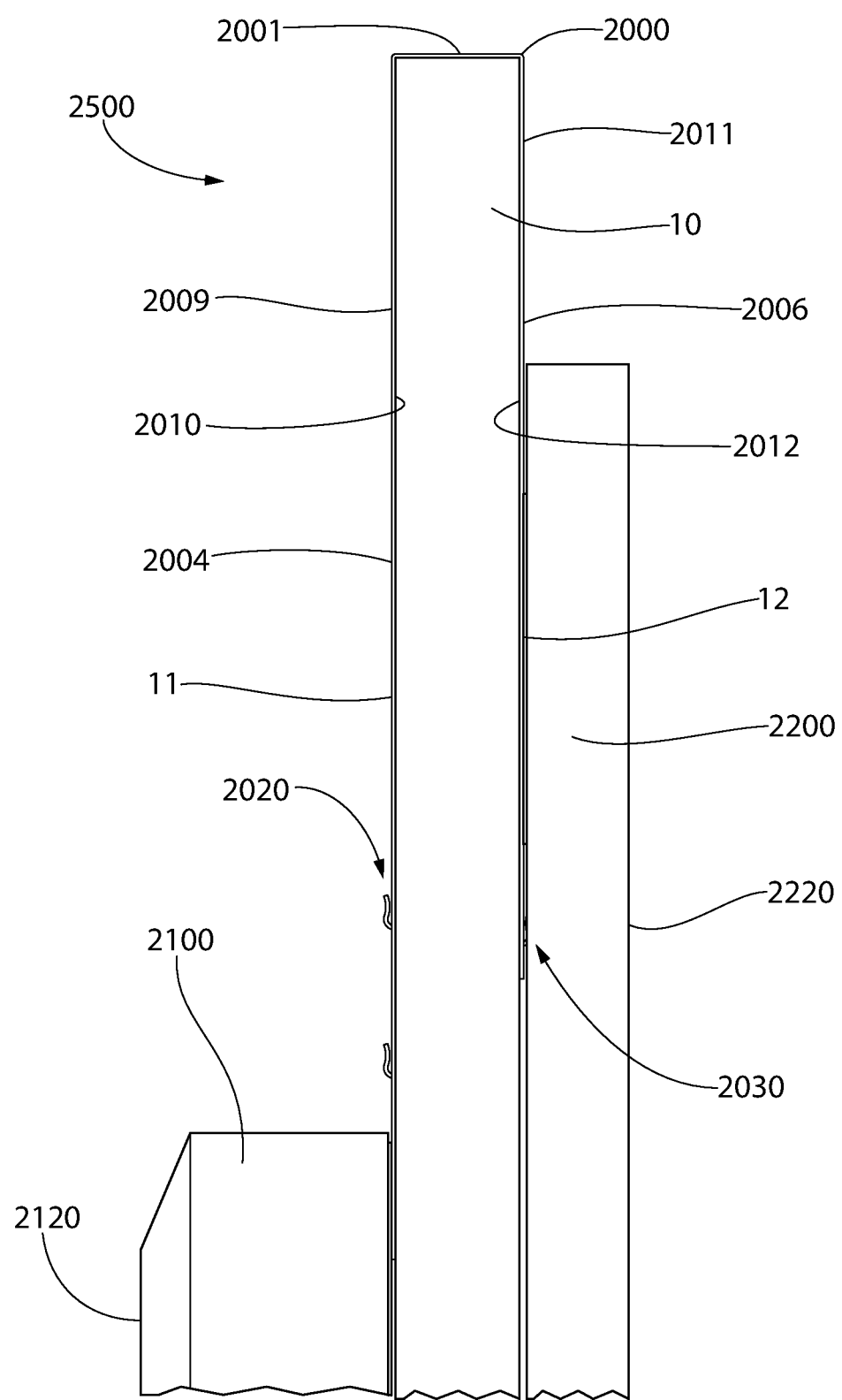
FIG. 31 is a side view of the bracket member of FIG. 27 supporting the first and second support structures.

Referring to FIGS. 30A, 30B, and 31, an over-the-door hanging apparatus 2500 is illustrated that utilizes two of the bracket members 2000 each coupled to first and second support structures 2100, 2200 for supporting the first and second support structures 2100, 2200 by a door 10. Although these figures illustrate two of the bracket members 2000 being used, the invention is not to be so limited and a single one of the bracket members 2000 may be used by itself without a second bracket member 2000 while still achieving the same function as described herein, which is to hang the first and second support structures 2100, 2200 from the door. Furthermore, more than two of the bracket members 2000 may also be used to support each of the first and second support structures 2100, 2200 in still other embodiments. Although one specific embodiment is illustrated in the drawings and described herein regarding the manner of coupling the bracket members 2000 to the first and second support structures 2100, 2200, the first and second support structures 2100, 2200 may be coupled to the bracket members 2000 in any one of the manners as has been described herein above. Thus, the invention is not to be limited by the specific embodiment shown in the drawings but the entire disclosure set forth in this application may be applicable to this embodiment, particularly with regard to the details of the mounting elements that are coupled to the support structures 2100, 2200 and the manner of coupling the bracket members 2000 to the support structures 2100, 2200.

In the exemplified embodiment, the first support structure 2100 comprises a front surface 2101 and an opposite rear surface 2102. The first support structure 2100 extends along a longitudinal axis C-C. A first mounting element 2110 is coupled to the rear surface 2102 of the first support structure 2100. Similarly, the second support structure 2200 comprises a front surface 2201 and an opposite rear surface 2202. The second support structure 2200 extends along a longitudinal axis D-D. A second mounting element 2210 is coupled to the rear surface 2202 of the second support structure 2200. In the exemplified embodiment, a third mounting element (not visible in the drawings) having an identical structure to the first mounting element 2110 is also coupled to the rear surface 2102 of the first support structure 2110 and a fourth mounting element 2211 having an identical structure to the second mounting element 2210 is coupled to the rear surface 2202 of the second support structure 2200. Specifically, as with the embodiments discussed previously above, the first and third mounting elements 2110 are coupled to the rear surface 2102 of the first support structure 2100 on opposite sides of the longitudinal axis C-C and the second and fourth mounting elements 2210, 2211 are coupled to the rear surface 2202 of the second support structure 2200 on opposite sides of the longitudinal axis D-D.

In the exemplified embodiment, the first and second mounting elements 2110, 2210 (and also the third and fourth mounting elements 2211) are plates having apertures therein that are aligned with apertures in the rear surfaces 2102, 2202 of the first and second support structures 2100, 2200. Thus, in the exemplified embodiment the mounting elements 2210, 2210, 2210 are similar to the mounting plates 120, 220 described previously herein. As such, one or more of the hooks 2021, 2022, 2023, 2031, 2032, 2033 of the bracket members 2000 may be inserted through the apertures in the plates to mount the support structures 2100, 2200 to the bracket members 2000 as has been described herein above with specific reference to FIGS. 1-9. However, any of the alternative mounting mechanisms can be used as the first and second mounting elements 2110, 2210 in place of the plate such as the plate segments 621 of FIG. 10, the mounting plates 820 of FIGS. 15A and 15B, the mounting elements 1104 of FIG. 22A, the mounting elements 1205, 1206 of FIG. 23A, the mounting elements 1304 of FIG. 24A, and the mounting brackets 1404, 1504, 1604 of FIGS. 25A-25E. Thus, the entirety of the disclosure set forth in this document is applicable to this particular embodiment. The difference is that in this embodiment the bracket member 2000 has two elongated portions that are each configured to support a product so that the bracket member 2000 can support two products rather than just one as with the embodiments previously described herein. However, the manner in which the products are mounted to the bracket member 2000 is the same.

In the exemplified embodiment, a writing surface 2120 is coupled to the front surface 2101 of the first support structure 2100. Stated another way, the writing surface 2120 is exposed at the front surface 2101 of the first support structure 2100 so that a user can write on the writing surface 2120. Thus, the first support structure 2100 is essentially a frame or other type of structure that is configured to support the writing surface 2120. Collectively, the first support structure 2100 and the writing surface 2120 form a first product. In the exemplified embodiment, the writing surface 2120 may be a chalkboard, a blackboard, a white board or any other type of writing surface on which a user can write with a marking instrument and then erase for reuse. Alternatively, the writing surface 2120 may not be reusable in other embodiments but may instead be a pad of paper or the like that is coupled to the first support structure 2100 and can be written on but generally not erased (unless using pencil).

In the exemplified embodiment, a mirror 2220 is coupled to the front surface 2201 of the second support structure 2200. Thus, the mirror 2220 is exposed at the front surface 2201 of the second support structure 2200 so that a user can view themselves in the mirror as desired. Thus, the second support structure 2200 is essentially a frame or other type of structure that is configured to support the mirror 2220. Collectively, the second support structure 2200 and the mirror 2220 form a second product.

As with the previously described embodiments, the first support structure 2100 is mounted to the (or each when more than one is used as shown in FIGS. 30A and 30B) bracket member 2000 through slidable mating between one of the mounting elements 2110 coupled to the rear surface 2102 of the first support structure 2100 and at least one of the first plurality of hooks 2020 of the bracket member 2000. Similarly, the second support structure 2200 is mounted to the (or each when more than one is used as shown in FIGS. 30A and 30B) bracket member 2000 through slidable mating between one of the mounting elements 2210 coupled to the rear surface 2202 of the second support structure 2200 and at least one of the second plurality of hooks 2030 of the bracket member 2000. Thus, the first and second support structures 2100, 2200 are mounted to the same bracket member 2000, and possibly to more than one bracket member 2000 such as is shown in the exemplified embodiment. Multiple bracket members 2000 may be used for mounting each of the first and second support structures 2100, 2200 to provide added support, but this is not required in all embodiments and a single bracket member 2200 may be used as would be appreciated by persons skilled in the art. If a single bracket member 2200 is used to support the first and second support structures 2100, 2200 the mounting elements 2110, 2210 may be located on the longitudinal axes C-C, D-D of the first and second support structures 2100, 2200 to facilitate a proper mounting orientation. There are no tools required to achieve the mounting of the first and second support structures 2100, 2200 to the bracket member 2000 as has been described in great detail herein.

FIG. 31 illustrates the first and second support structures 2100, 2200 mounted to the bracket member 2000 and the bracket member 2000 mounted to a door 10. As seen, the rear surfaces 2010, 2012 of the first and second portions 2004, 2006 of the bracket member 2000 are adjacent to and/or in contact with the opposing major surfaces (i.e., front and rear surfaces) of the door 10 and the top portion 2001 of the bracket member 2000 is adjacent to and/or in contact with the top edge of the door 10. The first support structure 2100 is mounted to the first portion 2004 of the bracket member 2000 via at least one of the first plurality of hooks 2020 and the second support structure 2200 is mounted to the second portion 2006 of the bracket member 2000 via at least one of the second plurality of hooks 2030. This mounting technique results in the writing surface 2120 being exposed on a first side 11 of the door 10 and the mirror 2220 being exposed on the second opposite side 12 of the door 10.

Although in the exemplified embodiment the first support structure 2100 (comprising the writing surface 2120) is illustrated and described as being coupled to the first portion 2004 of the bracket member 2000 and the second support structure 2200 (comprising the mirror 2220) is illustrated and described as being coupled to the second portion 2006 of the bracket member 2000, the invention is not to be so limited in all embodiments. Thus, this may be flipped in alternative embodiments if so desired so that the first support structure 2100 is coupled to the second portion 2006 of the bracket member 2000 and the second support structure 2200 is coupled to the first portion 2004 of the bracket member 2000. Furthermore, products other than writing surfaces and mirrors may be mounted to the bracket member 2000 in other embodiments, one such embodiment being described herein with reference to FIGS. 33-35D. Another product type may be a picture frame, an electronic display, or the like. Really any type of product desired to be hung from/mounted to a surface of a door without putting holes into the door can be used. Moreover, in some embodiments the same product may be hung from both the first and second sides of the door 11, 12 (a mirror, a writing surface, or some other type of product on both opposing sides of the door).

Figure 32A:
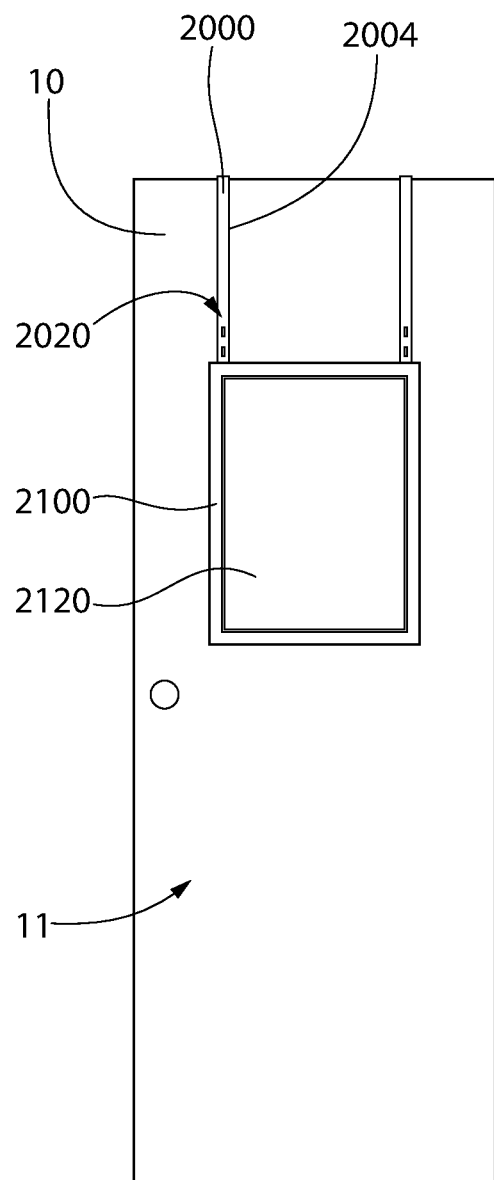
FIG. 32A is a front view of the bracket member of FIG. 27 mounted to a door and supporting the first support structure at a first hanging height.
Figure 32B:
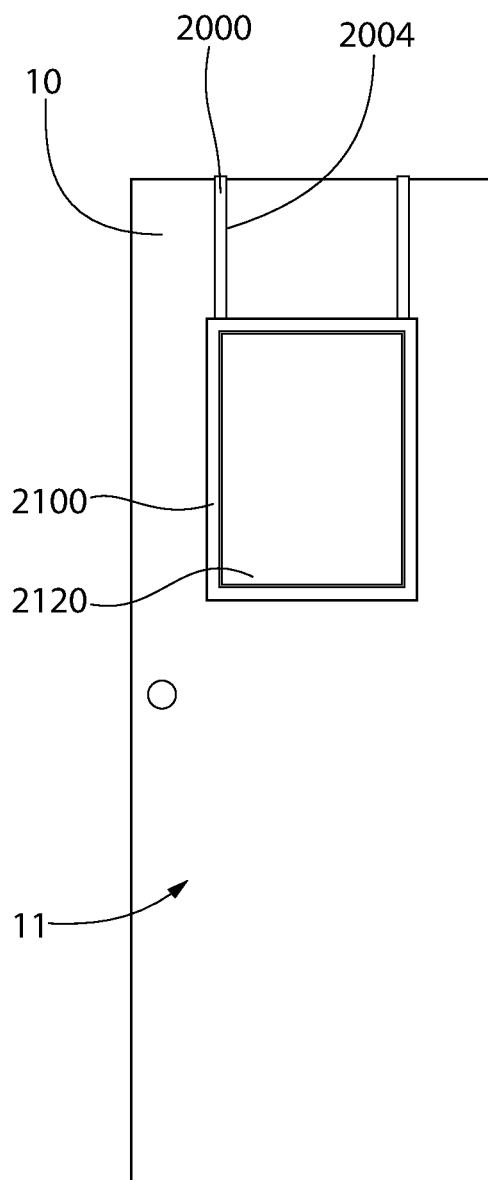
FIG. 32B is a front view of the bracket member of FIG. 27 mounted to a door and supporting the first support structure at a second hanging height.
Figure 32C:
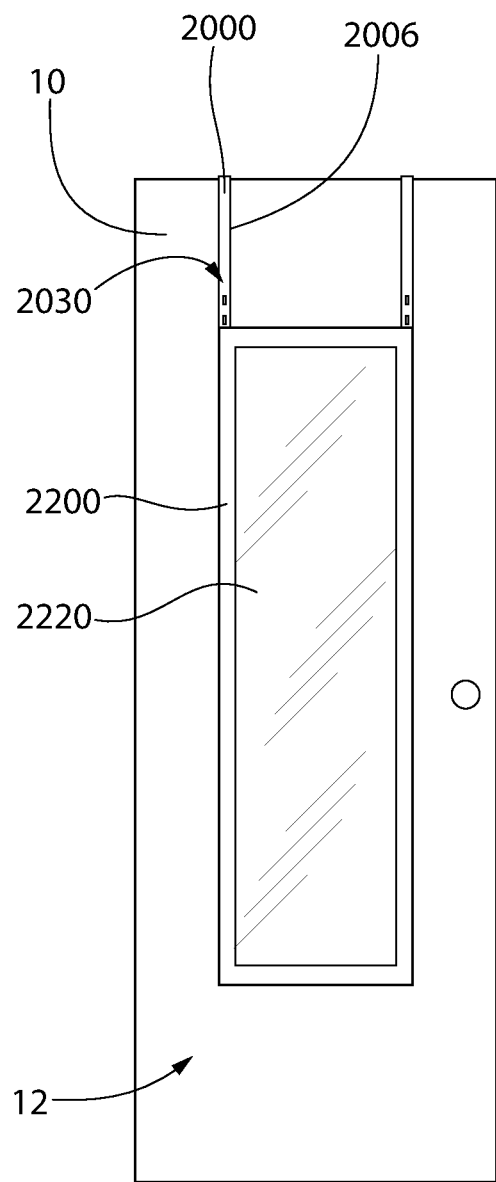
FIG. 32C is a rear view of the bracket member of FIG. 27 mounted to a door and supporting the second support structure at a first hanging height.
Figure 32D:
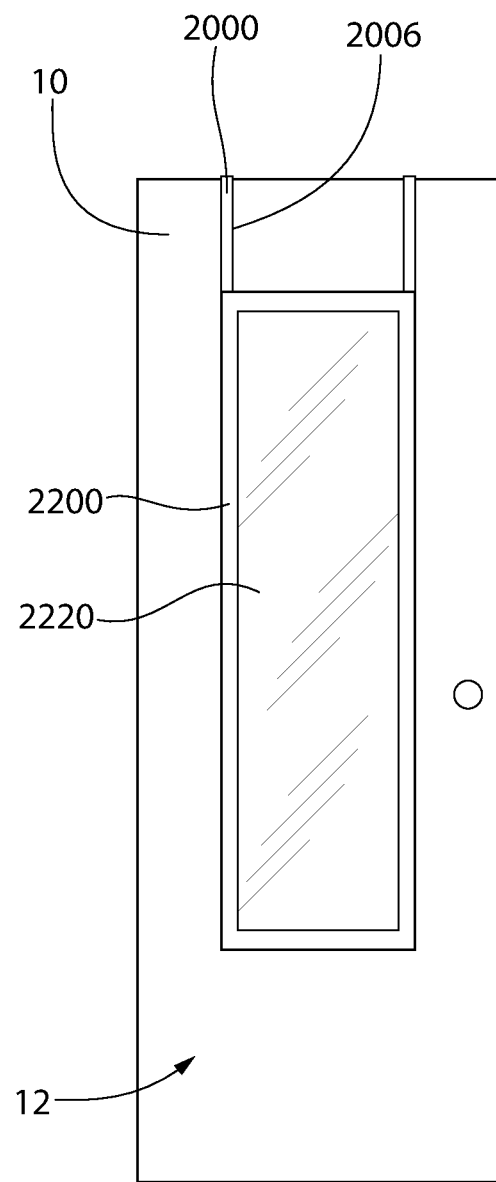
FIG. 32D is a rear view of the bracket member of FIG. 27 mounted to a door and supporting the second support structure at a second hanging height.
Figure 33:
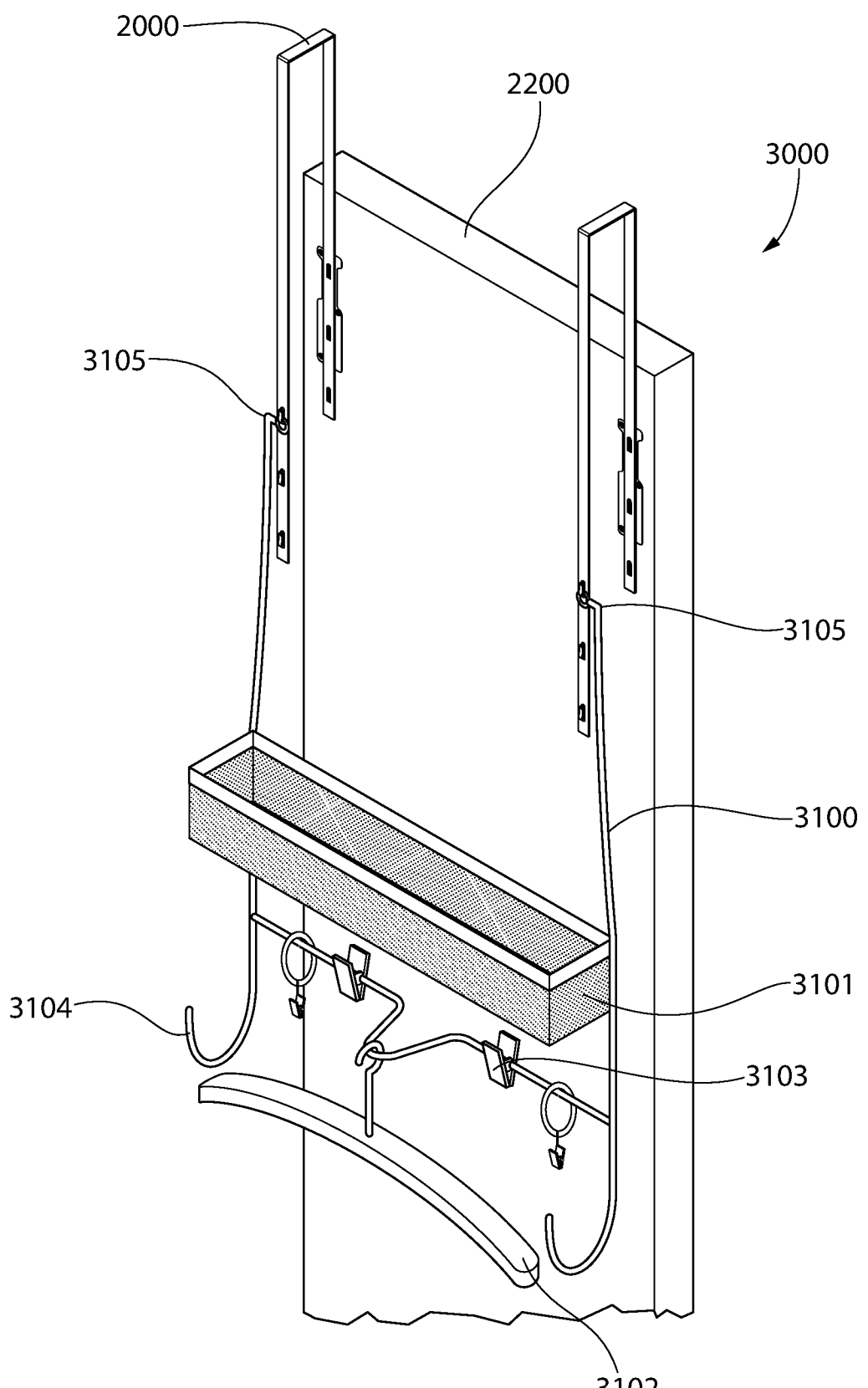
FIG. 33 is a rear view of the bracket member of FIG. 27 supporting an accessory and the second support structures in accordance with an alternative embodiment.
Figure 34:
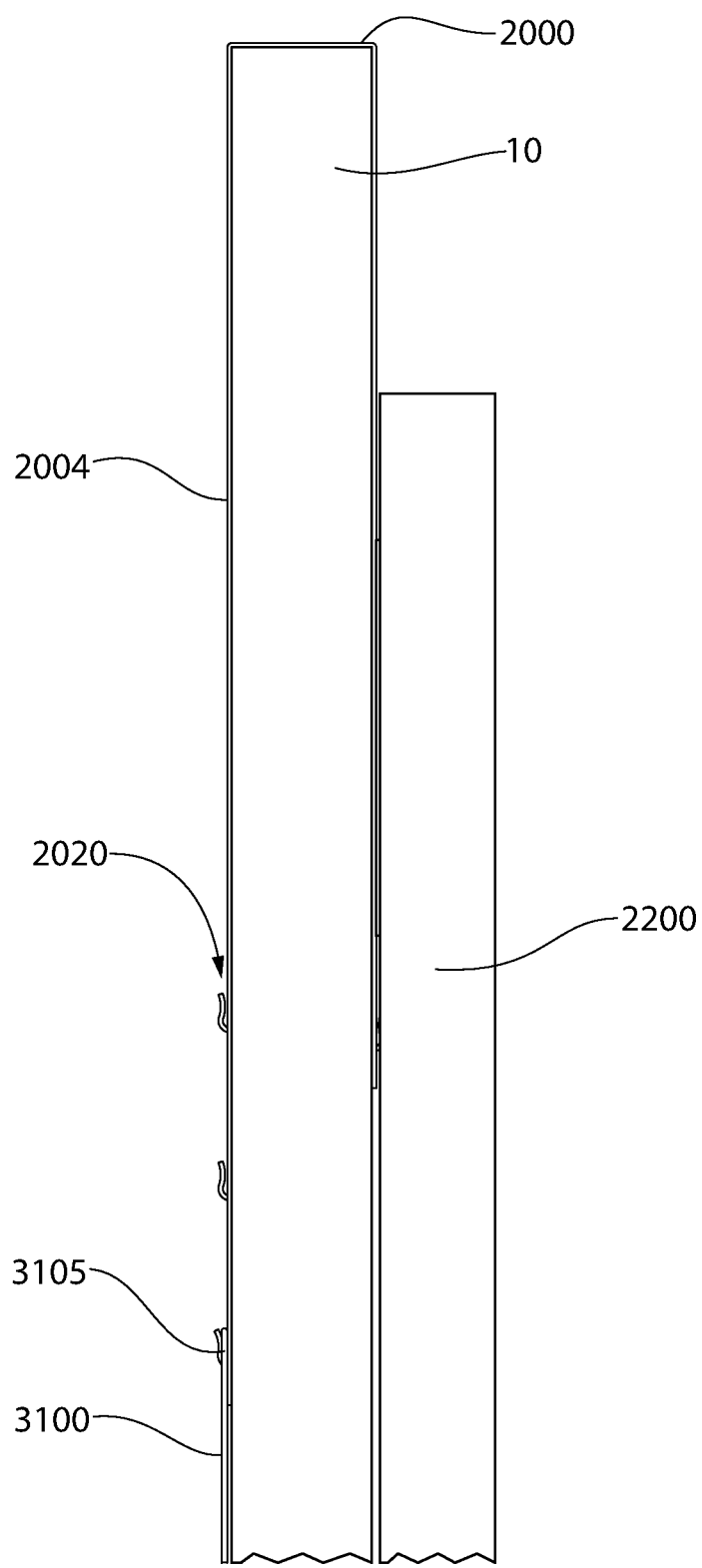
FIG. 34 is a side view of the bracket member of FIG. 33 mounted to a door and supporting the accessory and the second support structure.

FIGS. 32A and 32B are illustrations of the first surface 11 of the door 10 having the bracket member 2000 mounted thereon with the first and second support structures 2100, 2200 coupled to the bracket member 2000. In this view, only the first support structure 2100 is visible because the second support structure 2200 is located at the second surface 12 of the door 10 as shown in FIGS. 32C and 32D discussed below. Comparing FIG. 32A to FIG. 32B, these figures illustrate the manner in which the hanging height of the first support structure 2100 may be modified depending on which of the first plurality of hooks 2020 the first mounting element 2110 of the first support structure 2100 is coupled to. Specifically, in FIG. 32A the mounting element 2110 of the first support structure 2100 is coupled to the first hook 2021 of the first plurality of hooks 2020. In FIG. 32B the mounting element 2110 of the first support structure 2100 is coupled to the second and/or the third hook 2022, 2023 of the first plurality of hooks 2020. Depending on which hooks are used, the vertical height of the first support structure 2100 on the door 10 may be modified. As seen in these figures, the writing surface 2120 is exposed at the first surface 11 of the door 10 so that a user can write thereon as desired.

Comparing FIG. 32C to FIG. 32D, these figures illustrate the manner in which the hanging height of the second support structure 2200 may be modified depending in which of the second plurality of hooks 2030 the mounting element 2210 of the second support structure 2200 is coupled to. Specifically, in FIG. 32C the mounting element 2210 of the second support structure 2200 is coupled to the fourth hook 2031 of the second plurality of hooks 2030. In FIG. 32B the mounting element 2210 of the second support structure 2200 is coupled to the fifth and/or the sixth hook 2032, 2033 of the second plurality of hooks 2030. Depending on which hooks are used, the vertical height of the second support structure 2200 on the door 10 may be modified. As seen in this figure, the mirror 2220 is exposed at the second surface 12 of the door 10 so that a user can view themselves in the mirror 2220 as desired.

In certain embodiments, the invention may be directed to a kit that comprises one or two (or more as necessary) of the bracket members 2000, the first support structure 2100 comprising the writing surface (i.e., a first product), and the second support structure 2200 comprising the mirrored surface (i.e., a second product). When packaged, the first support structure 2100 would include the writing surface 2120 and the first mounting element 2110 and the second support structure 2200 would include the mirror 2220 and the second mounting element 2210. Thus, these components may be packaged together into a singular item that is sold at a retail store. A user can purchase the item and very easily hang both the first and second support structures 2100, 2200 from a door without any tools or hardware required. This would be particularly desirable for a college student who may want to hang a mirror from the inside surface of the door that faces the student's bedroom and a chalkboard or whiteboard from the outside surface of the door that faces the dormitory hallway or other bedroom exterior. Of course, there are many other uses for a device of this type, including in an office environment, in a home, or at any other location where it would be desirable to hang two products from opposing sides of a door.

Turning now to FIGS. 33-35D, an over-the-door hanging apparatus 3000 is illustrated in accordance with another embodiment of the present invention. This embodiment is the same as the previously described embodiment illustrated in FIGS. 30A-32D except that the first support structure/product has been modified. As noted above, the first product included the first support structure 2100, the first mounting element 2110 and the writing surface 2120. In this embodiment, the first product is an organizational item 3100 that includes a basket 3101, a hanger 3102, clips 3103, hooks 3104, and mounting elements 3105. The organizational item 3100 may be a bathroom or shower valet, a bathroom or shower caddy, a set of shelves, or similar type of product. Alternatively, the organizational item 3100 may be any type of product that assists a user in organizing his or her belongings. A user can store various items in the basket 3101, can use the hanger 3102 and clips 3103 to hang clothing, and can use the hooks 3104 to hang clothing, bags, purses, hats, or the like. The organizational item 3100 generally comprises a wire frame and includes the mounting elements 3105 that are configured for coupling/mounting to the first plurality of hooks 2020 of the first portion 2004 of the bracket member 2000 (or to the second plurality of hooks 2030 of the second portion 2006 of the bracket member 2000).

Figure 35A:
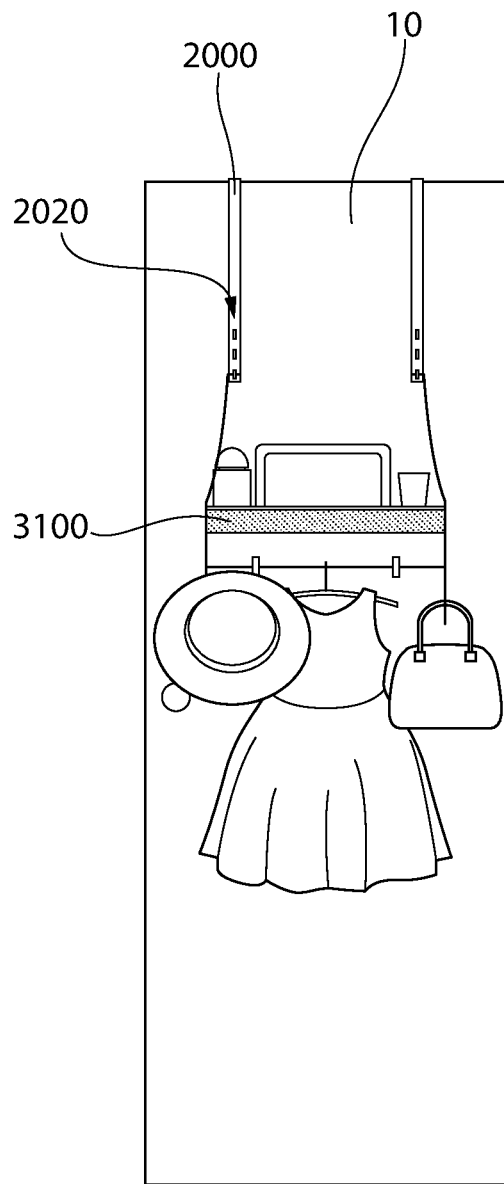
FIG. 35A is a front view of the bracket member of FIG. 33 mounted to a door and supporting the accessory at a first hanging height.
Figure 35B:
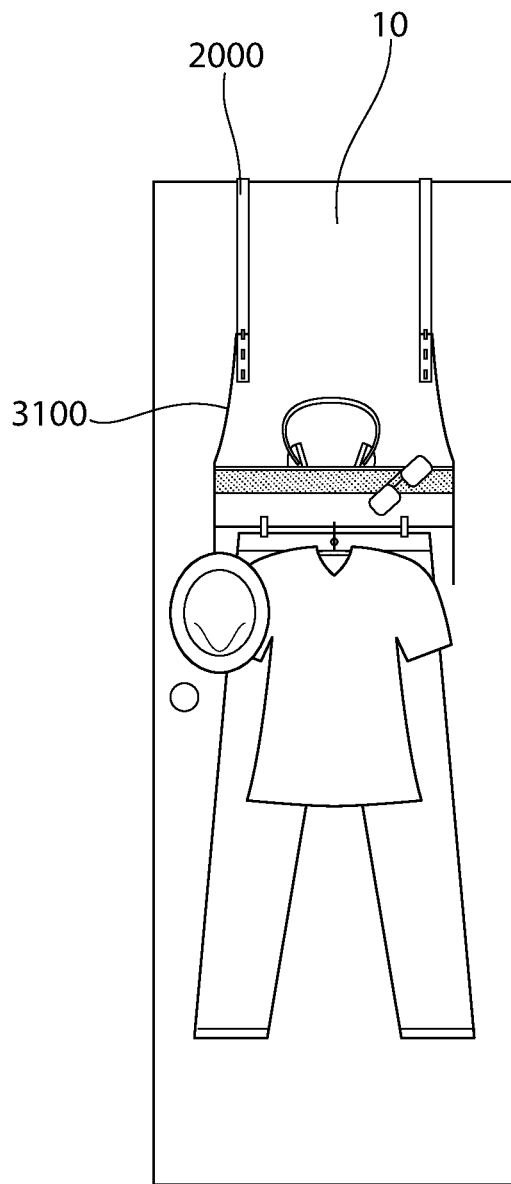
FIG. 35B is a front view of the bracket member of FIG. 33 mounted to a door and supporting the accessory at a second hanging height.

FIGS. 35A and 35B illustrate the organizational item 3100 mounted to the bracket member 2000 at two different elevations/heights with the organizational item 3100 being used to store and hold several of a user's belongings. The hanging height of the organizational item 3100 may be readily changed by changing the particular hook to which the mounting elements 3105 of the organizational item 3100 are coupled. In FIG. 35A the organizational item 3100 is hung at a lower height than in FIG. 35B. The organizational item 3100 may be hung at a lower height when the user is smaller, such as a child, and the organizational item 3100 may be hung at a higher height when the user is taller, such as an adult.

As has been discussed above, although specific product types are illustrated in these figures for mounting to the bracket member 2000, the invention is not to be limited by the products shown in these drawings and described herein in all embodiments. Thus, as mentioned above the same product may be mounted on the opposing sides of the door or any various combinations of different products may be mounted on opposing sides of the door. The products may be writing surfaces, mirrors, organizational items, shelving units, picture frames, posters, other artwork, clothing hanging units, or any other type of product desired to be hung from a door. Unless specifically recited as such in the claims, the invention is not to be limited by the particular product being mounted on the bracket member 2000.

Referring to FIG. 36A-37C, an over-the-door hanging apparatus 4000 will be briefly described. The over-the-door hanging apparatus 4000 generally comprises a bracket assembly 4100 and a support structure 4300. The bracket assembly 4100 is intended to be coupled to the support structure 4300 and then the bracket assembly 4100 can engage a top edge of a door to hang the over-the-door hanging apparatus 4000 from the door.

Figure 36A:
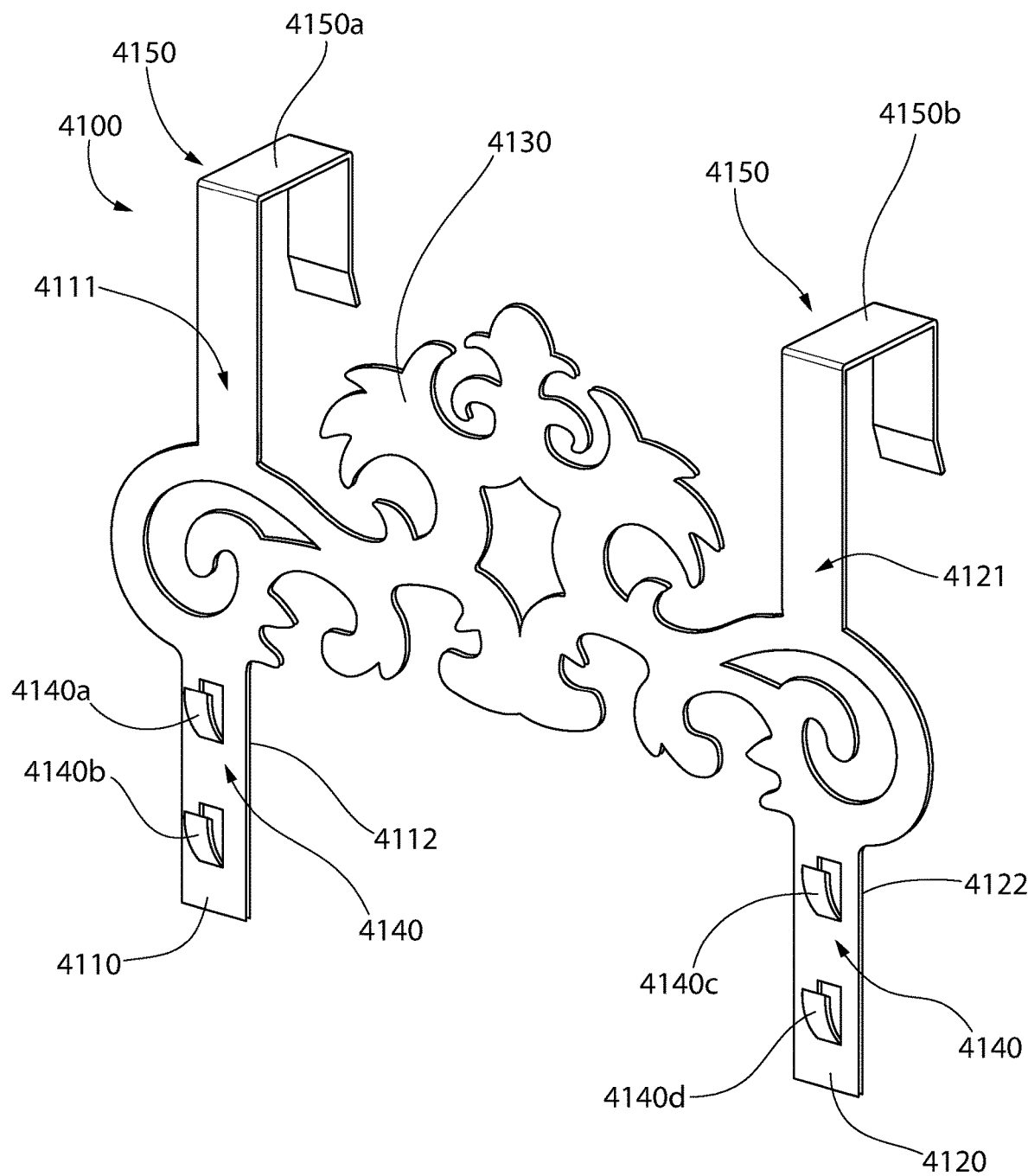
FIG. 36A is a front perspective view of a bracket assembly in accordance with an embodiment of the present invention.

Referring to FIG. 36A, the bracket assembly 4100 will be described in greater detail. The bracket assembly 4100 has several features that are similar to bracket assemblies that have been previously described herein, such as the bracket assembly 150. Thus, certain features may not be described in great detail, it being appreciated that the detailed description provided above for the bracket assembly 150 or any other bracket assemblies previously described may be applicable. The bracket assembly 4100 generally comprises at least one mounting element 4140 for coupling the bracket assembly 4100 to the support structure 4300, at least one bracket 4150 configured to engage a top edge of a door, and a decorative portion 4130.

More specifically, the bracket assembly 4100 comprises a first elongate member 4110 and a second elongate member 4120. The first elongate member 4110 has a front surface 4111 and an opposite rear surface 4112 and the second elongate member 4120 has a front surface 4121 and an opposite rear surface 4122. The at least one bracket 4150 comprises a first bracket 4150*a* extending from the rear surface 4112 of the first elongate member 4110 and a second bracket 4150*b* extending from the rear surface 4122 of the second elongate member 4120. Each of the first and second brackets 4150*a*, 4150*b* is a U-shaped member that facilitates coupling of the bracket assembly 4100 to the top edge of a door. Specifically, the U-shaped members of the first and second brackets 4150*a*, 4150*b* may be slid over the top edge of a door as has been described herein with reference to the previously described embodiments.

Furthermore, in the exemplified embodiment, the at least one mounting element 4140 comprises a first hook 4140*a* and a second hook 4140*b* extending from the front surface 4111 of the first elongate member 4110 and a first hook 4140*c* and a second hook 4140*d* extending from the front surface 4121 of the second elongate member 4120. Of course, more or less than two hooks may be present on each of the first and second elongate members 4110, 4120. For example, each of the first and second elongate members 4110, 4120 may include a single hook, three hooks, or even more than three hooks. Moreover, although hooks are used in the exemplified embodiment as the mounting elements 4140 of the bracket assembly 4100, the invention is not to be so limited. In other embodiments, the mounting elements 4140 of the bracket assembly 4100 may be apertures rather than hooks. In still other embodiments, the mounting elements 4140 may include additional hardware such as screws, nails, or the like for coupling the bracket assembly 4100 to the support structure 4300. Where the mounting elements 4140 are hardware, they may still be considered to form a part of the bracket assembly 4100 despite being a separate component. Thus, if the mounting element is a screw that couples the bracket assembly 4100 to the support structure 4300, the screw may be considered to form part of the bracket assembly 4100. Furthermore, in still other embodiments the mounting elements 4140 may be hook-and-loop fasteners, adhesive, bolts, pins, key and/or slot, or the like. Furthermore, combinations of mounting elements such as hooks that engage with apertures as well as hardware may be used to couple the bracket assembly 4100 to the support structure 4300. Thus, the bracket assembly 4100 may be coupled to the support structure using a tools-based system, a no-tools system, or a combination thereof.

In the exemplified embodiment, the hooks 4140*a-d* are intended to engage a plate similar to that which has been described above with regard to the hooks 161, 162 and the mounting plates 120. Of course, if the mounting elements are apertures instead of hooks, the mounting plate may have hooks that engage the apertures on the bracket assembly 4100. These embodiments are used for a no tools assembly of the over-the-door hanging apparatus 4000 (i.e., no tools such as screwdrivers or hammers are needed for assembly). However, the invention is not to be so limited and it is possible that a tools-based assembly may be required, for example in embodiments whereby hardware such as screws, nails, or the like are used as the mounting element or a portion thereof to couple the bracket assembly 400 to the support structure 4300.

In addition, the bracket assembly 4100 comprises the decorative portion 4130. The decorative portion 4130 may be any type of aesthetic design desirable. For example, the decorative portion 4130 may be a random design that is aesthetically pleasing, it may be a series of letters, numbers, or words, it may be a depiction of a particular object or objects with a theme, such as a bat and ball for a baseball theme, it may depict a particular scene or object (i.e., a flower, a mountain landscape, a known-tourist attraction or symbol) or the like. The decorative portion 4130 may also visually represent an animal, such as a horse, dog, cat, or the like, or it may have the text of a person's name or other desired text such as words of encouragement or words or the like. Thus, the invention is not to be particularly limited by the specific appearance of the decorative portion 4130 except that it should be something that is decorative and appeals to a certain group of people. Thus, the decorative portion 4130 must be ornamental rather than purely functional.

In the exemplified embodiment, the decorative portion 4130 extends between the first and second elongate members 4110, 4120. Furthermore, the decorative portion 4130 is located between the mounting elements 4140 and the brackets 4150. This ensures that the decorative portion 4130 is located at a position on the over-the-door hanging apparatus 4000 that ensures that it will be visible to a user to create a desired aesthetic appeal to the over-the-door hanging apparatus 4000.

In the embodiment exemplified in FIG. 36A, the bracket assembly 4100 is an integrally formed monolithic component that comprises the first and second elongate members 4110, 4120, the mounting elements 4140, the brackets 4150, and the decorative portion 4130. The bracket assembly 4100 may be a sheet of stamped metal, lasered MDF, or the like as desired in various different embodiments. Of course, as noted above the mounting elements 4140 may be or include hardware, and in such a case the hardware will be a separate structure although the rest of the bracket assembly 4100 may be a monolithic component.

Figure 36B:
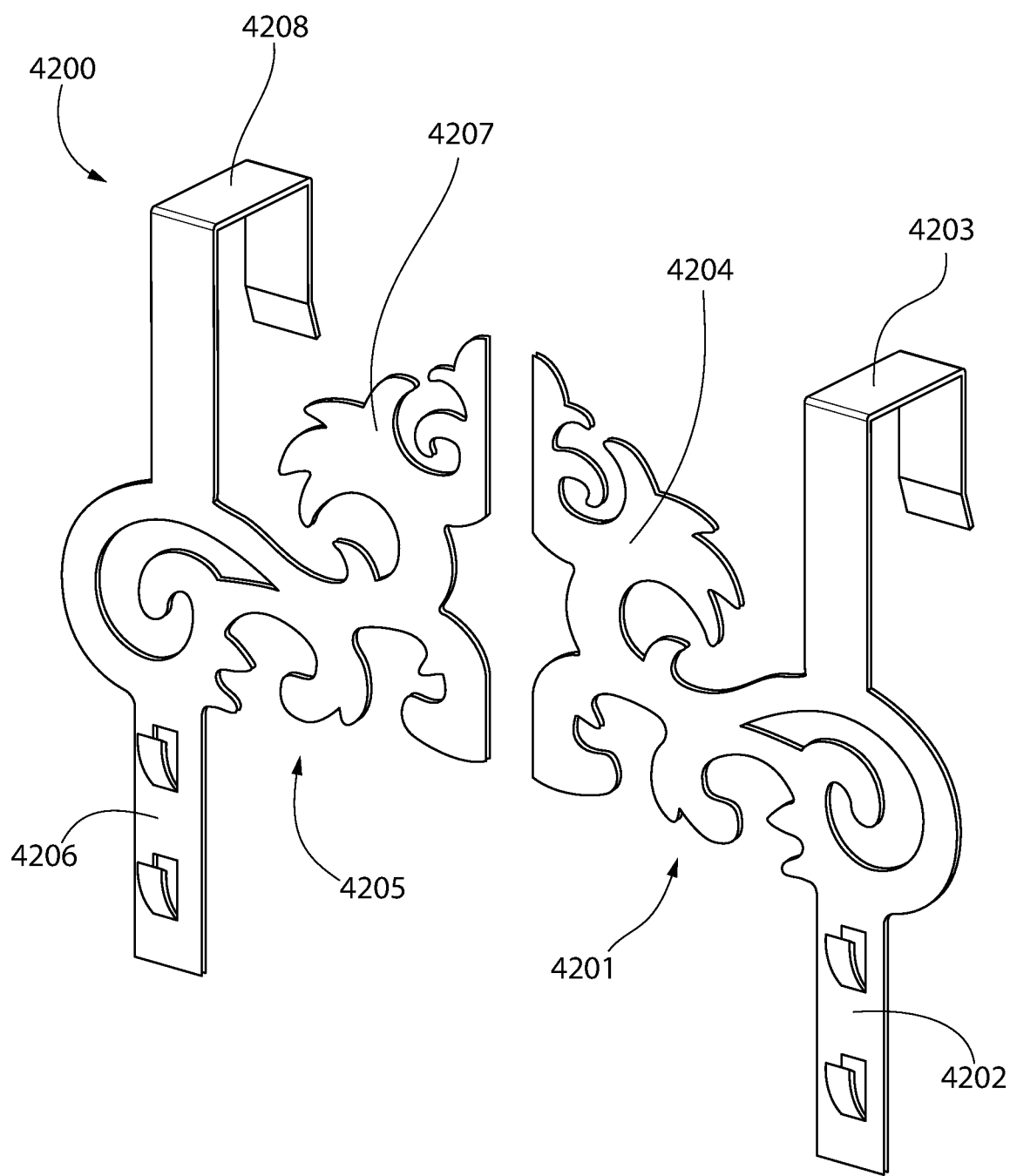
FIG. 36B is a front perspective view of a bracket assembly in accordance with another embodiment of the present invention.

Referring to FIG. 36B, an alternative embodiment of a bracket assembly 4200 is illustrated. The bracket assembly 4200 comprises a first portion 4201 and a second portion 4205. The first portion 4201 of the bracket assembly 4200 comprises the first elongate member 4202, the first bracket 4203, and a first portion of a decorative member 4204. The second portion 4205 of the bracket assembly 4200 comprises the second elongate member 4206, the second bracket 4208, and a second portion of the decorative member 4207. The first and second portions 4201, 4205 of the bracket assembly 4200 are separate components and each of them is an integrally formed monolithic component. When each of the first and second portions 4201, 4205 of the bracket assembly 4200 is coupled to the support structure 4300, the first and second portions of the decorative member 4204, 4207 collectively form the decorative member. Specifically, in the assembled/installed state, the first and second portions of the decorative member 4204, 4207 abut one another to form the full appearance of the decorative member. Thus, FIGS. 37B and 37C, described more fully below, are applicable to the assembled/installed state for both the bracket assembly 4100 and the bracket assembly 4200.

Figure 37A:
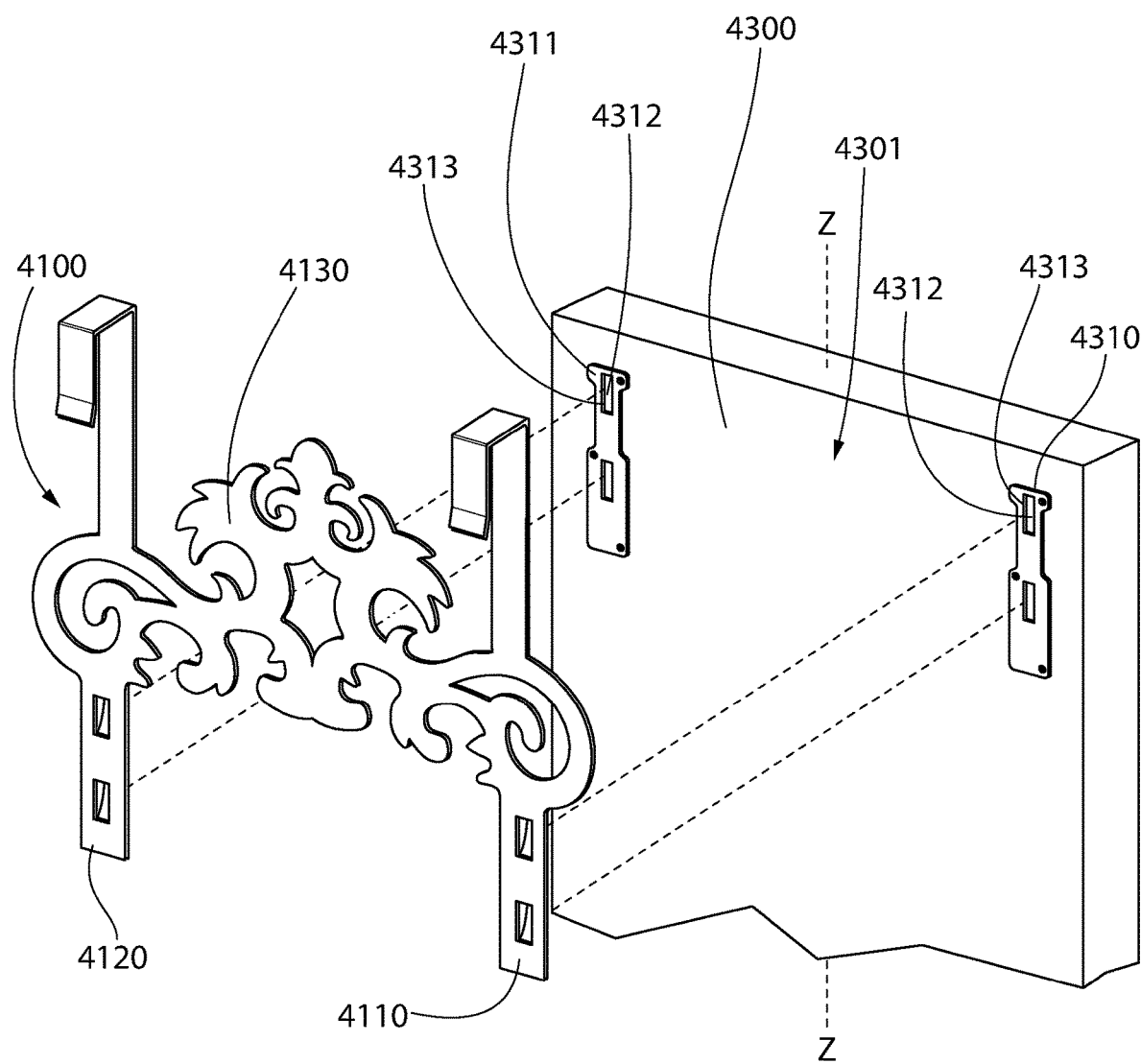
FIG. 37A is an exploded perspective view illustrating the bracket assembly of FIG. 36A prepared for coupling to a support structure.

Referring to FIG. 37A, the support structure 4300 and the bracket assembly 4100 are illustrated in an exploded state with a rear surface 4301 of the support structure 4300 exposed in this view. Similar to the embodiments described above, for example FIGS. 1 and 2, in this embodiment a first mounting plate 4310 and a second mounting plate 4311 are coupled to the rear surface 4301 of the support structure 4300 on opposite sides of a vertical centerline Z-Z of the support structure 4300. The discussion of the mounting plate 120 and the manner in which it is coupled to the frame 101 is applicable to the first and second mounting plates 4310, 4311 and the manner in which they are coupled to the support structure 4300. Briefly, the first mounting plate 4310 comprises at least one aperture 4312 that is aligned with a channel formed into the rear surface 4301 of the support structure 4300. The at least one aperture 4312 is defined by a closed-geometry edge 4313 such that the first mounting plate 4310 comprises at least one edge. The second mounting plate 4311 has an identical structure and arrangement.

Figure 37B:
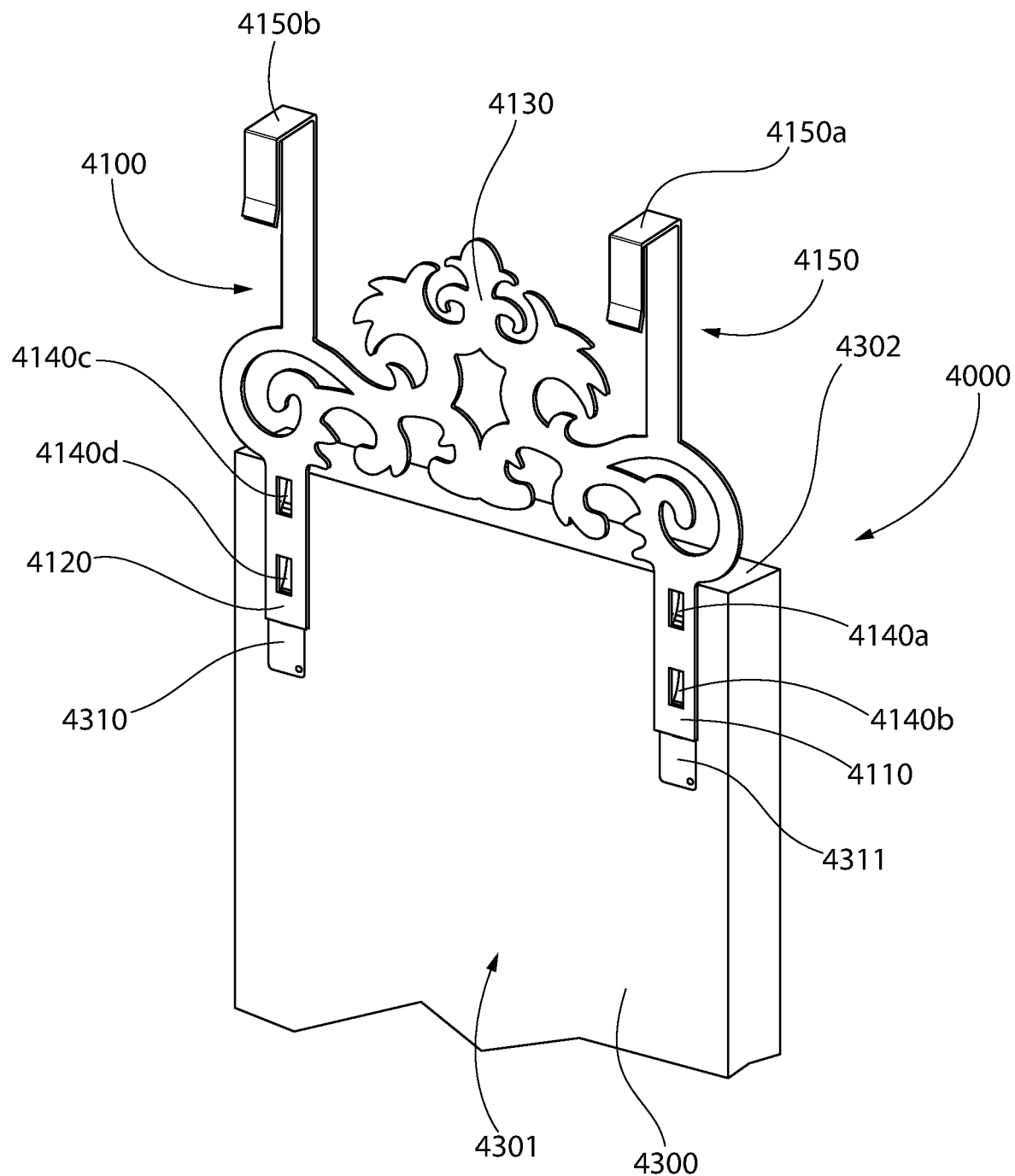
FIG. 37B is a perspective view illustrating an over-the-door hanging apparatus including the bracket assembly of FIG. 36A coupled to the support structure.

Referring collectively to FIGS. 37A and 37B, in the exemplified embodiment the bracket assembly 4100 is coupled to the rear surface 4301 of the support structure 4300 via slidable engagement between at least one of the first and second hooks 4140a, 4140b of the first elongate member 4110 and the first mounting plate 4110 and at least one of the first and second hooks 4140c, 4140d of the second elongate member 4120 and the second mounting plate 4111. Of course, this is merely an exemplary embodiment and other techniques for coupling the bracket assembly 4100 to the support structure 4300 are possible in accordance with the invention described herein. For example, the bracket assembly 4100 may have apertures that engage hooks or protrusions on the mounting plates 4110, 4111. Alternatively, the mounting plate 4110, 4111 may be omitted (or not) and the bracket assembly 4100 may be coupled directly to the rear surface 4301 of the support structure 4300 (or to the mounting plate 4110, 4111 when included) using hardware-type fasteners, adhesive, hook-and-loop, or the like. Thus, with regard to this embodiment, the invention is not to be particularly limited by the manner in which the bracket assembly 4100 is coupled to the support structure 4300 to form the over-the-door hanging apparatus 4000. As mentioned above, a no-tools or tools-based assembly may be used for coupling the bracket assembly 4100 to the support structure 4300.

Figure 37C:
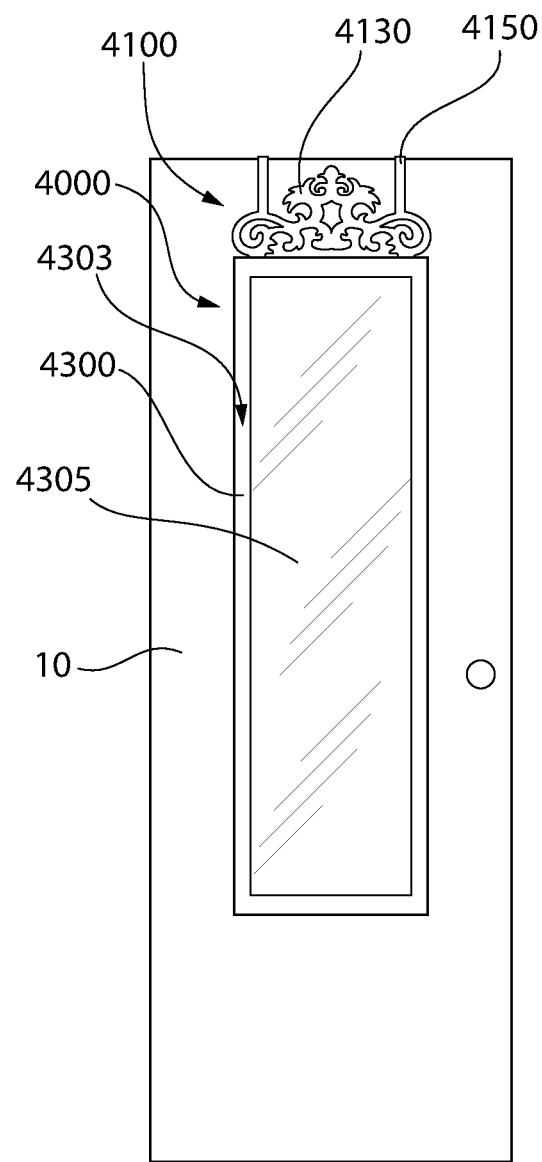
FIG. 37C is a front view illustrating the over-the-door hanging apparatus of FIG. 37B hanging from a door.

Referring to FIGS. 37B and 37C concurrently, when the bracket assembly 4100 is coupled to the support structure 4300, at least a portion of the decorative portion 4130 of the bracket assembly 4100 protrudes from a top edge 4302 of the support structure 4300. Thus, when the over-the-door hanging apparatus 4000 is made to hang from a door 10 by sliding the brackets 4150 over the top edge of the door 10, the portion of the decorative portion 4130 that protrudes from the top edge 4302 of the support structure 4300 is exposed for viewing by a user. In FIG. 37C, the decorative portion 4130, or at least a portion thereof, is located between the top edge 4302 of the support structure 4300 and the top edge of the door 10 from which the bracket 4150 of the bracket assembly 4100 is hanging.

As seen in FIG. 37C, in the exemplified embodiment a mirror 4305 is coupled to the support structure 4300 and exposed on a front surface 4303 of the support structure 4300. Thus, when the over-the-door hanging apparatus 4000 is hanging from the door 10, the rear surface 4301 of the support structure 4300 is facing the door 10 and the front surface 4303 of the support structure 4300, the mirror 4305, and the decorative portion 4130 of the bracket assembly 4100 are exposed. Of course, the mirror 4305 is not required in all embodiments and the support structure 4300 may support a photograph, illustration, poster, chalkboard, whiteboard, cork board, or any other item that is desired to be displayed while being hung from a door.

Figure 38A:
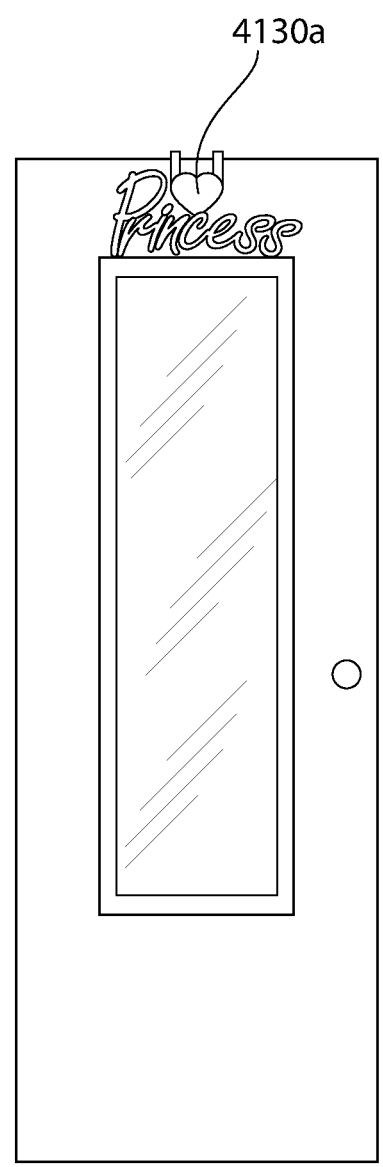
FIG. 38A is a front view illustrating a first alternative over-the-door hanging apparatus hanging from a door.
Figure 38B:
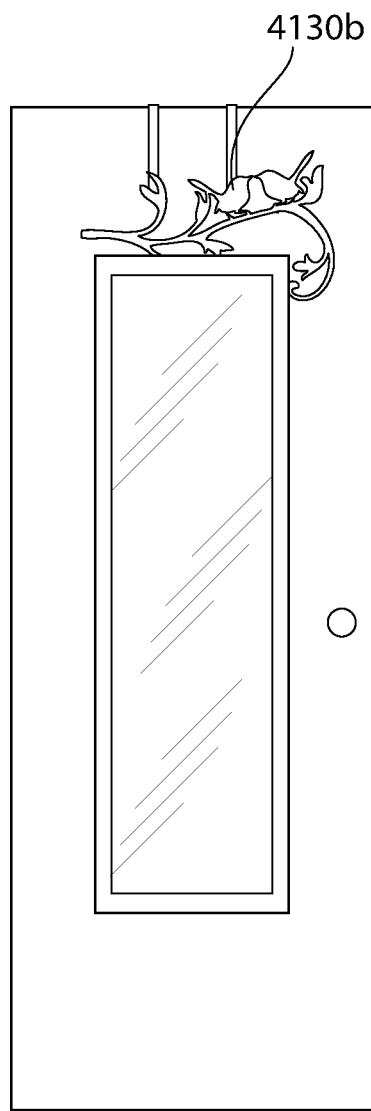
FIG. 38B is a front view illustrating a second alternative over-the-door hanging apparatus hanging from a door.
Figure 38C:
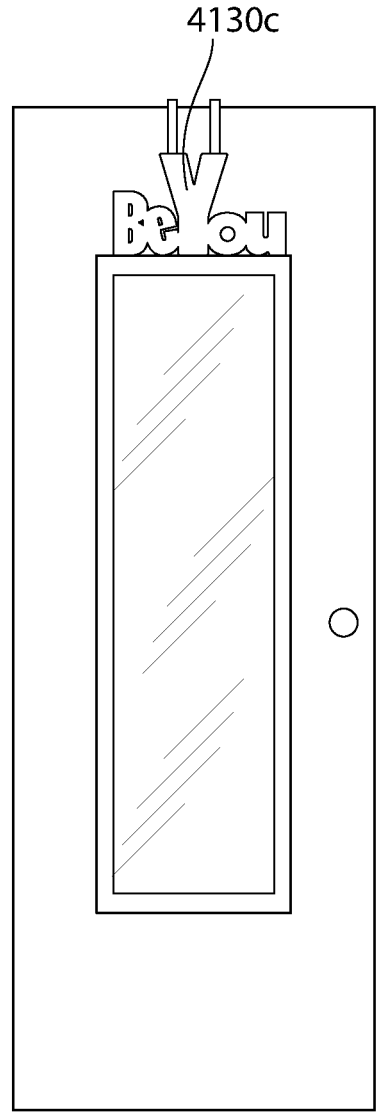
FIG. 38C is a front view illustrating a third alternative over-the-door hanging apparatus hanging from a door.

In this embodiment, the decorative portion 4130 of the bracket assembly 4100 adds an aesthetic design feature to the over-the-door hanging apparatus 4000 and it can be tailored to a particular user's desires or interests. For example, in FIG. 37C the decorative portion 4130 is a generic aesthetic design feature. However, FIGS. 38A-38C illustrate alternative designs for the decorative portion. Specifically, FIG. 38A illustrates a decorative portion 4130a that has the word "Princess" and a heart. FIG. 38B illustrates a decorative portion 4130b that has a twig or branch with two birds kissing. FIG. 38C illustrates a decorative portion 4130c with the words "Be You." In alternative embodiments not illustrated herein, the decorative portion 4130 could be a theme, such as a sports theme, a hiking theme, a dance theme, a music theme, or any other type of theme imaginable. The decorative portion 4130 could also be text in the form of a person's name or initials. The possibilities for the specific details of the various decorative portions are virtually endless. The requirements for the decorative portion 4130 are merely that it protrudes from the top edge 4302 of the support structure 4300 when the bracket assembly 4100 is coupled to the support structure 4300 and that it comprises ornamentation or some type of a design intended to add a desired aesthetic to the over-the-door hanging apparatus 4000. Thus, the decorative portion 4130 includes a specifically added design to add a decorative feature or ornamental design to the over-the-door hanging apparatus 4000. In some embodiments, the decorative portion 4130 is purely ornamental and not functional other than the fact that it creates a desirable aesthetic and makes the over-the-door hanging apparatus 4000 more desirable from an aesthetic standpoint.

Figures 39A, 39B:
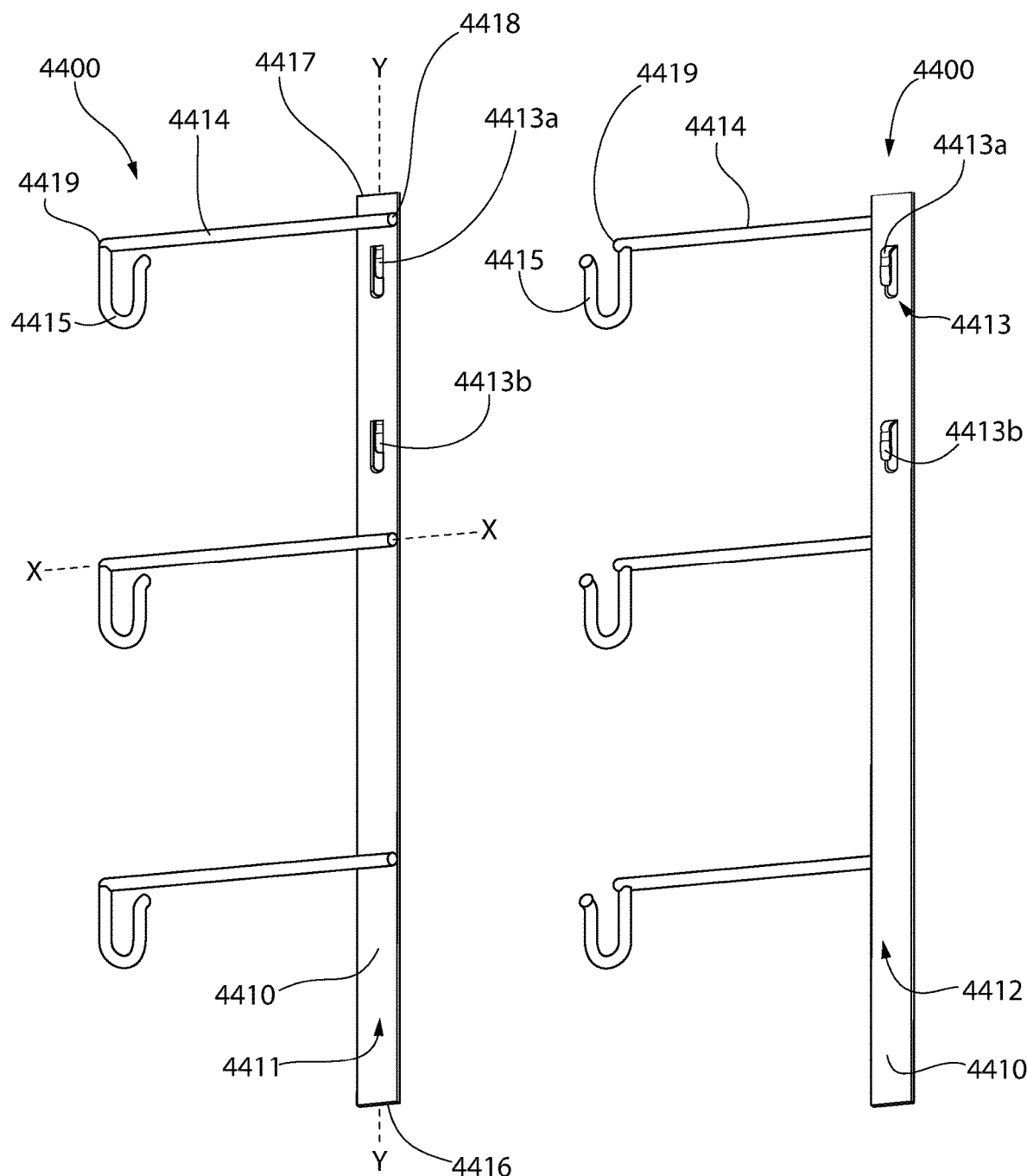
FIG. 39A is a perspective view of an accessory hook in accordance with an embodiment of the present invention.
FIG. 39B is a rear perspective view of the accessory hook of FIG. 39A.

Referring to FIGS. 39A and 39B, an accessory hook 4400 is illustrated in accordance with an embodiment of the present invention. The accessory hook 4400 is intended to be coupled to a support structure in addition to a bracket assembly as has been described previously herein. Thus, the bracket assembly will serve to hang the over-the-door hanging apparatus from a door as previously described and the accessory hook 4400 provides additional hooks on which a user can hang various articles such as hats, clothing, sunglasses, purses or other bags, or the like. The details of the accessory hooks 4400 will be described with reference to FIGS. 39A and 39B, and the manner in which they may be coupled to a support structure will be described with reference to FIGS. 40A-40B.

In this embodiment, the accessory hook 4400 generally comprises an elongate member 4410 having a front surface 4410 and an opposite rear surface 4412, at least one mounting element 4413 extending from the rear surface 4412, an arm 4414 extending from the front surface 4411, and a hook member 4415 extending from the arm 4414. In the exemplified embodiment, the elongate member 4410 extends from a first end 4416 to a second end 4417 along a longitudinal axis Y-Y.

Furthermore, in the exemplified embodiment the at least one mounting element 4413 comprises a first hook 4413a and a second hook 4413b. The first and second hooks 4413a, 4413b extend outwardly and downwardly from the elongate member 4410 to facilitate coupling of the accessory hook 4400 to the support structure in a similar manner to the manner in which the hooks of the bracket assembly previously described are used to couple the bracket assembly to the support structure. In other embodiments, a single hook or more than two hooks could be used. Furthermore, the at least one mounting element 4413 need not be hooks in all embodiments but can be any feature that permits coupling of the accessory hook 4400 to the support structure. For example, the at least one mounting element 4413 can be an aperture in the elongate member 4410 that engages with a hook on a mounting plate that is secured to the rear surface of the support structure. Furthermore, the at least one mounting element 4413 may not be integral with the elongate member 4410 in all embodiments, but it may be a separate piece of hardware such as a screw, nail, hook-and-loop, adhesive, or other type of fastener that secures the accessory hook 4400 to the support structure. Thus, similar to the previous embodiment, in this embodiment the assembly is not limited to a no-tools assembly but the use of tools may be required depending in the manner in which the bracket assembly and the accessory hook 4400 are coupled to the support structure.

In the exemplified embodiment, the hooks 4413*a*, 4413*b* extend from the rear surface 4412 of the elongate member 4410 and the arms 4414 extend from the front surface 4411 of the elongate member 4410. In the exemplified embodiment, there are three arms 4414 and three hook members 4415, but there could be more or less than three of each of these features in other embodiments. As shown, the arms 4414 extend from a first end 4418 to a second end 4419 along an axis X-X. In the exemplified embodiment, the axis X-X of the arms 4414 is perpendicular to the longitudinal axis Y-Y of the elongate member 4410. Of course, in other embodiments the axis X-X of the arms 4414 may be oblique to the longitudinal axis Y-Y of the elongate member 4410. The first end 4418 of the arms 4414 are coupled to the elongate member 4410. The hook members 4415 are coupled to the second ends 4419 of each of the arms 4414.

Figure 40A:
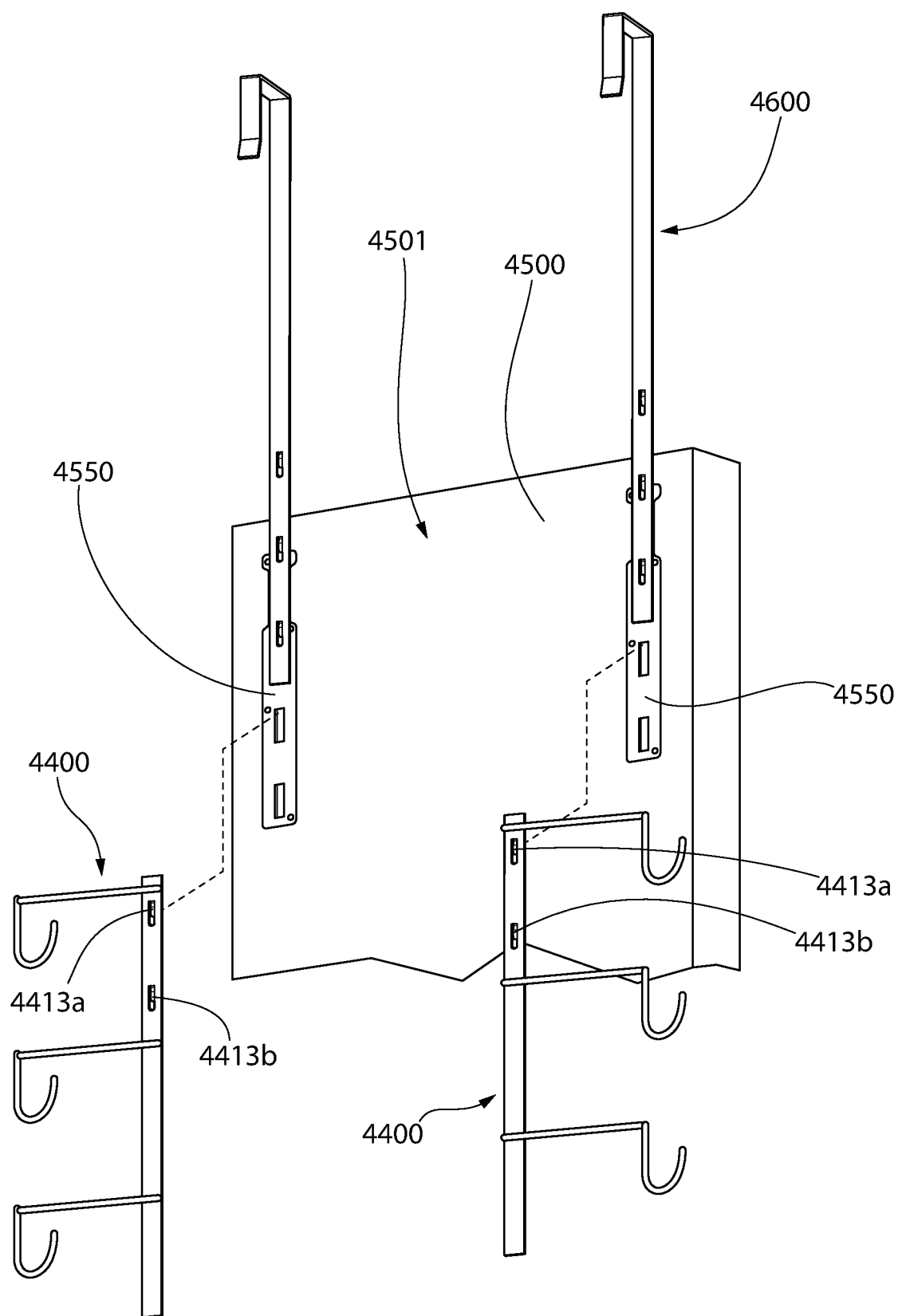
FIG. 40A is a partially exploded perspective view illustrating the accessory hook of FIG. 39A prepared for coupling to a support structure.
Figure 40B:
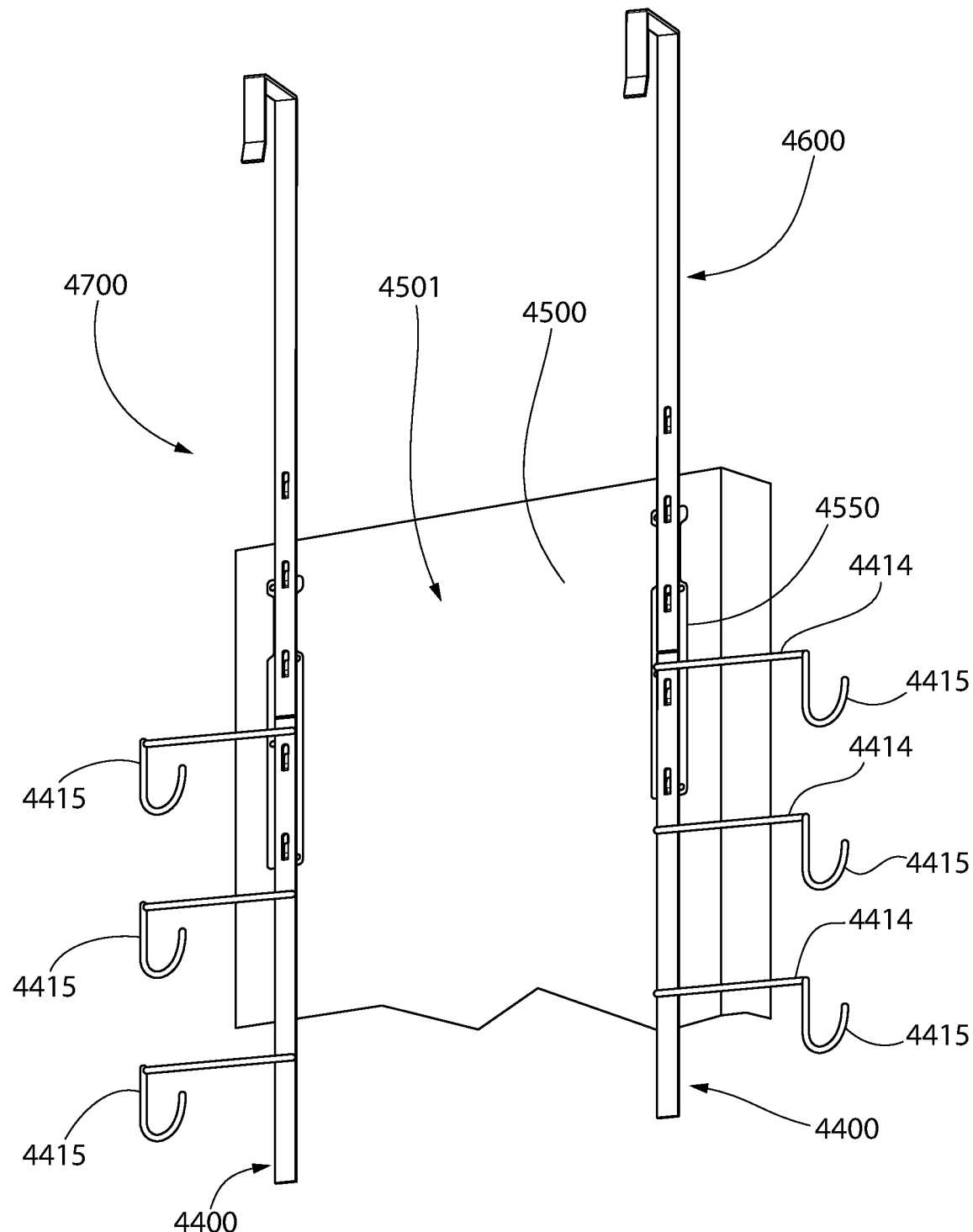
FIG. 40B is a perspective view illustrating the accessory hook of FIG. 39A coupled to the support structure.

Turning to FIGS. 40A and 40B, the coupling of the accessory hooks 4400 to a support structure 4500 will be described. FIG. 40A illustrates the accessory hooks 4400 separated from the support structure 4500 and FIG. 40B illustrates the accessory hooks 4400 coupled to the support structure 4500. The accessory hooks 4400 can be coupled to and decoupled from the support structure 4500 as desired, and thus the accessory hooks 4400 are alterable between a detached state (FIG. 40A) and an attached state (FIG. 40B). In FIG. 40A, a bracket assembly 4600 is illustrated coupled to a rear surface 4501 of the support structure 4500 in the same manner as described above with reference to FIGS. 1-6. However, the details of the bracket assembly 4600 and the manner in which it is coupled to the support structure 4500 may be similar to any of the other embodiments described herein. For example, the bracket assembly 4600 may include a decorative portion and the mounting elements of the bracket assembly 4600 may have any of the various shapes as shown in the different embodiments described herein. Furthermore, although in FIGS. 40A and 40B the bracket assembly 4600 is coupled to the support structure 4500 using a no-tools arrangement via engagement between hooks of the bracket assembly 4600 and apertures of a mounting plate 4550, the invention it not to be so limited in all embodiments and tools may be required to secure the bracket assembly 4600 to the support structure 4500 using screws or other hardware.

In the exemplified embodiment, a mounting plate 4550 is coupled to the rear surface 4501 of the support structure 4500 and the bracket assembly 4600 and the accessory hooks 4400 are coupled to the mounting plate 4550. In this regard, the mounting plate 4500 is similar to the mounting plate 120 described with reference to FIGS. 1-6 except that it has been lengthened and made to include more apertures so that both the bracket assembly 4600 and the accessory hooks 4400 can be coupled to the same mounting plate 4550. Of course, using the mounting plate 4550 for the coupling of the bracket assembly 4600 and/or the accessory hooks 4400 to the support structure 4500 is only one manner to accomplish said coupling. Other techniques and processes can be used, including separate hardware, adhesive, hook-and-loop, mechanical interlock, and the like.

As shown in FIGS. 40A and 40B, in the exemplified embodiment when the bracket assembly 4600 is coupled to the rear surface 4501 of the support structure 4500, the mounting plate 4550 has apertures that are unused by the bracket assembly 4600 (best seen in FIG. 40A) and thus available for use to couple the accessory hooks 4400 to the support structure 4500. Thus, in the exemplified embodiment the accessory hooks 4400 are coupled to the support structure 4500 via slidable engagement between the first and second hooks 4413*a*, 4413*b* of the accessory hooks 4400 and the available apertures and edges of the mounting plate 4550. Stated simply, the accessory hook 4400 is coupled to the rear surface 4501 of the support structure 4500 via slidable mating between the at least one mounting element 4413 of the accessory hook 4400 and one or more edges of the mounting plate 4550. Although both the bracket assembly 4600 and the accessory hooks 4400 are coupled to the same mounting plate 4550, it should be appreciated that they are separate components in the exemplified embodiment. However, in other embodiments the arms 4414 and the hook members 4415 could extend from the elongate members of the bracket assembly 4600 rather than from a separate component. Thus, the bracket assembly 4600 and the accessory hook 4400 could be a single, unitary structure in some embodiments rather than being two separate components as illustrated in the exemplified embodiment.

Figure 42:
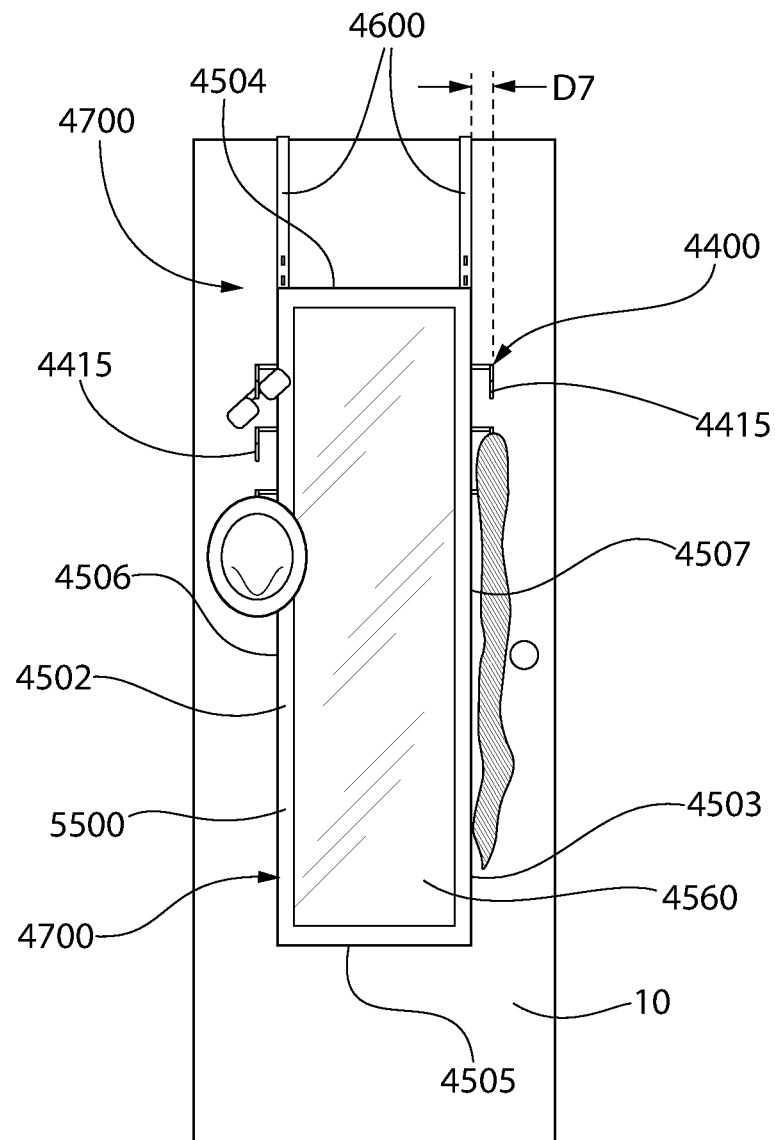
FIG. 42 is a front view of an over-the-door hanging apparatus hanging from a door and having one or more of the accessory hooks of FIGS. 40A and/or 41A coupled thereto.

Referring to FIGS. 40B and 42, the bracket assembly 4600 and the accessory hook 4400 are both coupled to the support structure 4500 to form an over-the-door hanging apparatus 4700. As seen in FIG. 40B, the hooks of the bracket assembly 4600 and the hooks of the accessory hook 4400 extend in opposite directions. The support structure 4500 has the rear surface 4501, a front surface 4502, and a perimetric edge 4503 extending between the front and rear surfaces 4501, 4502. The perimetric edge 4503 includes a top edge 4504, a bottom edge 4505, a first lateral edge 4506, and a second lateral edge 4507. Similar to the previously described embodiments, in this embodiment a mirror 4560 is supported by the support structure 4500 and exposed at the front surface 4502 of the support structure 4500. The mirror 4560 is only used in the exemplified embodiment and can be replaced by a photograph, poster, chalkboard, whiteboard, cork board, or the like in other embodiments.

In the fully assembled state, each of the hook members 4415 is located adjacent to the perimetric edge 4503 of the support structure 4500 in a spaced apart manner. More specifically, each of the hook members 4515 is adjacent to one of the first and second lateral edges 4506, 4507 of the support structure 4500. In the exemplified embodiment, the hook members 4515 are spaced apart from the lateral edge 4506, 4507 that they are adjacent to. In this regard, the arms 4414 have a length that enables the arms 4414 to protrude from the perimetric edge 4503 of the support structure 4500 to maintain the hook members 4515 at a location that is spaced apart from the perimetric edge 4503 of the support structure 4500. Thus, there is a space having a distance D7 between the hook members 4515 and the one of the first and second lateral edges 4506, 4507 of the support structure that the hook members 4515 are adjacent to. Of course, the invention is not to be so limited and the hook members 4515 could be located right up against the perimetric edge 4503 of the support structure 4500 in other embodiments without affecting the functionality and accessibility of the hook members 4515. As shown in FIG. 42, the hook members 4515 can be used to hang various items from the over-the-door hanging apparatus 4700, such as a hat, glasses, a scarf, other articles of clothing, or any other item that can be properly hung from one of the hook members 4515. This can be quite advantageous, particularly in small rooms such as dorm rooms where space is at a premium.

Figure 41A:
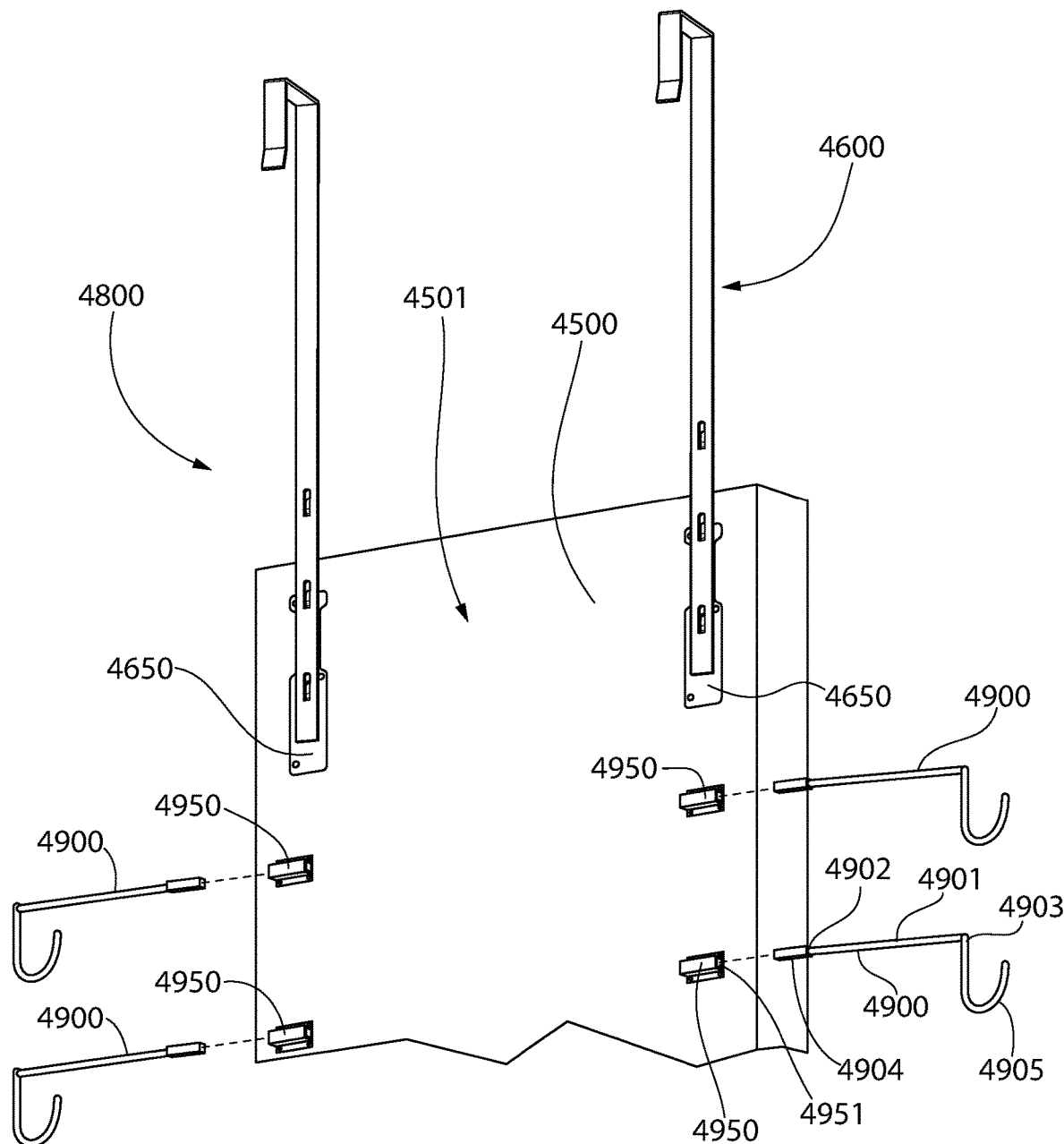
FIG. 41A is a partially exploded perspective view illustrating an alternative accessory hook prepared for coupling to the support structure.
Figure 41B:
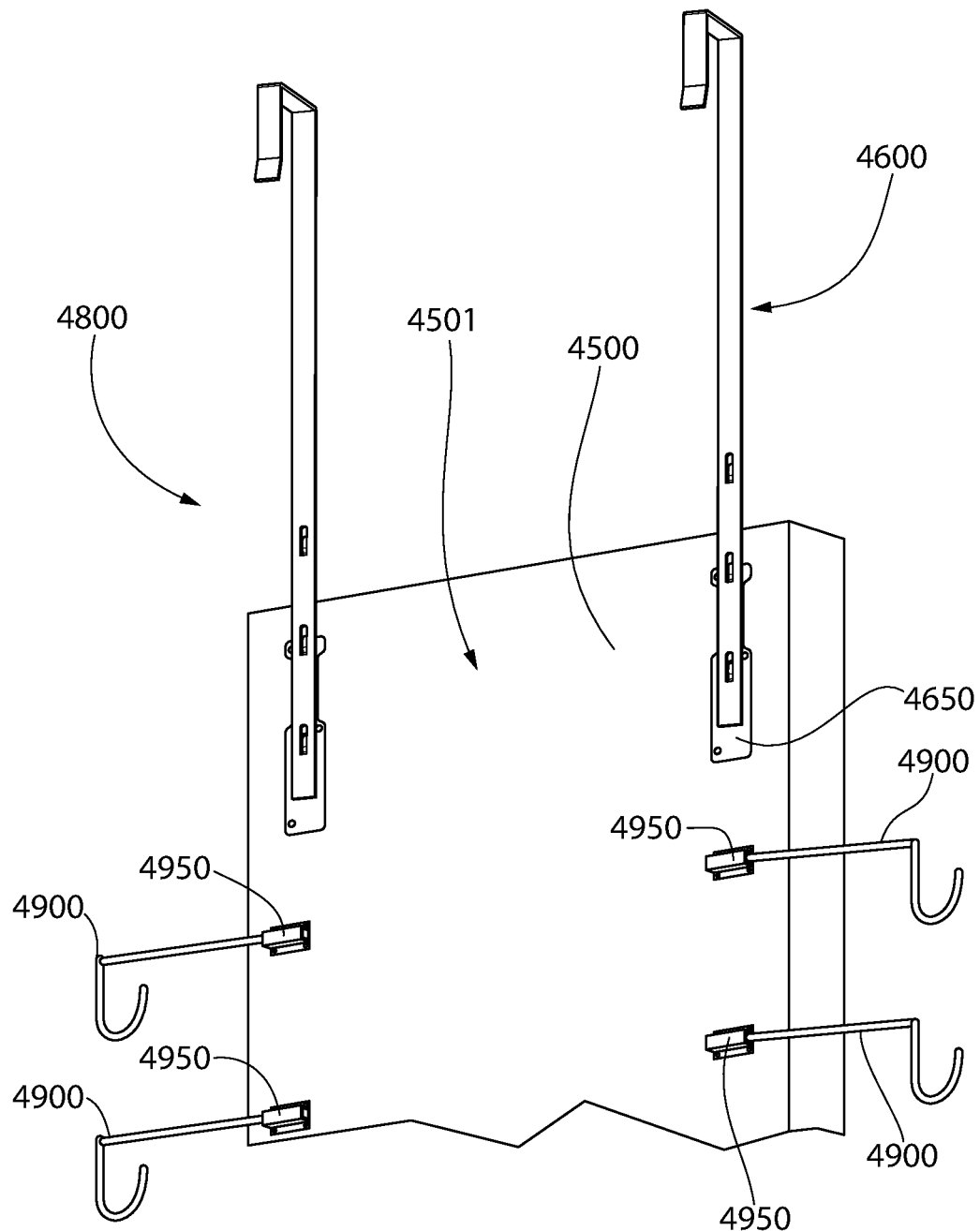
FIG. 41B is a perspective view illustrating the alternative accessory hook of FIG. 41A coupled to the support structure.

FIGS. 41A and 41B illustrate an alternative embodiment of an over-the-door hanging apparatus 4800 that includes one or more accessory hooks 4900. Specifically, in this embodiment the bracket assembly 4600 and the accessory hooks 4900 do not couple to the same mounting plate. Rather, the bracket assembly 4600 is coupled to the rear surface 4501 of the support structure 4500 using a mounting plate 4650 that is similar to the type that has been previously described herein. However, in this embodiment the accessory hooks 4900 are not also coupled to the same mounting plate 4650. Rather, the accessory hooks 4900 are coupled to the rear surface 4501 of the support structure 4500 using one or more accessory mounting plates 4950 that are secured to the rear surface 4501 of the support structure 4500. The accessory mounting plate 4950 may be secured to the rear surface 4501 of the support structure 4500 in any desired manner such as hardware (i.e., screws, nails, or the like), adhesive, hook-and-loop, or the like.

In this embodiment, each of the accessory hooks 4900 comprises an arm 4901 extending from a first end 4902 to a second end 4903. The accessory hook 4900 comprises a mounting element 4904 extending from the first end 4902 of the arm 4901 and a hook member 4905 extending from the second end 4903 of the arm 4901. In the exemplified embodiment, the mounting element 4904 has a greater cross-sectional area than the arm 4901. The accessory mounting plate 4950 comprises a receiving cavity 4951. In the exemplified embodiment, the accessory hook 4900 is coupled to the accessory mounting plate 4950 via mechanical engagement between the mounting element 4904 of the accessory hook 4900 and the receiving cavity 4951 of the accessory mounting plate 4950.

Specifically, in this embodiment the accessory hook 4900 is coupled to the accessory mounting plate 4950 by sliding/translating the accessory hook 4900 towards the accessory mounting plate 4950 in a direction of the longitudinal axis of the accessory hook 4900 until the mounting element 4904 of the accessory hook 4900 enters the receiving cavity 4951 of the accessory mounting plate 4950. In the exemplified embodiment, the accessory hook 4900 is coupled to the accessory mounting plate 4950 via a frictional fit between the mounting element 4904 of the accessory hook 4900 and the receiving cavity 4951 of the accessory mounting plate 4950. However, other techniques for coupling the accessory hook 4900 to the accessory mounting plate 4950 are possible and fall within the scope of the invention described herein.

FIGS. 40A, 40B and FIGS. 41A, 41B illustrate two alternative embodiments for coupling accessory hooks 4400, 4900 to a support structure. However, other techniques are possible for coupling accessory hooks to a support structure. In a generic sense, the invention in accordance with this embodiment is directed to an over-the-door hanging apparatus that includes a support structure, a bracket assembly coupled to the support structure for hanging the over-the-door hanging apparatus from a door, and an accessory hook coupled to the support structure, the accessory hook having a hook member that is spaced apart from a perimetric edge of the support structure. Alternatively, the hook member of the accessory hook may be located immediately adjacent to the perimetric edge of the support structure rather than being spaced apart from the perimetric edge of the support structure so long as it remains possible to hang an item (i.e., a hat, scarf, coat, or the like) from the hook member of the accessory hook. Although the accessory hooks 4400, 4900 are described herein as being coupled to the rear surface 4501 of the support structure 4500, the invention is not to be so limited and the accessory hooks 4400, 4900 may be coupled to the peripheral edge 4503 of the support structure 4500 or to the front surface 4502 of the support structure 4500 in alternative embodiments.

Figure 43A:
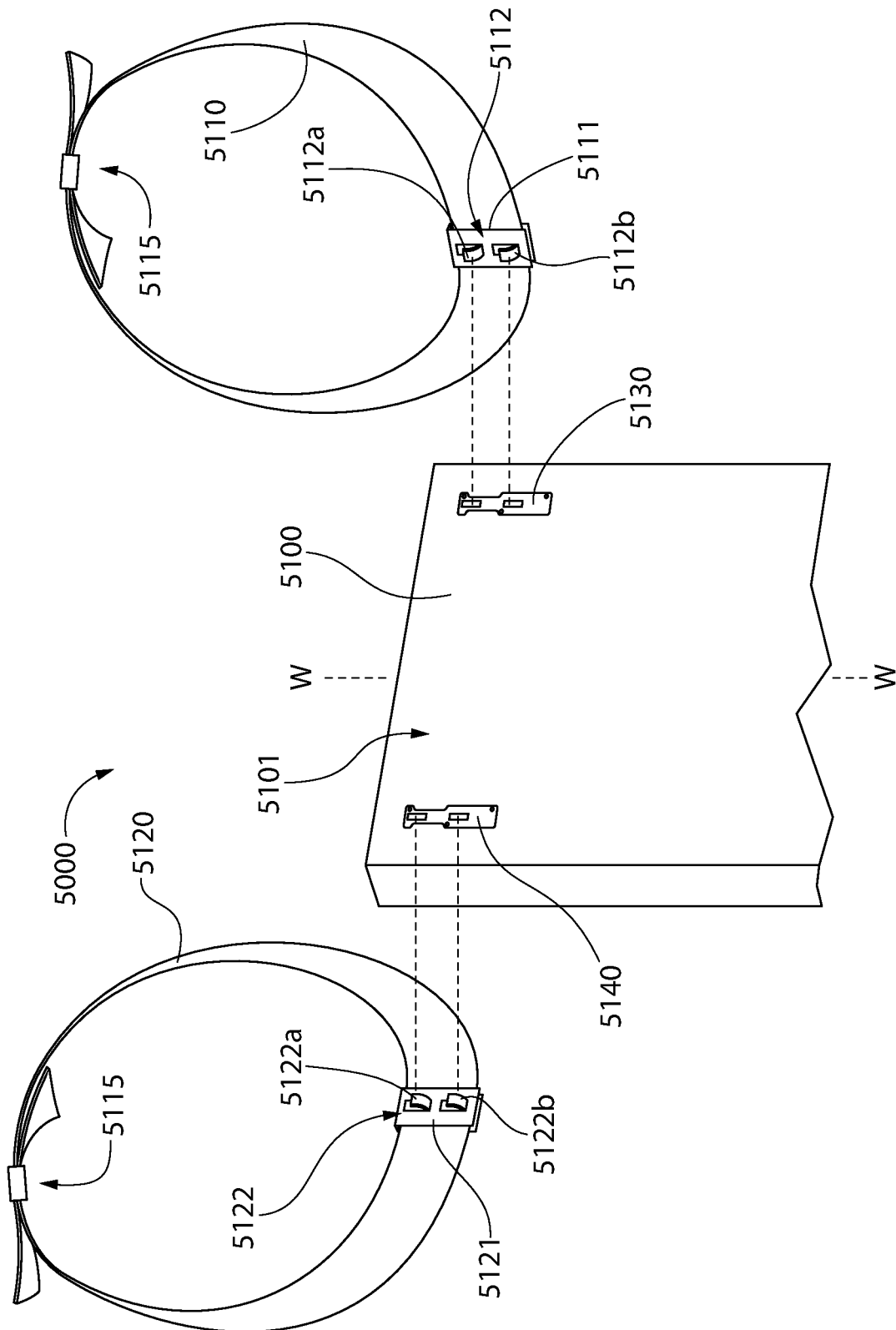
FIG. 43A is an exploded perspective view illustrating a support structure and first and second straps prepared for coupling to the support structure.
Figure 43B:
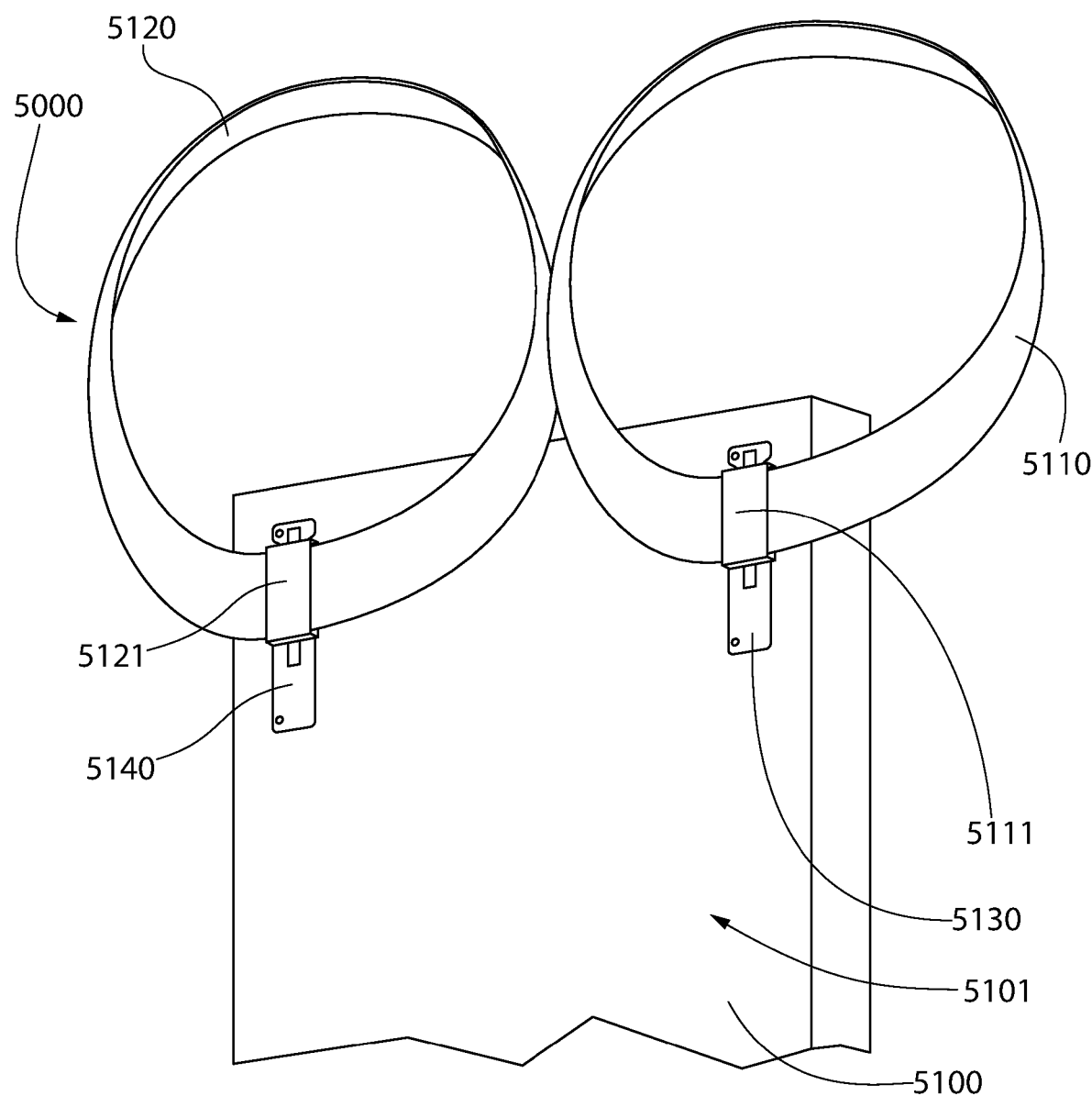
FIG. 43B is a perspective view illustrating the first and second straps coupled to the support structure.
Figure 43C:
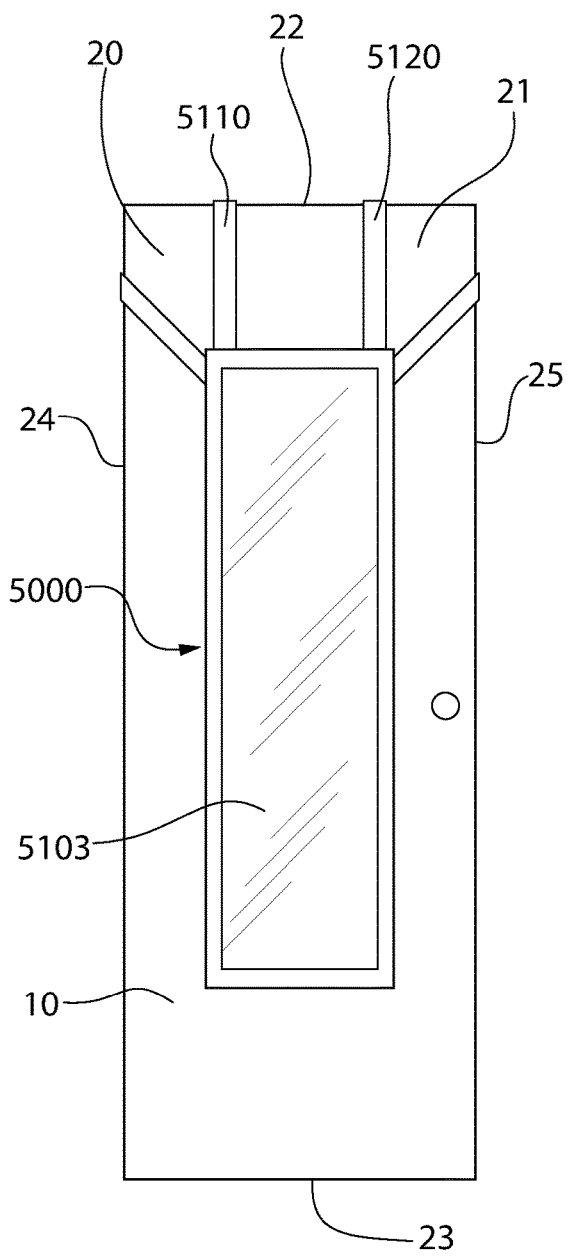
FIG. 43C is a front view illustrating an over-the-door hanging apparatus hanging from the door by the first and second straps of FIGS. 43A and 43B.

Referring to FIGS. 43A-43C, an over-the-door hanging apparatus 5000 will be described in accordance with yet another embodiment of the present invention. The over-the-door hanging apparatus 5000 generally comprises a support structure 5100 having a rear surface 5101, and a first strap 5110 and a second strap 5120 configured to be coupled to the rear surface 5101 of the support structure 5100. The first and second straps 5110, 5120, when coupled to the rear surface 5101 of the support structure 5100, are configured to wrap around at least a portion of a door to hang the support structure 5100 from the door.

As with the previously described embodiments, in the present embodiment the support structure 5100 supports a mirror 5103 at its front surface. However, the invention is not to be so limited and the support structure 5100 may support other items such as photographs, pictures, poster boards, a chalkboard, a white board, a cork board, or the like. Thus, the support structure 5100 may support any item that is desired to be hung from a door for display and/or use.

Furthermore, as with previously described embodiments, in the present embodiment a first mounting plate 5130 and a second mounting plate 5140 are coupled to the rear surface 5101 of the support structure 5100 on opposite sides of a vertical centerline W-W of the support structure 5100. The first and second mounting plates 5130, 5140 may have the same structure as the mounting plates 120, 220 previously described. Thus, the first and second mounting plates 5130, 5140 may be placed over a channel in the rear surface 5101 of the support structure 5100 so that apertures formed into the first and second mounting plates 5130, 5140 are aligned with the channel in the rear surface 5101 of the support structure 5100. In the exemplified embodiment, the first and second straps 5110, 5120 are coupled to the first and second mounting plates 5130, 5140, respectively. Of course, the first and second mounting plates 5130, 5140 might not be required in all embodiments and the first and second straps 5110, 5120 may be coupled to the rear surface 5101 of the support structure 5100 in other ways including any technique that has been described throughout this disclosure for coupling components to the rear surface of the support structure.

The first and second straps 5110, 5120 may be formed of a resilient and/or flexible material. In the exemplified embodiment, each of the first and second straps 5110, 5120 is formed of a textile which provides the first and second straps 5110, 5120 with the necessary flexibility to enable them to wrap around the upper corners of a door as described herein. Of course, other materials are possible, including leather, rubber or other elastomeric materials, or other flexible material, so long as the functionality described herein is maintained. The first and second straps 5110, 5120 are preferably formed of a material that permits the first and second straps 5110, 5120 to be stretched and then biased back to their normal size and shape. The first and second straps 5110, 5120 may comprise a decorative color or pattern. Specifically, the first and second straps 5110, 5120 may comprise a textile or other material having a desired color (the first and second straps 5110, 5120 may have the same color or a different color), or the first and second straps 5110, 5120 may have a decorative pattern or the like thereon to create a desired aesthetic.

In the exemplified embodiment, each of the first and second straps 5110, 5120 are in the form of a loop or ring, without specific regard to the shape of the loop or ring. Specifically, the first and second straps 5110, 5120 may form a circular loop, an oval loop, a rectangular loop, other polygonal shaped loops, or the like so long as they form a closed loop. Depending on the flexibility of the material used to form the straps 5110, 5120, the straps 5110, 5120 may not have a defined shape.

In the exemplified embodiment, a first clip 5111 is coupled to the first strap 5110 and a second clip 5121 is coupled to the second strap 5120. The first and second clips 5111, 5121 may be fixedly and non-movably coupled to the first and second straps 5110, 5120, respectively. Alternatively, the first and second clips 5112, 5122 may be configured to move relative to the first and second straps 5110, 5120, respectively. This is dictated by the manner in which the first and second clips 5111, 5121 is coupled to the first and second straps 5110, 5120. The first clip 5111 comprises a first mounting element 5112 and the second clip 5121 comprises a second mounting element 5122. In the exemplified embodiment, the first mounting element 5112 comprises first and second hooks 5113a, 5113b and the second mounting element 5122 comprises first and second hooks 5122a, 5122b. Of course, the first and second mounting elements 5112, 5122 need not be hooks in all embodiments, but may instead be apertures that engage with hooks on the mounting plates 5130, 5140 (in instances where the mounting plate 5130, 5140 have hooks instead of apertures for coupling to the first and second straps 5110, 5120). Alternatively, the first and second mounting elements 5112, 5122 may be any other structure configured to couple the first and second straps 5110, 5120 to the support structure 5100. Furthermore, in other embodiments the first and second straps 5110, 5120 may be coupled to the support structure 5100 using other techniques, such as hook-and-loop fasteners, hardware including screws, nails, or the like, adhesive, mechanical features having interference or friction-type fits, or the like.

In this embodiment, the first mounting element 5112 of the first clip 5111 is coupled to the first mounting plate 5130 and the second mounting element 5122 of the second clip 5121 is coupled to the second mounting plate 5140, thereby coupling the first and second straps 5110, 5120 to the rear surface 5101 of the support structure 5100. This is achieved in the exemplified embodiment via engagement between the hooks 5112a, 5112b of the first clip 5111 and the apertures/edges of the first mounting plate 5130 and the hooks 5122a, 5122b of the second clip 5121 and the apertures/edges of the second mounting plate 5140. Of course, the first and second mounting plates 5130, 5140 could be omitted and the first and second mounting elements 5112, 5122 of the first and second clips 5111, 5121 could be coupled directly to the rear surface 5101 of the support structure 5100 using any technique described with regard to any of the embodiments disclosed herein.

When the first and second straps 5110, 5120 are coupled to the rear surface 5101 of the support structure 5100, they are located on opposite sides of the vertical centerline W-W of the support structure 5100. Once the first and second straps 5110, 5120 are coupled to the rear surface 5101 of the support structure 5100, the first and second straps 5110, 5120 can then be coupled to the door 10 to hang the support structure 5100 from the door. Specifically, the first strap 5110 is made to wrap around a first upper corner 20 of the door 10 and the second strap 5120 is made to wrap around a second upper corner 21 of the door 10.

More specifically, in the exemplified embodiment the door 10 has a top edge 22, a bottom edge 23 opposite the top edge 22, a first lateral edge 24, and a second lateral edge 25 opposite the first lateral edge 24. Each of the first and second lateral edges 24, 25 extends between the top and bottom edges 22. When the first and second straps 5110, 5120 are coupled to the door 10, the first strap 5110 wraps around the first upper corner 20 of the door 10 so that the first strap 5110 is in direct contact with the top edge 22 of the door 10 and the first lateral edge 24 of the door 10 and the second strap 5120 wraps around the second upper corner 21 of the door 10 so that the second strap 5120 is in direct contact with the top edge 22 of the door 10 and the second lateral edge 25 of the door 10. Thus, the first upper corner 20 of the door 10 is located within the loop formed by the first strap 5110 and the second upper corner 21 of the door 10 is located within the loop formed by the second strap 5120. The weight of the support structure 5000 in conjunction with the force of gravity maintains the over-the-door hanging apparatus 5000 in the position illustrated in FIG. 43C when the over-the-door hanging apparatus 5000 is hung from the door 10.

In certain embodiments, each of the first and second straps 5110, 5120 may have a length adjustment feature 5115 that permits adjustment of the length of material of the first and second straps 5110, 5120. More specifically, adjusting the length adjustment feature 5115 will change the diameter of the loop that is formed by the first and second straps 5110, 5120. This will permit the support structure 5100 to be hung higher on the door 10 when the diameter of the loop is decreased and lower on the door 10 when the diameter of the loop is increased. Although the length adjustment feature 5115 is only illustrated on the first strap 5110, it may of course also be included on the second strap 5120.

Figure 44:
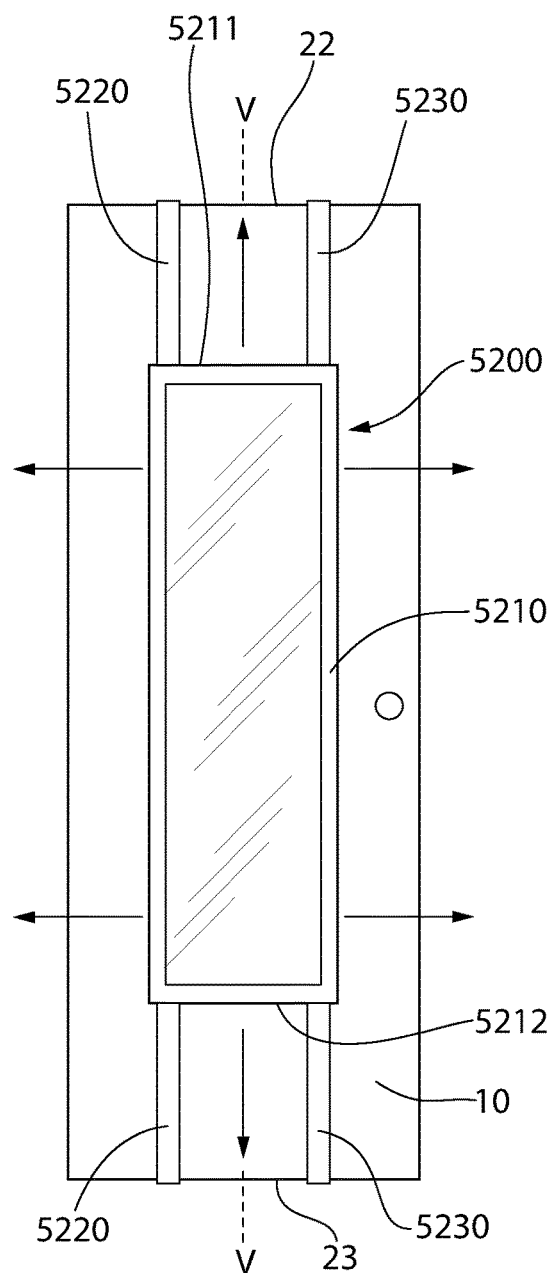
FIG. 44 is a front view illustrating an alternative over-the-door hanging apparatus hanging from the door by straps.

FIG. 44 illustrates an alternative embodiment of an over-the-door hanging apparatus 5200 in position coupled to the door 10. Similar to the previous embodiment, the over-the-door hanging apparatus 5200 comprises a support structure 5210 having a rear surface, a first strap 5220 coupled to the rear surface of the support structure 5210, and a second strap 5230 coupled to the rear surface of the support structure 5210. Each of the first and second straps 5220, 5230 may form a closed loop as with the previous embodiment. Alternatively, the first and second straps 5220, 5230 may not be in the form of a closed loop, but may instead have a first end coupled to the rear surface of the support structure 5210 at a first axial location along the rear surface of the support structure 5210 and a second end coupled to the rear surface of the support structure 5220 at a second axial location along the rear surface of the support structure 5210. The first axial location may be adjacent to the top end of the support structure 5210 and the second axial location may be adjacent to the bottom end of the support structure 5210 or it may be at any location between the first axial location and the bottom end of the support structure 5210. In this embodiment, the first and second straps 5220, 5230 have a length that is greater than a length of the door measured from the bottom edge 23 of the door 10 to the top edge 22 of the door 10.

In this embodiment, the first and second straps 5220, 5230 do not just wrap around a corner of the door, but rather they wrap around least: (1) the portion of the door that extends from a top edge 5211 of the support structure to the top edge 22 of the door 10; (2) the entire rear surface of the door (the surface opposite the surface that is adjacent to the rear surface of the support structure 5210; and (3) the portion of the door that extends from the bottom edge 23 of the door 10 to the bottom edge 5212 of the support structure 5210. Thus, the first and second straps 5220, 5230 wrap around the top edge 22 of the door 10, the bottom edge 23 of the door 10, and the rear surface of the door 10. In some embodiments, depending on the length of the first and second straps 5220, 5230 and the manner in which they are coupled to the rear surface of the support structure 5210, the first and second straps 5220, 5230 may wrap around an entirety of an axial circumference of the door 10.

Due to the manner in which the first and second straps 5220, 5230 are arranged and located, in this embodiment the support structure 5210 can move vertically and horizontally along the door 10 while remaining coupled to the door 10 as illustrated in FIG. 44. The first and second straps 5220, 5230 may also include a length adjustment feature as previously described with reference to the first and second straps 5110, 5120 to enable the first and second straps 5220, 5230 to fit around different sized doors. Furthermore, although the exemplified embodiment illustrates two straps, in some embodiments only one of the first and second straps 5220, 5230 may be needed to hang the over-the-door hanging apparatus 5200 from the door 10. In such an embodiment, the single strap may be located along the vertical centerline V-V of the support structure 5200 rather than being offset therefrom as with the exemplified embodiment that uses first and second straps 5220, 5230 located on opposite sides of the vertical centerline V-V of the support structure 5200.

Figure 45:
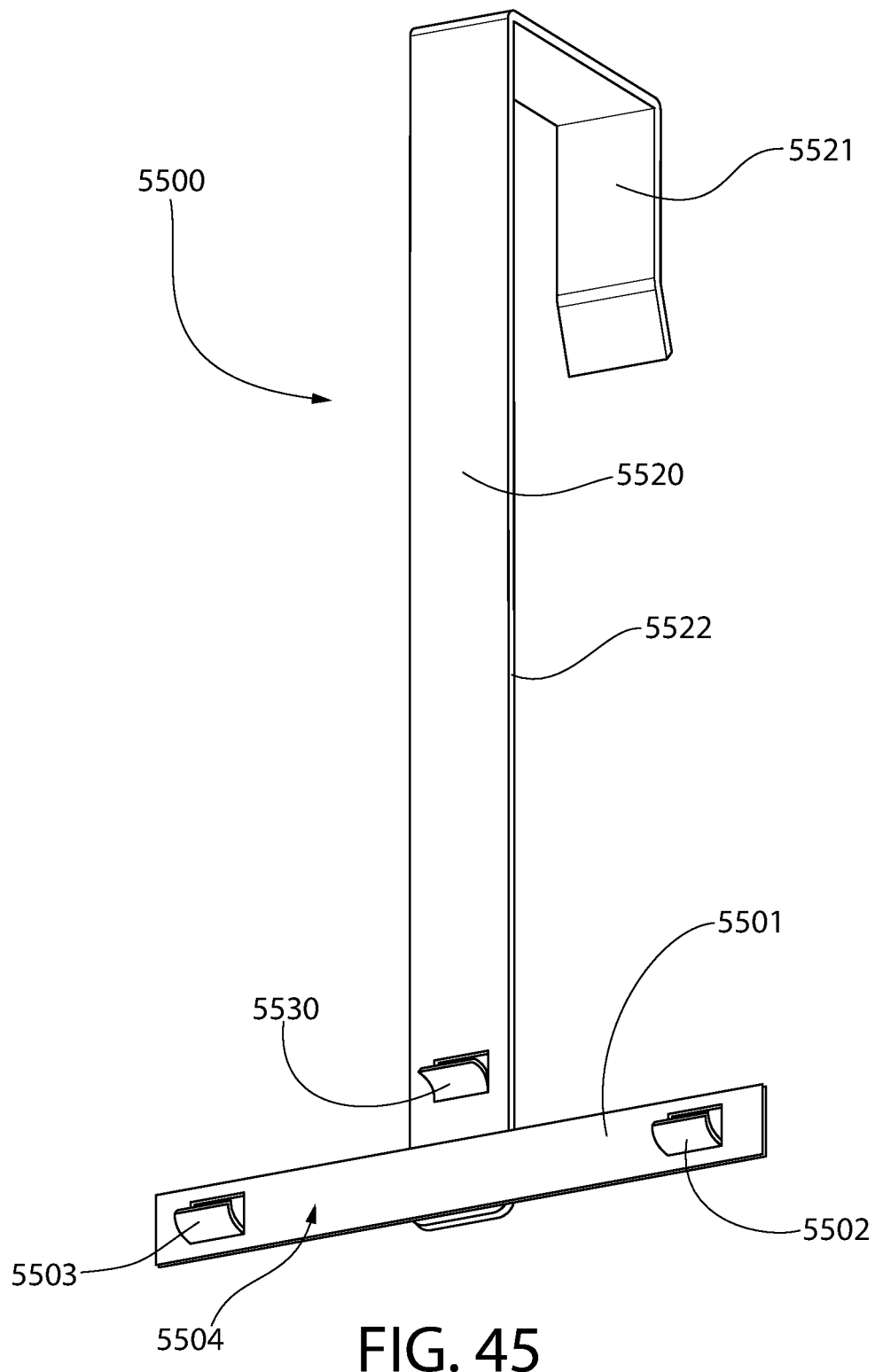
FIG. 45 is a perspective view of a bracket assembly in accordance with an embodiment of the present invention.
Figure 46A:
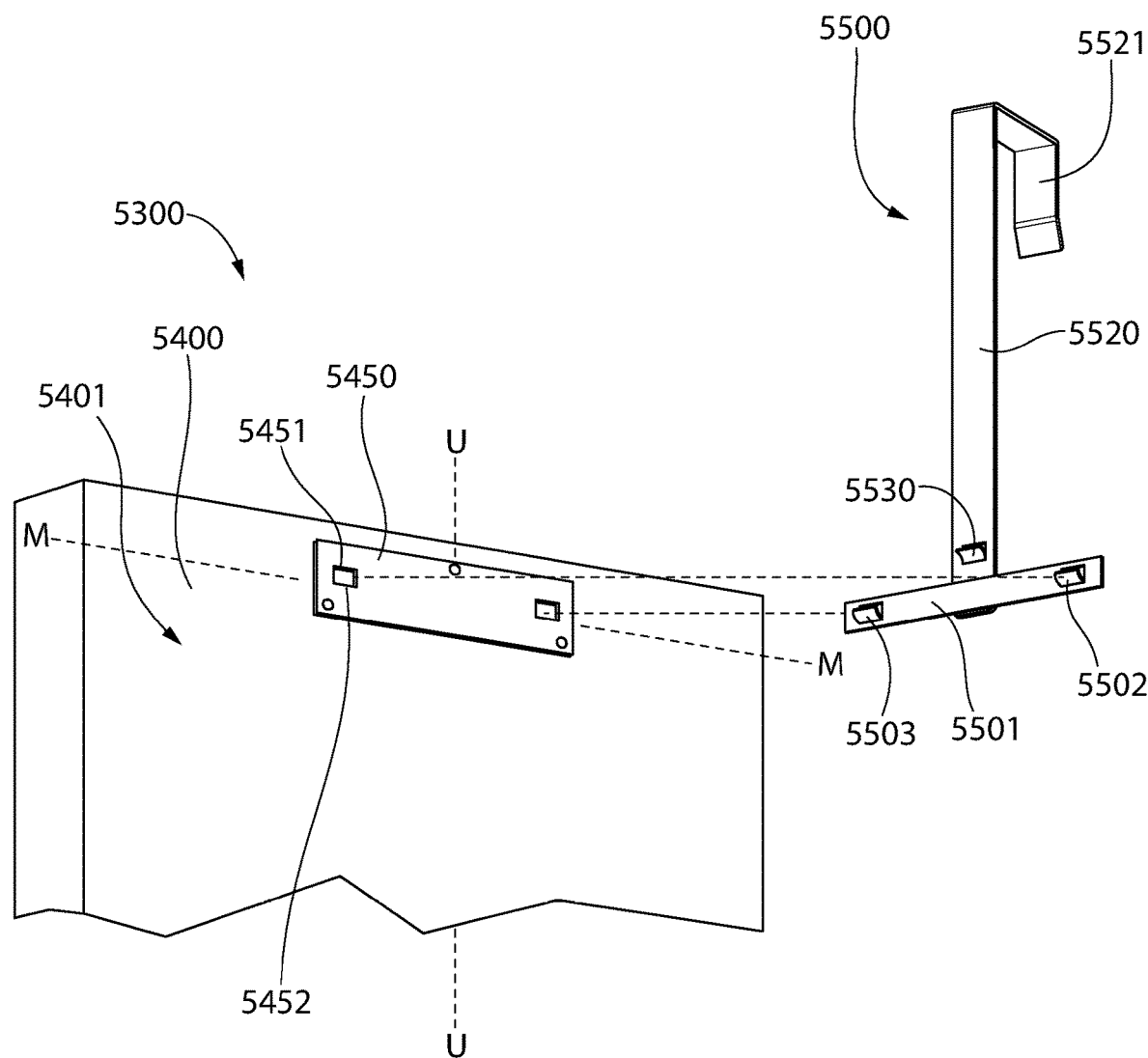
FIG. 46A is an exploded perspective view illustrating the bracket assembly of FIG. 45 in preparation for being coupled to a support structure.
Figure 46B:
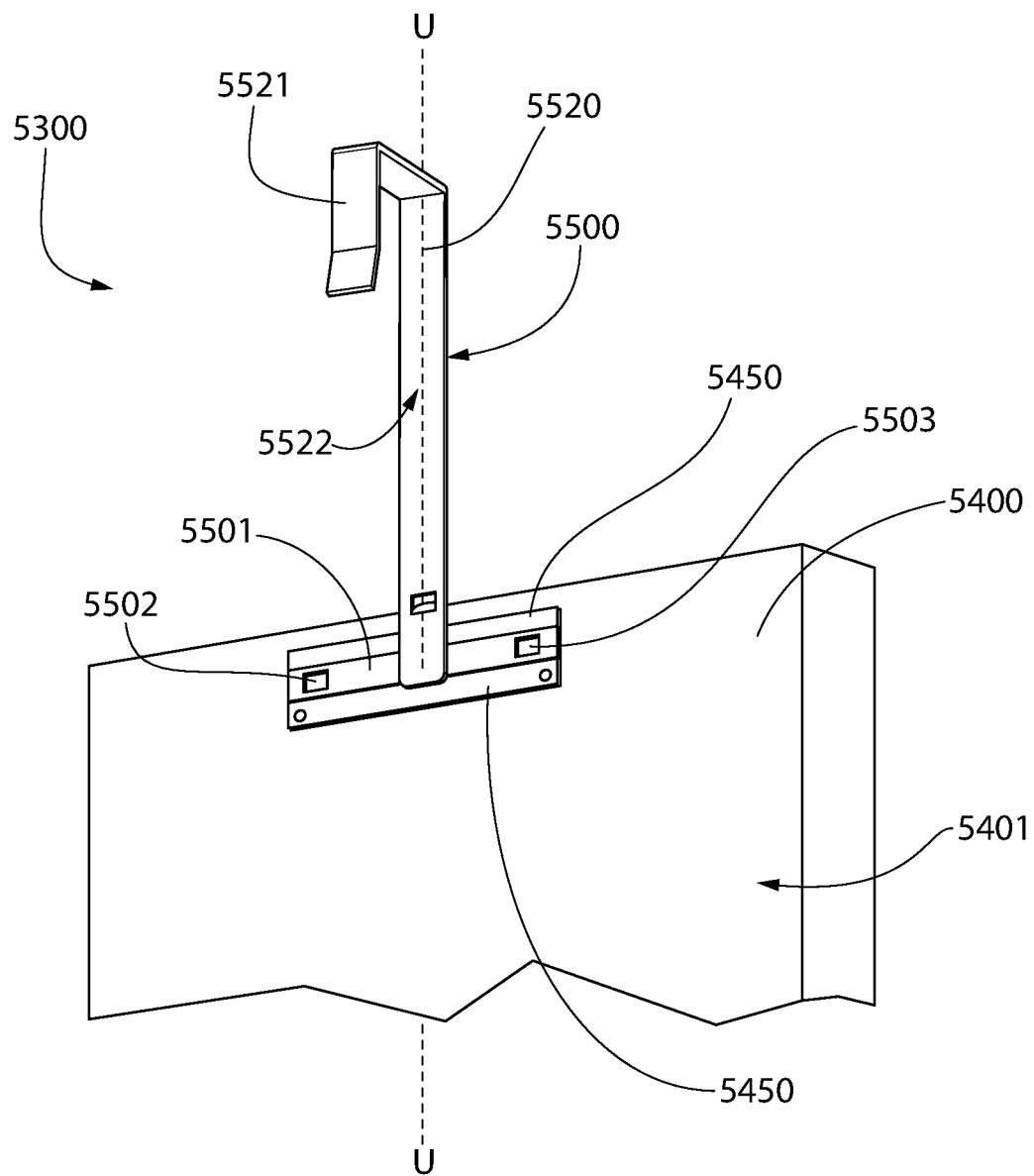
FIG. 46B is a perspective view of an over-the-door hanging apparatus that includes the bracket assembly of FIG. 45 coupled to the support structure.

Referring to FIGS. 45-46B, an over-the-door hanging apparatus 5300 will be described in accordance with yet another embodiment of the present invention. The over-the-door hanging apparatus 5300 generally comprises a support structure 5400 having a rear surface 5401, a mounting plate 5450 secured to the rear surface 5401 of the support structure 5400, and a bracket assembly 5500 detachably coupled to the rear surface 5401 of the support structure 5400. In the exemplified embodiment, the bracket assembly 5500 is coupled to the mounting plate 5450, but in alternative embodiments the mounting plate 5450 may be omitted and the bracket assembly 5500 may be coupled directly to the rear surface 5501 of the support structure 5500.

In this embodiment, the mounting plate 5450 comprises a first aperture 5451 defined by a first closed-geometry edge 5452 and a second aperture 5453 defined by a second closed-geometry edge 5454. The first and second apertures 5451, 5453 are horizontally spaced apart from one another and vertically aligned with one another. The rear surface 5401 of the support structure 5400 may have one or more channels formed therein that are aligned with the first and second apertures 5451, 5453 of the mounting plate 5450. As a result, a hook or mounting element of the bracket assembly 5500 may be inserted into the apertures 5451, 5453 of the mounting plate 5450 and into the channels in the rear surface 5401 of the support structure 5400 to couple the bracket assembly 5500 to the rear surface 5401 of the support structure 5400 in a manner similar to that which has been described above with regard to the previously described embodiments. One difference in this embodiment is that the first and second apertures 5451, 5453 of the mounting plate 5450 are horizontally spaced apart from one another. Thus, the first and second apertures 5451, 5453 are located on opposite sides of a vertical centerline U-U of the support structure 5400. The first and second apertures 5451, 5453 may be aligned with a plane that is transverse to the vertical centerline U-U. In the exemplified embodiment, the mounting plate 5450 is elongated along an axis M-M that is perpendicular to the vertical centerline U-U of the support structure 5400.

The bracket assembly 5500 comprises a horizontal portion 5501 and a vertical portion 5520 extending from the horizontal portion 5501. The bracket assembly 5500 further comprises first and second mounting elements 5502, 5503, which in the exemplified embodiment are in the form of hooks, extending from a front surface 5504 of the horizontal portion 5501 of the bracket assembly 5500. Furthermore, the bracket assembly 5500 comprises at least one bracket 5521 extending from a rear surface 5522 of the vertical portion 5502. The bracket 5521 is a U-shaped bracket as previously described so that the bracket 5521 may engage a top edge of a door to hang the support structure 5400 from the door.

The bracket assembly 5500 is coupled to the rear surface 5401 of the support structure 5400 via slidable engagement between the first mounting element 5502 of the bracket assembly 5500 and a portion of the first closed-geometry edge 5452 of the mounting plate 5450 and slidable engagement between the second mounting element 5503 of the bracket assembly 5500 and a portion of the second closed-geometry edge 5454 of the mounting plate 5450. To achieve this engagement, the first mounting element 5502 is positioned within the first aperture 5451 and the second mounting element 5503 is positioned within the second aperture 5453, and then the bracket assembly 5500 is move upwardly to engage the first and second mounting elements 5502, 5503 with the first and second closed-geometry edges 5452, 5454 of the mounting plate 5450. As best seen in FIG. 46B, when the bracket assembly 5500 is coupled to the support structure 5400, the vertical portion 5520 of the bracket assembly 5500 is aligned with the vertical centerline U-U of the support structure 5400.

In this embodiment, the bracket assembly 5500 is also illustrated with a locking feature 5530 to lock the bracket assembly 5500 to the support structure 5400 once the mounting elements 5502, 5503 are coupled to the mounting plate 5450. In that regard, the locking feature 5530 might be a hook that can be snapped or bent over the profile of the support structure 5400 to create a more secure connection between the bracket assembly 5500 and the support structure 5400.

Thus, the bracket assembly 5500 works in a similar manner to the previously described bracket assemblies except that it is a single component that is located in alignment with the vertical centerline of the support structure to which it is coupled rather than having two components located on opposite sides of the vertical centerline of the support structure. This design eliminates material and might result in a cost-savings.

Figure 46C:
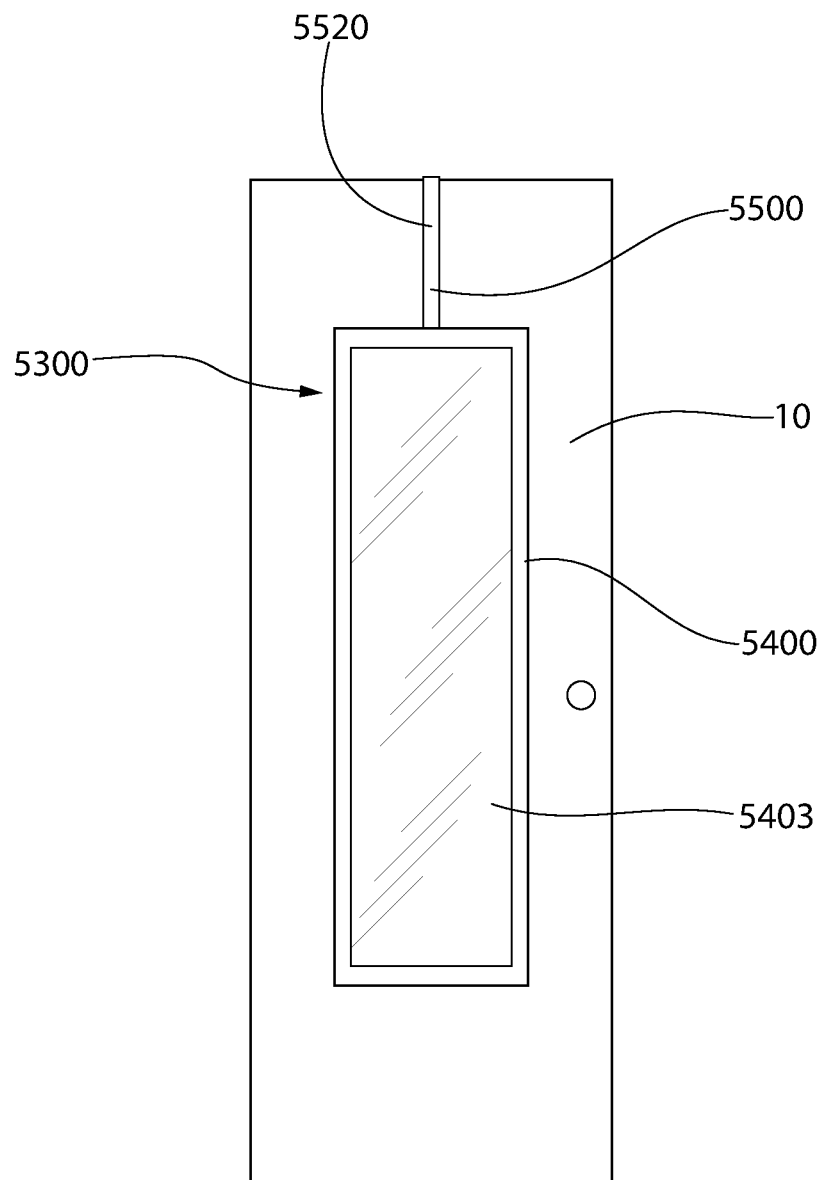
FIG. 46C is a front view of the over-the-door hanging apparatus of FIG. 46B hanging from a door.

Referring to FIG. 46C, the over-the-door hanging apparatus 5300 is illustrated being supported by a door 10. The bracket 5521 engages the top edge of the door and the support structure 5400 hangs from the bracket assembly 5500. As with the previous embodiments, in this embodiment the support structure 5400 supports a mirror 5403, although the invention is not to be so limited and other items might be supported by the support structure 5400 such as a chalk board, a poster board, a cork board, a white board, a poster, or the like.

Referring to FIGS. 47 and 47A, a bracket assembly 5600 for hanging an article from a door is illustrated. The bracket assembly 5600 comprises an elongate member 5610 comprising a front surface 5611 and a rear surface 5612. A plurality of mounting elements 5620 extend from the front surface 5611 and a bracket 5630 extends from the rear surface 5612. The bracket 5630 is configured to hang the bracket assembly 5600 from the top edge of a door as has been previously described herein. The mounting elements 5620 are configured to couple the bracket assembly 5600 to a support structure, such as a support structure that supports a mirror, a chalkboard, a poster board, a cork board, a white board, or the like.

The elongate member 5610 is similar to one of the elongate members 151 described above with reference to FIGS. 3A and 3B except that the structure of the mounting elements 5620 is different than the shape of the hooks 161, 162. The mounting elements 5620 may still be considered hooks, but they have a different shape than the hooks 161 of the embodiment described earlier in this document. Specifically, in this embodiment the mounting elements 5620 are wedge-shaped elements. The benefit of this shape is that the mounting elements 5620 will tighten the bracket assembly 5600 onto the support structure as the two are slid together. This will help create tension to better secure the support structures and the mirrors or other items that they support against wiggling and rattling.

Each of the mounting elements 5620 extends from a first end 5621 that is coupled directly to the front surface 5611 of the elongate member 5610 to a second end 5622, the second end 5622 being spaced apart from the front surface 5611 of the elongate member 5610 and forming a free end of the mounting element 5620. Each of the mounting elements 5620 is wedge-shaped such that the first end 5621 of the mounting elements 5620 that is coupled directly to the front surface 5611 of the elongate member 5610 is wider than the terminal or free end of the mounting elements 5620. Furthermore, in some embodiments the front surface 5611 of the elongate member 5610 may lie on a plane T-T.

The mounting elements 5620 may extend from the front surface 5611 in a manner such that the distance D between the plane T-T and the mounting elements 5620 measured in a direction perpendicular to a longitudinal axis of the elongate member 5610 increases with distance from the free end of the mounting elements 5620 towards the point of connection between the mounting elements 5620 and the front surface 5611 of the elongate member 5610. More specifically, in the exemplified embodiment the mounting elements 5620 have a first portion 5625 that includes the first end 5621 and a second portion 5626 that extends from the first portion 5625 to the second end 5622. The first portion 5625 extends obliquely to the plane T-T in a direction away from the front surface 5611 of the elongate member 5610. The second portion 5626 extends obliquely from the first portion 5625 in a direction back towards the front surface 5611 of the elongate member 5610. Thus, for each of the mounting elements 5620, the second free end 5622 is located closer to the front surface 5611 of the elongate member 5610 than the portion of the mounting elements 5620 that is located at the intersection or junction of the first and second portions 5625, 5626.

Figure 48:
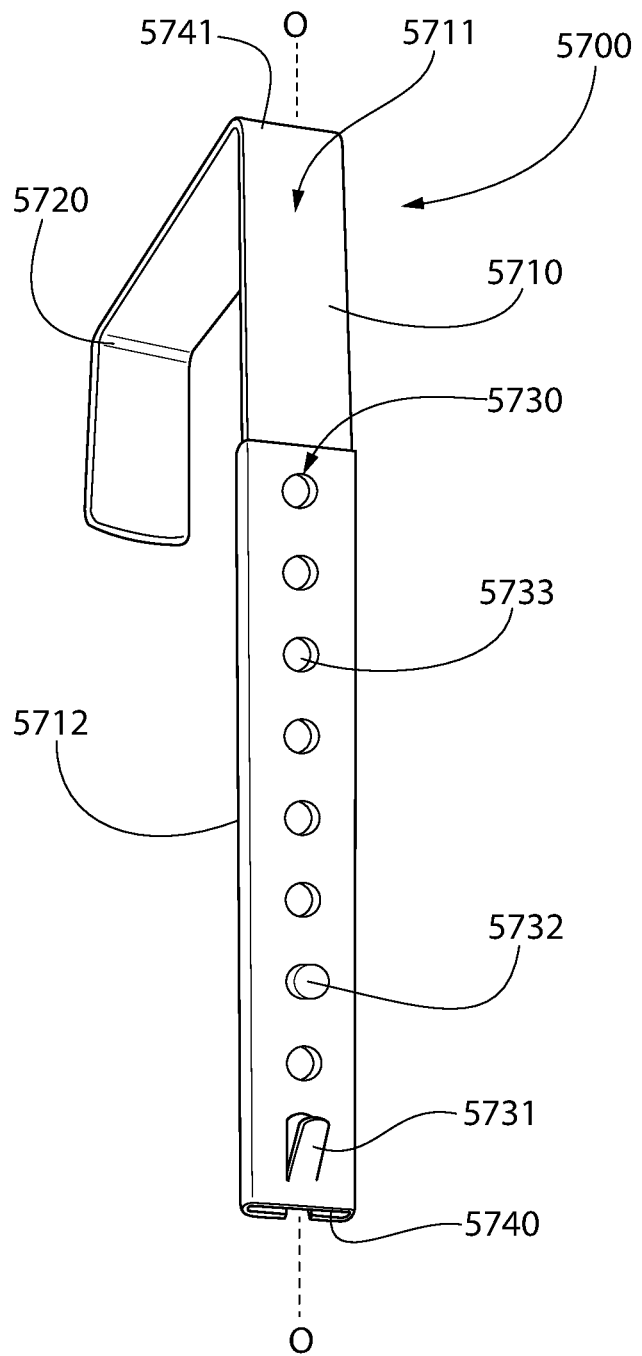
FIG. 48 is a perspective view of a portion of a bracket assembly in accordance with another embodiment of the present invention.

Referring to FIG. 48, yet another embodiment of a bracket assembly 5700 for hanging an article from a door is illustrated. The bracket assembly 5700 comprises an elongate member 5710 having a front surface 5711 and an opposite rear surface 5712. The bracket assembly 5700 may include more than one of the elongate members 5711 in some embodiments as should be appreciated from a full reading of this document. The bracket assembly 5710 comprises a bracket 5720 for hanging the bracket assembly 5710 from the top edge of a door and a plurality of mounting elements 5730 for coupling the bracket assembly 5710 to a support structure as has been described in detail herein.

In this embodiment, the bracket assembly 5700 is intended to be a universal bracket assembly so that it can be coupled to support structures having different coupling components, mounting plates, or the like. In that regard, the mounting elements 5730 of the bracket assembly 5700 comprises at least one hook 5731 extending from the front surface 5711 of the elongate member 5710, at least one protuberance 5732 having a different shape than the hook 5731 extending from the front surface 5711 of the elongate member 5710, and at least one aperture 5733 formed through the elongate member 5710. In this embodiment there are multiple apertures 5733 and only one hook 5731 and one protuberance 5732, but the invention is not to be so limited in all embodiments and variations in the number of apertures, protuberances, and hooks may be used in alternative embodiments.

The elongate member extends from a first end 5740 to a second end 5741 along a longitudinal axis O-O. In the exemplified embodiment, the hook 5731 is located adjacent the first end 5740 of the elongate member 5710 such that no mounting elements exist between the hook 5731 and the first end 5740 of the elongate member 5710. Of course, the specific locations along the first elongate member 5710 at which the various hooks 5731, protuberances 5732, and apertures 5733 are located may be modified from that which is shown in FIG. 48.

Figure 49A:
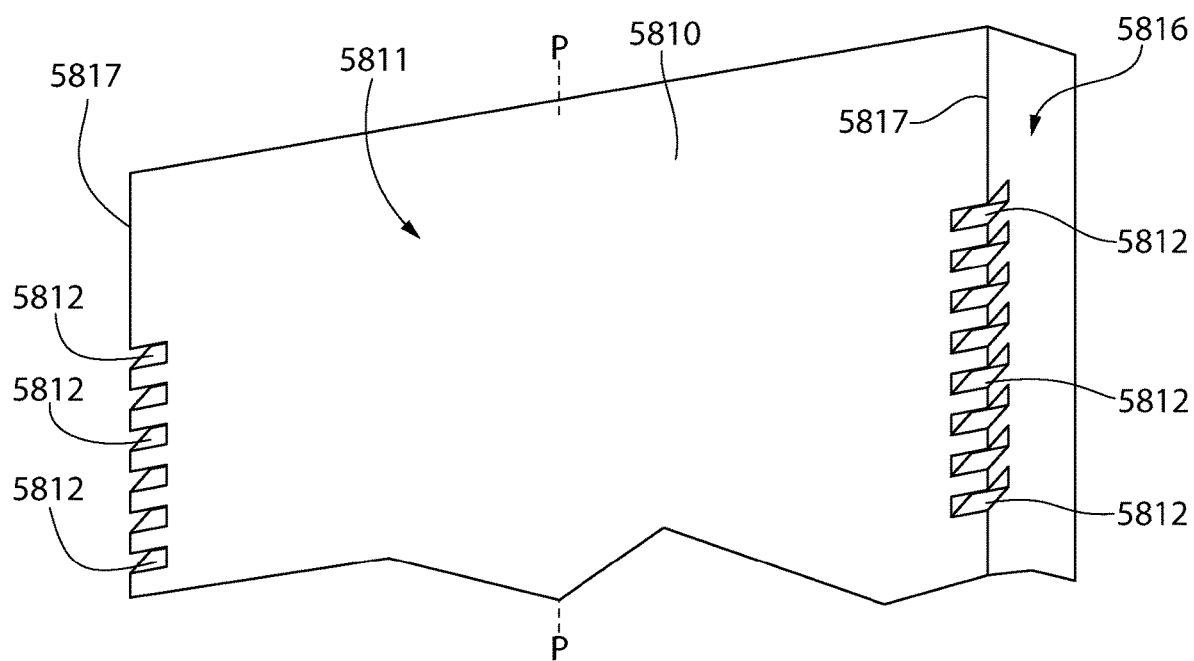
FIG. 49A is a perspective view of a support structure in accordance with an embodiment of the present invention.
Figure 49B:
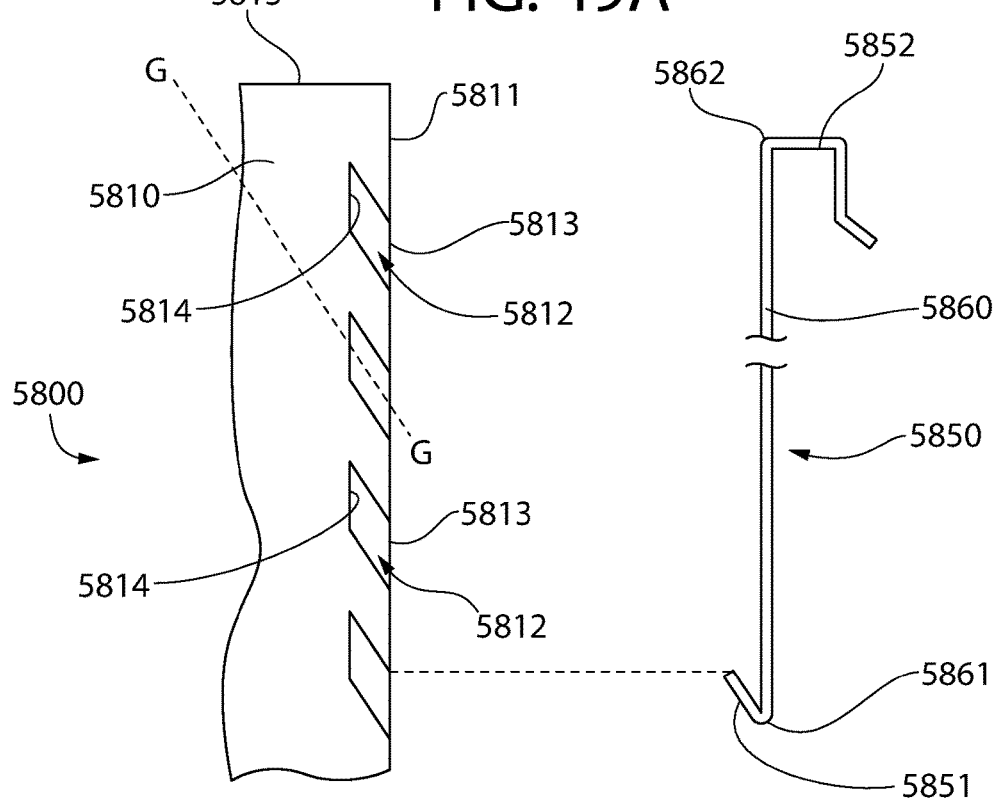
FIG. 49B is an exploded side view illustrating the manner in which a bracket assembly is coupled to the support structure of FIG. 49A.
Figure 49C:
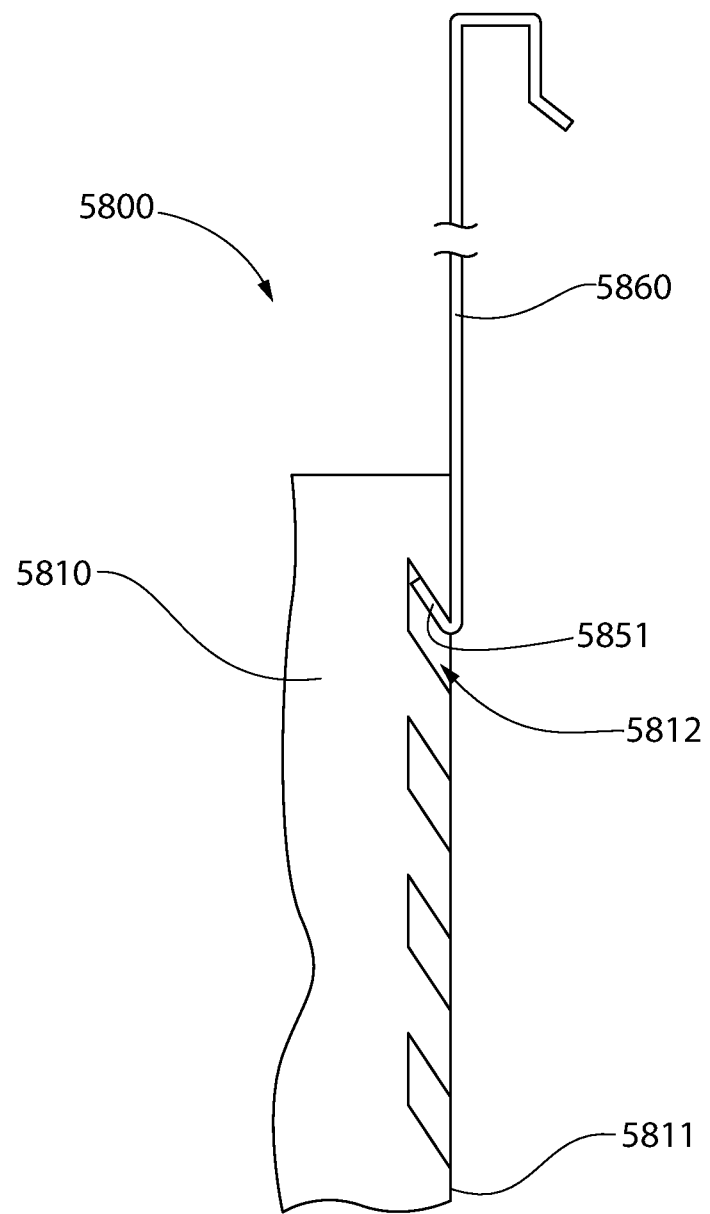
FIG. 49C is a side view illustrating the bracket assembly coupled to the support structure of FIGS. 49A and 49B.

Referring to FIGS. 49A-49C, another embodiment of an over-the-door hanging apparatus 5800 will be described. The over-the-door hanging apparatus 5800 generally comprises a support structure 5810 having a rear surface 5811 and a bracket assembly 5850 configured to hang the support structure 5810 from the top edge of a door. The support structure 5810 may support a mirror, chalkboard, poster board, cork board, white board, or the like as previously described. In this embodiment, the bracket assembly 5850 comprises at least one elongate member 5860 having at least one mounting element 5861 for coupling the bracket assembly 5850 to the rear surface 5811 of the support structure 5810 and at least one bracket 5852 configured to engage the top edge of the door. Although only a single elongate member 5860 is depicted, it should be appreciated that two of the elongate members 5860 are preferably included in the bracket assembly 5850 as with the previously described embodiments. In such an embodiment each of the elongate members 5860 has at least one mounting element 5851 and at least one bracket 5852. In this manner, the elongate members 5860 are coupled to the rear surface 5811 of the support structure 5810 on opposite sides of a vertical centerline P-P of the support structure 5810.

Thus, the bracket assembly 5850 has a similar structure to the bracket assembly 150 described previously with specific reference to FIGS. 1-6 and the elongate members 5860 have a similar structure to the elongate members 151, 251 previously described with reference to FIGS. 1-6. The elongate member 5860 extends from a first end 5861 to a second end 5862. In the exemplified embodiment, there is only one mounting element 5851 and it is located at the first end 5861 of the elongate member 5860 while the bracket 5852 is located at the second end 5862 of the elongate member 5860. However, the invention is not to be so limited in all embodiments and there could be additional mounting elements positioned along the elongate member 5860. In some embodiments, the elongate member 5860 may have an identical structure to the elongate members 151, 251. In the exemplified embodiment, the at least one mounting element 5851 is a hook and the at least one bracket 5852 is a U-shaped member.

The main difference in this embodiment is that there is no plate secured to the rear surface 5811 of the support structure 5810. Instead, at least one groove 5812 is formed directly into the rear surface 5811 of the support structure 5810. In the exemplified embodiment, there are eight grooves 5812 located on the first side of the vertical centerline P-P and eight grooves 5812 located on the second side of the vertical centerline P-P (only six of the eight grooves 5812 on the second side of the vertical centerline P-P are visible in the view provided in FIG. 49A). Of course, more or less than eight grooves may be used in other embodiments. For example, the spacing between the grooves may be modified relative to that which is shown in the exemplified embodiment. Furthermore, the grooves 5812 may be formed into the rear surface 5811 of the support structure 5810 along the entire length of the support structure 5810 in some embodiments or along only a portion of the length of the support structure 5810 in other embodiments.

Each of the grooves 5812 extends from an opening 5813 in the rear surface 5811 of the support structure 5810 to a floor 5814. Furthermore, each of the grooves 5812 extends along a groove axis G-G that is oblique to the rear surface 5811 of the support structure 5810. As a result of the angle at which the grooves 5812 are formed into the rear surface 5811 of the support structure 5810, the floor 5814 of each groove 5812 is located closer to a top edge 5815 of the support structure 5810 than the opening 5813 of that groove 5812. Thus, the grooves 5812 are angled upwardly towards the top edge 5815 of the support structure 5810 with increasing distance from the opening 5813 to the floor 5814. Stated another way, the groove axis G-G gets closer to the top edge 5815 of the support structure 5810 the further it extends from the rear surface 5811 of the support structure towards the front surface of the support structure 5810.

Referring to FIG. 49C, when the bracket assembly 5850 is coupled to the support structure 5810, the at least one mounting element 5851 of the bracket assembly 5850 nests within the at least one groove 5812. Because there are multiple grooves 5812 and a single mounting element 5851 in the exemplified embodiment, the bracket assembly 5850 may be coupled to the support structure 5810 at different locations by inserting the mounting element 5851 into different ones of the grooves 5812. This can be done to adjust the hanging height of the support structure 5810 when it is hung from a door using the bracket assembly 5850.

In the assembled state, the support structure 5810 hangs from the mounting element 5851 of the bracket assembly 5850. Furthermore, the bracket 5852 of the bracket assembly 5850 may slidably engage the top edge of a door to hang the support structure 5810 from the door. Thus, with the bracket 5852 positioned over the top edge of a door and the mounting element 5851 of the bracket assembly 5850 nesting within one of the grooves 5812 of the support structure 5810, the support structure 5810 is supported by or hung from the door.

As noted above, in certain embodiments the bracket assembly 5850 comprises two of the elongate members 5860 each having a bracket 5852 and at least one mounting element 5851. Furthermore, the support structure 5810 may comprise a first set of grooves 5812 located on a first side of the longitudinal centerline P-P and a second set of grooves 5812 located on a second side of the longitudinal centerline P-P. A first one of the elongate members 5860 may have its at least one mounting element 5851 nest within one of the first set of grooves 5812 and a second one of the elongate members 5860 may have its at least one mounting element 5851 nest within one of the second set of grooves 5812 while the brackets 5852 of both of the first and second ones of the elongate members 5860 engage the top edge of the door.

Figure 50:
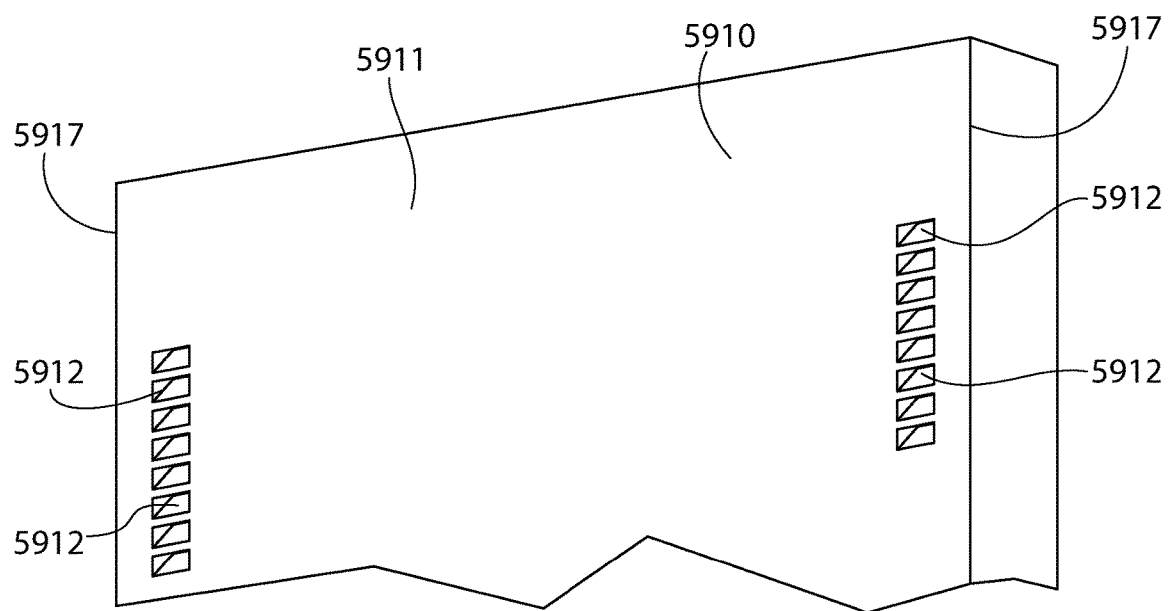
FIG. 50 is a perspective view of a support structure in accordance with another embodiment of the present invention.

In the embodiment of FIGS. 49A-49C, the grooves 5812 are located on the rear surface 5811 of the support structure 5810 along the oppositely positioned vertical edges 5817 of the rear surface 5811 of the support structure 5810. Thus, there is an opening into the grooves 5812 located along a peripheral edge 5816 of the support structure 5810. However, as shown in FIG. 50 this is not required in all embodiments and in an alternative embodiment the grooves 5912 may be inwardly offset from the vertical edges 5917 of the rear surface 5911 of the support structure 5910. This alternative embodiment may be better served to ensure that the mounting elements 5851 do not become accidentally disengaged or un-nested from the grooves 5912 once the over-the-door hanging apparatus is fully assembled and coupled to or hanging from a door.

Figure 51:
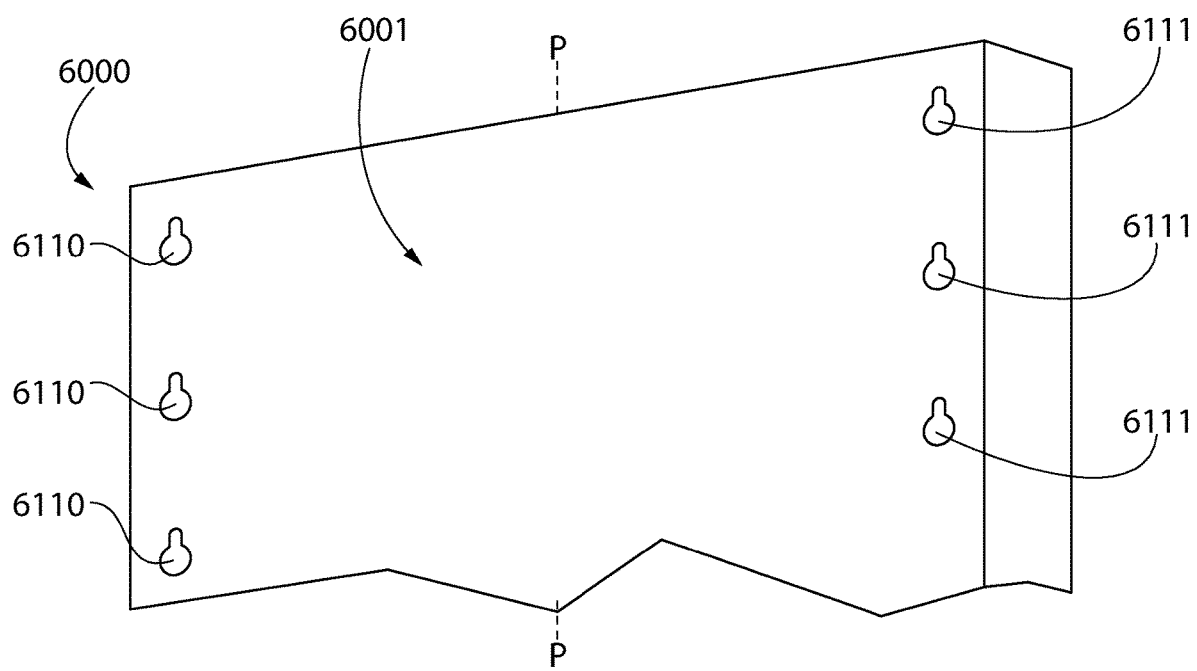
FIG. 51 is a perspective view of a support structure in accordance with yet another embodiment of the present invention.

FIG. 51 illustrates an alternative embodiment of a support structure 6000 that can be hung from a door using a bracket assembly comprising a pair of elongate members such as those depicted in FIGS. 18A and 18B. Again, in this embodiment there is no mounting plate secured to a rear surface 6001 of the support structure 6000. Rather, in this embodiment there is at least one multi-width slot 6110 formed into the rear surface 6001 of the support structure 6000. More specifically, in the exemplified embodiment the support structure 6000 has a vertical centerline N-N, a first set of multi-width slots 6110 formed into the rear surface 6001 of the support structure 6000 on a first side of the vertical centerline N-N and a second set of multi-width slots 6111 formed into the rear surface 6001 of the support structure 6000 on a second side of the vertical centerline N-N.

As noted above, the bracket assembly may include two of the elongate members 851A described above with regard to FIGS. 18A and 18B. In that regard, the at least one mounting element of the bracket assembly may comprise hooks or flanged fasteners that are configured to engage with the multi-width slots 6110 to couple the bracket assembly to the support structure 6000. Specifically, the mounting element of the bracket assembly (i.e., one of the flanged fasteners or hooks 881-883) may nest within one of the multi-width slots 6110, 6111 to couple the bracket assembly to the support structure 6000. The bracket assembly preferably includes two of the elongate members 851A such that the mounting element of one of the elongate members 851A nests within one of the multi-width slots 6110 while the mounting element of the other one of the elongate members 851A nests within one of the multi-width slots 6111. Furthermore, a bracket of the bracket assembly will engage a top edge of a door to hang the support structure 6000 from the door as has been described herein with reference to the embodiments previously described.

FIGS. 52-58 illustrate a hanging apparatus 6100 in accordance with another embodiment of the present invention. The hanging apparatus 6100 is similar to the over-the-door hanging apparatus 4700 depicted in FIGS. 40B and 42 and similar features will be readily recognized. Furthermore, there is a great deal of overlap between the hanging apparatus 6100 of FIGS. 52-58 and the over-the-door hanging apparatuses that have been described previously in this application, and thus certain features of the hanging apparatus 6100 will not be described in great detail herein, it being understood that the description of the previously embodiments above is applicable. For example, the manner in which the bracket assembly is coupled to the support structure will not be described in great detail with regard to this particular embodiment because this is similar in this embodiment as in those previously described. The hanging apparatus 6100 may be an over-the-door hanging apparatus in some embodiments, although this is not required in all embodiments and the hanging apparatus 6100 may be intended for hanging from a wall or door without being over-the-door in other embodiments.

Figure 52:
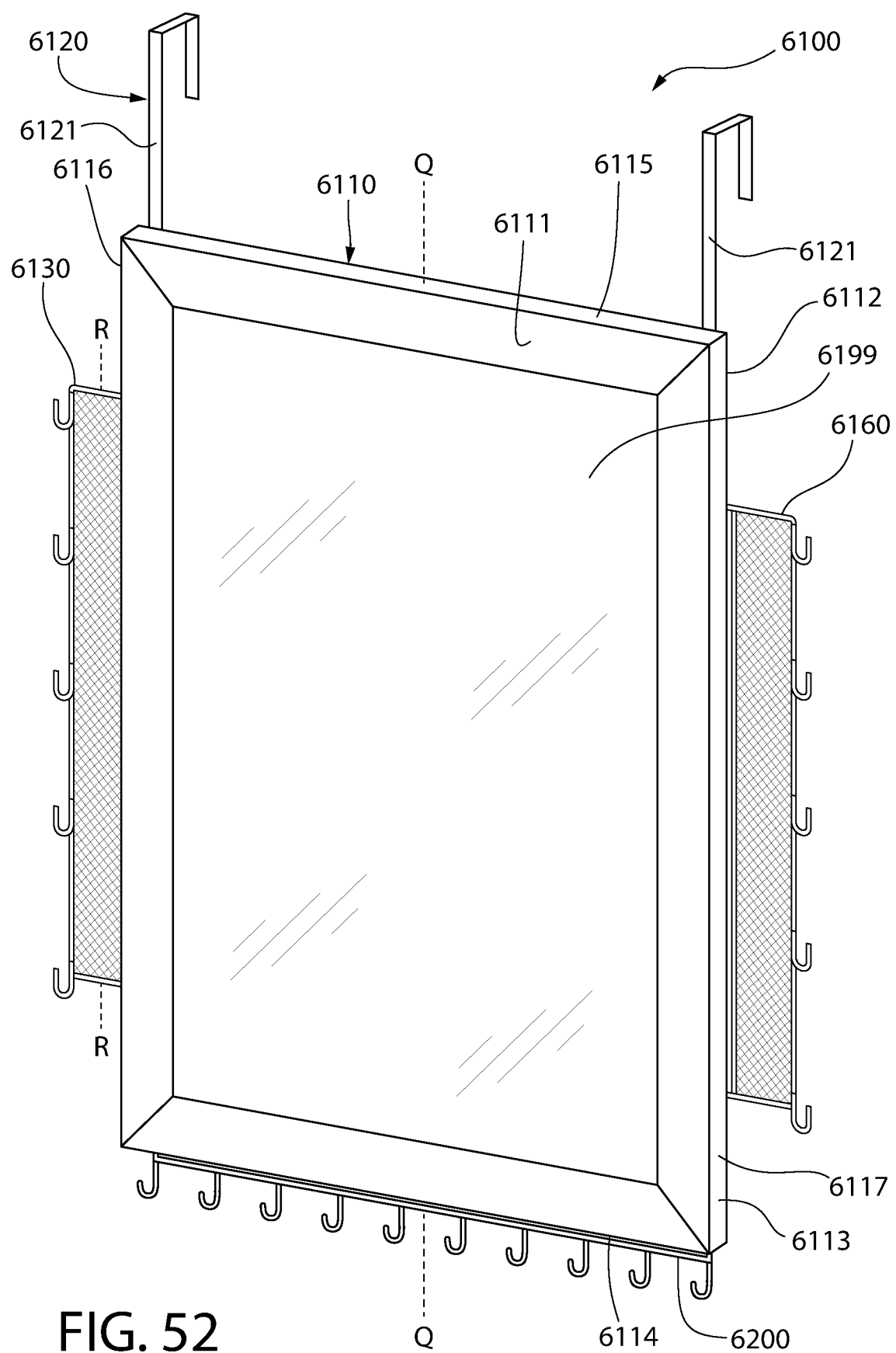
FIG. 52 is a perspective view of an over-the-door hanging apparatus in accordance with another embodiment of the present invention.

Referring to FIG. 52, the hanging apparatus 6100 comprises a support structure 6110, a bracket assembly 6120, and first, second, and third accessory units 6130, 6160, 6200. In the exemplified embodiment, the support structure 6110 and the bracket assembly 6120 are the same as those that have been described previously, and thus a detailed description of those components is not being provided here in the interest of brevity. However, the invention is not to be so limited in all embodiments and in other embodiments the bracket assembly 6120 may take on other structural forms, such as being a standard wire hanger, a sawtooth hanger, an aperture, or any other structure that may facilitate the hanging of the support structure 6100 from a surface such as a wall or a door.

In embodiments whereby the bracket assembly 6120 that is identical to the bracket assemblies described above is used, the above description is applicable for the manner in which the bracket assembly 6120 is coupled to the support structure 6110 and can be used to hang the support structure from a door. Briefly, the support structure 6110 comprises a front surface 6111, a rear surface 6112 opposite the front surface 6111, and a perimetric edge (also referred to as an outer edge) 6113 extending between the front and rear surfaces 6111, 6112. The perimetric edge 6113 forms an outer boundary of the support structure 6110 and generally defines the shape of the support structure 6110. The support structure 6110 may be a rigid structure in some embodiments, although this is not required in all embodiments.

The perimetric edge 6113 of the support structure 6110 may comprise a bottom edge 6114, a top edge 6115 opposite the bottom edge 6114, a first lateral edge 6116, and a second lateral edge 6117 opposite the first lateral edge 6116 with each of the first and second lateral edges 6116, 6117 extending between the bottom and top edges 6114, 6115. The support structure 6110 comprises a longitudinal axis Q-Q that extends between and intersects the bottom and top edges 6114, 6115. In the exemplified embodiment the support structure 6110 has a square or rectangular shape. Of course, the invention is not to be so limited in all embodiments and the support structure 6110 may be a circular shape or a polygonal shape that is not square/rectangular.

Furthermore, the support structure 6110 may support an item 6199 that is desired to be displayed in a particular location. The item 6199 may be coupled to the support structure 6110 using fasteners, adhesive, tape, glue, hook-and-loop, mechanical fasteners, hardware, locking tabs, mechanical interaction, or in any other manner. In the exemplified embodiment, the item 6199 is a mirror that is supported by the support structure 6110 so as to be exposed at the front surface 6111 of the support structure 6110. However, the item 6199 need not be a mirror in all embodiments and could be a chalkboard, a white board, a cork board, or any other item that is desired to be displayed in the manner described herein. In some embodiments the item 6199 may be a photograph, a poster, or the like that is intended for display via hanging the support structure 6110 on a wall or a door.

In the exemplified embodiment, the hanging apparatus 6100 also comprises a bracket assembly 6120 detachably coupled to the support structure 6610. In the exemplified embodiment, the bracket assembly 6120 is identical to the bracket assembly 150 described above with reference to FIGS. 1-11. Thus, the bracket assembly 6120 is configured to be detachably coupled to the support structure 6110 and the bracket assembly 6120 is configured to engage a top edge of a door to hang the support structure 6110 from the door. However, the invention is not to be so limited in all embodiments. Specifically, in this embodiment the invention is not necessarily limited to the manner in which the bracket assembly 6120 is coupled to the support structure 6110 or in the manner in which the bracket assembly 6120 hangs or supports the support structure 6110 from a surface. Thus, although the use of mounting plates on the support structure 6110 as mounting elements that interact with mounting elements of the bracket assembly has been previously described, this is not required in all embodiments and variations to these techniques may be used as would be appreciated by persons skilled in the art.

Furthermore, in some embodiments the bracket assembly 6120 may be non-detachably coupled to the support structure 6110. Moreover, although in the exemplified embodiment the bracket assembly 6120 comprises two elongate bracket members 6121, 6122 that are identical to the elongate bracket members 151 previously described, the invention is not to be so limited in all embodiments. The bracket assembly 6120 may be configured to hang the support structure 6110 from a wall rather than from a door, or the bracket assembly 6120 may be configured to hang the support structure 6110 from a wall without requiring the bracket assembly 6120 to engage the top edge of the door. Thus, in some embodiments the bracket assembly may be a standard wall hanging bracket assembly, such as a sawtooth hanger, a wire, or the like commonly found on picture frames that are configured to be hung from a wall by a screw, a nail, or the like. Thus, although referred to as a hanging apparatus 6100, in some embodiments it may just be an apparatus without there being a requirement that it be configured to hang from a door.

In addition to the above features, the hanging apparatus 6100 also comprises at least one accessory unit that is detachably coupled to the support structure 6300. In the exemplified embodiment, the at least one accessory unit comprises a first accessory unit 6130, a second accessory unit 6160, and a third accessory unit 6200. In the exemplified embodiment, each of the first, second, and third accessory units 6130, 6160, 6200 are separate components from one another, from the support structure 6110, and from the bracket assembly 6120 such that each of the first, second, and third accessory units 6130, 6160, 6200 is separately detachably coupled to the support structure 6110. Although FIG. 52 illustrates each of the first, second, and third accessory units 6130, 6160, 6200 coupled to the support structure 6100, any of one or more of the first, second, and third accessory units 6130, 6160, 6200 may be coupled to the support structure 6100 at any given time. Thus, depending on space constraints or desired use, the end-user can detachably couple just the third accessory unit 6200 to the support structure 6110 but not the first and second accessory units 6130, 6160, or the end-user may detachably couple just the first and second accessory units 6130, 6160 to the support structure 6110 but not the third accessory unit 6200, or the end-user may detachably couple the first and third accessory units 6130, 6200 to the support structure 6110 but not the second accessory unit 6160, or the second and third accessory units 6160, 6200 to the support structure 6110 but not the first accessory unit 6130.

Figure 53:
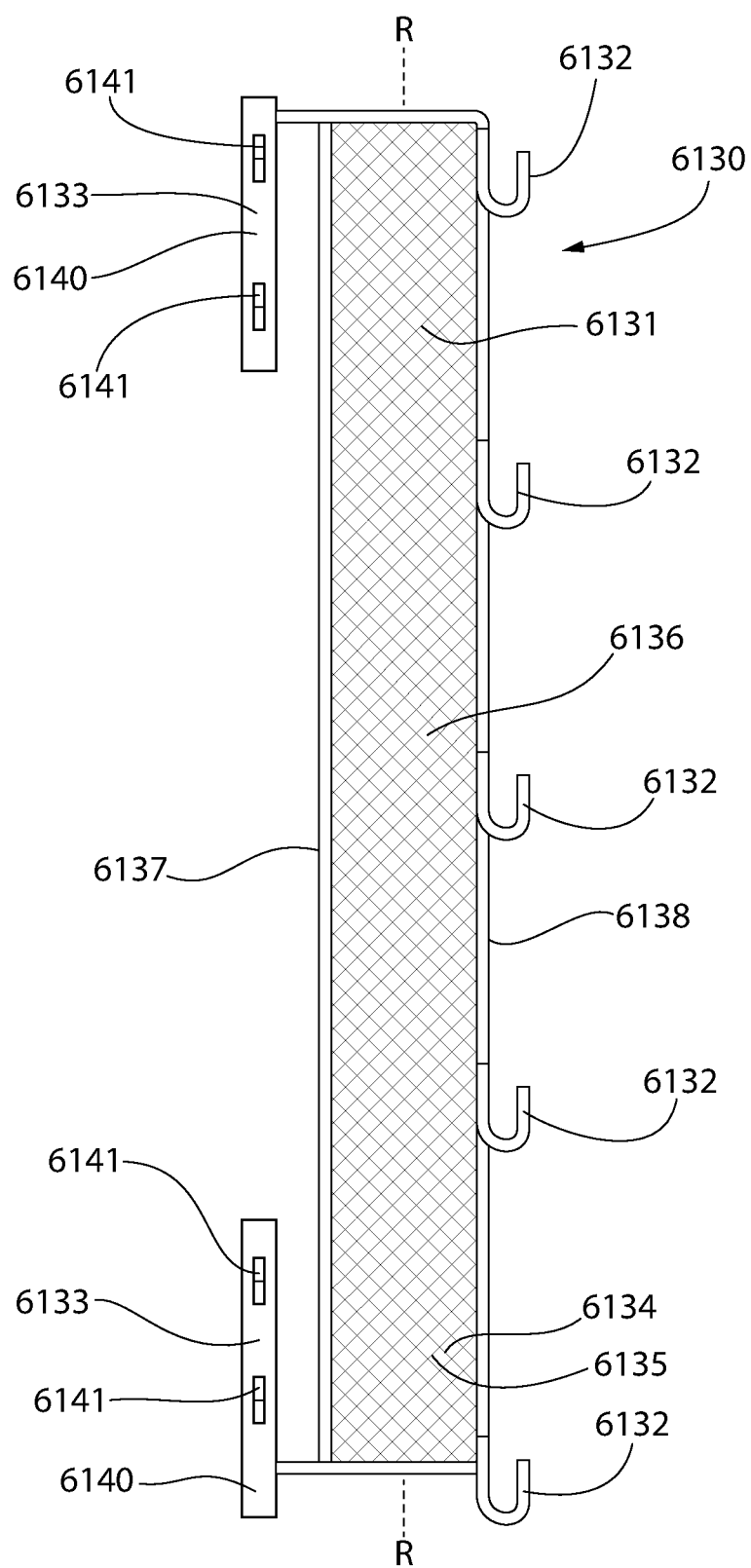
FIG. 53 is a front view of an accessory unit including a mesh portion and a plurality of hooks in accordance with an embodiment of the present invention.

Referring to FIGS. 52 and 53, the first accessory unit 6130 will be described in greater detail. In the exemplified embodiment, the second accessory unit 6160 is identical to the first accessory unit 6130 except with regard to the configuration of its mounting elements, which merely aids in ensuring that the first accessory unit 6130 is configured to be attached to the support structure 6100 on one side of the longitudinal axis Q-Q while the second accessory unit 6160 is configured to be attached to the support structure 6100 on the other side of the longitudinal axis Q-Q, as shown in FIG. 52. Thus, only the first accessory unit 6130 will be described herein, it being understood that the second accessory unit 6160 has the same features and is basically identical.

The first accessory unit 6130 is elongated along an axis R-R such that when the first accessory unit 6130 is coupled to the support structure 6100, the axis R-R is parallel to the longitudinal axis Q-Q. The first accessory unit 6130 comprises a mesh portion 6131 and a plurality of hooks 6132 for holding and/or storing personal items of a user, and at least one mounting element 6133 for coupling the first accessory unit 613 to the support structure 6100. In the exemplified embodiment, the first accessory unit 6130 is a monolithic component. However, the invention is not to be so limited in all embodiments and the first accessory unit 6130 could comprise multiple components that are coupled together in other embodiments. In the exemplified embodiment, the first accessory unit 6130 is formed from metal, although plastic and other rigid materials could also be suitable.

In the exemplified embodiment, the mesh portion 6131 of the first accessory unit 6130 is a wire mesh that comprises a first set of parallel strands 6134 and a second set of parallel strands 6135, the second set of parallel strands 6135 being orthogonal to the first set of parallel strands 6134. Thus, a plurality of openings 6136 are formed in the spaces between the first and second sets of parallel strands 6134, 6135. However, it should be appreciated that the invention is not to be so limited in all embodiments. Specifically, the mesh portion 6131 need not be a wire mesh in all embodiments and it should not be limited to being of such a structure. In other embodiments, the mesh portion 6131 of the first accessory unit 6130 could be formed from a fabric, a screen, or the like that is attached to a support portion of the first accessory unit 6130. In other embodiments, the mesh portion 6131 may be formed from fibers that extend in a desired pattern to facilitate the coupling of personal effects thereto. The mesh portion 6131 may in some embodiments be any structure configured to hold or store personal effects of a user. For example, a user may store earrings on the mesh portion 6131 of the first accessory unit 6130. In some embodiments, the mesh portion 6131 may be formed of metal and the user may secure items to the mesh portion 6131 using a magnet.

In some alternative embodiments, the mesh portion 6131 may be replaced with a different structure, such as ornamental features or features that extend horizontally to support a personal effect or other user item. Thus, the invention is not limited to the first accessory unit 6130 comprising the mesh portion 6131 unless specifically claimed as such.

In the exemplified embodiment, the mesh portion 6131 comprises a first edge 6137 and a second edge 6138. When the first accessory unit 6130 is coupled to the support structure 6110 as shown in FIG. 52, the first edge 6137 of the mesh portion 6131 is adjacent to and extends in the same direction as the first lateral edge 6116 of the support structure 6110 and the second edge 6138 of the mesh portion 6131 is spaced apart from the first lateral edge 6116 of the support structure 6110. Furthermore, in the exemplified embodiment each of the plurality of hooks 6132 extends from the second edge 6138 of the mesh portion 6131. Of course, the hooks 6132 could extend along the first edge 6137 of the mesh portion 6131 instead in other embodiments. In the exemplified embodiment, the hooks 6132 are positioned in a vertically or axially spaced apart manner along the second edge 6138 of the mesh portion.

The hooks 6132 may extend in a direction that is away from the front surface of the first accessory unit 6130, in a direction that is away from the rear surface of the accessory unit 6130, or in a direction that is away from the second edge 6138 of the mesh portion 6132 of the first accessory unit 6130. In the exemplified embodiment, there are five of the hooks 6132, although more or less than five hooks could be used in various embodiments. When assembled with the first accessory unit 6130 coupled to the support structure 6110, the mesh portion 6131 is located between the hooks 6132 and the support structure 6110 in the exemplified embodiment. Of course, other arrangements may be possible in alternative embodiments, such as the hooks 6132 being located between the mesh portion 6131 and the support structure 6110.

As mentioned above, the first accessory unit 6130 comprises a mounting element 6133 for detachably coupling the first accessory unit 6130 to the support structure 6100. In the exemplified embodiment, the mounting element 6133 comprises a mounting plate 6140 and one or more hook members 6141 protruding from the mounting plate 6140 and configured to engage a mounting element of the support structure 6110. In the exemplified embodiment, there are two of the mounting elements 6133, although in other embodiments just one of the mounting elements 6133 may be used. Moreover, the particular structure of the mounting elements 6133 provided in the drawings is merely exemplary in nature and is not intended to be limiting of the invention in all embodiments. In other embodiments, the mounting elements 6133 may be clips, clamps, barbs, threaded members, mechanical features, or the like that can couple the first accessory unit 6130 to the support structure 6110. As noted above, the second accessory unit 6160 may be a similar or identical structure to the first accessory unit 6130 with the only differences being those that enable the second accessory unit 6160 to be coupled to the support structure 6110 adjacent its second lateral edge 6117 rather than adjacent its first lateral edge 6116 if such a difference is necessary for such purpose.

Figure 54:
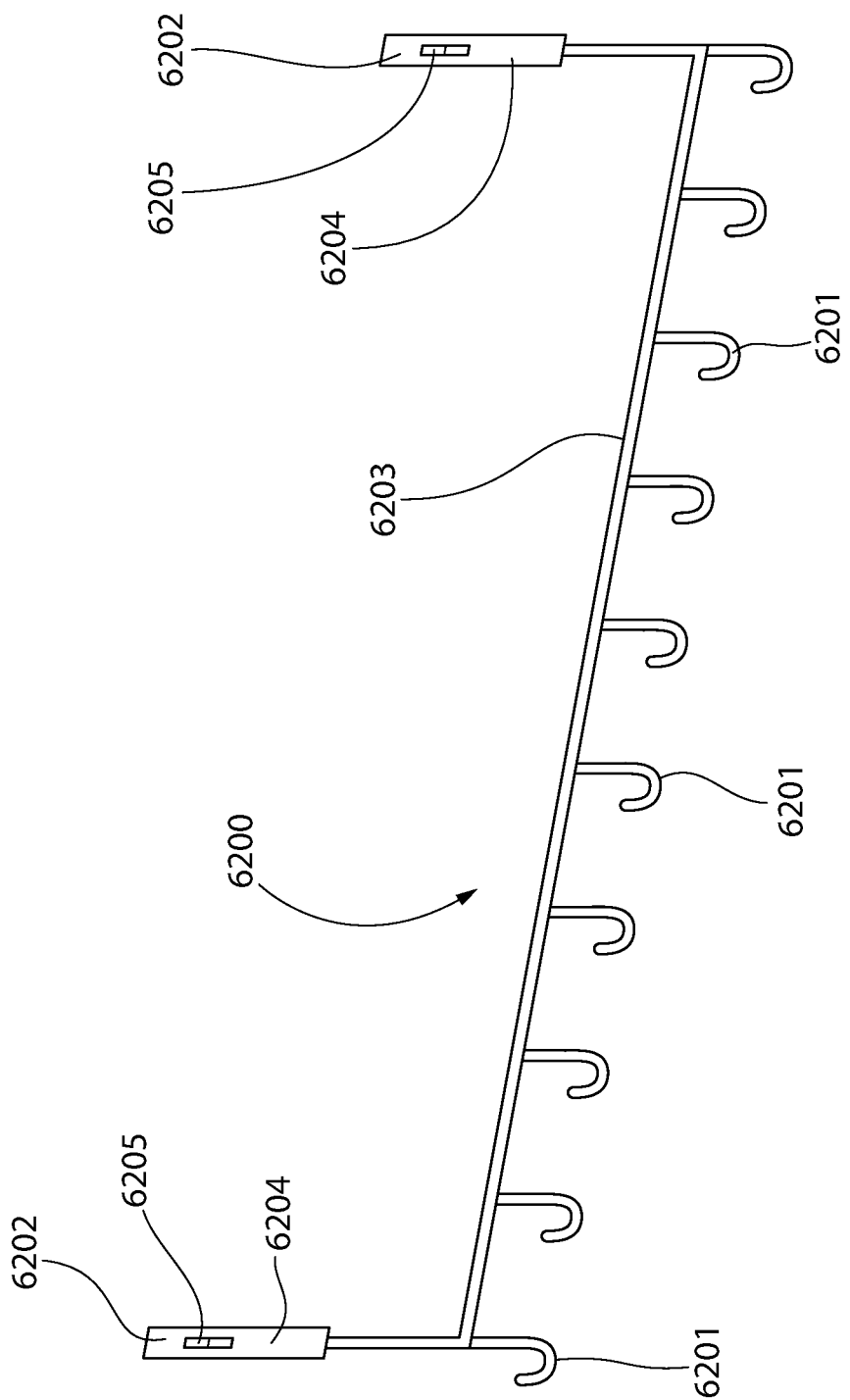
FIG. 54 is a perspective view of an accessory unit including a plurality of hooks in accordance with another embodiment of the present invention.

Referring to FIGS. 52 and 54, the third accessory unit 6200 will be described. The third accessory unit 6200 comprises a plurality of hooks 6201 and at least one mounting element 6202 for mounting the third accessory unit 6200 to the support structure 6110. The plurality of hooks 6201 extend from a horizontal bar 6203 that is located adjacent to the bottom edge 6114 of the support structure 6110 when the third accessory unit 6200 is coupled to the support structure 6110. In the exemplified embodiment, there are ten of the hooks 6201 positioned in a spaced apart manner along the horizontal bar 6203, although more or less than ten of the hooks 6201 may be included in various alternative embodiments.

In the exemplified embodiment, there are two of the mounting elements 6202, one on either end of the horizontal bar 6203, although a single mounting element 6202 or more than two mounting elements 6202 could be used in other embodiments. In the exemplified embodiment, each of the mounting elements 6202 comprises a mounting plate 6204 and a hook member 6205. Of course, other features such as any of those described herein can be used in place of the mounting elements 6202 in other embodiments so long as the third accessory unit 6200 is configured for detachable coupling to the support structure 6100. As will be described in greater detail below with reference to FIG. 56, the mounting elements 6202 interact with mounting elements on the support structure 6110 to facilitate coupling of the third accessory unit 6200 to the support structure 6110.

Figure 55:
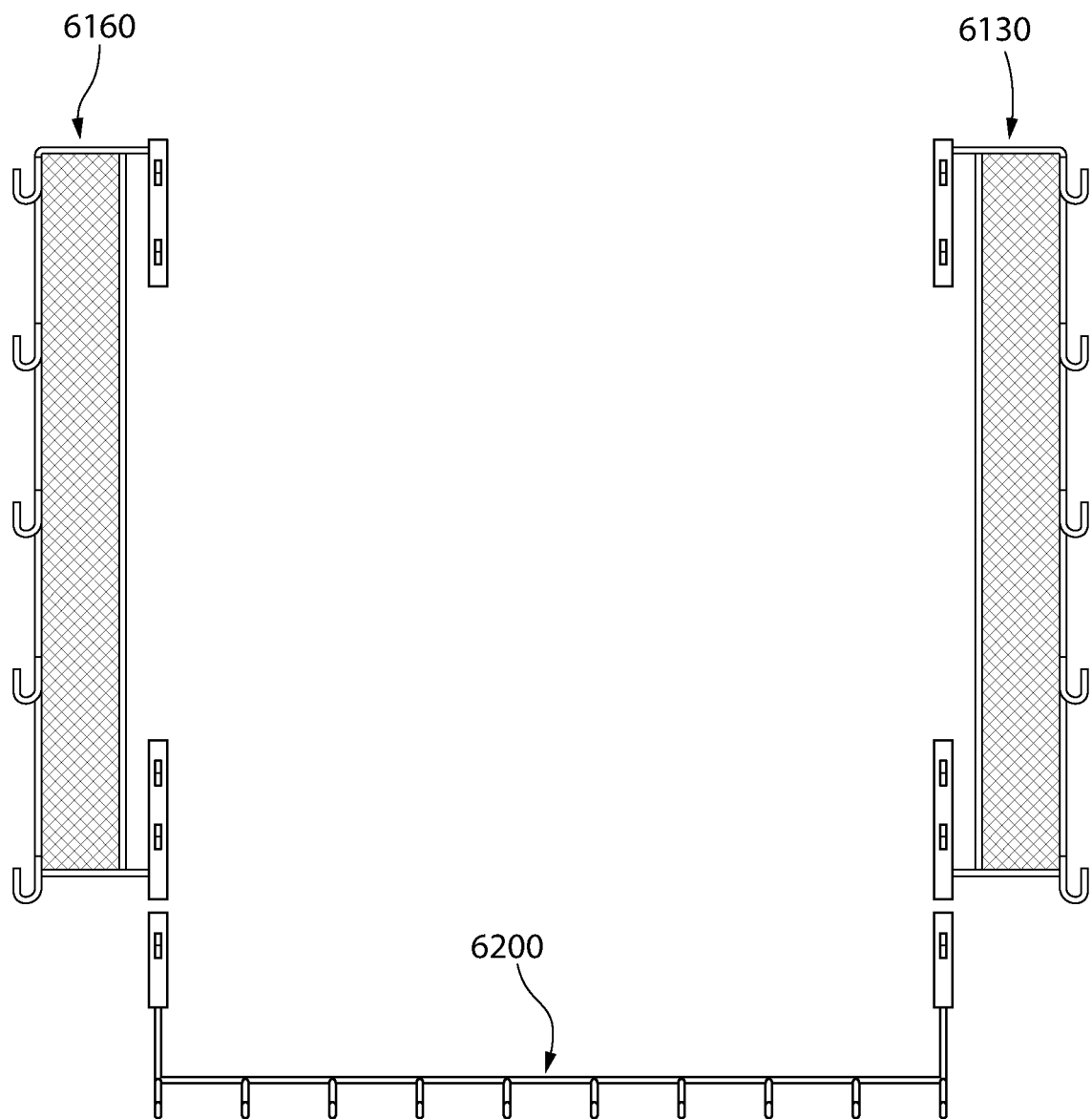
FIG. 55 is a front view of several accessory units of the over-the-door apparatus of FIG. 52.

FIG. 55 illustrates the first, second, and third accessory units 6130, 6160, 6200 oriented as they would be when coupled to the support structure 6110, although the support structure is not shown in FIG. 55. As can be seen, the first and second accessory units 6130, 6160 are elongated in a similar direction whereas the third accessory unit 6200 is elongated in a direction orthogonal to the first and second accessory units 6130, 6160. When the hanging apparatus 6100 is fully assembled, the first and second accessory units 6130, 6160 are adjacent to the first and second lateral sides 6116, 6117 of the support structure 6110 and the third accessory unit 6200 is adjacent to the bottom edge 6114 of the support structure 6110. Of course, each of the first, second, and third accessory units 6130, 6160, 6200 may be coupled to and decoupled from the support structure 6110 as desired so all of the accessory units 6130, 6160, 6200 need not be coupled to the support structure 6110 at the same time (although this is possible).

Figure 56:
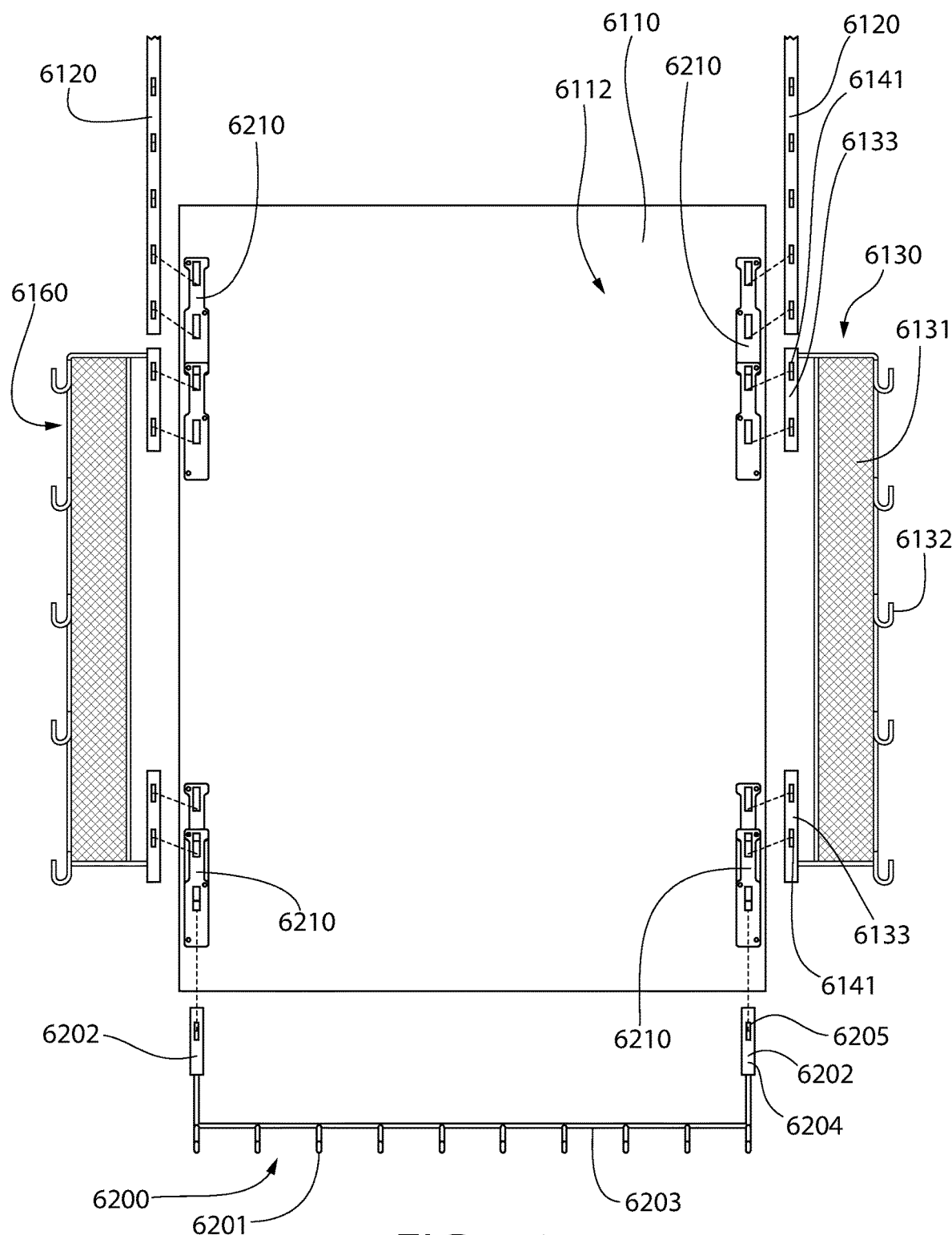
FIG. 56 illustrates a manner in which a bracket assembly and the accessory units may be coupled to a support structure of the over-the-door hanging apparatus of FIG. 52.

FIG. 56 illustrates the coupling of the bracket assembly 6120 and the first, second, and third accessory units 6130, 6160, 6200 to the support structure 6110. Thus, in FIG. 56 the rear surface 6112 of the support structure 6110 is depicted. In this embodiment, there are a plurality of mounting elements on the rear surface 6112 of the support structure 6110 configured to mate/interact with the mounting elements of the bracket assembly 6120 and the first, second, and third accessory units 6130, 6160, 6200 so all can be detachably coupled to the support structure 6110. In the exemplified embodiment, there are several mounting plates 6210 on the rear surface 6112 of the support structure 6110, with each of the mounting plates 6210 having one or more apertures therein that is aligned with a recess or opening in the rear surface 6112 of the support structure 6110.

Thus, the first and second accessory units 6130, 6160 can be detachably coupled to the support structure 6110 by inserting one or more of the hook members 6141 into the apertures in the mounting plates 6210 and sliding the accessory units 6130, 6160 downwardly relative to the support structure 6100. Similarly, the third accessory unit 6200 can be detachably coupled to the support structure 6110 by inserting the hook members 6205 into the apertures in the mounting plates 6210 and sliding the accessory unit 6200 downwardly relative to the support structure 6100. Of course, this is merely one embodiment, and other features may be used to facilitate the coupling between the first, second, and third accessory units 6130, 6160, 6200 and the support structure 6110. In the exemplified embodiment, there are enough mounting plate apertures on the rear surface 6112 of the support structure 6110 to enable all of the mounting elements 6141, 6205 of each of the first, second, and third accessory units 6130, 6160, 6200 and the mounting elements of the bracket assembly 6120 to be coupled to the support structure 6110 at the same time. Of course, FIG. 56 provides only one example of the manner in which the bracket assembly 6120 and the first, second, and third accessory units 6130, 6160, 6200 may be coupled to the support structure 6110. Any other techniques described herein may be used to couple the first, second, and third accessory units 6130, 6160, 6200 to the support structure 6110, such as the various techniques described herein for coupling the bracket assemblies to the support structures, and still fall within the scope of the invention described herein.

Figure 57:
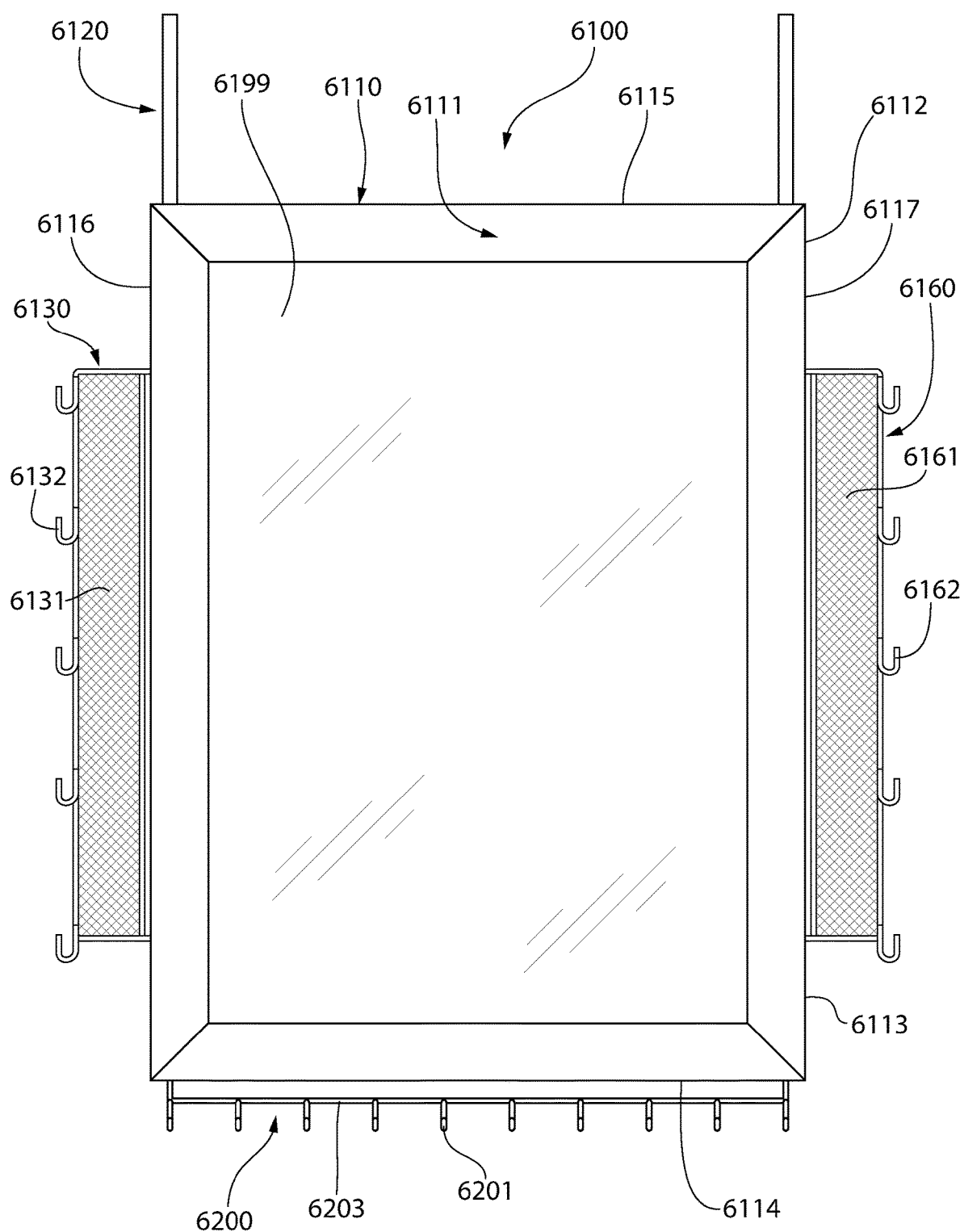
FIG. 57 is a front view of the over-the-door hanging apparatus of FIG. 52.

FIG. 57 illustrates a front view of the hanging apparatus 6100 with the bracket assembly 6120 and the first, second, and third accessory units 6130, 6160, 6200 coupled to the support structure 6110. The mounting elements of the bracket assembly 6120 and the first, second, and third accessory units 6130, 6160, 6200 are not visible because they are located on the rear surface 6112 of the support structure 6110. Thus, the bracket assembly 6120 and the first, second, and third accessory units 6130, 6160, 6200 may in some embodiments be coupled to the rear surface 6112 of the support structure 6110, although this is not required in all embodiments.

The first accessory unit 6130 is coupled to the support structure 6110 and positioned adjacent to and/or along the first lateral edge 6116 of the support structure 6110. Thus, the mesh portion 6131 of the first accessory unit 6130 is adjacent to and extends along the first lateral edge 6116 of the support structure 6110. The hooks 6132 of the first accessory unit 6130 then extend from the mesh portion 6131 in a direction away from the first lateral edge 6116 of the support structure 6110. The second accessory unit 6160 is coupled to the support structure and positioned adjacent to and/or along the second lateral edge 6117 of the support structure 6110. Thus, the mesh portion 6161 of the second accessory unit 6160 is adjacent to and extends along the second lateral edge 6117 of the support structure 6110. The hooks 6162 of the second accessory unit 6160 then extend from the mesh portion 6161 in a direction away from the second lateral edge 6117. The third accessory unit 6200 is coupled to the support structure 6110 and positioned adjacent to and/or along the bottom edge 6114 of the support structure 6110. The horizontal bar 6203 extends along the bottom edge 6114 and the hooks 6201 extend from the horizontal bar 6203 in a direction of the front surface 6111 of the support structure 6110.

In the exemplified embodiment, the first and second accessory units 6130, 6160 have a height that is less than a height of the support structure 6110. Thus, in the exemplified embodiment the first and second accessory units 6130, 6160 do not extend along the entirety of the first and second lateral sides 6116, 6117 of the support structure 6110. However, the invention is not to be so limited in all embodiments and the length/height of the first and second accessory units 6130, 6160 may be modified as desired. Similarly, the length of the third accessory unit 6200 may be modified to be greater or less than that which is depicted in the exemplified embodiment relative to the width of the support structure 6110.

Figure 58:
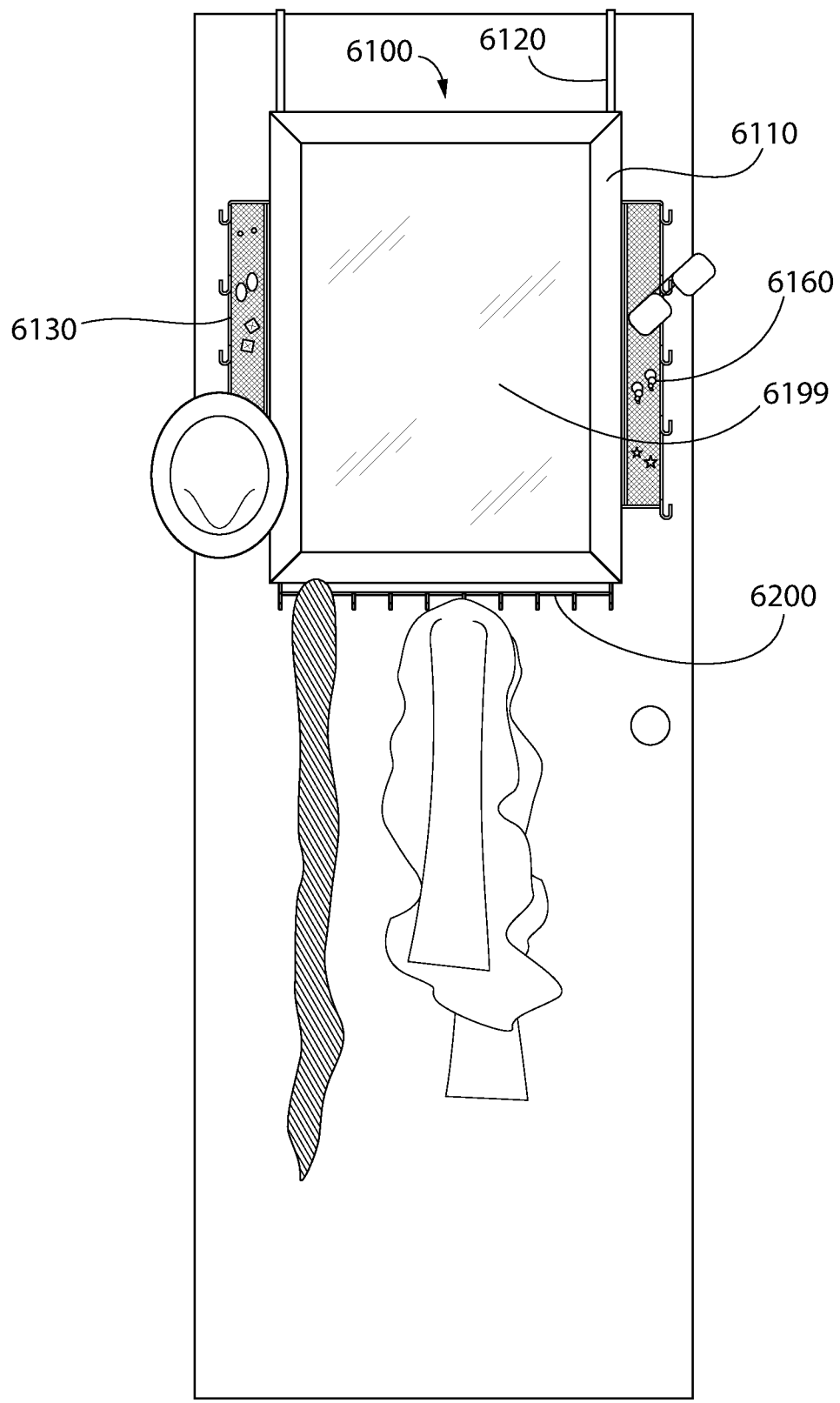
FIG. 58 is a front view illustrating the over-the-door hanging apparatus of FIG. 52 hanging from a door and holding articles on its accessory units.

Referring to FIG. 58, the hanging apparatus 6100 is illustrated hanging from a top edge of a door by the bracket assembly 6120. A user can hang various items or personal effects from the hooks 6132, 6162, 6201 of the first, second, and third accessory units 6130, 6160, 6200. For example, hats, glasses, sunglasses, jewelry, scarves, jackets, backpacks, purses, handbags, or the like may be hung from the hooks 6132, 6162, 6201. Furthermore, a user may use the mesh portions 6131, 6161 of the first and second accessory units 6130, 6160 to hold or store other personal effects, such as earrings or other jewelry.

Figures 59A, 59B:
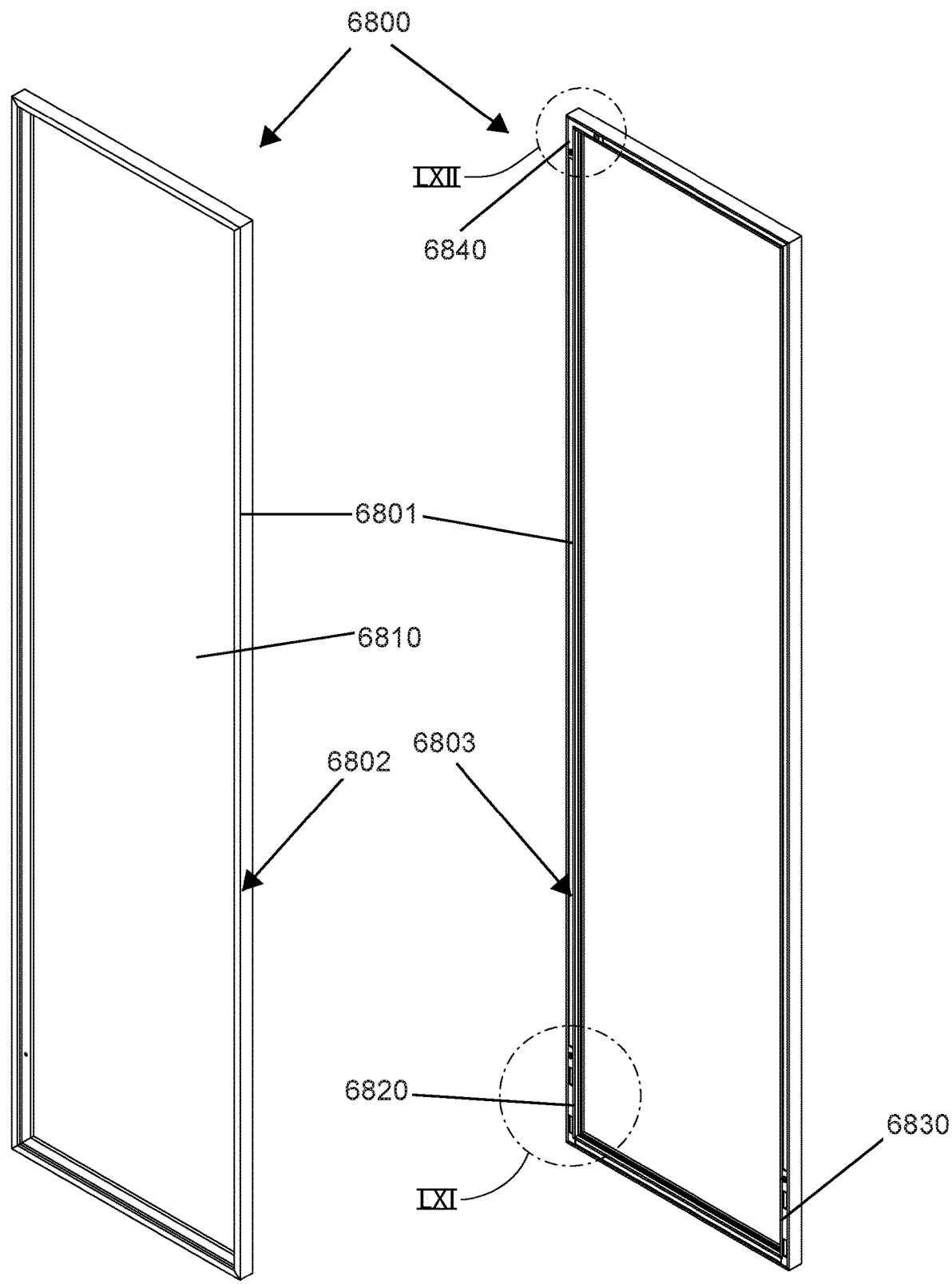
FIG. 59A is a front perspective view of an over-the-door hanging apparatus in accordance with an embodiment of the present invention.
FIG. 59B is a rear perspective view of the over-the-door hanging apparatus of FIG. 59A.

FIGS. 59A and 59B illustrate an over-the-door hanging apparatus 6800 in accordance with yet another embodiment of the present invention. The over-the-door hanging apparatus 6800 generally comprises a frame 6801, a flat article 6810 supported within the frame 6801, first and second mounting plates 6820, 6830 secured to a rear surface 6803 of the frame 801, a corner plate 6840 secured to the rear surface 6803 of the frame 6801, and a bracket assembly to which the frame 6801 is slidably mounted (the bracket assembly 150 described above can be used as the bracket assembly in this embodiment, although it is not separately illustrated herein with regard to the over-the-door hanging apparatus 6800 in the interest of brevity). The frame 6801 has a front surface 6802 and the rear surface 6803. The front surface 6802 defines a display opening through which the flat article 6810 can be viewed. In certain preferred embodiments, the flat article 6810 is a mirror. However, the flat article 6810 can be any other article that is desired to be displayed within the frame 6801 and particularly one that is desired to be hung from a door.

In this embodiment, the frame 6801 is preferably formed from aluminum or another metal. For example, the frame 6801 could be formed from an extrusion process out of aluminum or another metal or metal-like material. The construction of the frame 6801 may be one-piece construction in some embodiments, although the invention is not to be so limited and each linear section of the frame 6801 could be separately formed and then later connected together to form the frame 6801 in other embodiments.

Figure 60:
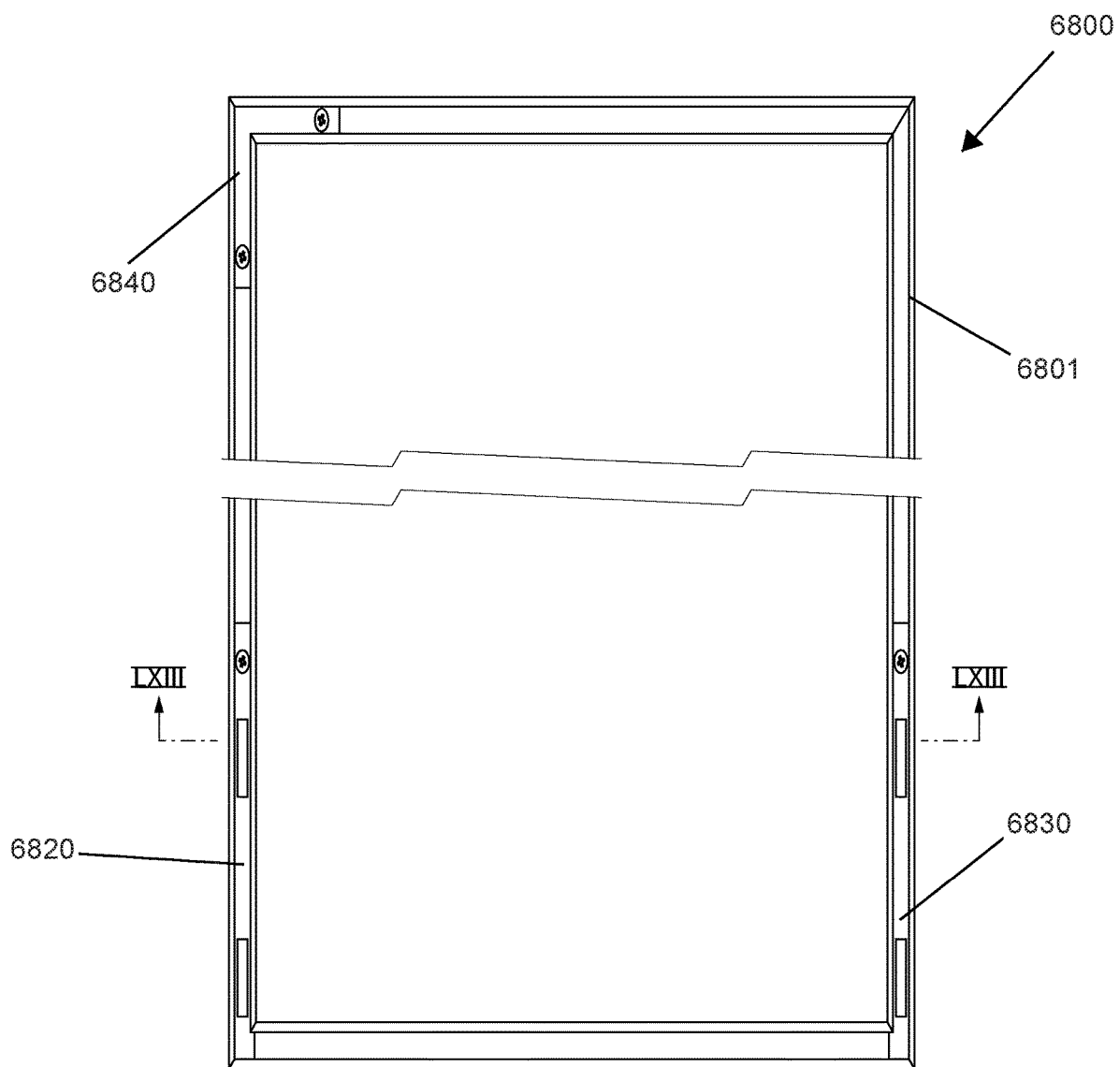
FIG. 60 is a rear elevation view of the over-the-door hanging apparatus of FIG. 59A.

FIG. 60 depicts a rear view of the over-the-door hanging apparatus 6800 showing the rear surface 6803 of the frame 6801 and the first and second mounting plates 6820, 6830 and the corner plate 6840 secured to the rear surface 6803 of the frame 6801. In this particular embodiment, there is one corner plate 6840 located along one corner of the rear surface 6803 of the frame 6801 and there are two of the mounting plates 6820, 6830 positioned along two opposing sides of the rear surface 6803 of the frame 6801 on opposite sides of the longitudinal axis of the frame 6801. In other embodiments, one of the corner plates 6840 may be positioned along each of the four corners of the rear surface 6803 of the frame 6801. In still other embodiments, the corner plates 6840 may be positioned along two or three of the four corners of the rear surface 6803 of the frame 6801. The corner plates 6840 provide stability to the frame 6801 by spanning across and being coupled directly to (with a fastener such as a screw as shown) two adjacent and perpendicularly oriented sides/sections of the frame 6801, thereby securing the linear sections of the frame 6801 together. The mounting plates 6820 can be used in a similar manner to the mounting plates described previously in this document along with the bracket assemblies 150 to hang the frame 6801 from the top of a door. In various different embodiments, the mounting plate 6820 may be positioned at different positions or heights along the two opposing sides on which they are located. However, the mounting plates 6820 should be aligned with one another (positioned at the same elevation/height along the sides) to ensure that they can be used to hang the frame 6801 in an even manner.

Figure 61:
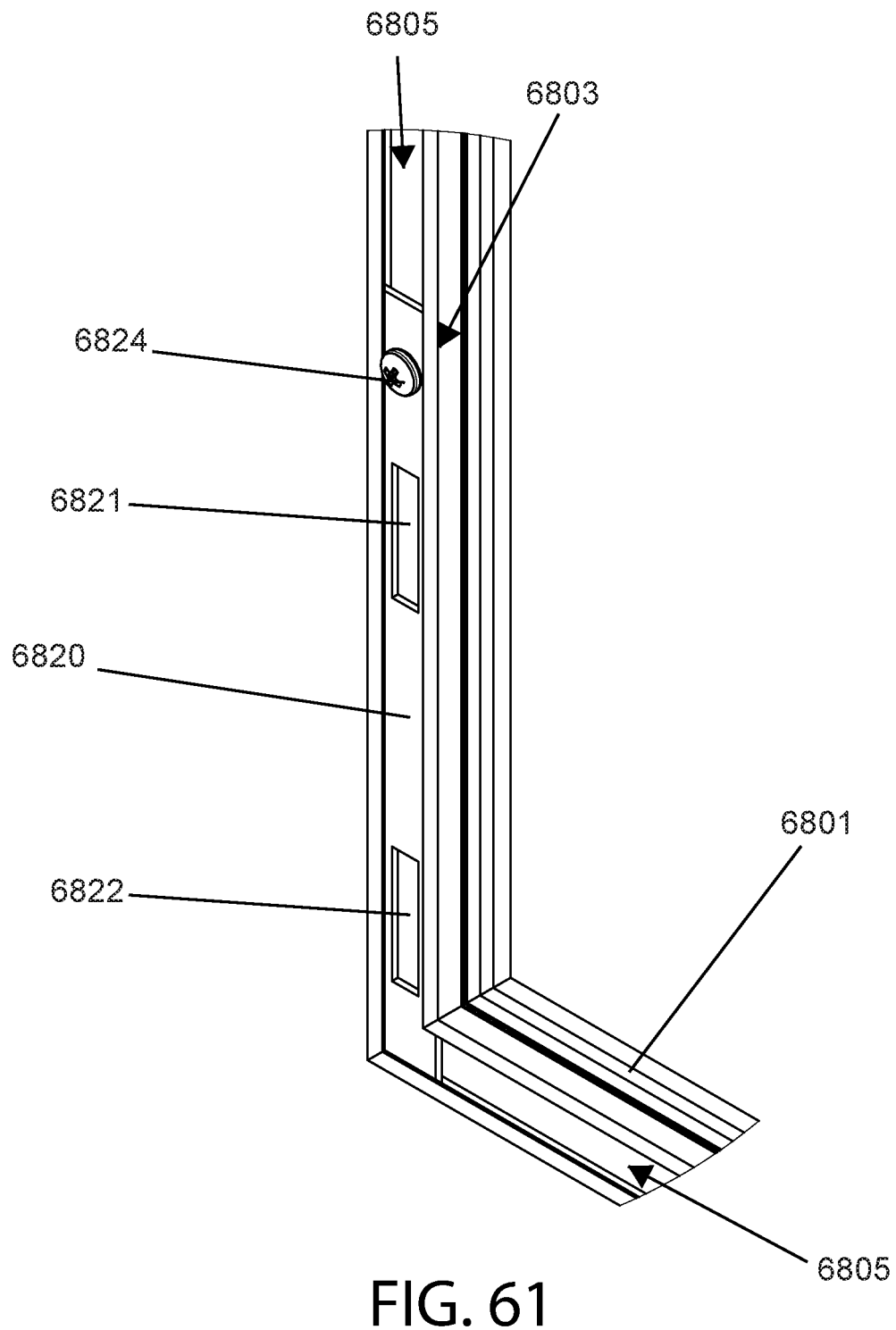
FIG. 61 is a close-up view of area LXI of FIG. 59B.

FIG. 61 is a close-up view of one of the corners of the frame 6801 with the first mounting plate 6820 coupled thereto. The rear surface 6803 of the frame 6801 comprises a channel 6805 and the first mounting plate 6820 is located within the channel 6805. The channel 6805 is defined by a floor, sidewalls extending from opposite sides of the floor, and a flange or lip extending inwardly towards each other at distal ends of the sidewalls (described further below with reference to FIG. 64). The flange or lip ensures that the first and second mounting plates 6820, 6830 are maintained in the channel 6805. Furthermore, the first and second mounting plates 6820, 6830 may be secured to the frame 6805 with a fastener such as a screw (also shown in FIG. 64). The second mounting plate 6830 is located within the channel 6805 on the opposite side of a longitudinal centerline of the frame 6801, although this is not shown in FIG. 61. As seen in FIG. 61, the entirety of the mounting plate 6820 nests within the channel 6805 in this embodiment. Specifically, the flange or lip of the frame 6801 overlies the exposed surface of the mounting plate 6820 to hold the mounting plate 6820 in the channel 6805.

The first mounting plate 6820 and the second mounting plate 6830 are identical. Thus, while the first mounting plate 6820 will be described, it should be appreciated that the details provided for the first mounting plate 6820 are also applicable for the second mounting plate 6830. The first mounting plate 6820 is a flat plate having a flat or planar front surface and a flat or planar rear surface. The first mounting plate 6820 comprises a first mounting element 6821, which, in the exemplified embodiment, is in the form of an aperture or opening, a second mounting element 6822, which, in the exemplified embodiment, is in the form of an aperture or opening, and a connection element 6823 in the form of an aperture or opening. In the exemplified embodiment, the first and second mounting elements 6821, 6822 are rectangular-shaped openings formed through the first mounting plate 6820. The first and second mounting elements 6821, 6822 are intended to receive the hooks of the bracket assembly 150 (i.e., the hooks 161, 162 as shown in FIGS. 3A and 3B) for mounting the frame 6801 to the bracket assembly 150.

However, the invention is not to be so limited in all embodiments. Thus, for example, the first and second mounting elements 6821, 6822 may be protrusions in other embodiments that mate with openings in the bracket assembly 150 while achieving the same result of coupling the bracket assembly 150 to the mounting plates 6820, 6830. Other engaging or corresponding features may be used as the mounting elements of the bracket assembly 150 and the mounting elements 6821, 6822 of the first mounting plate 6820 (and the second mounting plate 6830). This could include adhesives, hook-and-loop fasteners, notch/protrusion engagement, or the like.

As noted above, the first mounting plate 6820 also comprises the connection element 6823. In the exemplified embodiment, the connection element 6823 is an opening or aperture formed through the first mounting plate 6820. The connection element 6823 is configured to receive a screw 6824 to secure the first mounting plate 6820 to the frame 6801. In the exemplified embodiment, there is one connection element/aperture 6823 in the first mounting plate 6820. In other embodiments, multiple connection elements/apertures 6823 could be provided in the mounting plate 6820 to ensure that the mounting plate 6820 is securely coupled to the frame 6801.

Figure 62:
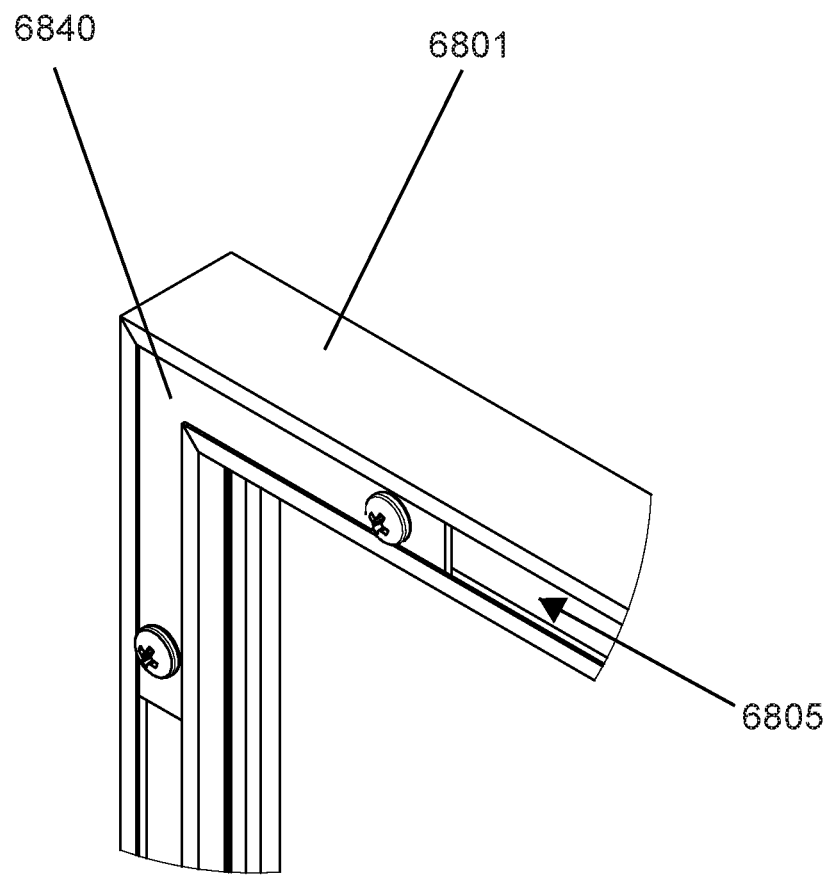
FIG. 62 is a close-up view of area LXII of FIG. 59B.

FIG. 62 illustrates a close-up view showing the corner plate 6840 mounted within the channel 6805 of the frame 6801 along one of the corners of the frame 6801. The corner plate 6840 is an L-shaped plate that assists in coupling together two sections of the frame 6801 that are oriented perpendicularly to one another. Specifically, the frame 6801 may be formed from four (or more than four or in some embodiments three) separate sections or components that are coupled together. The corner plate 6840 can help to hold the separate sections of the frame 6801 together by coupling the corner plate 6840 to two different sections of the frame 6801 with screws as shown in FIG. 62.

Figure 63:
FIG. 63 is a cross-sectional view taken along line LXIII-LXIII in FIG. 60.
Figure 64:
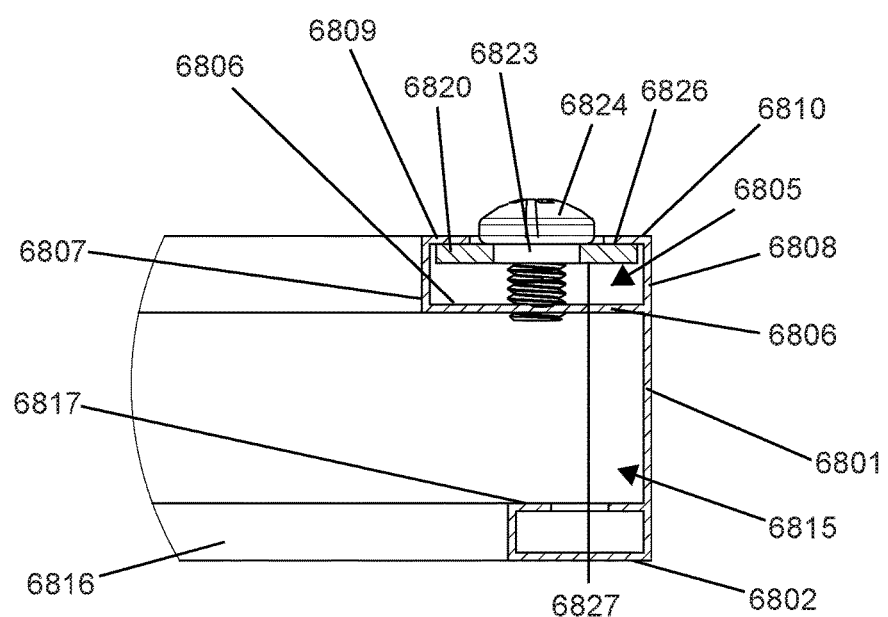
FIG. 64 is a detail view of area LXIV of FIG. 63.

FIG. 63 is a cross-sectional view taken along line LXIII-LXIII of FIG. 60 and FIG. 64 is a close-up view of area LXIV of FIG. 63. FIGS. 63 and 64 show how the screw 6824 may be used to couple the first mounting element 6820 to the frame 6801. As mentioned above, the channel 6805 is defined by a floor 6806, a first sidewall 6807 on a first side of the floor 6806, and a second sidewall 6808 on a second side of the floor 6806. Furthermore, a flange 6809 extends from the first sidewall 6807 inwardly towards the second sidewall 6808 and a second flange 6810 extends from the second sidewall 6808 inwardly towards the first sidewall 6807. The first mounting plate 6820 nests within the channel 6805 between the flanges 6809, 6810 and the floor 6806. The screw or other fastener 6824 extends through the apertures 6823 in the first mounting plate 6820 and then through an opening in the floor 6806 of the channel 6805 to secure the first mounting plate 6820 to the frame 6801. Notably, although not shown herein, the second mounting plate 6830 is secured to the frame 6801 in the same way. FIGS. 63 and 64 also illustrate how, in this embodiment, the first mounting plate 6820 has a planar top and bottom surface, although the invention is not to be so limited in all embodiments as described below with reference to FIGS. 67 and 68.

FIGS. 63 and 64 also depict the rabbet 6815 of the frame 6801. The mirror or other item that is intended to be displayed (not shown in FIGS. 63 and 64) is positioned within the rabbet 6815 and rests atop of a floor 6817 of the rabbet 6815. The rabbet 6815 is the space defined between the floor 6817 of the rabbet 6815 and the floor 6806 of the channel 6805. The mirror or other item is displayed and visible through a display opening 6816 on the front surface 6802 of the frame 6801.

Figure 65:
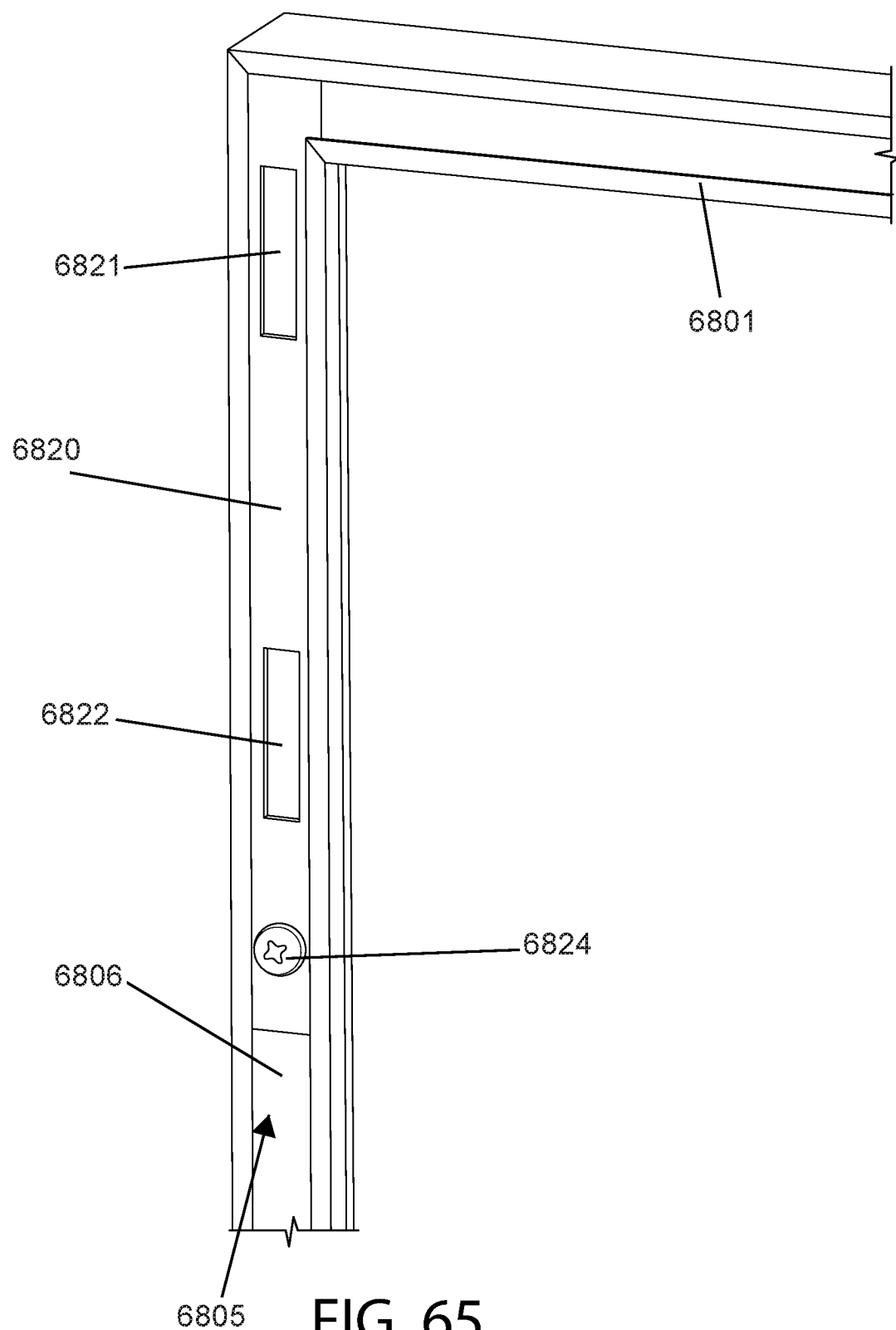
FIG. 65 is a perspective view of a portion of the rear of the over-the-door hanging apparatus of FIG. 59A.
Figure 66:
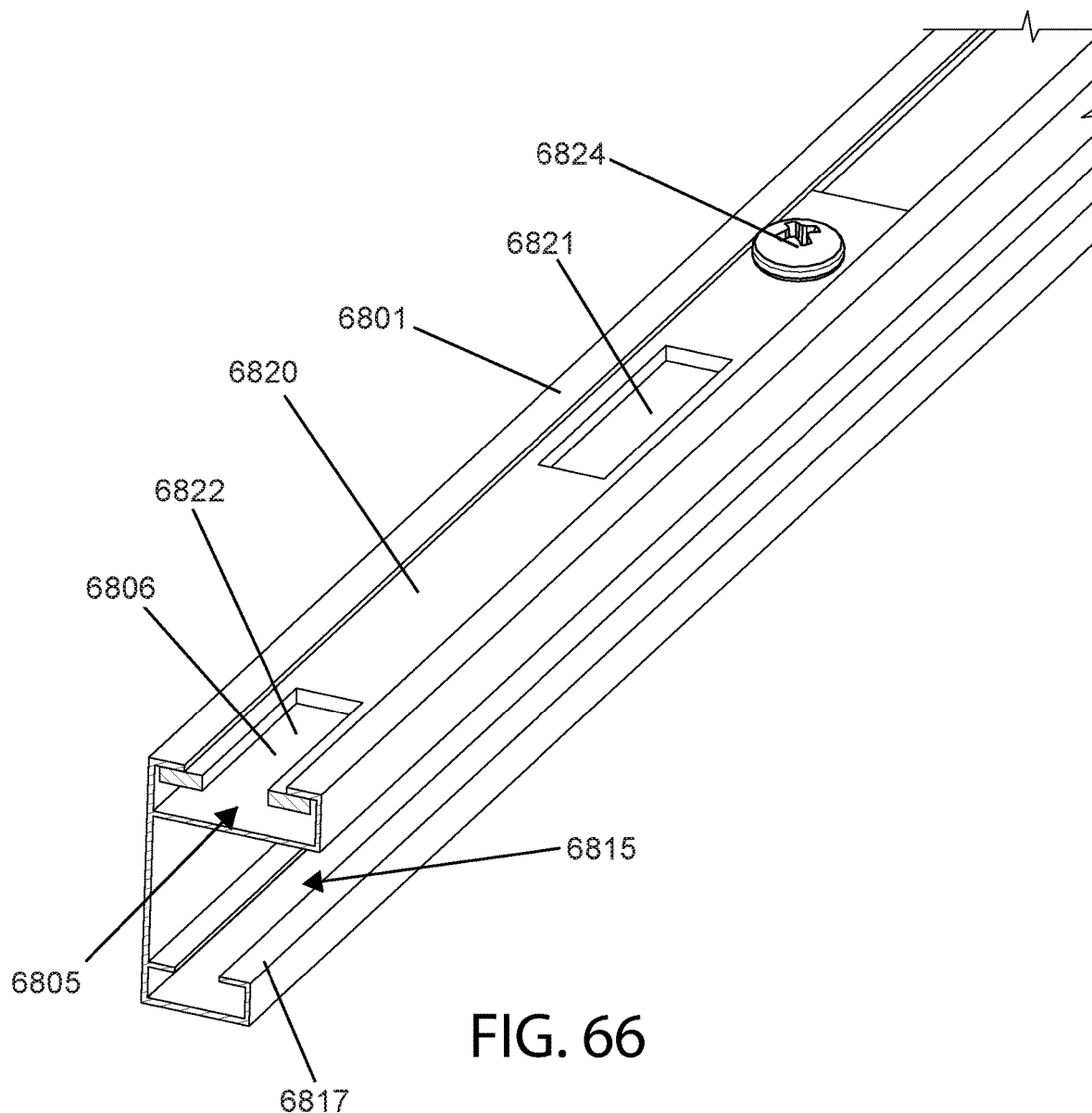
FIG. 66 is a perspective cut-away view of a portion of the rear of the over-the-door hanging apparatus of FIG. 59A.

FIGS. 65 and 66 are three-dimensional renderings of portions of the over-the-door hanging apparatus 6800 that illustrate a portion of the frame 6801 and the first mounting plate 6820 coupled thereto. Referring to FIGS. 64 and 66 in particular, the first mounting plate 6820 comprises a front surface 6826 and a rear surface 6827 opposite the front surface 6826. Furthermore, the channel 6805 comprises the floor 6806. The first mounting plate 6820 is positioned in the channel 6805 so that the rear surface 6827 of the first mounting plate 6820 is spaced apart from the floor 6806 of the channel 6805. Thus, there is a space between the rear surface 6827 of the mounting plate 6820 and the floor 6806 of the channel 6805 within which the hooks or other mounting elements of the bracket assembly (such as the bracket assembly 150) can nest when the bracket assembly 150 is mounted or otherwise coupled to the frame 6801 via the first and second mounting plates 6820, 6830.

Figure 67:
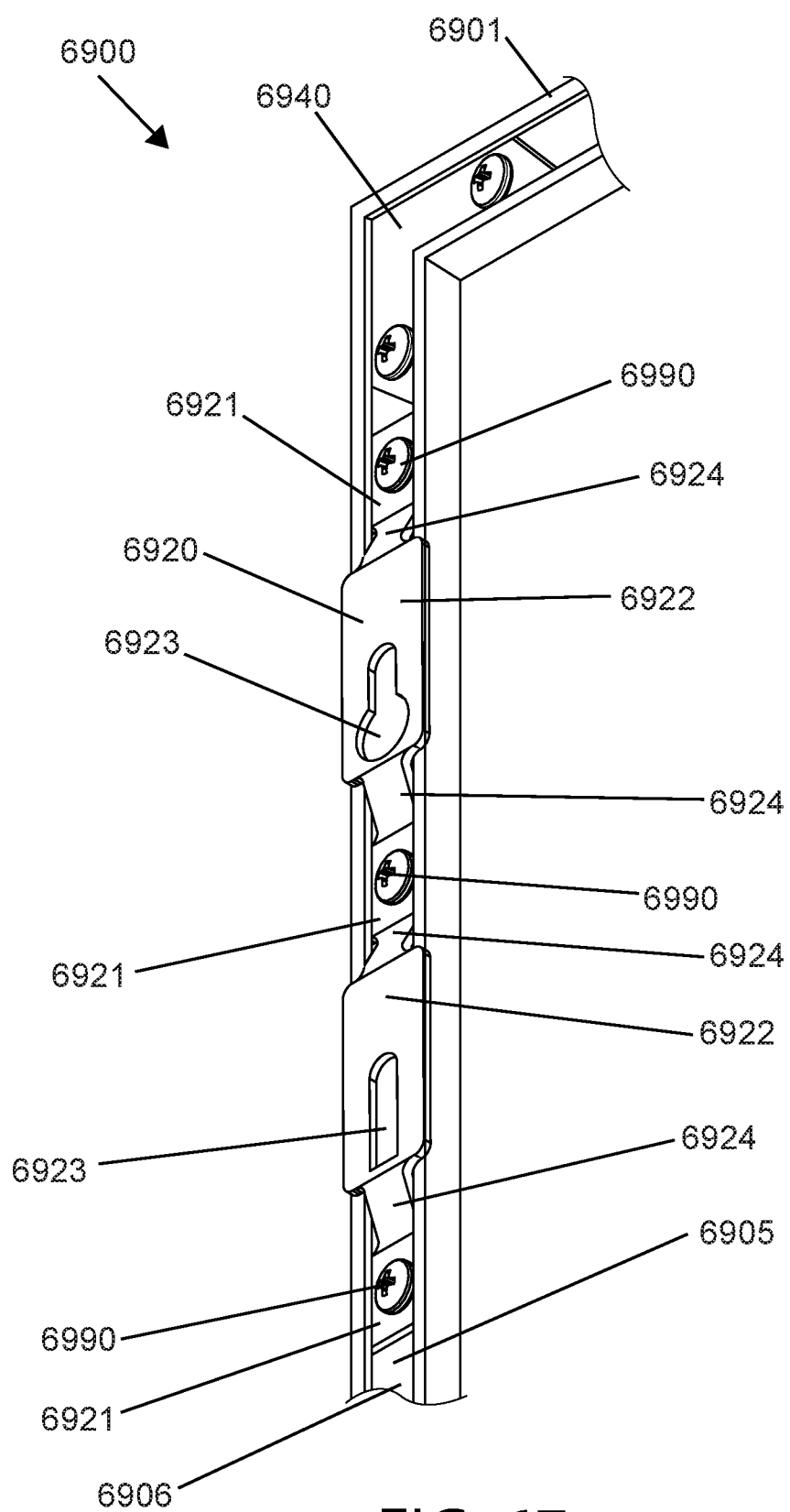
FIG. 67 is a partial rear view of an over-the-door hanging apparatus in accordance with still another embodiment of the present invention.

FIG. 67 illustrates an over-the-door hanging apparatus 6900 in accordance with another embodiment. The over-the-door hanging apparatus 6900 is identical to the over-the-door hanging apparatus 6800 except that it includes a different type of mounting bracket 6920. Thus, the over-the-door hanging apparatus 6900 includes the aluminum or metal frame with the channel 6905, but the configuration and structure of the mounting brackets 6920 is modified from that which was shown and described in the previous embodiment of the over-the-door hanging apparatus 6800. In FIG. 67 only one mounting bracket 6920 is depicted, but it should be appreciated that there would be an identical one on the opposite side of the frame 6901. There is also a corner bracket 6940 coupled to the frame 6901 in this embodiment, as shown.

Figure 68:
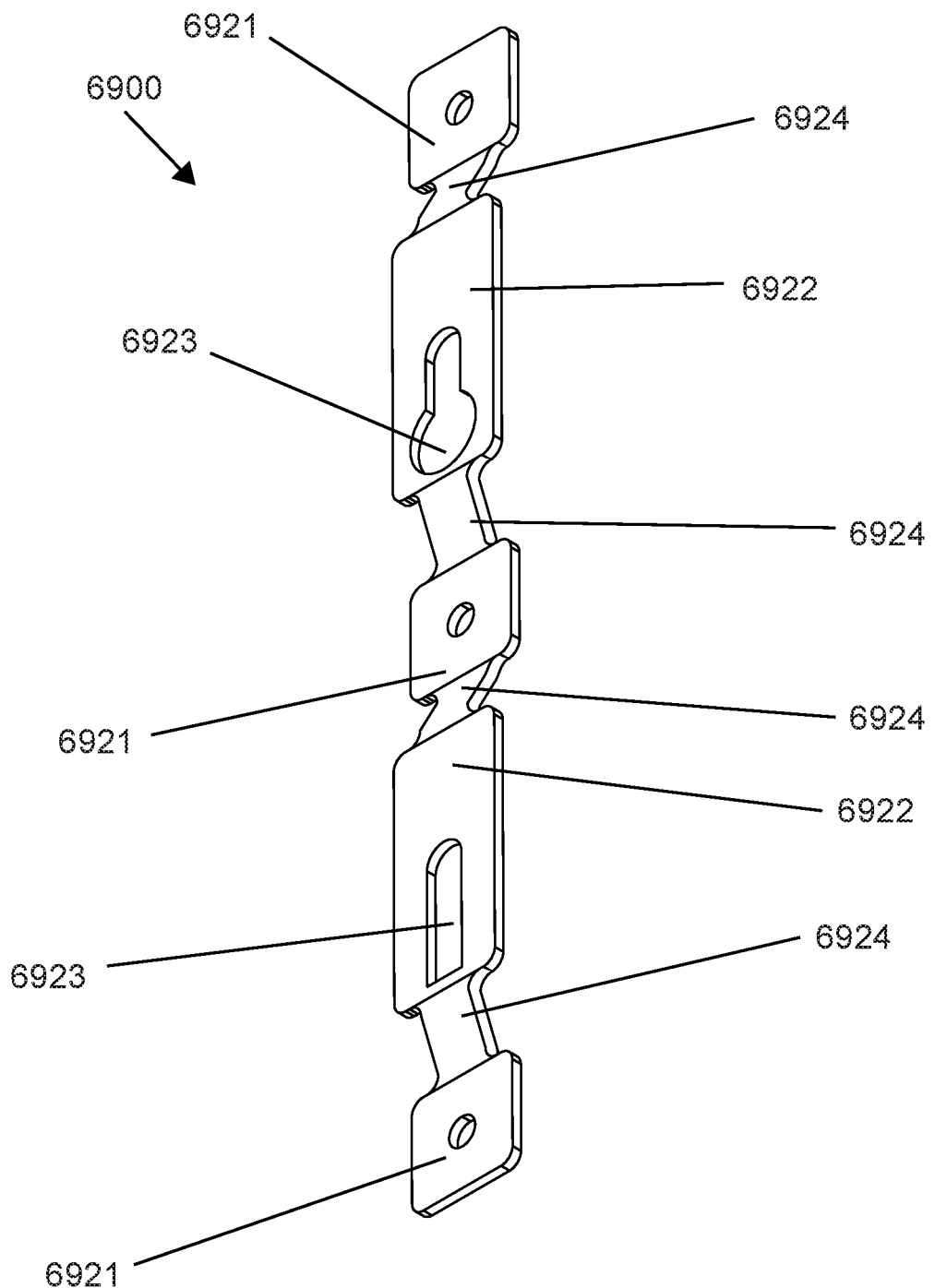
FIG. 68 is a perspective view of a mounting plate of the over-the-door hanging apparatus of FIG. 67.

Referring to FIGS. 67 and 68, the mounting bracket 6920 will be described in greater detail. The mounting bracket 6920 comprises a plurality of first portions 6921 that are configured for coupling the mounting bracket 6920 to the frame 6901 and a plurality of second portions 6922 that are configured for coupling the mounting bracket 6920 to the bracket assembly 150 (i.e., to the first and second elongate members 151, 251 of the bracket assembly 150).

The first portions 6921 of the mounting bracket 6920 comprise holes through which fasteners 6990 can be disposed for purposes of coupling the mounting bracket 6920 to the frame 6901. Thus, the fasteners 6990 extend through the holes in the first portions 6921 of the mounting bracket 6920 and into holes in the floor of the channel 6905 similar to the manner in which the mounting brackets 6820 are coupled to the frame 6801 as described above.

The second portions 6922 of the mounting bracket 6920 comprise mounting elements 6923, which in the exemplified embodiment are openings that are configured to receive the hooks of the bracket assembly 150 for coupling the bracket assembly 150 to the mounting bracket 6920 which is in turn coupled to the frame 6901. Of course, as has been described above, the mounting elements 6923 could be modified to be protrusions, adhesives, hook-and-loop, or other structures or components so long as they are configured to mate with or engage the bracket assembly 150 for purposes of coupling the bracket assembly to the mounting brackets 6920.

In the exemplified embodiment, mounting element 6923 of one of the second portions 6922 of the mounting bracket 6920 has a different shape than the mounting element 6923 of the other one of the second portions 6922 of the mounting bracket 6920. Specifically, in the exemplified embodiment the mounting elements 6923 are both apertures. One of the apertures has a circular-shaped insertion section and a thinner elongated nesting section which is generally used to accept a screw head and neck. The other of the apertures has an elongated section only (i.e., rectangular shaped) without a circular-shaped insertion section so that it can accept/receive one of the hooks of the bracket assembly 150. Of course, variations to the shapes of the apertures of the mounting elements 6923 are possible in other embodiments. For example, in some embodiments both of the mounting elements 6923 of the mounting bracket 6920 may have a circular-shaped insertion section and an elongated nesting section. In still other embodiments, both of the mounting elements 6923 could be rectangular shaped apertures. Thus, variations are possible as should be understood in the context of the disclosure set forth herein its entirety.

The second portions 6922 of the mounting bracket 6920 are coupled to the first portions 6921 of the mounting bracket 6920 by inclined connector members 6924. Specifically, one of the inclined connector members 6924 extends from each end of each of the second portions 6922 of the mounting bracket 6920 to the first portions 6921 of the mounting bracket 6920. The inclined connector members 6924 are oriented at an angle relative to the first and second portions 6221, 6222 of the mounting bracket 6220. Thus, if the first and second portions 6921, 6922 are planar and parallel to one another as they appear in the exemplified embodiment, the inclined connector members 6924 are oblique relative to the first and second portions 6921, 6922. In fact, regardless of the relative orientation of the first and second portions 6921, 6922 to each other, the inclined connector members 6924 are oriented obliquely relative to each of the first and second portions 6921, 6922 in the exemplified embodiment. In other embodiments, it may be possible for the inclined connector members 6924 to be oriented perpendicularly to the first and second portions 6921, 6922 of the mounting bracket 6920.

Due to the inclination of the connector members 6924, as the first portions 6921 of the mounting bracket 6920 are secured to the floor 6906 of the channel 6905, the second portions 6922 of the mounting bracket 6920 are elevated or raised above the floor 6906 of the channel 6905. This ensures that there is a space between the rear surface of the mounting brackets 6920 and the floor 6906 of the channel 6905 within which the hooks of the bracket assembly 150 can best when the bracket assembly 150 is coupled to the mounting brackets 6920. FIG. 68 also shows that the inclined orientation of the connector members 6924 elevates the second portions 6922 of the mounting bracket 6920 relative to the first portions 6921 of the mounting bracket 6920.

Although there are many embodiments disclosed herein, some features may only be described with regard to one embodiment despite that feature being applicable to other of the embodiments disclosed herein. For example, the bracket assembly and the elongate members are illustrated in most of the embodiments. However, they are described in varying detail in each embodiment. It should be appreciated that the disclosure of one embodiment may be applicable to other embodiments and the omission of a detailed description of some features in some embodiments may be done in the interest of brevity.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A hanging apparatus comprising:
a support structure comprising a front surface, a rear surface, and a perimetric edge extending between the front and rear surfaces;
a bracket assembly coupled to the support structure and configured to hang the support structure from a surface; and
at least one accessory unit detachably coupled to the support structure, the at least one accessory unit comprising a mesh portion located adjacent to at least a portion of the perimetric edge of the support structure.

2. The hanging apparatus according to claim 1 wherein the at least one accessory unit further comprises at least one mounting element that mates with a first mounting element on the rear surface of the support structure to couple the accessory unit to the support structure.

3. The hanging apparatus according to claim 1 wherein the perimetric edge of the support structure comprises a top edge, a bottom edge opposite the top edge, a first lateral edge, and a second lateral edge opposite the first lateral edge, and wherein the mesh portion of the at least one accessory unit is adjacent to at least a portion of one of the first and second lateral edges of the support structure.

4. The hanging apparatus according to claim 3 wherein the support structure extends from the bottom edge to the top edge along a longitudinal axis, wherein the mesh portion comprises a wire mesh, and wherein the mesh portion is elongated in a direction parallel to the longitudinal axis.

5. The hanging apparatus according to claim 3, wherein the mesh portion of the at least one accessory unit comprises a first accessory unit detachably coupled to the support structure and a second accessory unit detachably coupled to the support structure, the first accessory unit comprising a first mesh portion located adjacent to the first lateral edge of the support structure and the second accessory unit comprising a second mesh portion located adjacent to the second lateral edge of the support structure.

6. The hanging apparatus according to claim 1 wherein the at least one accessory unit further comprises at least one hook extending from the mesh portion for hanging personal effects thereon.

7. The hanging apparatus according to claim 6 wherein the mesh portion of the at least one accessory unit comprises a first edge located adjacent to the perimetric edge of the support structure and a second edge opposite the first edge, wherein the at least one hook extends from the second edge of the mesh portion.

8. The hanging apparatus according to claim 6 further comprising a plurality of hooks extending from the mesh portion in a spaced apart manner.

9. The hanging apparatus according to claim 1 wherein the at least one accessory unit is a separate component from the support structure and the bracket assembly.

10. The hanging apparatus according to claim 1 further comprising:
a first mounting plate coupled to the rear surface of the support structure, the bracket assembly coupled to the first mounting plate; and
a second mounting plate coupled to the rear surface of the support structure, the at least one accessory unit coupled to the second mounting plate.

11. The hanging apparatus according to claim 1 further comprising an item coupled to the support structure, the item selected from a group consisting of a mirror, a chalkboard, a cork board, and a white board.

12. A hanging apparatus comprising:
a support structure comprising a front surface, a rear surface, and a perimetric edge extending between the front and rear surfaces;
a bracket assembly coupled to the support structure and configured to hang the support structure from a surface; and
a first accessory unit detachably coupled to the support structure, the first accessory unit comprising a plurality of hooks arranged in a spaced apart manner adjacent to at least a portion of the perimetric edge of the support structure.

13. The hanging apparatus according to claim 12 wherein the bracket assembly is configured to hang the support structure from a top edge of a door.

14. The hanging apparatus according to claim 12 further comprising a first mounting element located on a rear surface of the support structure, and wherein the first accessory unit comprises a second mounting element that mates with the first mounting element to detachably couple the first accessory unit to the support structure.

15. The hanging apparatus according to claim 12 wherein the perimetric edge of the support structure comprises a bottom edge, a top edge, a first lateral edge, and a second lateral edge, the plurality of hooks of the first accessory unit being located adjacent to the bottom edge of the support structure, and further comprising a second accessory unit detachably coupled to the support structure, the second accessory unit comprising a mesh portion located adjacent to the first lateral edge of the support structure.

16. The hanging apparatus according to claim 15 further comprising a third accessory unit detachably coupled to the support structure, the third accessory unit comprising a mesh portion located adjacent to the second lateral edge of the support structure.

17. The hanging apparatus according to claim 16 wherein each of the second and third accessory units comprises a plurality of hooks extending from the mesh portion in a direction away from the one of the first and second lateral edges of the support structure to which it is adjacent.

18. The over-the-door hanging apparatus according to claim 12 further comprising an item coupled to the support structure, the item selected from a group consisting of a mirror, a chalkboard, a cork board, and a white board.

19. An apparatus comprising:
  a support structure;
  a mirror coupled to the support structure and exposed at a front surface of the support structure;
  a first accessory unit detachably coupled to the support structure and being positioned adjacent to a lateral edge of the support structure;
  a second accessory unit detachably coupled to the support structure and being positioned adjacent to a bottom edge of the support structure; and
  wherein each of the first and second accessory units comprises a plurality of hooks.

20. The apparatus according to claim 19 wherein the first accessory unit further comprises a mesh portion located between the lateral edge of the support structure and the plurality of hooks of the first accessory unit.

* * * * *